(12) United States Patent
Roumi

(10) Patent No.: US 11,527,802 B2
(45) Date of Patent: *Dec. 13, 2022

(54) ELECTROCHEMICAL SYSTEMS WITH IONICALLY CONDUCTIVE AND ELECTRONICALLY INSULATING SEPARATOR

(71) Applicant: CALIFORNIA INSTITUTE OF TECHNOLOGY, Pasadena, CA (US)

(72) Inventor: Farshid Roumi, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,036

(22) Filed: May 11, 2020

(65) Prior Publication Data
US 2020/0388811 A1    Dec. 10, 2020

Related U.S. Application Data

(63) Continuation of application No. 15/911,020, filed on Mar. 2, 2018, now Pat. No. 10,693,117, which is a
(Continued)

(51) Int. Cl.
*H01M 8/22*         (2006.01)
*H01M 50/449*       (2021.01)
(Continued)

(52) U.S. Cl.
CPC ........ *H01M 50/449* (2021.01); *H01G 9/0029* (2013.01); *H01G 11/52* (2013.01);
(Continued)

(58) Field of Classification Search
CPC ............ H01M 50/449; H01M 50/403; H01M 50/463; H01M 50/446; H01M 50/431;
(Continued)

(56) References Cited

U.S. PATENT DOCUMENTS

| | | |
|---|---|---|
| 528,647 A | 11/1894 | Reed |
| 990,069 A | 4/1911 | Sessions |

(Continued)

FOREIGN PATENT DOCUMENTS

| | | |
|---|---|---|
| CN | 1555588 | 12/2004 |
| CN | 1670989 | 9/2005 |

(Continued)

OTHER PUBLICATIONS

Korean Intellectual Property Office, "Notice to File a Response," dated Jul. 26, 2021, corresponding to Korean Patent Application No. 10-2021-7007717.

(Continued)

*Primary Examiner* — Raymond Alejandro
(74) *Attorney, Agent, or Firm* — Leydig, Voit & Mayer, Ltd.

(57) ABSTRACT

Separator systems for electrochemical systems providing electronic, mechanical and chemical properties useful for applications including electrochemical storage and conversion. Separator systems include structural, physical and electrostatic attributes useful for managing and controlling dendrite formation and for improving the cycle life and rate capability of electrochemical cells including silicon anode based batteries, air cathode based batteries, redox flow batteries, solid electrolyte based systems, fuel cells, flow batteries and semisolid batteries. Separators include multilayer, porous geometries supporting excellent ion transport properties, providing a barrier to prevent dendrite initiated mechanical failure, shorting or thermal runaway, or providing improved electrode conductivity and improved electric field uniformity, as well as composite solid electrolytes with supporting mesh or fiber systems providing solid electrolyte hardness and safety with supporting mesh or fiber toughness (Continued)

and long life required for thin solid electrolytes without fabrication pinholes or operationally created cracks.

29 Claims, 59 Drawing Sheets

Related U.S. Application Data continuation of application No. 15/148,278, filed on May 6, 2016, now Pat. No. 9,954,213, which is a continuation of application No. 13/738,835, filed on Jan. 10, 2013, now Pat. No. 9,379,368, which is a continuation-in-part of application No. 13/545,683, filed on Jul. 10, 2012, now Pat. No. 10,158,110, and a continuation-in-part of application No. PCT/US2012/046067, filed on Jul. 10, 2012.

(60) Provisional application No. 61/679,584, filed on Aug. 3, 2012, provisional application No. 61/677,306, filed on Jul. 30, 2012, provisional application No. 61/622,371, filed on Apr. 10, 2012, provisional application No. 61/506,489, filed on Jul. 11, 2011.

(51) Int. Cl.
| | |
|---|---|
| *H01G 9/00* | (2006.01) |
| *H01G 11/52* | (2013.01) |
| *H01M 50/403* | (2021.01) |
| *H01M 50/411* | (2021.01) |
| *H01M 50/431* | (2021.01) |
| *H01M 50/446* | (2021.01) |
| *H01M 50/463* | (2021.01) |
| *H01M 4/131* | (2010.01) |
| *H01M 4/133* | (2010.01) |
| *H01M 4/134* | (2010.01) |
| *H01M 4/136* | (2010.01) |
| *H01M 4/38* | (2006.01) |
| *H01M 4/525* | (2010.01) |
| *H01M 4/58* | (2010.01) |
| *H01M 4/587* | (2010.01) |
| *H01M 4/62* | (2006.01) |
| *H01M 8/02* | (2016.01) |
| *H01M 8/0245* | (2016.01) |
| *H01M 8/1016* | (2016.01) |
| *H01M 10/0525* | (2010.01) |
| *H01M 10/0562* | (2010.01) |
| *H01M 10/0568* | (2010.01) |
| *H01M 10/0569* | (2010.01) |
| *H01M 10/0585* | (2010.01) |
| *H01M 12/08* | (2006.01) |
| *H01M 10/052* | (2010.01) |
| *H01M 4/02* | (2006.01) |

(52) U.S. Cl.
CPC .......... *H01M 4/131* (2013.01); *H01M 4/133* (2013.01); *H01M 4/134* (2013.01); *H01M 4/136* (2013.01); *H01M 4/38* (2013.01); *H01M 4/382* (2013.01); *H01M 4/525* (2013.01); *H01M 4/587* (2013.01); *H01M 4/5825* (2013.01); *H01M 4/625* (2013.01); *H01M 8/02* (2013.01); *H01M 8/0245* (2013.01); *H01M 8/1016* (2013.01); *H01M 10/0525* (2013.01); *H01M 10/0562* (2013.01); *H01M 10/0568* (2013.01); *H01M 10/0569* (2013.01); *H01M 10/0585* (2013.01); *H01M 12/08* (2013.01); *H01M 50/403* (2021.01); *H01M 50/411* (2021.01); *H01M 50/431* (2021.01); *H01M 50/446* (2021.01); *H01M 50/463* (2021.01); *H01M 10/052* (2013.01); *H01M 2004/027* (2013.01); *H01M 2004/028* (2013.01); *H01M 2300/004* (2013.01); *H01M 2300/0037* (2013.01); *H01M 2300/0071* (2013.01); *Y10T 29/49108* (2015.01)

(58) Field of Classification Search
CPC .... H01M 50/411; H01M 4/131; H01M 4/133; H01M 4/134; H01M 4/136; H01M 4/38; H01M 4/382; H01M 4/525; H01M 4/5825; H01M 4/587; H01M 4/625; H01M 8/02; H01M 8/0245; H01M 8/1016; H01M 10/052; H01M 10/0525; H01M 10/0562; H01M 10/0568; H01M 10/0569; H01M 10/0585; H01M 12/08; H01M 2004/027; H01M 2004/028; H01M 2300/0037; H01M 2300/004; H01M 2300/0071; H01G 9/0029; H01G 11/52; Y10T 29/49108
See application file for complete search history.

(56) References Cited

U.S. PATENT DOCUMENTS

| | | | |
|---|---|---|---|
| 2,673,230 | A | 3/1954 | Brennan |
| 3,168,458 | A | 2/1965 | Sprague |
| 3,275,478 | A | 9/1966 | Rosser et al. |
| 3,342,717 | A | 9/1967 | Leduc |
| 3,351,495 | A | 11/1967 | Wayne et al. |
| 3,607,422 | A | 9/1971 | Moran |
| 3,639,173 | A | 2/1972 | Stachurski |
| 3,970,472 | A | 7/1976 | Steffensen |
| 3,972,795 | A | 8/1976 | Goens et al. |
| 4,041,211 | A | 8/1977 | Wiacek |
| 4,052,539 | A | 10/1977 | Shropshire et al. |
| 4,346,152 | A | 8/1982 | Sammells et al. |
| 4,349,614 | A | 9/1982 | Werth et al. |
| 4,438,185 | A | 3/1984 | Taskier |
| 4,786,567 | A | 11/1988 | Skyllas-Kazacos et al. |
| 4,871,428 | A | 10/1989 | Misra et al. |
| 4,981,672 | A | 1/1991 | De Neufville et al. |
| 5,089,455 | A | 2/1992 | Ketcham et al. |
| 5,227,260 | A | 7/1993 | Rose et al. |
| 5,384,211 | A | 1/1995 | Choi et al. |
| 5,487,959 | A | 1/1996 | Koksbang |
| 5,510,209 | A | 4/1996 | Abraham et al. |
| 5,554,464 | A | 9/1996 | Stempin et al. |
| 5,601,951 | A | 2/1997 | Johnson et al. |
| 5,714,283 | A | 2/1998 | Briscoe et al. |
| 5,952,120 | A | 9/1999 | Yu et al. |
| 6,074,776 | A | 6/2000 | Mao et al. |
| 6,096,456 | A | 8/2000 | Takeuchi et al. |
| 6,146,786 | A | 11/2000 | Stadnick et al. |
| 6,306,540 | B1 | 10/2001 | Hiroi et al. |
| 6,335,115 | B1 | 1/2002 | Meissner |
| 6,372,379 | B1 * | 4/2002 | Samii ............... H01M 50/417 |
| | | | 429/129 |
| 6,383,675 | B1 | 5/2002 | Zhong |
| 6,432,586 | B1 | 8/2002 | Zhang |
| 6,444,339 | B1 | 9/2002 | Eshraghi |
| 6,444,340 | B1 | 9/2002 | Jaffrey |
| 6,447,958 | B1 | 9/2002 | Shinohara et al. |
| 6,462,551 | B1 | 10/2002 | Coates et al. |
| 6,489,055 | B1 | 12/2002 | Ichihashi et al. |
| 6,563,691 | B2 | 5/2003 | Kijima et al. |
| 6,602,593 | B1 * | 8/2003 | Callahan ............. H01M 50/403 |
| | | | 428/315.9 |
| 6,770,401 | B1 | 8/2004 | Clough |
| 6,781,817 | B2 | 8/2004 | Andelman |
| 6,830,849 | B2 | 12/2004 | Lee et al. |
| 6,852,446 | B2 | 2/2005 | Barbarich |
| 6,869,727 | B2 | 3/2005 | Slezak |
| 7,282,295 | B2 | 10/2007 | Visco et al. |

(56) References Cited

U.S. PATENT DOCUMENTS

| | | | |
|---|---|---|---|
| 7,282,296 B2 | 10/2007 | Visco et al. |
| 7,390,591 B2 | 6/2008 | Visco et al. |
| 7,425,387 B2 | 9/2008 | Bohnstedt |
| 7,553,584 B2 | 6/2009 | Chiang et al. |
| 7,618,748 B2 | 11/2009 | Nathan et al. |
| 7,642,012 B2 | 1/2010 | Djian et al. |
| 7,662,510 B2 | 2/2010 | Zhang |
| 7,811,507 B2 | 10/2010 | Wechs et al. |
| 7,846,571 B2 | 12/2010 | Christensen et al. |
| 7,951,480 B1 | 5/2011 | Skinlo et al. |
| 7,985,337 B2 | 7/2011 | Heuser et al. |
| 8,017,260 B2 | 9/2011 | Kaneta et al. |
| 8,048,556 B2 | 11/2011 | Davis et al. |
| 8,110,301 B2 | 2/2012 | Lacovangelo et al. |
| 8,119,269 B2 | 2/2012 | Ramasubramanian et al. |
| 8,119,273 B1 | 2/2012 | Gerald, II et al. |
| 8,202,649 B2 | 6/2012 | Visco et al. |
| 8,216,712 B1 | 7/2012 | Ramasubramanian et al. |
| 8,288,034 B2 | 10/2012 | Davis et al. |
| 8,697,290 B2 | 4/2014 | Babinec et al. |
| 8,703,356 B2 | 4/2014 | Hayashi |
| 9,379,368 B2 * | 6/2016 | Roumi | H01M 4/5825 |
| 9,658,292 B2 | 5/2017 | Roumi et al. |
| 9,831,043 B2 | 11/2017 | Roumi et al. |
| 9,882,196 B2 | 1/2018 | Eaglesham et al. |
| 9,954,213 B2 * | 4/2018 | Roumi | H01M 10/0569 |
| 10,158,110 B2 * | 12/2018 | Roumi | H01M 50/491 |
| 10,693,117 B2 | 6/2020 | Roumi |
| 10,714,724 B2 | 7/2020 | Roumi et al. |
| 2001/0041295 A1 | 11/2001 | Vallee et al. |
| 2002/0150818 A1 | 10/2002 | Amatucci et al. |
| 2002/0160263 A1 | 10/2002 | Corrigan et al. |
| 2003/0013015 A1 | 1/2003 | Klein et al. |
| 2003/0059681 A1 | 3/2003 | Noh |
| 2003/0096147 A1 | 5/2003 | Badding et al. |
| 2003/0099884 A1 | 5/2003 | Chiang et al. |
| 2004/0011661 A1 | 1/2004 | Bradford et al. |
| 2004/0018431 A1 | 1/2004 | Gozdz et al. |
| 2004/0126653 A1 | 7/2004 | Visco et al. |
| 2004/0175626 A1 | 9/2004 | Dasgupta et al. |
| 2004/0234862 A1 | 11/2004 | Macglashan et al. |
| 2004/0241540 A1 | 12/2004 | Tsutsumi et al. |
| 2005/0074671 A1 | 4/2005 | Sugiyama et al. |
| 2005/0095504 A1 | 5/2005 | Kim et al. |
| 2005/0175894 A1 | 8/2005 | Visco et al. |
| 2005/0186469 A1 | 8/2005 | De Jonghe et al. |
| 2005/0208383 A1 | 9/2005 | Totsuka et al. |
| 2006/0121342 A1 | 6/2006 | Sano et al. |
| 2006/0154141 A1 | 7/2006 | Salot et al. |
| 2007/0059584 A1 | 3/2007 | Nakano et al. |
| 2007/0117000 A1 | 5/2007 | An et al. |
| 2007/0141432 A1 | 6/2007 | Wang et al. |
| 2007/0166617 A1 | 7/2007 | Gozdz et al. |
| 2007/0190427 A1 | 8/2007 | Carlson et al. |
| 2007/0212603 A1 | 9/2007 | Nathan et al. |
| 2008/0057389 A1 | 3/2008 | Kono et al. |
| 2008/0057399 A1 | 3/2008 | Visco et al. |
| 2008/0107958 A1 | 5/2008 | Kliatzkin |
| 2008/0113261 A1 | 5/2008 | De Jonghe et al. |
| 2008/0153000 A1 | 6/2008 | Salot et al. |
| 2008/0241664 A1 | 10/2008 | Nanjundaswamy et al. |
| 2008/0268327 A1 | 10/2008 | Gordon et al. |
| 2008/0274394 A1 | 11/2008 | Schormann et al. |
| 2009/0035664 A1 | 2/2009 | Chiang et al. |
| 2009/0087728 A1 | 4/2009 | Less et al. |
| 2009/0087730 A1 | 4/2009 | Kondo et al. |
| 2009/0169954 A1 | 7/2009 | Ino et al. |
| 2009/0189567 A1 | 7/2009 | Joshi et al. |
| 2009/0197170 A1 | 8/2009 | Viavattine |
| 2009/0208834 A1 | 8/2009 | Ramasubramanian et al. |
| 2009/0214956 A1 | 8/2009 | Prieto et al. |
| 2010/0047671 A1 | 2/2010 | Chiang et al. |
| 2010/0090650 A1 | 4/2010 | Yazami et al. |
| 2010/0129699 A1 | 5/2010 | Mikhaylik et al. |
| 2010/0203372 A1 | 8/2010 | Kim et al. |
| 2010/0266907 A1 | 10/2010 | Yazami |
| 2011/0027648 A1 | 2/2011 | Long et al. |
| 2011/0065009 A1 | 3/2011 | Lascaud et al. |
| 2011/0097623 A1 | 4/2011 | Marinis et al. |
| 2011/0104521 A1 | 5/2011 | Kishimoto et al. |
| 2011/0117416 A1 | 5/2011 | Arora et al. |
| 2011/0123850 A1 * | 5/2011 | Duong | H01M 50/411 427/407.1 |
| 2011/0123875 A1 | 5/2011 | Issaev et al. |
| 2011/0143207 A1 | 6/2011 | Arora et al. |
| 2011/0143217 A1 | 6/2011 | Arora et al. |
| 2011/0151332 A1 | 6/2011 | Morgan et al. |
| 2011/0159373 A1 | 6/2011 | Conner et al. |
| 2011/0159374 A1 | 6/2011 | Conner et al. |
| 2011/0171514 A1 | 7/2011 | Nishikawa et al. |
| 2011/0171518 A1 | 7/2011 | Dunn et al. |
| 2011/0183186 A1 | 7/2011 | Klootwijk et al. |
| 2011/0197435 A1 | 8/2011 | Kaneko et al. |
| 2011/0217585 A1 | 9/2011 | Wang et al. |
| 2011/0217586 A1 | 9/2011 | Kim et al. |
| 2011/0217588 A1 | 9/2011 | Roh et al. |
| 2011/0227243 A1 | 9/2011 | Kepler et al. |
| 2011/0236744 A1 | 9/2011 | Kim et al. |
| 2011/0256443 A1 | 10/2011 | Park et al. |
| 2011/0281176 A1 | 11/2011 | Seymour |
| 2011/0293976 A1 | 12/2011 | Chiba et al. |
| 2012/0015229 A1 | 1/2012 | Ohashi et al. |
| 2012/0015232 A1 | 1/2012 | Teshima et al. |
| 2012/0028101 A1 | 2/2012 | Ishihara et al. |
| 2012/0034508 A1 | 2/2012 | Davis et al. |
| 2012/0043940 A1 | 2/2012 | Affinito et al. |
| 2012/0077095 A1 | 3/2012 | Roumi et al. |
| 2012/0094188 A1 | 4/2012 | Visco et al. |
| 2012/0094194 A1 | 4/2012 | Visco et al. |
| 2012/0119155 A1 | 5/2012 | Liu et al. |
| 2012/0183868 A1 | 7/2012 | Tousaint et al. |
| 2012/0219842 A1 | 8/2012 | Visco et al. |
| 2012/0244412 A1 | 9/2012 | Pascaly et al. |
| 2012/0263986 A1 | 10/2012 | Fulop et al. |
| 2012/0270088 A1 | 10/2012 | Huang et al. |
| 2012/0270112 A1 | 10/2012 | Visco et al. |
| 2013/0017432 A1 | 1/2013 | Roumi |
| 2013/0130131 A1 | 5/2013 | Johnson et al. |
| 2013/0189592 A1 | 7/2013 | Roumi et al. |
| 2013/0224632 A1 | 8/2013 | Roumi |
| 2013/0260205 A1 | 10/2013 | Kwon et al. |
| 2014/0205883 A1 | 7/2014 | Wang et al. |
| 2014/0272500 A1 | 9/2014 | Roumi et al. |
| 2014/0272533 A1 | 9/2014 | Shi et al. |
| 2014/0329120 A1 | 11/2014 | Cui et al. |
| 2015/0171398 A1 | 6/2015 | Roumi |
| 2015/0180000 A1 | 6/2015 | Roumi |
| 2015/0357635 A1 | 12/2015 | Jito et al. |
| 2016/0013463 A1 | 1/2016 | Roumi et al. |
| 2016/0126532 A1 | 5/2016 | Eaglesham et al. |
| 2016/0254514 A1 | 9/2016 | Roumi |
| 2017/0315178 A1 | 11/2017 | Roumi et al. |
| 2018/0114971 A1 | 4/2018 | Eaglesham et al. |
| 2018/0114972 A1 | 4/2018 | Doe et al. |
| 2018/0294460 A1 | 10/2018 | Roumi et al. |
| 2020/0365862 A1 | 11/2020 | Roumi et al. |

FOREIGN PATENT DOCUMENTS

| | | |
|---|---|---|
| CN | 1726608 | 1/2006 |
| CN | 101188322 | 5/2008 |
| CN | 101641815 | 2/2010 |
| CN | 101809801 | 8/2010 |
| CN | 102117905 | 7/2011 |
| CN | 103647107 | 3/2014 |
| EP | 1271673 | 1/2003 |
| EP | 2639855 | 9/2013 |
| GB | 320916 | 10/1929 |
| JP | S40-001456 | 1/1965 |
| JP | S49-122476 | 10/1974 |
| JP | S51-048627 | 4/1976 |
| JP | S57-055064 | 4/1982 |
| JP | S62-291871 | 12/1987 |
| JP | S63-155552 | 6/1988 |

(56) References Cited

FOREIGN PATENT DOCUMENTS

| | | |
|---|---|---|
| JP | H06-140015 | 5/1994 |
| JP | H06-168737 | 6/1994 |
| JP | H08-180853 | 7/1996 |
| JP | 08-236093 | 9/1996 |
| JP | 09-092254 | 4/1997 |
| JP | H09-153354 | 6/1997 |
| JP | H09-231962 | 9/1997 |
| JP | H10-106521 | 4/1998 |
| JP | 2000-030686 | 1/2000 |
| JP | 2001-122998 | 5/2001 |
| JP | 2003-151633 | 5/2003 |
| JP | 2005-525674 | 8/2005 |
| JP | 2005-259566 | 9/2005 |
| JP | 2005-268095 | 9/2005 |
| JP | 2006-019146 | 1/2006 |
| JP | 2006-503416 | 1/2006 |
| JP | 2006-066355 | 3/2006 |
| JP | 2006-185917 | 7/2006 |
| JP | 2006-286427 | 10/2006 |
| JP | 2008-16193 | 1/2008 |
| JP | 2008-159589 | 7/2008 |
| JP | 2009-510700 | 3/2009 |
| JP | 2009-105063 | 5/2009 |
| JP | 2010-238421 | 10/2010 |
| JP | 2010-534389 | 11/2010 |
| JP | 2011-512010 | 4/2011 |
| JP | 2011086554 | 4/2011 |
| JP | 2011-515821 | 5/2011 |
| JP | 2011-124104 | 6/2011 |
| JP | 2011-518404 | 6/2011 |
| JP | 2011-222215 | 11/2011 |
| JP | 5452202 | 3/2014 |
| JP | 2015-519686 | 7/2015 |
| JP | 6019980 | 11/2016 |
| KR | 10-2002-0059781 | 7/2002 |
| KR | 10-2006-0043693 | 5/2006 |
| KR | 10-2008-0069275 | 7/2008 |
| KR | 10-2010-0098498 | 9/2010 |
| KR | 10-1375422 | 3/2014 |
| WO | WO 1997/006569 | 2/1997 |
| WO | WO 2003/012908 | 2/2003 |
| WO | WO 2008/019398 | 2/2008 |
| WO | WO 2008/117220 | 3/2008 |
| WO | WO 2008/049040 | 4/2008 |
| WO | WO 2008/153749 | 12/2008 |
| WO | WO 2010/007579 | 1/2010 |
| WO | WO 2010/054261 | 5/2010 |
| WO | WO 2010/062391 | 6/2010 |
| WO | WO 2011/070712 | 6/2011 |
| WO | WO 2012/034042 | 3/2012 |
| WO | WO 2013/009750 | 1/2013 |
| WO | WO 2013/154623 | 10/2013 |
| WO | WO 2014/119274 | 8/2014 |
| WO | WO 2014/119275 | 8/2014 |
| WO | WO 2014/152650 | 9/2014 |
| WO | WO 2014/156891 | 10/2014 |
| WO | WO 2015/074037 | 5/2015 |
| WO | WO 2015/074065 | 5/2015 |
| WO | WO 2015/157339 | 10/2015 |
| WO | WO 2016/100919 | 6/2016 |

OTHER PUBLICATIONS

China National Intellectual Property Administration, Examination Report dated Feb. 9, 2022, corresponding to Chinese Patent Application No. 2019100825878.
Adams (1993) "Particle size and shape effects in materials science: Examples from polymer and paper systems," Clay Minerals 28: 509-530.
Angulakshmi et al., "MgAl2SiO6-incorporated poly(ethylene oxide)-based electrolytes for all-solid-state lithium Batteries", Ionics, 20: 151-156 (2013).
Arora et al., "Battery Separators", Chem. Rev., 104:4419-4462 (2004).
Aurbach et al. (1989) "The Correlation Between Surface Chemistry, Surface Morphology, and Cycling Efficiency of Lithium Electrodes in a Few Polar Aprotic Systems," J. Electrochem Soc. 136(11): 3198-3205.
Aurbach et al., "A short review of failure mechanisms of lithium metal and lithiated graphite anodes in liquid electrolyte solutions", Solid State Ionics, 148:405-416 (2002).
AZoM (Oct. 2016) "Dendrites Are Major Issue for Next-Generation Lithium Batteries," available online at http://www.azom.com/news.aspx?newsID=46636, pp. 1-4.
Bruce et al. "Li-O2 and Li-S Batteries with High Energy Storage", Nature Materials, 11 : 19-29 (2012).
Chang et al. (Feb. 2017) Abstract only for "Effect of geometric size on mechanical properties of dielectric elastomers based on an improved visco-hyperelastic film model," Smart Materials and Structures 26(3): 3 pp.
Cheng et al., "Metal-Air Batteries: From Oxygen Reduction Electrochemistry to Cathode Catalysts", Chem. Soc. Rev., 41 :2172-2192 (2012).
Christensen et al., "A Critical Review of Li/Air Batteries", J. Electrochem. Soc., 159(2):R1-R30 (2011).
Croce et al., "Role of the ceramic fillers in enhancing the transport properties of composite polymer electrolytes", Electrochimica Acta., 46:2457-2461 (2001).
Duduta et al., "Semi-Solid Lithium Rechargeable Flow Battery", Advanced Energy Materials, 1 (4):511-516 (2011).
Frankland (Sep. 2015) "Extrusion: Pellet Geometry Can Impact Output," available online at http://www.ptonline.com/columns/extrusion-pellet-geometry-can-impact-output, [Accessed Aug. 2017) pp. 1-4.
Goodenough, "Rechargeable Batteries: Challenges Old and New", J. Solid State Electrochem., 16:2019-2029 (Published Online May 8, 2012).
Gowda et al., "3D Nanoporous Nanowire Current Collectors for Thin Film Microbatteries", Nano. Lett., 12(3):1198-1202 (2012).
Hamelet et al., "Non-aqueous Li-Based Redox Flow Batteries", J. Electrochem. Soc., 159(8):A1360-A1367 (2012).
Han et al., "Negating interfacial impedance in garnet-based solid-state Li metal batteries", Nature Materials, pp. 1-9 (2016).
Han et al., "Supplementary Information: Negating interfacial impedance in garnet-based solid-state Li metal batteries", pp. 1-17 (2016).
Jung et al., "An Improved High-Performance Lithium-Air Battery", Nature Chemistry, 4:579-585 (Published online Jun. 10, 2012).
Kichambare et al., "Mesoporous Nitrogen-Doped Carbon-Glass Ceramic for Solid-State Lithium-Oxygen Batteries", ACS Appl. Mater. Interfaces, 4(1):49-52 (2012).
Kumar et al., "A Solid-State, Rechargeable, Long Cycle Life Lithium-Air Battery", J. of the Electrochemical Society, 157(1):A50-A54 (2010).
Laman et al. (1988) "Effect of discharge current on cycle life of a rechargeable lithium battery," J. of Power Sources 24: 195-206.
Lee et al., "A review of recent developments in membrane separators for rechargeable lithium-ion batteries", Energy and Environmental Science, 7:3857-3886 (Aug. 18, 2014).
Li et al., "A Dual-Electrolyte Rechargeable Li-Air Battery with Phosphate Buffer Catholyte", Electrochemistry Communications, 14(1):78-81 (2012).
Li et al., "The pursuit of rechargeable solid-state Li-air batteries", Energy and Environmental Science, 6:2302-2311 (May 16, 2013).
LONG et al., "Three-Dimensional Battery Architectures", Chem. Rev., 104:4463-4492 (2004).
Lu et al., "Aqueous Cathode for Next-Generation Alkali-Ion Batteries", J. Am. Chem. Soc., 133(15):5756-5759 (2011).
LU et al., "Rechargeable-Ion Cathode-Flow Battery", J. Mater. Chem., 21:10113-10117 (2011).
Peng et al., "A Reversible and Higher-Rate Li-O2 Battery", Science, 337(6094):563-566 (2012).
Pu et al., "Preparation of PVDF-HFP microporous membrane for Li-ion batteries by phase inversion", J. of Membrane Science, 272(1-2): 11-14 (2006).
Raja et al., "Thin, flexible and thermally stable ceramic membranes as separator for lithium-ion batteries", J. Membrane Sci., 471:103-109 (2014).

(56) References Cited

OTHER PUBLICATIONS

Roberts et al., "3D Lithium Ion Batteries—From Fundamentals to Fabrication", J. Mater. Chem., 21 :9876-9890 (2011).
Roumi, "Shape changing transformations: Interactions with plasticity and electrochemical processes", Dissertation (Ph.D.), California Institute of Technology (2010).
Salvatierra et al. (publicly available Oct. 2018) "Suppressing Li Metal Dendrites Through a Solid Li-Ion Backup Layer," Adv. Mater. (Dec. 2018) 30(50):1-9.
Salvatierra et al. (2018) Supporting Information for "Suppressing Li Metal Dendrites Through a Solid Li-Ion Backup Layer," Adv. Mater., 38 pp.
Scrosati, "Nanomaterials: Paper powers battery breakthrough", Nature Nanotechnology, 2:598-599 (2007).
Seel et al., "Electrochemical Intercalation of PF6 into Graphite", Electrochem. Soc., 147(3):892-898 (2000).
Shao et al., "Electrocatalysts for Nonaqueous Lithium-Air Batteries: Status, Challenges, and Perspective", ACS Catal., 2(5):844-857 (Published online Apr. 6, 2012).
Shi et al., "Single ion solid-state composite electrolytes with high electrochemical stability based on a poly(perfluoroalkylsulfonyl)-imide ionene polymer", J. Mater. Chem. A., 2:15952-15957 (2014).
Sun et al., "Graphene Nanosheets as Cathode Catalysts for Lithium-Air Batteries with an Enhanced Electrochemical Performance", Carbon, 50(2):727-733 (2012).
Tan et al., "Synthesis and Characterization of Biphenyl-Based Lithium Solvated Electron Solutions", J. Phys. Chem. B., 116(30):9056-9060 (Published Online Jul. 1, 2012).
Tarascon et al., "Issues and challenges facing rechargeable lithium batteries", Nature, 414:359-367 (2001).
Tsai (1965) "Strength characteristics of composite materials," NASA CR-224, Prepared under Contract No. NAS 7-215 by Philco Corporation, 100 pp.
Tu et al., "A Dendrite-Free Lithium Metal Battery Model Based on Nanoporous Polymer/Ceramic Composite Electrolytes and High Energy Electrodes", Small, 11(22):2631-2635 (2015).
Weber et al., "Redox Flow Batteries: A Review", J. Appl. Electrochem., 41 :1137-1164 (2011).
Wiesler, "Membranes," Ultrapure Water. Article No. UP130427, pp. 27-31 [Accessible on the Internet at: http://www.liquicel.com/uploads/documents/Membrane%20Contactors%20-%20An%20Introduction%20To%20The%20Technology.pdfl (1996).
Wu et al. (2014) "Improving battery safety by early detection of internal shorting with a bifunctional separator," Nat. Comm. 5: 5193, pp. 1-6.
Xu, "Nonaqueous Electrolytes for Lithium-Based Rechargeable Batteries", Chemical Reviews, 104:4303-4417 (2004).
Zadin, "Modeling the 3-D Micro battery," University of Tartu [Accessible on the Internet at: http://dspace.utlib.ee/dspace/handle/10062/25375] [Last Accessed Jun. 26, 2013] (May 8, 2012).
Zhang, "A review on the separators of liquid electrolyte Li-ion batteries", J. of Power Sources, 164(1) :351-364 (2007).
Zheng et al., "Amphiphilic Surface Modification of Hollow Carbon Nanofibers for Improved Cycle Life of Lithium Sulfur Batteries", Nano Lett., 13(3):1265-1270 (2013).
Zhong et al., "High-Capacity Silicon-Air Battery in Alkaline Solution", ChemSusChem., 5:177-180 (Published online Dec. 5, 2011).
Communication pursuant to Article 94(3) EPC dated Mar. 28, 2017, for European Patent Application No. 12811935.1.
Decision to Grant a Patent drafted Nov. 30, 2017, corresponding to Japanese Patent Application No. 2014-520250, English translation.
Decision to Grant a Patent drafted Jul. 24, 2018, corresponding to Japanese Patent Application No. 2015-505702, English translation.
Decision to Grant a Patent drafted Aug. 19, 2019, corresponding to Japanese Patent Application No. 2017-200193, English translation.
Decision to Grant a Patent drafted Sep. 30, 2019, corresponding to Japanese Patent Application No. 2018-160745, English translation.
Examination Report corresponding to Chinese Patent Application No. 2012800335610, dated Jun. 8, 2015—with English translation.
Extended European Search Report corresponding the European Patent Application No. 12811935.1, dated Mar. 9, 2015.
Extended European Search Report corresponding to European App. No. 13775922.1, dated Jul. 3, 2018.
Extended European Search Report dated Mar. 9, 2015, corresponding the European Patent Application No. 12811935.1.
Grant of Patent dated Dec. 26, 2018, corresponding to Korean Patent Application No. 10-2014-7000423, English translation.
International Search Report and Written Opinion dated Jan. 30, 2013, for International Application No. PCT/US2012/046067.
International Search Report and Written Opinion dated Jun. 27, 2013, for PCT International Application No. PCT/US2013/021043.
International Search Report and Written Opinion dated Apr. 30, 2012, for International Application No. PCT/US2011/051041.
International Search Report and Written Opinion dated Feb. 12, 2015, corresponding the International Application No. PCT/US2014/066200.
International Search Report with Written Opinion corresponding to International Patent Application No. PCT/US2014/066113, dated Feb. 19, 2015.
International Search Report with Written Opinion corresponding to International Patent Application No. PCT/US2015/024787, dated Jul. 16, 2015.
Notice of Allowance corresponding to Chinese Patent Application No. 201180042861.0, dated Oct. 27, 2015—with English translation.
Notice of Allowance corresponding to Chinese Patent Application No. 201280033561.0, dated Aug. 30, 2016—with English translation.
Notice of Allowance corresponding to U.S. Appl. No. 13/229,479, dated Jul. 7, 2017.
Notice of Allowance corresponding to U.S. Appl. No. 13/738,835, dated Mar. 2, 2016.
Notice of Allowance corresponding to U.S. Appl. No. 14/546,472, dated Jan. 31, 2018.
Notice of Allowance corresponding to U.S. Appl. No. 15/148,278, dated Jan. 23, 2018.
Notice of Allowance corresponding to U.S. Appl. No. 15/148,278, dated Jul. 29, 2017.
Notice of Allowance corresponding to United States U.S. Appl. No. 13/545,683, dated Jul. 27, 2018.
Notification of Reasons for Refusal corresponding to Japanese Patent Application No. 2015-505702, dated Jan. 10, 2017, with English translation.
Notification of Reasons for Refusal dated Aug. 1, 2017 for Japanese Patent Application No. 2014-520250 (including English translation).
Notification of Reasons for Refusal dated Sep. 5, 2017 corresponding to Japanese Patent Application No. 2015-505702 (including English translation).
Notification of Reasons for Refusal drafted Jun. 20, 2018 corresponding to Japanese Patent Application No. 2015-505702, English translation.
Notification of Reason for Refusal dated Aug. 13, 2018 corresponding to Korean Patent Application No. 10-2014-7000423, English translation.
Notification of Reason for Refusal dated Jun. 27, 2019 corresponding to Korean Patent Application No. 10-2014-7030130, with English translation.
Notification of Reasons for Refusal drafted Feb. 27, 2019 corresponding to Japanese Patent Application No. 2017-200193, English translation.
Notification to Go Through Registration Formalities date Nov. 13, 2018, corresponding to Chinese Patent Application No. 2013800305253 with English translation.
Notice of Allowance corresponding to U.S. Appl. No. 15/911,020, dated Feb. 13, 2020.
Notice of Allowance corresponding to Korean Patent Application No. 10-2014-7030130, dated Feb. 27, 2020.
Notice of Allowance corresponding to U.S. Appl. No. 14/680,997, dated Mar. 4, 2020.
Office Action corresponding to Chinese Patent Application No. 201380030525.3, dated Jul. 30, 2018—with English translation.

(56) References Cited

OTHER PUBLICATIONS

Office Action corresponding to Chinese Patent Application No. 201380030525.3, dated Feb. 16, 2017—with English summary.
Office Action corresponding to Chinese Patent Application No. 201180042861.0, dated Apr. 10, 2015—with partial English translation.
Office Action corresponding to Chinese Patent Application No. 201180042861.0, dated Sep. 4, 2014—with English translation.
Office Action corresponding to Chinese Patent Application No. 201280033561.0, dated Jan. 4, 2016—with English summary.
Office Action corresponding to Chinese Patent Application No. 201380030525.3, dated Nov. 16, 2017—with English summary.
Office Action corresponding to Chinese Patent Application No. 201380030525.3, dated Apr. 1, 2016—with English summary.
Office Action corresponding to Chinese Patent Application No. 2012800335610, dated Jun. 8, 2015—with English translation.
Office Action corresponding to European Patent Application No. 13775922.1, dated Jul. 2, 2018.
Office Action corresponding to European Patent Application No. 12811935.1, dated Dec. 1, 2015.
Office Action corresponding to European Patent Application No. 13775922.1, dated Aug. 9, 2019.
European Examination Report corresponding to European Patent Application No. 12811935.1, dated Dec. 1, 2015.
Office Action corresponding to European Patent Application No. 12811935.1, dated Mar. 28, 2017.
Office Action corresponding to European Patent Application No. 12811935.1, dated May 8, 2018.
Office Action corresponding to Japanese Patent Application No. 2017-200193, dated Oct. 23, 2018—with English translation.
Office Action corresponding to Japanese Patent Application No. 2013-528339, dated Aug. 18, 2015—with English translation.
Office Action corresponding to Japanese Patent Application No. 2013-528339, dated Jul. 5, 2016—with English translation.
Office Action corresponding to Japanese Patent Application No. 2014-520250, dated Aug. 16, 2016—with English translation.
Notification of Reasons for Refusal dated Aug. 16, 2016 for Japanese Patent Application No. 2014-520250 (including English translation).
Office Action corresponding to Japanese Patent Application No. 2014-520250, dated Jan. 10, 2017—with English translation.
Office Action corresponding to Japanese Patent Application No. 2014-520250, dated Aug. 1, 2017—with English translation.
Office Action corresponding to Japanese Patent Application No. 2015-505702, dated Sep. 5, 2017—with English translation.
Office Action corresponding to Japanese Patent Application No. 2015-505702, dated Aug. 1, 2017—with English translation.
Office Action corresponding to Japanese Patent Application No. 2015-505702, dated Jan. 10, 2017—with English translation.
Office Action corresponding to Korean Patent Application No. 10-2013-7007963, dated Sep. 22, 2017—with English translation.
Office Action Corresponding to U.S. Appl. No. 14/546,953, dated May 24, 2018.
Office Action corresponding to U.S. Appl. No. 13/229,479, dated Aug. 13, 2015.
Office Action corresponding to U.S. Appl. No. 13/229,479, dated May 19, 2016.
Office Action corresponding to U.S. Appl. No. 13/545,683, dated May 18, 2015.
Office Action corresponding to U.S. Appl. No. 13/545,683, dated Nov. 23, 2015.
Office Action corresponding to U.S. Appl. No. 13/545,683, dated Dec. 1, 2016.
Office Action corresponding to U.S. Appl. No. 13/545,683, dated Oct. 5, 2017.
Office Action corresponding to U.S. Appl. No. 13/724,479, dated Jul. 27, 2017.
Office Action corresponding to U.S. Appl. No. 13/724,479, dated Oct. 7, 2016.
Office Action corresponding to U.S. Appl. No. 13/738,835, dated Apr. 13, 2015.
Office Action corresponding to U.S. Appl. No. 13/738,835, dated Aug. 3, 2015.
Office Action corresponding to U.S. Appl. No. 14/546,472, dated Jan. 31, 2018.
Office Action corresponding to U.S. Appl. No. 14/546,472, dated Mar. 17, 2017.
Office Action corresponding to U.S. Appl. No. 14/546,953, dated Mar. 14, 2019.
Office Action corresponding to U.S. Appl. No. 14/546,953, dated Oct. 10, 2019.
Office Action corresponding to U.S. Appl. No. 14/546,953, dated Feb. 13, 2017.
Office Action corresponding to U.S. Appl. No. 14/546,953, dated Oct. 12, 2017.
Office Action corresponding to U.S. Appl. No. 14/680,997, dated Jul. 17, 2019.
Office Action corresponding to U.S. Appl. No. 14/680,997, dated Jan. 25, 2018.
Office Action corresponding to U.S. Appl. No. 14/680,997, dated Dec. 14, 2018.
Office Action corresponding to U.S. Appl. No. 14/680,997, dated Apr. 21, 2017.
Office Action corresponding to U.S. Appl. No. 15/148,278, dated Jan. 23, 2018.
Office Action corresponding to U.S. Appl. No. 15/148,278, dated Feb. 9, 2017.
Office Action corresponding to U.S. Appl. No. 15/148,278, dated Oct. 18, 2016.
Office Action dated Feb. 16, 2017, for Chinese Patent Application No. 201380030525.3 (including English summary).
Office Action corresponding to U.S. Appl. No. 15/911,020, dated Apr. 10, 2019.
Office Action corresponding to U.S. Appl. No. 15/911,020, dated Sep. 23, 2019.
Office Action corresponding to Korean Patent Application No. 10-2020-7015283, dated Jul. 3, 2020.
Partial Supplementary European Search Report corresponding the European Patent Application No. 13775922.1, dated Feb. 1, 2016.
Search Report corresponding to European Patent Application No. 12811935.1, dated Mar. 9, 2015.
Search Report corresponding to European Patent Application No. 13775922.1, dated Feb. 1, 2016.
Search Report corresponding to European Patent Application No. 13775922.1, dated Jun. 15, 2016.
Japanese Intellectual Property Office, "Notification of Reasons for Refusal," dated Dec. 22, 2020, corresponding to Japanese Patent Application No. 2019-201691, 7 pages.
Notice of Allowance corresponding to Korean Patent Application No. 10-2020-7015283, dated Dec. 15, 2020.
Korean Intellectual Property Office, "Notice to File a Response," dated Aug. 25, 2022, corresponding to Korean Patent Application No. 10-2022-7013868.

\* cited by examiner 1, 1') Perforated strong material
2) Frame or very porous layer
3) Anode (e.g. Li, Zn, Si)
4) Cathode

ELECTROCHEMICAL SYSTEMS WITH IONICALLY CONDUCTIVE AND ELECTRONICALLY INSULATING SEPARATOR

CROSS REFERENCE TO RELATED APPLICATION

This application is a continuation of U.S. Nonprovisional patent application Ser. No. 15/911,020 filed Mar. 2, 2018 (now U.S. Pat. No. 10,693,117), which is a continuation of U.S. Nonprovisional patent application Ser. No. 15/148,278 filed May 6, 2016 (now U.S. Pat. No. 9,954,213), which is a continuation of U.S. Nonprovisional patent application Ser. No. 13/738,835 filed Jan. 10, 2013 (now U.S. Pat. No. 9,379,368), which is a continuation-in-part of U.S. Nonprovisional patent application Ser. No. 13/545,683, filed Jul. 10, 2012 (now U.S. Pat. No. 10,158,110), which claims the benefit of, and priority, to U.S. Provisional Application No. 61/506,489, filed Jul. 11, 2011 and U.S. Provisional Application No. 61/622,371, filed Apr. 10, 2012, and PCT International Application PCT/US12/46067, filed Jul. 10, 2012, which claims the benefit of, and priority, to U.S. Provisional Application No. 61/506,489, filed Jul. 11, 2011 and U.S. Provisional Application No. 61/622,371, filed Apr. 10, 2012; this application also claims the benefit of, and priority to, U.S. Provisional Application No. 61/622,371, filed Apr. 10, 2012, U.S. Provisional Application No. 61/677,306, filed Jul. 30, 2012, and U.S. Provisional Application No. 61/679,584, filed Aug. 3, 2012, all of which are hereby incorporated by reference in their entireties to the extent not inconsistent with the present description.

BACKGROUND

Over the last few decades revolutionary advances have been made in electrochemical storage and conversion devices expanding the capabilities of these systems in a variety of fields including portable electronic devices, air and space craft technologies, passenger vehicles and biomedical instrumentation. Current state of the art electrochemical storage and conversion devices have designs and performance attributes that are specifically engineered to provide compatibility with a diverse range of application requirements and operating environments. For example, advanced electrochemical storage systems have been developed spanning the range from high energy density batteries exhibiting very low self-discharge rates and high discharge reliability for implanted medical devices to inexpensive, light weight rechargeable batteries providing long runtimes for a wide range of portable electronic devices to high capacity batteries for military and aerospace applications capable of providing extremely high discharge rates over short time periods.

Despite the development and widespread adoption of this diverse suite of advanced electrochemical storage and conversion systems, significant pressure continues to stimulate research to expand the functionality of these systems, thereby enabling an even wider range of device applications. Large growth in the demand for high power portable electronic products, for example, has created enormous interest in developing safe, light weight primary and secondary batteries providing higher energy densities. In addition, the demand for miniaturization in the field of consumer electronics and instrumentation continues to stimulate research into novel design and material strategies for reducing the sizes, masses and form factors of high performance batteries. Further, continued development in the fields of electric vehicles and aerospace engineering has also created a need for mechanically robust, high reliability, high energy density and high power density batteries capable of good device performance in a useful range of operating environments.

Many recent advances in electrochemical storage and conversion technology are directly attributable to discovery and integration of new materials for battery components. Lithium battery technology, for example, continues to rapidly develop, at least in part, due to the discovery of novel electrode and electrolyte materials for these systems. The element lithium has a unique combination of properties that make it attractive for use in an electrochemical cell. First, it is the lightest metal in the periodic table having an atomic mass of 6.94 AMU. Second, lithium has a very low electrochemical oxidation/reduction potential (i.e., −3.045 V vs. NHE (normal hydrogen reference electrode)). This unique combination of properties enables lithium based electrochemical cells to have very high specific capacities. State of the art lithium ion secondary batteries provide excellent charge-discharge characteristics, and thus, have also been widely adopted as power sources in portable electronic devices, such as cellular telephones and portable computers. U.S. Pat. Nos. 6,852,446, 6,306,540, 6,489,055, and "Lithium Batteries Science and Technology" edited by Gholam-Abbas Nazri and Gianfranceo Pistoia, Kluer Academic Publishers, 2004, which are hereby incorporated by reference in their entireties, are directed to lithium and lithium ion battery systems.

Advances in electrode materials, electrolyte compositions and device geometries continue to support the further development of Li based electrochemical systems. For example, U.S. Patent Application Publication US2012/0077095, published on Mar. 29, 2012, and International Patent Application publication WO 2012/034042, published on Mar. 15, 2012, disclose three-dimensional electrode array structures for electrochemical systems including lithium batteries.

Despite substantial advances, practical challenges remain in connection with the continued development of Li based electrochemical systems. A significant issue, for example, relates to dendrite formation in primary and secondary lithium and lithium ion batteries. It is generally known that Li deposition in many electrolytes is highly dendritic which make these systems susceptible to problems involving shorting, mechanical failure and thermal runaway. Safety concerns relating to dendrite formation are currently a barrier to implementation of metal Li anodes in rechargeable systems. A number of strategies have been pursued to address safety in connection with dendrite formation, particularly in the context of secondary batteries, including development of non-lithium anodes and internal safety systems able to monitor in real time problems associated with dendrite formation.

As will be generally recognized from the foregoing, a need currently exists for electrochemical systems, such as lithium based or alkaline based batteries, flow batteries, supercapacitors and fuel cells, exhibiting electrochemical properties useful for a range of applications. Specifically, lithium electrochemical systems capable of good electrochemical performance and high versatility for both primary and secondary lithium based batteries are needed.

SUMMARY

In an aspect, the invention provides separator systems for electrochemical systems providing electronic, mechanical and chemical properties useful for a range of electrochemical storage and conversion applications. Separator systems of some embodiments, for example, provide structural, physical and electrostatic attributes useful for preventing catastrophic failure in electrochemical cells and useful for increasing the performance such as cycle life and energy and power. One series of examples are separators for managing and controlling dendrite formation in metal based batteries, such as lithium based, alkaline based, zinc based and lead based batteries. In an embodiment, for example, separator systems of the invention have a multilayer, porous geometry supporting excellent ion transport properties while at the same time providing a barrier effective to prevent dendrite initiated mechanical failure, electronic internal shorting and/or thermal runaway. Another series of examples are multilayer separators consisting of several porous/perforated layers and an impervious yet ion-selective conductive membrane in which the porous layers provide a barrier effective to prevent internal shorting failure, such as dendrite shorting failure, and/or thermal runaway; and the membrane layer provide a barrier effective to separate the electrolyte next to the anode from that next to the cathode which can prevent the contamination of either of the electrodes and their surfaces and their electrolytes and thus increase the performance of the cell, such as energy, power and life cycle; this is especially useful in metal air and flow batteries and semi-solid batteries, some examples are lithium-air, lithium water and zinc-air cells.

In an embodiment, the invention provides a separator system for an electrochemical system comprising: (i) a first high mechanical strength layer having a plurality of apertures extending entirely through the first high mechanical strength layer and provided in a first pattern; and (ii) a second high mechanical strength layer having a plurality of apertures extending entirely through the second high mechanical strength layer and provided in a second pattern; the second pattern having an off-set alignment relative to the first pattern such that an overlap of the apertures of the first high mechanical strength layer and the apertures of the second high mechanical strength layer along axes extending perpendicularly from the first high mechanical strength layer to the second high mechanical strength layer is less than or equal to 20%; wherein the first high mechanical strength layer and the second high mechanical strength layer are positioned such that ions of an electrolyte provided in contact with the first high mechanical strength layer and the second high mechanical strength layer are able to be transported through the first high mechanical strength layer and the second high mechanical strength layer. In an embodiment, for example, the first high mechanical strength layer and the second high mechanical strength layer are not in direct physical contact with each other. In an embodiment of this aspect, the overlap of the apertures of the first high mechanical strength layer and the apertures of the second high mechanical strength layer along axes extending perpendicularly from the first high mechanical strength layer to the second high mechanical strength layer is less than or equal to 10%. In an embodiment, for example, the separator system of the invention further comprises one or more electrolytes provided between, and optionally in contact, with the first high mechanical strength layer the second high mechanical strength layer or both, wherein the first and second high mechanical strength layers are ionically conductive and optionally allow transport of the electrolyte of an electrochemical system.

In an embodiment, the invention provides a separator system for an electrochemical system comprising: (i) a first high mechanical strength layer having a plurality of apertures extending entirely through the first high mechanical strength layer and provided in a first pattern; (ii) a second high mechanical strength layer having a plurality of apertures extending entirely though the second high mechanical strength layer and provided in a second pattern, the second pattern having an off-set alignment relative to the first pattern such that an overlap of the apertures of the first high mechanical strength layer and the apertures of the second high mechanical strength layer along axes extending perpendicularly from the first high mechanical strength layer to the second high mechanical strength layer is less than or equal to 20%; and (iii) a third high mechanical strength layer having a plurality of apertures extending entirely through the third high mechanical strength layer and provided in a third pattern having the same spatial arrangement of apertures as the first pattern; wherein the first high mechanical strength layer, the second high mechanical strength layer and the third high mechanical strength layer are positioned such that ions of an electrolyte provided in contact with the first high mechanical strength layer, the second high mechanical strength layer and the third high mechanical strength layer are able to be transported through the first high mechanical strength layer, the second high mechanical strength layer and the third high mechanical strength layer. In an embodiment of this aspect, the overlap of the apertures of the first high mechanical strength layer and the apertures of the second high mechanical strength layer along axes extending perpendicularly from the first high mechanical strength layer to the second high mechanical strength layer is less than or equal to 10%. As used throughout this description, the "same spatial arrangement of apertures" refers to the positions of apertures of two or more high mechanical strength layers such that they are aligned along axes extending perpendicularly between the high mechanical strength layers. In an embodiment, for example, the same spatial arrangement of apertures" refers to the positions of apertures of two or more high mechanical strength layers such that they overlap by a factor of 90% or more along axes extending perpendicularly between the high mechanical strength layers.

In an embodiment, the invention provides a separator system for an electrochemical system comprising: (i) a first high mechanical strength layer having a plurality of apertures extending entirely through the first high mechanical strength layer and provided in a first pattern; (ii) a second high mechanical strength layer having a plurality of apertures extending entirely through the second high mechanical strength layer and provided in a second pattern, the second pattern having an off-set alignment relative to the first pattern such that an overlap of the apertures of the first high mechanical strength layer and the apertures of the second high mechanical strength layer along axes extending perpendicularly from the first high mechanical strength layer to the second high mechanical strength layer is less than or equal to 20%; (iii) a third high mechanical strength layer having a plurality of apertures extending entirely through the third high mechanical strength layer and provided in a third pattern having the same spatial arrangement of apertures as that of the first pattern; and (iv) a fourth high mechanical strength layer having a plurality of apertures extending entirely through the fourth high mechanical strength layer and provided in a fourth pattern having the same spatial arrangement of apertures as that of the second pattern; wherein the first high mechanical strength layer, the second high mechanical strength layer, the third high mechanical strength layer and the fourth high mechanical strength layer are positioned such that ions of an electrolyte provided in contact with the first high mechanical strength layer, the second high mechanical strength layer, the third high mechanical strength layer and the fourth high mechanical strength layer are able to be transported through the first high mechanical strength layer, the second high mechanical strength layer, the third high mechanical strength layer and the fourth high mechanical strength layer. In an embodiment of this aspect, the overlap of the apertures of the first high mechanical strength layer and the apertures of the second high mechanical strength layer along axes extending perpendicularly from the first high mechanical strength layer to the second high mechanical strength layer is less than or equal to 10%.

In an embodiment, the invention provides a separator system for an electrochemical system comprising: (i) a first high mechanical strength layer having a plurality of apertures extending entirely through the first high mechanical strength layer and provided in a first pattern; (ii) a second high mechanical strength layer having a plurality of apertures extending entirely through the second high mechanical strength layer and provided in a second pattern, the second pattern having an off-set alignment relative to the first pattern such that an overlap of the apertures of the first high mechanical strength layer and the apertures of the second high mechanical strength layer along axes extending perpendicularly from the first high mechanical strength layer to the second high mechanical strength layer is less than or equal to 40%; and (iii) a third high mechanical strength layer having a plurality of apertures extending entirely through the third high mechanical strength layer and provided in a third pattern; the third pattern having an off-set alignment relative to the first pattern and the second pattern such that an overlap of the apertures of the first high mechanical strength layer, the apertures of the second high mechanical strength layer and the apertures of the third high mechanical strength layer along axes extending perpendicularly from the first layer or the second layer to the third layer is less than or equal to 20%; wherein the first high mechanical strength layer, the second high mechanical strength layer and the third high mechanical strength layer are positioned such that ions of an electrolyte provided in contact with the first high mechanical strength layer, the second high mechanical strength layer and the third high mechanical strength layer are able to be transported through the first high mechanical strength layer, the second high mechanical strength layer and the third high mechanical strength layer. In an embodiment of this aspect, the overlap of the apertures of the first high mechanical strength layer and the apertures of the second high mechanical strength layer along axes extending perpendicularly from the first high mechanical strength layer to the second high mechanical strength layer is less than or equal to 20% and the overlap of the apertures of the first high mechanical strength layer, the apertures of the second high mechanical strength layer and the apertures of the third high mechanical strength layer along axes extending perpendicularly from the first high mechanical strength layer or the second high mechanical strength layer to the third high mechanical strength layer is less than or equal to 10%.

In an embodiment, the invention provides a separator system for an electrochemical system comprising: (i) a first high mechanical strength layer having a plurality of apertures extending entirely through the first high mechanical strength layer and provided in a first pattern; (ii) a second high mechanical strength layer having a plurality of apertures extending entirely through the second high mechanical strength layer and provided in a second pattern, the second pattern having an off-set alignment relative to the first pattern such that an overlap of the apertures of the first high mechanical strength layer and the apertures of the second high mechanical strength layer along axes extending perpendicularly from the first high mechanical strength layer to the second high mechanical strength layer is less than or equal to 50%; (iii) a third high mechanical strength layer having a plurality of apertures extending entirely through the third high mechanical strength layer and provided in a third pattern; the third pattern having an off-set alignment relative to the first pattern and the second pattern such that an overlap of the apertures of the first high mechanical strength layer, the apertures of the second high mechanical strength layer and the apertures of the third high mechanical strength layer along axes extending perpendicularly from the first high mechanical strength layer or the second high mechanical strength layer to the third high mechanical strength layer is less than or equal to 30%; and (iv) a fourth high mechanical strength layer having a plurality of apertures extending entirely through the fourth high mechanical strength layer and provided in a fourth pattern; the fourth pattern having an off-set alignment relative to the first pattern, the second pattern and the third pattern such that an overlap of the apertures of the first high mechanical strength layer, the apertures of the second high mechanical strength layer, the apertures of the third high mechanical strength layer and the apertures of the fourth high mechanical strength layer along axes extending perpendicularly from the first high mechanical strength layer or the second high mechanical strength layer to the fourth high mechanical strength layer is less than or equal to 20%; wherein the first high mechanical strength layer, the second high mechanical strength layer, the third high mechanical strength layer and the fourth high mechanical strength layer are positioned such that ions of an electrolyte provided in contact with the first high mechanical strength layer, the second high mechanical strength layer, the third high mechanical strength layer and the fourth high mechanical strength layer are able to be transported through the first high mechanical strength layer, the second high mechanical strength layer, the third high mechanical strength layer and the fourth high mechanical strength layer. In an embodiment of this aspect, the overlap of the apertures of the first high mechanical strength layer and the apertures of the second high mechanical strength layer along axes extending perpendicularly from the first high mechanical strength layer to the second high mechanical strength layer is less than or equal to 30%, and the off-set alignment relative to the first pattern and the second pattern such that an overlap of the apertures of the first high mechanical strength layer, the apertures of the second high mechanical strength layer and the apertures of the third high mechanical strength layer along axes extending perpendicularly from the first layer or the second layer to the third layer is less than or equal to 20%, and off-set alignment relative to the first pattern, the second pattern and the third pattern such that an overlap of the apertures of the first high mechanical strength layer, the apertures of the second high mechanical strength layer, the apertures of the third high mechanical strength layer and the apertures of the fourth high mechanical strength layer along axes extending perpendicularly from the first high mechanical strength layer or the second high mechanical strength layer to the third layer is less than or equal to 10%.

In some embodiments, for example, the second high mechanical strength layer is provided between the first high mechanical strength layer and the third high mechanical strength layer. In some embodiments, for example, the first high mechanical strength layer is provided between the second high mechanical strength layer and the fourth high mechanical strength layer or wherein the third high mechanical strength layer is provided between the second high mechanical strength layer and the fourth high mechanical strength layer. In an embodiment, first and second mechanical strength layers are not provided in physical contact, or first, second and third mechanical strength layers are not provided in physical contact, or first, second, third and fourth mechanical strength layers are not provided in physical contact.

Some separators of this aspect, for example, provide a multilayer structure for managing dendrite formation in an electrochemical system, wherein multiple separator layers (e.g., first, second, third, fourth, etc. high mechanical strength layers) have complementary patterns of apertures, such as micro- or nano-channels, that establish ion conductivity between positive and negative electrodes in a manner that dendrite growth between positive and negative electrodes is kinetically and/or thermodynamically unfavorable. Some separators of this aspect, for example, provide a barrier having a multilayer geometry and physical properties preventing a direct, linear pathway for dendrite growth between positive and negative electrodes, for example, by providing a multilayer structure wherein the only pathway(s) for ion transport between positive a negative electrodes requires curved trajectories that are kinetically and/or thermodynamically unfavorable to dendrite growth. Without being bound by any theory, the force from the high strength layers on the dendrites slows down or stops the dendrite growth. In electrochemical cell embodiments, this significantly improves the performance of the cell. In an embodiment, the first high mechanical strength layer, the second high mechanical strength layer, the third high mechanical strength layer and/or the fourth high mechanical strength layer are planar and provided in a substantially parallel orientation with respect to each other, for example, wherein planar surfaces of the first, second, third and/or fourth high mechanical strength layers are provided in parallel planes. In an embodiment, the first high mechanical strength layer, the second high mechanical strength layer, the third high mechanical strength layer and/or the fourth high mechanical strength layer are hollow cylindrical structures and provided in a substantially concentric orientation, for example, wherein curved surfaces of cylindrical first and second layers are provided in a concentric orientation. As used herein, axes extending perpendicularly from a concentric orientation are perpendicular to a central axis and extend radially from the central axis.

The multilayer geometry of some separator systems of the invention provides an off-set alignment providing a selected overlap of apertures of the first pattern and the apertures of the second pattern along axes extending perpendicularly from the first layer to the second layer. This aspect of the invention is useful for accessing useful ion transport properties while at the same time preventing dendrite formation between positive and negative electrodes of an electrochemical cell. In some embodiments, the term "off-set" refers to a configuration wherein the apertures of one high mechanical strength layer of the separator are off-set relative to the positions of apertures of another high mechanical strength layer along axes extending from the one layer to the another layer, such as axes extending perpendicularly from a first high mechanical strength layer to a second high mechanical strength layer. In some embodiments, the term "off-set" refers to a relative configuration of patterns of apertures in high mechanical strength layers, such as wherein the apertures of a first pattern of the first high mechanical strength layer are off-set relative to the positions of apertures of the second pattern of the second high mechanical strength layer such that the apertures of the first high mechanical strength layer are not entirely superimposable onto the apertures of the second high mechanical strength layer along the axes extending perpendicularly from the first high mechanical strength layer to the second high mechanical strength layer. In an embodiment, for example, the first and second high mechanical strength layers are nano- and/or micro-porous and aligned such that the apertures of the first high mechanical strength layer are not superimposable at all onto the apertures of the second high mechanical strength layer along the axes extending perpendicularly from the first high mechanical strength layer to the second high mechanical strength layer. In an embodiment, for example, the overlap of the apertures of two or more of the first pattern, the second pattern, the third pattern and the fourth pattern along the axes extending perpendicularly from the first high mechanical strength layer to the second high mechanical strength layer is less than or equal to 10%, and optionally for some applications less than or equal to 1%. In an embodiment, for example, the overlap of the apertures of two or more of the first pattern, the second pattern, the third pattern and the fourth pattern along the axes extending perpendicularly from the first high mechanical strength layer to the second high mechanical strength layer is selected from the range of 0 to 5%, and optionally for some applications selected from the range of 0 to 1%. In an embodiment, for example, the overlap of the apertures of two or more of the first pattern, the second pattern, the third pattern and the fourth pattern along the axes extending perpendicularly from the first high mechanical strength layer to the second high mechanical strength layer is equal to 0, for example equal to 0 by a good precision. In an embodiment, for example, the overlap of the apertures of the first pattern, the second pattern, and the third pattern along the axes extending perpendicularly from the first high mechanical strength layer to the second high mechanical strength layer is less than or equal to 10%. In an embodiment, for example, the overlap of the apertures of the first pattern, the second pattern, and the third pattern along the axes extending perpendicularly from the first high mechanical strength layer to the second high mechanical strength layer is selected from the range of 0 to 5%. In an embodiment, for example, the overlap of the apertures of the first pattern, the second pattern, the third pattern and the fourth pattern along the axes extending perpendicularly from the first high mechanical strength layer to the second high mechanical strength layer is less than or equal to 10%. In an embodiment, for example, the overlap of the apertures of the first pattern, the second pattern, the third pattern and the fourth pattern along the axes extending perpendicularly from the first high mechanical strength layer to the second high mechanical strength layer is selected from the range of 0 to 5%.

In an embodiment, for example, two or more of the first pattern, the second pattern, the third pattern and the fourth pattern comprise substantially complementary patterns. In an embodiment, for example, the substantially complementary patterns correspond to substantially negative images of one another. As used herein, a complementary pattern refers to a configuration wherein the relative positions of apertures of one pattern of a high mechanical strength layer and the apertures of one or more other pattern or one or more other high mechanical strength layers are selected to prevent dendrite growth between positive and negative electrodes of an electrochemical cell. In an embodiment, for example, the substantially complementary patterns of the first and second patterns are negative images of one another, for example, wherein the positions of apertures of the first pattern correspond to regions of the second layer not having an aperture. As an example of a complementary pattern of the invention, the first layer may be characterized by a pattern of apertures corresponding to the black squares of a chess board and the second layer may be characterized by a pattern of apertures corresponding to the red squares of the chess board. As an example of a complementary pattern of the invention, the first high mechanical strength layer may have a first periodic pattern of apertures characterized by a first pitch and aperture spacing, wherein the second high mechanical strength layer has a second periodic pattern of apertures characterized by a the same pitch and aperture spacing but offset or translated from the positions of the apertures of the first pattern such that the apertures of the first high mechanical strength layer are not superimposable on the apertures of the second high mechanical strength layer along axes extend perpendicularly from first and second high mechanical strength layers.

In an embodiment, a separator system having three or more high mechanical strength layers may include some high mechanical strength layers having identical patterns (i.e. non-complementary patterns), so long as at least one layer having a complementary pattern is positioned between the high mechanical strength layers having identical patterns. For example, a separator system may be characterized by one or more high mechanical strength layers having a pattern A and one or more high mechanical strength layers having a pattern B, where A and B are complementary patterns, arranged according to a repeating sequence of ABA, with longer sequences possible for multilayer systems containing four or more high mechanical strength layers, e.g., ABABAB.

In another embodiment, a separator system having three or more high mechanical strength layers may include only high mechanical strength layers having complementary patterns. For example, a separator system may be characterized by one or more high mechanical strength layers having a pattern A, one or more high mechanical strength layers having a pattern B, and one or more high mechanical strength layers having a pattern C, where A, B and C are each complementary to the other two patterns, arranged according to a repeating sequence of ABC, with longer sequences (e.g. ABCABC) and varied sequences (e.g. ABCBA, ABCA) possible for multilayer systems containing four or more high mechanical strength layers.

In another aspect, the invention provides separator systems further comprising one or more low ionic resistance layers provided on a side of at least one of the first high mechanical strength layer, the second high mechanical strength layer, the third high mechanical strength layer and the fourth high mechanical strength layer. In an embodiment, for example, each of the one or more low ionic resistance layers is an electrolyte containing layer providing a reservoir for the electrolyte, for example of an electrochemical cell. In an embodiment, for example, each of the one or more low ionic resistance layers independently has an ionic resistance less than or equal to 20 ohm-cm$^2$, and preferably for some embodiments less than or equal to 2 ohm-cm$^2$, and preferably for some embodiments less than or equal to 1 ohm-cm$^2$. In an embodiment, for example, at least one of t one or more low ionic resistance layers is a pressure buffer providing space for an electrolyte provided between at least two of the first high mechanical strength layer, the second high mechanical strength layer, the third high mechanical strength layer and the fourth high mechanical strength layer.

In an embodiment, for example, at least one of the high mechanical strength layers and the one or more low ionic resistance layers is a deposited layer that is deposited on at least one of the high mechanical strength layers and the one or more low ionic resistance layers. In an embodiment, for example, at least one of the high mechanical strength layers and the one or more low ionic resistance layers is a deposited layer that is deposited on an electrode of an electrochemical cell, such as a layer deposited directly on the surface of a positive or negative electrode presented to an electrolyte of an electrochemical cell. In an embodiment, for example, at least one of the one or more low ionic resistance layers, and optionally all, is adhered by pressure, heat or chemical adhering to at least one side of any of the first high mechanical strength layer, the second high mechanical strength layer, the third high mechanical strength layer and the fourth high mechanical strength layer. In an embodiment, for example, at least one of the one or more low ionic resistance layers, and optionally all, is adhered by a resin polymer to at least one side of any of the first high mechanical strength layer, the second high mechanical strength layer, the third high mechanical strength layer and the fourth high mechanical strength layer. In an embodiment, for example, at least one of the one or more low ionic resistance layers, and optionally all, comprises a microporous material, a woven material, or a nonwoven material.

In an embodiment, for example, at least one of the one or more low ionic resistance layers, and optionally all, comprises a ceramic or a glass electrolyte, a polymer electrolyte or another solid electrolyte. In an embodiment, for example, the low ionic resistance layers comprise a glass electrolyte, such as Nafion or $ZrO_2$ or NASICON or LISICON or LIPON, or a polymer electrolyte such as PEO. In an embodiment, for example, at least one of the one or more low ionic resistance layers, and optionally all, comprises a perforated ceramic separator, a porous ceramic separator, a perforated glass separator, a porous glass separator or a perforated metal or perforated alloy separator or perforated rubber or a rubber mesh or a metal mesh or an alloy mesh or a porous metal.

In an embodiment, for example, at least one of the one or more low ionic resistance layers comprises a ring or a frame having a central aperture, such as a ring or frame structure providing a mechanically supporting structure, an electrolyte reservoir structure and/or a spacer structure in an electrochemical cell. In an embodiment, for example, the one or more low ionic resistance layers comprise one or more frame layers in contact with at least one of the first high mechanical strength layer, the second high mechanical strength layer, the third high mechanical strength layer and the fourth high mechanical strength layer. In an embodiment, for example, the first high mechanical strength layer is provided between first and second frame layers and wherein the second high mechanical strength layer is provided between third and fourth frame layers or the first high mechanical strength layer is provided between first and second frame layers and wherein the second high mechanical strength layer is provided between second and third frame layers. In an embodiment, for example, the one or more low ionic resistance layers comprise one or more frame layers in physical contact with at least one of the electrodes of an electrochemical system, such as the positive and/or negative electrodes of an electrochemical cell. In an embodiment, for example, the one or more low ionic resistance layers comprise a spacer provided between the first and second layers, the spacer separating the first and second layers by a selected distance selected from the range of 10 nm to 1000 µm, and optionally for some applications selected from the range of 1 µm to 1000 µm. In an embodiment, for example, the spacer of this aspect comprises: a ring for establishing the selected distance between the first high mechanical strength layer and the second high mechanical strength layer; a frame structure having a porous wall component, a material layer, or an arrangement of discrete material elements.

In an embodiment, for example, each of the low ionic resistance layers, and optionally all, is independently a polymer, a ceramic, a wood, glass, a mineral, a metal, an alloy, a woven material, a nonwoven material, cellulose, wood fiber, sponge or a combination thereof. In an embodiment, for example, the one or more low ionic resistance layers each independently have porosity greater than or equal to 50%, and preferably for some applications greater than 70%, and preferably for some applications greater than 90%. In an embodiment, for example, the one or more low ionic resistance layers each independently have a porosity selected from the range of 50% to 95%, preferably for some applications a porosity selected from the range of 70% to 95%.

In an embodiment, for example, at least one side of one of the high mechanical strength layers is wet-able, for example wet-able with electrolyte of an electrochemical cell. In an embodiment, for example, a separator configuration is characterized by the wet-able side of a high mechanical strength layer is placed next to another high mechanical strength layer with no low ionic resistance layer provided between them. In an embodiment, for example, a separator configuration is characterized by the wet-able side of the high mechanical strength layer is placed next to an electrode with no low ionic resistance layer between them. In an embodiment, for example, a separator includes one or more low ionic resistance layers or high mechanical strength layers coated on another low ionic resistance layer or a high mechanical strength layer or coated on an electrode in a chemical cell, such as on the positive electrode or negative electrode of an electrochemical system.

In another aspect, the invention provides a separator further comprising one or more chemical barrier layers provided on a side of at least one of the first high mechanical strength layer, the second high mechanical strength layer, the third high mechanical strength layer, the fourth high mechanical strength layer or the one or more low ionic resistance layers. Separators having one or more chemical barriers are useful in electrochemical systems wherein positive and negative electrodes are provided in contact with different electrolytes and, thus, the chemical barrier(s) allow transport of charge carriers but prevents transport of electrolytes. In such configurations, the chemical barriers are useful for protecting the electrodes from degradation and/or enabling the use of different electrolytes for positive and negative electrodes of an electrochemical cell. In an embodiment, for example, the one or more chemical barrier layers independently prevents transportation of unwanted chemical components through the one or more chemical barrier layers to a positive electrode or a negative electrode of an electrochemical cell. In an embodiment, for example, the one or more chemical barrier layers prevents transport of an electrolyte solvent through the one or more chemical barrier layers to a positive electrode or a negative electrode of an electrochemical cell. In an embodiment, for example, the one or more chemical barrier layers comprises a solid electrolyte or a solid polymer electrolyte disposed on at least one side of an electrode of an electrochemical cell. In an embodiment, for example, the one or more chemical barrier layers comprise a solid electrolyte from LISICON or NASICON or a polymer electrolyte comprising polyethylene oxide (PEO).

In an embodiment, for example, the separator system is a component of an electrochemical cell having a negative electrode and a positive electrode, wherein the one or more chemical barrier layer comprise an ion conductive protective membrane, wherein the protective membrane provides a barrier between a first electrolyte in contact with the positive electrode and a second electrode in contact with the negative electrode, wherein the ion conductive protective membrane prevents contact between the negative electrode and the first electrolyte. In an embodiment, for example, the negative electrode is a lithium metal electrode, wherein the ion conductive protective membrane conducts lithium ion charge carriers and prevents contact between the lithium metal electrode and the first electrolyte.

In an embodiment, for example, the ion conductive protective membrane comprising a material selected from the group consisting of glassy or amorphous active metal ion conductors, ceramic active metal ion conductors, and glass-ceramic active metal ion conductors. In an embodiment, for example, the one or more chemical barrier layers further comprises a solid polymer electrolyte disposed between a surface of the protective membrane and the positive electrode or negative electrode. In an embodiment, for example, at least one of the high mechanical strength layers, one or more low ionic resistance layers and the one or more chemical barrier layers is a deposited layer that is deposited on at least one of the high mechanical strength layers, one or more low ionic resistance layers and the one or more chemical barrier layers. In an embodiment, for example, at least one of the high mechanical strength layers, one or more low ionic resistance layers and the one or more chemical barrier layers is a deposited layer that is deposited on an electrode of an electrochemical cell. In an embodiment, for example, a separator comprises a combination of at least two of the first high mechanical strength layer, the second high mechanical strength layer, the third high mechanical strength layer and the fourth high mechanical strength layer and the one or more chemical barrier layers without any of the low ionic resistance layers.

In an aspect, a separator further comprises a third high mechanical strength layer having a plurality of apertures extending entirely through the third high mechanical strength layer and provided in a third pattern; the third high mechanical strength layer positioned between the first high mechanical strength layer and the second high mechanical strength layer; the third pattern having an off-set alignment relative to the first pattern or the second pattern such that an overlap of the apertures of the first pattern or the second pattern and the apertures of the third pattern along axes extending perpendicularly from the first high mechanical strength layer or the second high mechanical strength layer to the third high mechanical strength layer is less than or equal to 20%. In an aspect, a separator further comprises a fourth high mechanical strength layer having a plurality of apertures extending entirely through the fourth high mechanical strength layer and provided in a fourth pattern; the fourth high mechanical strength layer positioned between the first high mechanical strength layer and the second high mechanical strength layer, the fourth pattern having an off-set alignment relative to the first pattern, the second pattern or the third pattern such that an overlap of the apertures of the first pattern, the second pattern or the third pattern and the apertures of the fourth pattern along axes extending perpendicularly from the first high mechanical strength layer or the second high mechanical strength layer to the fourth high mechanical strength layer is less than or equal to 20%.

The layers of multilayer separator systems of the invention may be configured and attached via a variety of mechanisms and device arrangements to provide mechanical properties useful for specific applications. In an embodiment, for example, at least a portion, and optionally all, of the first high mechanical strength layer, the second high mechanical strength layer, the third high mechanical strength layer, the fourth high mechanical strength layer, low ionic resistance layers, frame layers, spacer, chemical barrier layers, or any combination of these are at least partially attached to each other via a pressure, heating, an adhesive coating, a chemical adherent, plasma treating or any combination of these. In an embodiment, for example, at least a portion, and optionally all, of the first high mechanical strength layer, the second high mechanical strength layer, the third high mechanical strength layer, the fourth high mechanical strength layer, low ionic resistance layers, frame layers, spacer, chemical barrier layers, or any combination of these are at least partially attached to each other via glue, epoxy, cement, PTFE, a solid electrolyte, a gel electrolyte, a polymer electrolyte, a silicone adhesive, acrylic adhesive, cyanacrylate, stycast 1266, deltabond 151, PVDF, PVA, LIPON, LISICON, PE-PP-PVDF, tetramethylammonium hydroxide pentahydrate $(CH_3)_4NOH.5H_2O$, poly(ethylene oxide) (PEO), copolymer of epichlorohydrin and ethylene oxide P(ECH-co-EO) and poly(vinylalcohol), glassfibre polymer electrolyte, zinc sulfide, silicon dioxide, Kapton Tape, polyethylene oxide or polypropylene oxide, or a copolymer, PVDF-co-HFP $Bi_2O_3$, a non-fluorine-containing binder or an aromatic binder, lithium polyacrylate or a combination thereof.

In an embodiment, the invention provides a separator system further comprising one or more solid electrolyte layers that prevent water molecules, $CO_2$, $O_2$ or air from transporting through the separator system, for example, wherein the one or more solid electrolyte layers comprise LISICON or NASICON.

In an aspect, a separator of the invention further comprises one or more electrolytes, such as an electrolyte of an electrochemical cell, which is optionally in physical contact with at least a portion of the first high mechanical strength layer, the second high mechanical strength layer, the third high mechanical strength layer, the fourth high mechanical strength layer, low ionic resistance layers, frame layers, spacer, chemical barrier layers, or any combination of these. In an embodiment, for example, the separator system is a component of an electrochemical cell having a positive electrode and a negative electrode, the separator further comprising an electrolyte provided between the positive electrode and the negative electrode; wherein the electrolyte is in contact with any of the first high mechanical strength layer, the second high mechanical strength layer, the third high mechanical strength layer, and the fourth high mechanical strength layer. In an embodiment, for example, the separator system is a component of an electrochemical cell having a positive electrode and a negative electrode, the separator further comprising a first electrolyte and a second electrolyte provided between the positive electrode and the negative electrode; wherein the first electrolyte has a different composition than the second electrolyte; wherein the first electrolyte is in contact with any of the first high mechanical strength layer, the second high mechanical strength layer, the third high mechanical strength layer, and the fourth high mechanical strength layer, and wherein the second electrolyte is in contact with any of the first high mechanical strength layer, the second high mechanical strength layer, the third high mechanical strength layer, and the fourth high mechanical strength layer; where the first electrolyte and the second electrolyte do not mix with each other because of the presence of an impervious ion conducting layer between them or because of different chemistry and physics such as hydrophilic or hydrophobic behavior or density.

Selection of the physical, chemical and electronic properties of the components of the separator system, such as the first high mechanical strength layer, the second high mechanical strength layer, the third high mechanical strength layer, and the fourth high mechanical strength layer, are selected to provide net separator properties useful for applications in electrochemical cells, such as to provide the combination of high electrical resistance, high ion conductivity and useful mechanical attributes.

In an embodiment, for example, the first pattern of apertures provides a first porosity of the first high mechanical strength layer greater than or equal to 30% and preferably for some applications more than 40%, and/or wherein the second pattern of apertures provides a second porosity of the second high mechanical strength layer greater than or equal to 30%, and preferably for some applications more than 40%. In an embodiment, for example, the first pattern of apertures provides a first porosity of the first high mechanical strength layer greater than or equal to 30% and preferably for some applications more than 40%, or wherein the second pattern of apertures provides a second porosity of the second high mechanical strength layer greater than or equal to 30% and preferably for some applications more than 40%; or wherein the third pattern of apertures provides a third porosity of the third high mechanical strength layer greater than or equal to 30% and preferably for some applications more than 40%; or wherein the fourth pattern of apertures provides a fourth porosity of the fourth high mechanical strength layer greater than or equal to 30% and preferably for some applications more than 40%. In an embodiment, for example, the first pattern of apertures provides a porosity of the first high mechanical strength layer selected from the range of 30% to 70% and preferably for some applications 40% to 70%; and wherein the second pattern of apertures provides a porosity of the second high mechanical strength layer selected from the range of 30% to 70% and preferably for some applications 40% to 70%. In an embodiment, for example, the first pattern of apertures provides a porosity of the first high mechanical strength layer selected from the range of 30% to 70% and preferably for some applications 40% to 70%; or wherein the second pattern of apertures provides a porosity of the second high mechanical strength layer selected from the range of 30% to 70% and preferably for some applications 40% to 70%; or wherein the third pattern of apertures provides a porosity of the third high mechanical strength layer selected from the range of 30% to 70% and preferably for some applications 40% to 70%; or wherein the fourth pattern of apertures provides a porosity of the fourth high mechanical strength layer selected from the range of 30% to 70% and preferably for some applications 40% to 70%.

A range of geometries, shapes, orientations and patterns for apertures of the high mechanical strength layers are useful in the separator systems of the invention. In an embodiment, for example, the apertures of any of the first high mechanical strength layer, the second high mechanical strength layer, the third high mechanical strength layer or the fourth high mechanical strength layer independently have cross sectional shapes selected from the group consisting of a circle, parallelogram, rectangle, square, triangle, ellipse, tetragon, pentagon, hexagon and any combinations thereof. In an embodiment, for example, the apertures of the high mechanical strength layers have at least one lateral dimension (e.g., length, width, diameter, etc.) greater than or equal to 20 µm, optionally for some embodiments greater than or equal to 50 µm, optionally for some embodiments greater than or equal to 200 µm; optionally for some embodiments greater than or equal to 500 µm. In an embodiment, for example, the apertures of the high mechanical strength layers have at least one lateral dimension between 1 µm and 1 mm, and optionally for some applications 200 µm and 1 mm. In an embodiment, for example, the apertures of the high mechanical strength layers have at least one lateral dimension less than or equal to 200 µm and optionally for some applications less than or equal to 10 µm; and optionally for some applications less than or equal to 1 µm. In an embodiment, for example, any of the first pattern, the second pattern, the third pattern or the fourth pattern is independently a symmetrical pattern of apertures or an asymmetrical pattern of apertures. In an embodiment, for example, any of the first pattern, the second pattern, the third pattern or the fourth pattern independently comprise a pattern of apertures that is not random.

In an embodiment, for example, any of the first pattern of apertures, second pattern of apertures, third pattern of apertures or the fourth pattern of apertures are independently made by a process selected from the group consisting of laser cutting, lithography, etching, casting, drilling, molding, punching, patterning, coating and any combinations of these.

In an embodiment, the first high mechanical strength layer; and/or second high mechanical strength layer; and/or third high mechanical strength layer; and/or fourth high mechanical strength layer are electrically non-conductive, for example, one or more of these layers comprising an electrically insulating material so as to prevent direct electrical contact between positive and negative electrodes of an electrochemical system such as an electrochemical cell. Electrically insulating high mechanical strength layers may comprise a range of electrical insulating materials such as Kapton, polyester, $Al_2O_3$, polyethylene, Polypropylene, fibrous cellulose, and/or metal layers coated with electrical insulators such as PE and PP coatings. In an embodiment, at least one of the first high mechanical strength layer; and/or second high mechanical strength layer; and/or third high mechanical strength layer; and/or fourth high mechanical strength layer are electrically conductive, for example, wherein one or more of these layers comprises an electrically insulating material and one or more of these layers comprises an electrically conductive material. the first high mechanical strength layer; and/or second high mechanical strength layer; and/or third high mechanical strength layer; and/or fourth high mechanical strength layer comprise a material characterized by a shape memory property, such as a shape memory polymer, or a materials characterized by the property of super elasticity.

In an embodiment, for example, the first high mechanical strength layer and the second high mechanical strength layer are not in complete physical contact with each other, such as provided in a configuration wherein there is at least some space between first high mechanical strength layer and the second high mechanical strength layer for electrolyte to have ionic transport, such as provided by first and second high mechanical strength layers having rough surfaces in contact with each other such that at some points they are physically attached but at some other points there is some space between them. In an embodiment, the first high mechanical strength layer and the second high mechanical strength layer are not in physical contact or are not in complete physical contact. In an embodiment, for example, at least a part of the first high mechanical strength layer and the second high mechanical strength layer are separated by a distance selected from the range of 20 nm to 2 mm. In an embodiment, for example, at least a part of the first high mechanical strength layer or the second high mechanical strength layer is separated from the third high mechanical strength layer or the fourth high mechanical strength layer by a distance selected from the range of 20 nm to 2 mm.

In an embodiment, for example, any of, and optionally all of, the first high mechanical strength layer, the second high mechanical strength layer, the third high mechanical strength layer, the fourth high mechanical strength layer, the one or more low ionic resistance layers, and the one or more chemical barrier layers independently have an average thickness selected over the range of 10 nm to 1 mm, and optionally for some applications selected over the range of 1 µm to 500 µm, and optionally for some applications selected over the range of 10 nm to 50 µm. In an embodiment, for example, any of, and optionally all of, the first high mechanical strength layer, the second high mechanical strength layer, the third high mechanical strength layer, the fourth high mechanical strength layer, the one or more low ionic resistance layers, and the one or more chemical barrier layers independently have an average thickness selected over the range 5 µm to 1 mm, optionally for some applications selected over the range 25 µm to 5 mm, and optionally for some applications selected over the range of 100 µm to 2 mm, and optionally for some applications selected over the range of 500 µm to 1 mm. In an embodiment, for example, any of, and optionally all of, the first high mechanical strength layer, the second high mechanical strength layer, the third high mechanical strength layer, the fourth high mechanical strength layer, the one or more low ionic resistance layers, and the one or more chemical barrier layers independently have an average thickness selected over the range 10 nm to 2 µm or selected over the range 2 µm to 50 µm.

In an embodiment, for example, any of, and optionally all of, the first high mechanical strength layer, the second high mechanical strength layer, the third high mechanical strength layer and the fourth high mechanical strength layer independently have a Young's modulus selected over the range of 500 MPa to 500 GPa. In an embodiment, for example, any of, and optionally all of, the first high mechanical strength layer, the second high mechanical strength layer, the third high mechanical strength layer and the fourth high mechanical strength layer independently have a yield strength selected over the range of 5 MPa to 1000 MPa. In an embodiment, for example, any of, and optionally all of, the first high mechanical strength layer, the second high mechanical strength layer, the third high mechanical strength layer and the fourth high mechanical strength layer independently have a propagating tear strength selected over the range of 0.005 N to 10 N, preferably for some applications a propagating tear strength more than 0.01 N. In an embodiment, for example, any of, and optionally all of, the first high mechanical strength layer, the second high mechanical strength layer, the third high mechanical strength layer and the fourth high mechanical strength layer independently have an initiating tear strength selected over the range of 10 N to 500 N, preferably for some applications an initiating tear strength more than 50 N. In an embodiment, for example, any of, and optionally all of, the first high mechanical strength layer, the second high mechanical strength layer, the third high mechanical strength layer and the fourth high mechanical strength layer independently have a tensile strength selected over the range of 50 MPa to 2 GPa. In an embodiment, for example, any of, and optionally all of, the first high mechanical strength layer, the second high mechanical strength layer, the third high mechanical strength layer and the fourth high mechanical strength layer independently have an impact strength selected over the range of 10 N cm to 1000 N cm.

In an embodiment, for example, any of, and optionally all of, the first high mechanical strength layer, the second high mechanical strength layer, the third high mechanical strength layer and the fourth high mechanical strength layer independently comprise planar layers provided in a parallel configuration. In an embodiment, for example, any of, and optionally all of, the first high mechanical strength layer, the second high mechanical strength layer, the third high mechanical strength layer and the fourth high mechanical strength layer independently comprise hollow cylindrical layers provided in a concentric configuration. In an embodiment, for example, any of, and optionally all of, the first high mechanical strength layer, the second high mechanical strength layer, the third high mechanical strength layer, the fourth high mechanical strength layer, the one or more low ionic resistance layers, and the one or more chemical barrier layers comprise chemically resistant materials. In an embodiment, the first high mechanical strength layer, the second high mechanical strength layer, the third high mechanical strength layer, the fourth high mechanical strength layer, the one or more low ionic resistance layers, and the one or more chemical barrier layers are independently chemically compatible with an electrolyte it is provided in contact with and/or independently chemically compatible with an electrode it is provided in contact with.

In an embodiment, for example, any of, and optionally all of, the first high mechanical strength layer, the second high mechanical strength layer, the third high mechanical strength layer and the fourth high mechanical strength layer independently comprise a material having a melting point greater than or equal to 100 Celsius. In an embodiment, for example, at least two of the high mechanical strength layers have different melting temperature with the difference of at least 30 Celsius, optionally wherein the difference in melting temperatures of the high mechanical strength layers provides a shutdown mechanism that by melting one of the layers the ionic path between two electrodes of an electrochemical cell closes; or alternatively wherein the difference in melting temperatures of the high mechanical strength layers result does not provide a shutdown mechanism that by melting one of the layers the ionic path between two electrodes of an electrochemical cell closes. In an embodiment, for example, any of, and optionally all of, the first high mechanical strength layer, the second high mechanical strength layer, the third high mechanical strength layer and the fourth high mechanical strength layer independently comprise a material having a thermal coefficient of thermal expansion is less than or equal to 50 ppm/° C.

The first high mechanical strength layer, the second high mechanical strength layer, the third high mechanical strength layer and the fourth high mechanical strength layer of separator systems of the invention may comprise a range of materials selected for a particular application, such as type of electrochemical cell. In an embodiment, for example, first high mechanical strength layer, the second high mechanical strength layer, the third high mechanical strength layer and the fourth high mechanical strength layer independently comprise chemically resistant materials. In an embodiment, for example, first high mechanical strength layer, the second high mechanical strength layer, the third high mechanical strength layer and the fourth high mechanical strength layer independently comprise thermally stable materials. In an embodiment, for example, any of, and optionally all of, the first high mechanical strength layer, the second high mechanical strength layer, the third high mechanical strength layer and the fourth high mechanical strength layer independently comprise one or more materials selected from the group consisting of a polymer, a metal, an alloy, a ceramic, a wood, a glass, a semiconductor, a woven material, and a nonwoven material. In an embodiment, for example, any of, and optionally all of, the first high mechanical strength layer, the second high mechanical strength layer, the third high mechanical strength layer and the fourth high mechanical strength layer independently comprise a material having a dielectric constant greater than or equal to 50. In an embodiment, for example, any of, and optionally all of, the first high mechanical strength layer, the second high mechanical strength layer, the third high mechanical strength layer and the fourth high mechanical strength layer independently comprise a conductive material. In an embodiment, for example, any of, and optionally all of, the first high mechanical strength layer, the second high mechanical strength layer, the third high mechanical strength layer and the fourth high mechanical strength layer independently comprise one or more materials selected from the group consisting of a gel electrolyte, a solid electrolyte and a polymer electrolyte. In an embodiment, for example, any of, and optionally all of, the first high mechanical strength layer, the second high mechanical strength layer, the third high mechanical strength layer and the fourth high mechanical strength layer independently comprise one or more materials selected from the group consisting of Polyacrylic acid (PAA), Cross-linked polyethylene (PEX, XLPE), Polyethylene (PE), Polyethylene terephthalate (PET, PETE), Polyphenyl ether (PPE), Polyvinyl chloride (PVC), Polyvinylidene chloride (PVDC), Polylactic acid (PLA), Polypropylene (PP), Polybutylene (PB), Polybutylene terephthalate (PBT), Polyamide (PA), Polyimide (PI), Polycarbonate (PC), Polytetrafluoroethylene (PTFE), Polystyrene (PS), Polyurethane (PU), Polyester (PE), Acrylonitrile butadiene styrene (ABS), Poly(methyl methacrylate) (PMMA), Polyoxymethylene (POM), Polysulfone (PES), Styrene-acrylonitrile (SAN), Ethylene vinyl acetate (EVA), Styrene maleic anhydride (SMA), PVDF, PEO, LIPON, LISICON, Nafion, $ZrO_2$, NASICON, tetramethylammonium hydroxide pentahydrate $(CH_3)_4NOH.5H_2O$, poly(ethylene oxide) (PEO), copolymer of epichlorohydrin and ethylene oxide P(ECH-co-EO) and poly(vinylalcohol), PEO-PVA-glassfibre polymer electrolyte, zinc sulfide, silicon dioxide, PVA and PSA, PVA/V6/PSS; PVAN6/(PSS+PAA); V6/PVA/(PSS+PAA); PVMPSS+PAA(35%))/(PSS+PAA(35%)); (PSS+PAA(35%))/PVA/(PSS+PAA(35%)); or (PSS+PAA (35%))/(PVA(10%)+PSS (20% vs. PVA))/(PSS+PAA (35%)) polyethylene glycol, polypropylene glycol, polybutylene glycol, alkyl-polyethylene glycol, alkyl-polypropylene glycol, alkyl-polybutylene glycol, a copolymer thereof, a PEO material or a PVA material and any combination thereof.

In an embodiment, for example, a surface of any of the first high mechanical strength layer, the second high mechanical strength layer, the third high mechanical strength layer and the fourth high mechanical strength layer is wet-able with an electrolyte. In an embodiment, for example, a surface of any of the first high mechanical strength layer, the second high mechanical strength layer, the third high mechanical strength layer and the fourth high mechanical strength layer is coated with a coating that is wet-able with an electrolyte. In an embodiment, for example, at least a portion of a surface of any of the first high mechanical strength layer, the second high mechanical strength layer, the third high mechanical strength layer and the fourth high mechanical strength layer is coated with an adhesive coating, optionally covering less than 10% of the surface. In an embodiment, for example, at least a portion of a surface of any of the first high mechanical strength layer, the second high mechanical strength layer, the third high mechanical strength layer and the fourth high mechanical strength layer is coated with an adhesive coating having a thickness less than 5 µm. In an embodiment, for example, at least one surface of any of the first high mechanical strength layer, the second high mechanical strength layer, the third high mechanical strength layer and the fourth high mechanical strength layer has a surface roughness, such as a surface roughness characterized by a rms (root mean square) selected from the range of 1 nm to 1000 nm, providing a space for an electrolyte between at least a portion of the first high mechanical strength layer, the second high mechanical strength layer, the third high mechanical strength layer or the fourth high mechanical strength layer. In an embodiment, for example, the separator system is a component in an electrochemical cell having a positive electrode and a negative electrode; wherein at least one surface of any of the first high mechanical strength layer, the second high mechanical strength layer, the third high mechanical strength layer and the fourth high mechanical strength layer has a surface roughness such as a surface roughness characterized by a rms selected from the range of 1 nm to 1000 nm, providing a space for an electrolyte between the first high mechanical strength layer, the second high mechanical strength layer, the third high mechanical strength layer or the fourth high mechanical strength layer and the positive electrode or the negative electrode of the electrochemical cell. In an embodiment, for example, the surface roughness provides a distance between at least a portion of two of the high mechanical strength layers or between at least a portion of a high mechanical strength layer and the positive electrode or negative electrode selected from the range of 5 nm and 5 micrometers.

In an aspect, the invention provides a separator system wherein at least some of the first high mechanical strength layer, the second high mechanical strength layer, the third high mechanical strength layer, the fourth high mechanical strength layer, low ionic resistance layers, frame layers, spacer, chemical barrier layers, or any combination of these have a high surface energy, preferably for some applications a surface energy greater than or equal to 10 mJ/m$^2$. In an embodiment, for example, the surface energy of any of these components facilitates the wettability of the layers with the electrolyte. In an embodiment, for example, the surface energy of any of these components helps with the attachment of the layers to each other or to the electrodes of an electrochemical cell.

In an aspect, the separator further comprises one or more coatings provided on any of the first high mechanical strength layer, the second high mechanical strength layer, the third high mechanical strength layer and the fourth high mechanical strength layer. In an embodiment, for example, the one or more coatings independently comprises one or more non-conductive coatings. In an embodiment, for example, the one or more coatings independently comprises one or more hydrophobic coatings and/or hydrophilic coatings. In an embodiment, for example, the one or more coatings independently comprises polyethylene glycol. In an embodiment, for example, the one or more coatings prevent material transport from a positive electrode to a negative electrode of an electrochemical cell. In an embodiment, for example, the one or more coatings independently have a thickness selected from the range of 10 nm to 2 µm. In an embodiment, for example, the separator is for an electrochemical cell having a sulfur-based cathode, wherein the one or more coating repels hydrophobic polysulfides and increases the performance and cycle life of the electrochemical cell. In an embodiment, the hydroponic or hydrophobic coating is provided for a sulfur based cathode Li– battery. A problem with state of the art for a sulfur based cathode Li-batteries is that the electrochemical reactions are solvable in the electrolyte and, thus there may be a significant capacity loss due to the passage of the materials (intermedially poly sulfides) from the sulfur electrode to the Li electrode through the electrolyte. To prevent this problem, a separator of a specific embodiment is coated with polyethylene glycol material (hydrophilic) which repels the hydrophobic poly sulfides and, thus hinders the materials passage and capacity loss. Use of a coating in embodiments of the invention is also useful in protecting a Li anode from moisture, say a by a hydrophobic coating on the separator, for example in a lithium-air and lithium water electrochemical cell.

In an embodiment, for example, any of the first high mechanical strength layer, the second high mechanical strength layer, the third high mechanical strength layer and the fourth high mechanical strength layer is independently a metal layer, optionally selected from the group consisting of Al, Ni, Cu and stainless steel. In an embodiment, for example, the coating is a non-conductive coating, optionally comprising PTFE, PE, PP, PVC, or a polyimide.

The invention includes separator systems useful for with a range of electrochemical systems. In an embodiment, for example, the invention provides a separator system for a primary electrochemical cell or secondary electrochemical cell. In an embodiment, for example, the invention provides a separator system for a lithium battery, an alkaline battery, zinc battery or a lead acid battery. In an embodiment, for example, the invention provides a separator system for a lithium metal-air battery, a lithium ion battery, a lithium air battery, a Fe-air battery, an Al-air battery, or a zinc-air battery. In an embodiment, for example, the invention provides a separator system for a fuel cell, a flow battery system, a semisolid battery, a 3-D battery, a nano-battery, a micro-battery or an electrochemical capacitor.

In another aspect, the invention provides an electrochemical cell comprising: (i) a negative electrode; (ii) a positive electrode; (iii) a first electrolyte provided between the positive electrode and the negative electrode; and (iv) a separator system of the invention provided in contact with the electrolyte and between the negative electrode and the positive electrode; wherein the separator system is positioned such that ions of the electrolyte are able to be transported between the positive electrode and the negative electrode. In an aspect, the separator system prevents electrical contact between the positive electrode and the negative electrode. As will be understood by one of skill in the art, any of the separator systems described herein can be used for electrochemical systems of the invention, such as electrochemical cells.

In an embodiment, for example, the separator system is provided in physical contact with the positive electrode and the negative electrode. In an embodiment, for example, the separator system provides an ionic conductivity between the positive electrode and the negative electrode equal to or greater than $1\times10^{-3}$ S/cm, optionally for some applications preferably greater than $1\times10^{-2}$ S/cm. In an embodiment, for example, the separator system provides a net ionic resistance from the positive electrode to the negative electrode selected over the range of 0.5 ohm cm$^2$ to 25 ohm cm$^2$, and preferably for some applications less than 5 ohm cm$^2$.

In an embodiment, the electrochemical cell further comprises a chemical barrier layer provided between the positive electrode and the negative electrode; the electrochemical cell further comprising a second electrolyte provided between the positive electrode and the negative electrode, wherein the chemical barrier layer prevents mixing of the first electrolyte and the second electrolyte.

In an embodiment, for example, the off-set alignment of the high mechanical strength layers provides no direct, linear path between the positive and negative electrodes. In an embodiment, for example, the off-set alignment prevents shorting via electrical contact between the positive electrode and the negative electrode by manufacturing defects, external objects or the formation of dendrites on the positive electrode or negative electrode. Embodiments of this aspect are beneficial, for example, for minimizing or preventing electrical shorting from the positive electrode to the negative electrode or thermal runaway issues arising from the formation of dendrites. Embodiments of this aspect are beneficial, for example, for providing electrochemical cells capable of enhanced cycling and/or high discharge rate performance.

In an embodiment, for example, at least one of the first high mechanical strength layer, the second high mechanical strength layer, the third high mechanical strength layer, the fourth high mechanical strength layer, the low ionic resistance layers, the frame layers, the spacer, the chemical barrier layers, or any combination of these are at least partially attached the positive electrode or the negative electrode by via pressure, heating, an adhesive coating, a chemical adherent, plasma treating or by depositing or coating one layer on another layer or on an electrode or any combination of these. In an embodiment, for example, at least one of the first high mechanical strength layer, the second high mechanical strength layer, the third high mechanical strength layer, the fourth high mechanical strength layer, the low ionic resistance layers, the frame layers, the spacer, the chemical barrier layers, or any combination of these are at least partially attached to the positive electrode or the negative electrode by via a glue, epoxy, cement, a Telfon coating, a solid electrolyte, a gel electrolyte or a polymer electrolyte. In an embodiment, for example, at least one of the first high mechanical strength layer, the second high mechanical strength layer, the third high mechanical strength layer, the fourth high mechanical strength layer, low ionic resistance layers, frame layers, spacer, chemical barrier layers, or any combination of these comprise a coating deposited on a surface of the positive electrode or the negative electrode.

In an embodiment, for example, the invention provides an electrochemical cell incorporating the present separator system having a cycle capacity at least 300 cycles, and preferably for some applications at least 500 cycles. In an embodiment, for example, the invention provides an electrochemical cell incorporating the present separator system having a specific capacity equal to or greater than 100 mAh g$^{-1}$ at a discharge rate equal to or greater than C/5. In an embodiment, for example, the invention provides an electrochemical cell having Electrochemical cells and separator systems of the invention are compatible with a range of electrolytes, including liquid electrolytes, solid, electrolytes, gel electrolytes, aprotic electrolytes, aqueous electrolytes and nonaqueous electrolytes. In an embodiment, for example, the electrolyte comprises a solid charge carrying media or a gel electrode. In an embodiment, for example, the electrolyte comprises a polymeric media. In an embodiment, for example, the electrolyte comprises polyethylene oxide, polytetrafluoroethylene, polyvinylidene fluoride, fluorine-containing copolymers, polyacrylonitrile, and any combinations thereof.

In an embodiment, for example, the electrolyte comprises an alkali metal salt at least partially dissolved in one or more nonaqueous solvents. In an embodiment, for example, the electrolyte comprises a solvent and a supporting salt; wherein the solvent is selected from the group consisting of organic carbonates, ethers, esters, formates, lactones, sulfones, sulfolane, 1,3-dioxolane, ethylene carbonate, propylene carbonate, dimethyl carbonate, diethyl carbonate, ethyl methyl carbonate, butylene carbonate, vinylene carbonate, fluoroethylene carbonate, fluoropropylene carbonate, y-butylrolactone, methyl difluoroacetate, ethyl difluoroacetate, dimethoxyethane, diglyme (bis(2-methoxyethyl) ether), tetrahydrofuran, dioxolane, 2MeTHF, 1,2-DME or higher glymes, sufolane, methyl formate, methyl acetate, and any combinations thereof; and wherein the supporting salt is selected from the group consisting of LiPF$_6$, LiBF$_4$, LiAsF$_6$, LiClO$_4$, LiSO$_3$CF$_3$, LiN(CF$_3$SO$_2$)$_2$, LiN(SO$_2$C$_2$F$_5$)$_2$ an any combinations thereof. In an embodiment, for example, the electrolyte comprises a golfing agent selected from the group consisting of PVdF, PVdF-HFP copolymer, PAN, and PEO and mixtures thereof; a plasticizer selected from the group consisting of EC, PC, DEC, DMC, EMC, THE, 2MeTHF, 1,2-DME and mixtures thereof; and a Li salt selected from the group consisting of LiPF$_6$, LiBF$_4$, LiAsF$_6$, LiClO$_4$, LiSO$_3$CF$_3$, LiN(CF$_3$SO$_2$)$_2$ and LiN(SO$_2$C$_2$F$_5$)$_2$.

In an aspect, the invention provides an electrochemical cell having a first electrolyte on a first side of the cell including the positive electrode and a second electrolyte on a second side of the cell including the negative electrode, wherein the first electrolyte has a different composition than the second electrolyte, and wherein the electrochemical cell further comprises one or more chemical barrier layers comprising an ion conductive protective membrane positioned between the positive electrode and the negative electrode. In an embodiment of this aspect, the first electrolyte is an aqueous electrolyte and the second electrolyte is an aprotic electrolyte. In an embodiment of this aspect, at least one of the first electrolyte and the second electrolyte is a solid electrolyte.

Electrochemical cells and separator systems of the invention are compatible with electrodes having a range of compositions, form factors and device geometries. In an embodiment, for example, the negative electrode, the positive electrode or both comprise a micro-sized material of a nano-sized material. As used herein, nano-sized refers to a structure, such as a particle or thin film, having at least one physical dimension (e.g., length, height, width, diameter, etc.) that is selected over the range of 1 nm to 1000 nm. As used herein, micro-sized refers to a structure, such as a particle or thin film, having at least one physical dimension (e.g., length, height, width, diameter, etc.) that is selected over the range of 1 µm to 1000 µm. In an embodiment, for example, the negative electrode or the positive electrode is in the form of a powder, such as a mixture of active electrode particles and conductive particles. In an embodiment, for example, the negative electrode or the positive electrode is in the form of a thin film. In an embodiment, for example, the invention provides an electrochemical cell wherein at least one of the positive electrode or negative electrode in the form of a solvated metal, such as solvated lithium or a solvated lithium alloy. In an embodiment, for example, the invention provides an electrochemical cell wherein at least one of the positive electrode or negative electrode in the form of a molten metal.

In an embodiment, for example, the invention provides an electrochemical cell wherein the negative electrode comprises a material selected from the group consisting of lithium, zinc, aluminum, silicon, tin, antimony, lead, germanium, magnesium, cadmium, bismuth, indium, molybdenum, niobium, tungsten, tantalum, iron, nickel, manganese, copper, a sodium transition metal phosphate, a sodium mixed metal phosphate; $Li_4/3Ti5/3O_4$, graphite, an alloy of tin, cobalt, carbon, $LiVO_2$, $Li_4Ti_5O_{12}$, $Li4/3Ti5/3O_4$ $TiO_2$, $WO_2$, and $MoO_2$. In an embodiment, for example, the invention provides an electrochemical cell wherein the positive electrode comprises a material selected from the group consisting of graphite, $LiCoO\_2$ $NiO\_8O_2$, $LiNiO2$, $LiFePO_4$, $LiMnPO_4$, $LiCoPO_4$, $LiMn_2O_4$, $LiCoO_2$, $LiNiO\_5Mn 1.5O_4$, $LiVPO_4$ F, silver oxide, nickel oxide, cobalt oxide, manganese oxide, $AgO$, $Ag_2O_3$, $Zn$, $ZnO$ $AgO$, $Ag_2O$, $Ag_2O_3$, $HgO$, $Hg_2O$, $CuO$, $CdO$, $NiOOH$, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, $LiMn_2O_4$, $LiVO_2$, $Li_4Ti_5O_{12}$, $TiO_2$, $WO_2$, and $MoO_2$. In an embodiment, for example, the invention provides an electrochemical cell wherein the positive electrode comprises a material selected from the group consisting of a (i) lithiated metal oxide based cathode selected from the group consisting of $LixCoO_2$, $Li_xNiO_2$, $LixMn_2O_4$ and $LiFePO_4$; (ii) an unlithiated metal oxide based cathode selected from the group consisting of $Ag_xV_2O_5$, $Cu_xV_2O_5$, $V_2O_5$, $V_6O_{13}$, $MnO_2$, $CuO$, $Ag_2CrO_4$ and $MoO_3$, wherein x ranges from 0 to 2; (iii) a lithiated metal oxide based cathode selected from the group consisting of $FeS_2$, $TiS_2$, $FeS$ and $CuS$; (iv) an active sulfur cathode selected from the group consisting of elemental sulfur, polysulfides and combinations thereof; and (v) a PEO/carbon/metal-oxide type cathode structure comprising an aqueous electrochemically active component such as water or a water soluble oxidant selected from the group consisting of gaseous, liquid and solid oxidants and combinations thereof such as peroxide, hydrogen peroxide, $O_2$, $SO_2$ and $NO_2$, and the water soluble solid oxidants are selected from the group consisting of $NaNO_2$, $KNO_2$, $Na_2SO_3$ and $K_2SO_3$ wherein the cathode structure electronically conductive component is a porous catalytic support such as nickel and wherein the cathode structure electrochemically active material comprises air.

Electrochemical cells of the invention include primary electrochemical cells and secondary electrochemical cells. In an embodiment, for example, the invention provides an electrochemical cell comprising a lithium battery, an alkaline battery, zinc battery, a lead acid battery, a lithium metal-air battery, a lithium ion battery, a lithium air battery, a Fe-air battery, a Al-air battery, or a zinc-air battery. In an embodiment, for example, the invention provides an electrochemical cell comprising a fuel cell, a flow battery system, a semisolid battery, a 3-D battery, a nano-battery, a micro-battery, or an electrochemical capacitor. In an embodiment, for example, the invention provides an electrochemical cell comprising a thin film battery. In an embodiment, for example, the invention provides an electrochemical cell that is an alkaline metal ion battery.

In an embodiment, for example, the invention provides a battery pack comprising one or more electrochemical cells, such as one or more lithium ion electrochemical cells. As will be understood by one of skill in the art, any of the separator systems and electrochemical cells described herein can be used for alkali metal flow batteries, supercapacitors or fuel cells of the invention.

In an aspect, the invention provides an alkali metal fuel cell, comprising: (i) a renewable anode comprising solid alkali metal and alkali metal dissolved in a solvent as fuel; (ii) a cathode structure comprising a static electronically conductive component, an ionically conductive component comprising an electrolyte for ions of the alkali metal, and a fluid oxidant obtained from an operating environment of the cell; and (iii) a separator system of the invention provided between the anode and cathode structure. As will be understood by one of skill in the art, any of the separator systems described herein can be used for alkali metal flow batteries, supercapacitors or fuel cells of the invention.

In an aspect, the invention provides a method of making an electrochemical cell, the method comprising the steps of: (i) providing a negative electrode; (ii) providing a positive electrode; (iii) providing an electrolyte between the positive electrode and the negative electrode; and (iv) providing a separator system positioned between the positive electrode and the negative electrode, wherein the separator system comprises (i) a first high mechanical strength layer having a plurality of apertures extending entirely through the first high mechanical strength layer and provided in a first pattern; and (ii) a second high mechanical strength layer having a plurality of apertures extending entirely through the second high mechanical strength layer and provided in a second pattern; the second pattern having an off-set alignment relative to the first pattern such that an overlap of the apertures of the first high mechanical strength layer and the apertures of the second high mechanical strength layer along axes extending perpendicularly from the first high mechanical strength layer to the second high mechanical strength layer is less than or equal to 20%; wherein the first high mechanical strength layer and the second high mechanical strength layer are positioned such that ions of an electrolyte provided in contact with the first high mechanical strength layer and the second high mechanical strength layer are able to be transported through the first high mechanical strength layer and the second high mechanical strength layer. In an embodiment, the separator system is at least partially in physical contact with the electrolyte. In an embodiment, the method further comprises providing an ion conductive chemical barrier between the positive electrode and the negative electrode; wherein the ion conductive chemical barrier separates a first electrolyte in contact with the positive electrode from a second electrolyte that is in connect with the negative electrode; wherein the first electrolyte has a different composition from the second electrolyte; and wherein the ion conductive chemical barrier prevents mixing of the first electrolyte and the second electrolyte. As will be generally understood by one of skill in the art, any of the present separator systems and systems of the invention, including all specific embodiments and combinations of components, materials and properties described herein, may be used in the present methods of making an electrochemical cell.

In an aspect, the invention provides a method of generating an electrical current, the method comprising the steps of: (i) providing an electrochemical cell, wherein the electrochemical cell comprises: (1) a first high mechanical strength layer having a plurality of apertures extending entirely through the first high mechanical strength layer and provided in a first pattern; and (2) a second high mechanical strength layer having a plurality of apertures extending entirely through the second high mechanical strength layer and provided in a second pattern; the second pattern having an off-set alignment relative to the first pattern such that an overlap of the apertures of the first high mechanical strength layer and the apertures of the second high mechanical strength layer along axes extending perpendicularly from the first high mechanical strength layer to the second high mechanical strength layer is less than or equal to 20%; wherein the first high mechanical strength layer and the second high mechanical strength layer are positioned such that ions of an electrolyte provided in contact with the first high mechanical strength layer and the second high mechanical strength layer are able to be transported through the first high mechanical strength layer and the second high mechanical strength layer; and (ii) discharging the electrochemical cell. In an embodiment, the method of this aspect further includes the step of charging the electrochemical cell. In an embodiment, the method of this aspect further includes the step of cycling the electrochemical cell through a plurality of charge and discharge cycles. As will be generally understood by one of skill in the art, any of the present separator systems and systems of the invention, including all specific embodiments and combinations of components, materials and properties described herein, may be used in the present methods of generating an electrical current.

In another aspect, provided are electrochemical cells comprising: a positive electrode; a negative electrode; an ionically conductive and electronically insulating separator positioned between the positive electrode and the negative electrode; a first electronically and ionically conductive layer positioned between the positive electrode and the separator and in electrical contact with the positive electrode or positioned between the negative electrode and the separator and in electrical contact with the negative electrode; and one or more electrolytes positioned between the positive electrode and the negative electrode; wherein the one or more electrolytes are capable of conducting charge carriers.

Optionally the first electronically and ionically conductive layer comprises a metal, a metal alloy, a carbon material, a semiconductor, an electronically conductive polymer, an electronically conductive ceramic or any combination of these. Optionally, the first electronically and ionically conductive layer comprises a metallic or alloy mesh, a metallic or alloy perforated layer, a metal or alloy coating, a carbon coating, a porous layer, a perforated layer, a mesh, a foam, an at least partial coating of a conductive material or any combination of these. Optionally, the first electronically and ionically conductive layer comprises a Au, Al, Cu, Ti, Zn, Ag, stainless steel, Li, Sn, Si, Ni, steel, Tungsten, Tin, Lead, Constantan, Mercury, Germanium or any of their alloys, graphite, carbon black, graphene, carbon nanotubes, coke, Li alloys, Fe alloys, Indium tin oxide (ITO), lanthanum-doped strontium titanate (SLT), yttrium-doped strontium titanate (SYT), Poly(fluorene)s, polyphenylenes, polypyrenes, polyazulenes, polynaphthalenes, Poly(acetylene)s, Poly(p-phenylene vinylene), poly(pyrrole)s, polycarbazoles, polyindoles, polyazepines, polyanilines, poly(thiophene)s, poly(3,4-ethylenedioxythiophene), poly(p-phenylene sulfide), polyfluorene-based conducting polymers, PAN, Poly(9,9-dioctylfluorene-co-fluorenone, Poly(9,9-dioctylfluorene-co-fluorenone-co-methylbenzoic ester), polythiophene, polypyrrole, poly(3,4-ethylenedioxythiophene) poly(styrenesulfonate)(PEDOT:PSS), [(ferocenyl)amidopropyl]pyrrole, pyrrole, polypyrrole, polyaniline, polythiophene, polyfuran, $SiO_2$, Napon, PVC or their doped compositions or their mixtures; or any combination of these.

Optionally, the first electronically and ionically conductive layer comprises a porous or perforated material having a porosity greater than or equal to 30%, greater than or equal to 40%, greater than or equal to 50%, greater than or equal to 60%, greater than or equal to 70%, greater than or equal to 80%, greater than or equal to 90%, selected from the range of 30% to 90%, selected from the range of 40% to 80%, selected from the range of 50% to 70% or selected from the range of 50% to 90%.

Optionally, the first electronically and ionically conductive layer comprises a chemically resistant material, a heat resistant material, a mechanically resistant material or any combination of these. Optionally, the first electronically and ionically conductive layer comprises a thin film structure deposited on at least one external surface of the separator, the positive electrode or the negative electrode. Optionally, the first electronically and ionically conductive layer comprises a coating coated on at least one external surface of the separator, the positive electrode or the negative electrode.

Optionally, the first electronically and ionically conductive layer has an electronical conductivity greater than or equal to 1 S/cm, greater than or equal to 10 S/cm or greater than or equal to 100 S/cm. Optionally, the first electronically and ionically conductive layer has an ionic resistance less than or equal to 10 $\Omega \cdot cm^2$, less than or equal to 5 $\Omega \cdot cm^2$, less than or equal to 3 $\Omega \cdot cm^2$, less than or equal to 1 $\Omega \cdot cm^2$, selected from the range of 0.3 $\Omega \cdot cm^2$ to 3 $\Omega \cdot cm^2$, selected from the range of 0.03 $\Omega \cdot cm^2$ to 3 $\Omega \cdot cm^2$, selected from the range of 0.1 $\Omega \cdot cm^2$ to 10 $\Omega \cdot cm^2$, selected from the range of 0.3 $\Omega \cdot cm^2$ to 5 $\Omega \cdot cm^2$ or selected from the range of 0.3 $\Omega \cdot cm^2$ to 3 $\Omega \cdot cm^2$.

Optionally, the first electronically and ionically conductive layer has a thickness less than or equal to 100 µm, less than or equal to 50 µm, less than or equal to 25 µm, less than or equal to 10 µm, less than or equal to 1 µm, less than or equal to 100 nm, selected from the range of 10 nm to 100 µm, selected from the range of 10 nm to 10 µm or, selected from the range of 50 nm to 5 µm.

Optionally, the first electronically and ionically conductive layer is provided in physical contact with the separator. Optionally, the first electronically and ionically conductive layer is in physical contact with at least 10% of an exterior surface of the separator. Optionally, the first electronically and ionically conductive layer is in physical contact with the positive electrode or the negative electrode. Optionally, the first electronically and ionically conductive layer is in physical contact with at least 10% of an exterior surface of the positive electrode or the negative electrode. Optionally, the first electronically and ionically conductive layer is at least partially covered with the positive electrode material or the negative electrode material.

In embodiments, the first electronically and ionically conductive layer increases an electronic conductivity of at least a portion of the negative electrode or the positive electrode. Optionally, the first electronically and ionically conductive layer provides an added path for electron transfer between the positive electrode and a positive electrode current collector, an added path for electron transfer between the negative electrode and a negative electrode current collector, a homogeneous electric field adjacent to and within the positive electrode or a homogeneous electric field adjacent to and within the negative electrode or any combination of these provided benefits. Optionally, the first electronically and ionically conductive layer provides an auxiliary path for electrons to or from the positive electrode or the negative electrode. Optionally, the first electronically and ionically conductive layer provides a homogeneous electric field adjacent to and within the positive electrode or the negative electrode, thereby providing uniform ion deposition into the positive electrode or the negative electrode. In exemplary embodiments, the first electronically and ionically conductive layer prevents dendrite growth on or from the positive electrode or the negative electrode.

In certain embodiments, an electrochemical cell of this aspect further comprises a second electronically and ionically conductive layer. Optionally, the first electronically and ionically conductive layer is positioned in electrical contact with the positive electrode and wherein the second electronically and ionically conductive layer is positioned in electrical contact with the negative electrode.

Optionally, the separator comprises a microporous layer comprising a polymer, polyethylene, polypropylene, polyethylene terephthalate, Kapton, polyester, Nafion, $ZrO_2$, polyimide, polytetrofluoroethylene, glass separator, nonwoven separator, woven separator or any combination of these. Optionally, the separator comprises a polymer electrolyte, a solid electrolyte, a gel electrolyte, Nafion, $ZrO_2$, PVDF, PEO, PMMA, LISICON, NASICON, LIPON, NaPON, PE, PP, PET, Kapton or any combination of these.

In embodiments, the separator comprises a high mechanical strength layer. Optionally, the separator comprises a first high mechanical strength layer having a plurality of apertures extending entirely through the first high mechanical strength layer and provided in a first pattern. Optionally, the separator further comprises a first ionically conductive and electronically insulating material provided in at least a portion of the plurality of apertures of the first high mechanical strength layer.

In some embodiments, for example, the separator comprises: a first high mechanical strength layer having a plurality of apertures extending entirely through the first high mechanical strength layer and provided in a first pattern; and a second high mechanical strength layer having a plurality of apertures extending entirely through the second high mechanical strength layer and provided in a second pattern; the second pattern having an off-set alignment relative to the first pattern such that an overlap of the apertures of the first high mechanical strength layer and the apertures of the second high mechanical strength layer along axes extending perpendicularly from the first high mechanical strength layer to the second high mechanical strength layer is less than or equal to 20%; wherein the first high mechanical strength layer and the second high mechanical strength layer are positioned such that ions of an electrolyte provided in contact with the first high mechanical strength layer and the second high mechanical strength layer are able to be transported through the first high mechanical strength layer and the second high mechanical strength layer.

Optionally, the separator comprises a coating coated on at least one external surface of the first electronically and ionically conductive layer, at least one surface of the positive electrode or at least one surface of the negative electrode. Optionally, the separator comprises a thin film deposited on at least one external surface of the first electronically and ionically conductive layer, at least one surface of the positive electrode or at least one surface of the negative electrode. Optionally, the first electronically and ionically conductive layer is a component of the separator. Optionally, the first electronically and ionically conductive layer is a coating on the separator. Optionally the separator has a total thickness less than or equal to 500 µm or selected or the range of 10 nm to 200 µm.

Optionally, the positive electrode or negative electrode comprises an intercalation host material. Optionally, the positive electrode or negative electrode comprises a material that undergoes a change in shape during charging or discharging of the electrochemical cell. Optionally, the positive electrode comprises a metal oxide, sulfur, $SO_2$, Lithium-thionyl chloride, $MnO_2$, $CF_x$, CuO, $V_6O_{13}$, $V_2O_5$, $FeS_2$, $CuCl_2$, $I_2$, HgO, Cadmium, bromine, hydrogen based electrode, oxygen based electrode, bromine, FeS, $V_2O_5$, Ag, Ni, Pb, $PbO_2$, Carbon, $LiCoO_2$, $LiFePO_4$ $LiMn_2O_4$, carbon based oxygen cathode, carbon based water cathode, an alkali metal, an alkali metal alloy, a binary or ternary alkali metal alloy with or more of Ca, Mg, Sn, Ag, Zn, Bi, Al, Cd, Ga, In, zinc oxide, Na, lead oxide, Li, Lithium oxide, Lithium peroxide, lithium titanium oxide, oxygen active material cathode, water active material cathode, $Na_{2/3}[Fe_{1/2}Mn_{1/2}]O_2$, copper hexacyanoferrate, polypyrrole, activated carbon, grapheme, graphite, nanocarbon, antimony, a tin and antimony alloy, 5% vanadium-doped lithium iron phosphate, lithium iron fluorophosphates, manganese spinel, lithium nickel manganese cobalt, purpurin, lithium purpurin, lithium vanadium oxide, lithium titanate, cobalt oxide, iron phosphate, titanium dioxide, silicon, copper antinomide, a water soluble gaseous oxidant, a water soluble liquid oxidant, a water soluble solid oxidant or any combination of these. Optionally, the negative electrode comprises Si, Li, Zn, ZnO, Carbon, Na, Mg, Sn, Cd, Pb, $PbO_2$, LTO, vanadium oxide, an alkali metal, an alkali metal alloy, a binary or ternary alkali metal alloy with or more of Ca, Mg, Sn, Ag, Zn, Bi, Al, Cd, Ga, In, zinc oxide, Na, lead oxide, Li, Lithium oxide, Lithium peroxide, lithium titanium oxide, oxygen active material cathode, water active material cathode, $Na_{2/3}[Fe_{1/2}Mn_{1/2}]O_2$, copper hexacyanoferrate, polypyrrole, activated carbon, grapheme, graphite, nanocarbon, antimony, a tin and antimony alloy, 5% vanadium-doped lithium iron phosphate, lithium iron fluorophosphates, manganese spinel, lithium nickel manganese cobalt, purpurin, lithium purpurin, lithium vanadium oxide, lithium titanate, cobalt oxide, iron phosphate, titanium dioxide, silicon, $SO_2$, Lithium-thionyl chloride, $MnO_2$, $CF_x$, CuO, $V_6O_{13}$, $V_2O_5$, $FeS_2$, $CuCl_2$, $I_2$, HgO, Cadmium, bromine, hydrogen based electrode, oxygen based electrode, bromine, copper antinomide; or any combination of these.

Optionally, the positive electrode comprises an active positive electrode material; and wherein the first electronically and ionically conductive layer is provided in electrical contact with the active positive electrode material. Optionally, the positive electrode further comprises a current collector in electrical contact with the active positive electrode material. Optionally, the negative electrode comprises an active negative electrode material; and wherein the first electronically and ionically conductive layer is provided in electrical contact with the active negative electrode material. Optionally, the negative electrode further comprises a current collector in electrical contact with the active negative electrode material.

Optionally, an electronically and ionically conductive layer comprises an external current collector pole, for example for use in reduction and/or oxidation. Optionally the first electronically and ionically conductive layer reduces one of the positive electrode and the negative electrode. Optionally, the external current collector pole oxidizes one of the positive electrode and the negative electrode, such as occurs in oxygen evolution in a metal-air battery.

In various embodiments, wherein the electrochemical cell comprises a secondary battery, a primary battery, a flow battery, a fuel cell or a semi-solid battery or or an electrochemical capacitor or a lead acid battery. Optionally, the electrochemical cell comprises a lithium ion battery, a lithium metal battery, a zinc battery, a lithium-air battery, a zinc-air battery, an aluminum-air battery, an iron-air battery, a lithium-water battery, a silicon based battery, a sodium battery, a magnesium battery, a sodium ion battery, a magnesium ion battery, an alkaline battery or a lead acid battery or a redox flow battery or a fuel cell or an electrochemical capacitor. Optionally, the electrochemical cell comprises a lithium battery comprising one or more of a silicon based anode, a lithium anode, a metal oxide electrode, a sulfur based cathode, a carbon-based oxygen cathode and a carbon based water cathode.

In another aspect, provided are electrochemical cells comprising: a positive electrode; a negative electrode; an ionically conductive and electronically insulating separator positioned between the positive electrode and the negative electrode, wherein the separator comprises: a first high mechanical strength layer having a plurality of apertures extending entirely through the first high mechanical strength layer and provided in a first pattern; and a first ionically conductive and electronically insulating material provided in at least a portion of the plurality of apertures of the first high mechanical strength layer; a first electrolyte positioned between the positive electrode and the separator; and a second electrolyte positioned between the negative electrode and the separator; wherein the first and second electrolytes are capable of conducting charge carriers.

Optionally, the first ionically conductive and electronically insulating material comprises a solid electrolyte, a gel electrolyte, a polymer electrolyte, Nafion, $ZrO_2$, LISICON, NASICON, PEO, $Li_{10}GeP_2S_{12}$, LIPON, PVDF, $Li_3N$, $Li_3P$, LiI, LiBr, LiCl, LiF, lithium imide, KOH, NaOH, oxide perovskite, $La_{0.5}$, $Li_{0.5}TiO_3$, thio-LISICON, $Li_{3.25}Ge_{0.25}P_{0.75}S_4$, glass ceramics, $Li_7P_3S_{11}$, glassy materials, $Li_2S$—$SiS_2$—$Li_3PO_4$, lithium nitride, polyethylene oxide, Doped $Li_3N$, $Li_2S$—$SiS_2$—$Li_3PO_4$, LIPON, $Li_{14}Zn(GeO_4)_4$, Li-beta-alumina, $Li_{3.6}Si_{0.6}P_{0.4}O_4$, $Li_2S$—$P_2S_5$, $PEO-LiClO_4$, $LiN(CF_3SO_2)_2/(CH_2CH_2O)_8$, NaPON, $SiO_2$, alumina, silica glass, ceramics, glass-ceramics, water-stable polymers, glassy metal ion conductors, amorphous metal ion conductors, ceramic active metal ion conductors, glass-ceramic active metal ion conductors, an ion conducting ceramic, an ion conducting solid solution, an ion conducting glass, a solid lithium ion conductor or any combination of these.

Optionally, the first ionically conductive and electronically insulating material comprises 10% or more, 20% or more, 30% or more, 40% or more, 50% or more, 60% or more, 70% or more or 80% or more by volume of the separator. Optionally, the first ionically conductive and electronically insulating material comprises 10% or more, 20% or more, 30% or more, 40% or more, 50% or more, 60% or more, 70% or more or 80% or more of a surface area of the separator.

Optionally, the first ionically conductive and electronically insulating material has an average thickness selected from the range 0.01 μm to 2000 μm. Optionally, the first ionically conductive and electronically insulating material has an average thickness selected from the range 0.005 mm to 0.05 mm.

In embodiments, the first ionically conductive and electronically insulating material has an average porosity less than 1% or is non-porous. Optionally, the first ionically conductive and electronically insulating material has an average porosity selected from the range of 0% to 5%. Preferably, first ionically conductive and electronically insulating material is substantially free of pinholes, cracks, holes or any combination of these. Preferably, the first ionically conductive and electronically insulating material is substantially free of defects. Optionally, the first ionically conductive and electronically insulating material is doped.

Optionally, the first ionically conductive and electronically insulating material has an ionic conductivity greater than or equal to $10^{-5}$ S/cm, greater than or equal to $10^{-4}$ S/cm, greater than or equal to $10^{-4}$ S/cm, greater than or equal to $10^{-3}$ S/cm, greater than or equal to $10^{-2}$ S/cm, greater than or equal to $10^{-1}$ S/cm, greater than or equal to 10 S/cm, selected from the range of $10^{-7}$ S/cm to 100 S/cm, selected from the range of $10^{-5}$ S/cm to 10 S/cm, selected from the range of $10^{-3}$ S/cm to 1 S/cm. Optionally, the first ionically conductive and electronically insulating material has an ionic conductivity selected from the range of $10^{-7}$ S/cm to 100 S/cm at an operating temperature of the cell.

Optionally, the first ionically conductive and electronically insulating material is provided into the plurality of apertures using a method selected from the group consisting of wet processing, dry processing, mechanical pressing, thermal deposition, coating and any combination of these.

Optionally, the first ionically conductive and electronically insulating material is provided into the plurality of apertures by pressing the first high mechanical strength layer into the first ionically conductive and electronically insulating material, thereby providing the first ionically conductive and electronically insulating material in at least a portion of the plurality of apertures of the first high mechanical strength layer. Optionally, pressing the first high mechanical strength layer into the first ionically conductive and electronically insulating material occurs during formation of the first ionically conductive and electronically insulating material. Optionally, pressing the first high mechanical strength layer into the first ionically conductive and electronically insulating material occurs at a temperature of 400° C. or greater or 500° C. or greater.

Optionally, the first high mechanical strength layer comprises a mesh or a foam. Optionally, the mesh or the foam comprises a metal, Ni, stainless steel, tin, Al, Cu, an alloy, a glass, a polymer, Kapton, PE, PP, PET, PTFE, PVDF, $SiO_2$, a ceramic, aluminum oxide, carbon, graphite, nanocarbon or any combination of these.

Optionally, the first ionically conductive and electronically insulating material is provided in substantially all of the plurality of apertures of the first high mechanical strength layer. Optionally, the first ionically conductive and electronically insulating material fills all of the plurality of apertures of the first high mechanical strength layer.

Optionally, the first high mechanical strength layer comprises an electronically insulating material. Optionally, the first high mechanical strength layer comprises Kapton, polyethylene, polypropylene, polyethylene terephthalate, poly(methyl methacrylate), a metal coated with a nonconductive material, an alloy coated with a nonconductive material, a polymer, a glass, an aluminum oxide, a silicon oxide, a titanium oxide and any combination of these. Optionally, the first high mechanical strength layer comprises one or more materials selected from the group consisting of Polyacrylic acid (PAA), Cross-linked polyethylene (PEX, XLPE), Polyethylene (PE), Polyethylene terephthalate (PET, PETE), Polyphenyl ether (PPE), Polyvinyl chloride (PVC), Polyvinylidene chloride (PVDC), Polylactic acid (PLA), Polypropylene (PP), Polybutylene (PB), Polybutylene terephthalate (PBT), Polyamide (PA), Polyimide (PI), Polycarbonate (PC), Polytetrafluoroethylene (PTFE), Polystyrene (PS), Polyurethane (PU), Polyester (PE), Acrylonitrile butadiene styrene (ABS), Poly(methyl methacrylate) (PMMA), Polyoxymethylene (POM), Polysulfone (PES), Styrene-acrylonitrile (SAN), Ethylene vinyl acetate (EVA), Styrene maleic anhydride (SMA), PVDF, PEO, LIPON, LISICON, tetramethylammonium hydroxide pentahydrate, $(CH_3)_4NOH.5H_2O$, poly(ethylene oxide) (PEO), copolymer of epichlorohydrin and ethylene oxide P(ECH-co-EO) and poly(vinylalcohol), PEO-PVA-glassfibre polymer electrolyte, zinc sulfide, silicon dioxide, PVA and PSA, PVA/V6/PSS; PVAN6/(PSS+PAA); V6/PVA/(PSS+PAA); PVMPSS+PAA(35%))/(PSS+PAA(35%)); (PSS+PAA (35%))/PVA/(PSS+PAA(35%)); or (PSS+PAA (35%))/(PVA (10%)+PSS (20% vs. PVA))/(PSS+PAA (35%)) polyethylene glycol, polypropylene glycol, PEDOT:PSS, $SiO_2$, Lithium nitride, NaPON, PVC, glass fiber mat, polybutylene glycol, alkyl-polyethylene glycol, alkyl-polypropylene glycol, alkyl-polybutylene glycol, a copolymer thereof, a PEO material, a PVA material and any combination thereof.

Optionally, the first pattern of apertures provides a first porosity of the first high mechanical strength layer greater than or equal to 30%, greater than or equal to 50%, greater than or equal to 70%, selected from the range of 30% to 90%, selected from the range of 30% to 70% or selected from the range of 40% to 60%. Optionally, the first high mechanical strength layer has an average thickness selected from the range 0.01 µm to 2000 µm. Optionally, the first high mechanical strength layer has an average thickness selected from the range 0.005 mm to 0.05 mm.

Optionally, an electrochemical cell of this aspect further comprises a first electronically and ionically conductive layer positioned between the positive electrode and the separator and in electrical contact with the positive electrode or positioned between the negative electrode and the separator and in electrical contact with the negative electrode. Optionally, an electrochemical cell of this aspect further comprises a second electronically and ionically conductive layer positioned between the negative electrode and the separator and in electrical contact with the negative electrode or positioned between the positive electrode and the separator and in electrical contact with the positive electrode.

Optionally, the first electronically and ionically conductive layer is a component of the separator. Optionally, the first electronically and ionically conductive layer is provided in physical contact and/or electronic contact with the separator. Optionally, the first electronically and ionically conductive layer comprises a coating on the separator. Optionally, the first electronically and ionically conductive layer is in physical contact and/or electronic contact with the positive electrode or the negative electrode. Optionally, an electronically and ionically conductive layer comprises an external current collector pole. Optionally, the first electronically and ionically conductive layer comprises a coating on the positive electrode or the negative electrode. Optionally, an electronically and ionically conductive layer reduces one of the positive electrode and the negative electrode. Optionally, an external current collector pole oxidizes one of the positive electrode and the negative electrode.

Optionally, the positive electrode or negative electrode comprises an intercalation host material. Optionally, the positive electrode or negative electrode comprises a material that undergoes a change in shape during charging or discharging of the electrochemical cell. Optionally, the positive electrode comprises an active positive electrode material and a current collector in electrical contact with the active positive electrode material. Optionally, the negative electrode comprises an active negative electrode material and a current collector in electrical contact with the active negative electrode material.

Optionally, in an electrochemical cell of this aspect, the separator further comprises a second high mechanical strength layer having a plurality of apertures extending entirely through the second high mechanical strength layer and provided in a second pattern, the second pattern having an off-set alignment relative to the first pattern such that an overlap of the apertures of the first high mechanical strength layer and the apertures of the second high mechanical strength layer along axes extending perpendicularly from the first high mechanical strength layer through the second high mechanical strength layer is less than or equal to 20%; and wherein the first high mechanical strength layer and the second high mechanical strength layer are positioned such that ions of an electrolyte provided in contact with the first high mechanical strength layer and the second high mechanical strength layer are able to be transported through the first high mechanical strength layer and the second high mechanical strength layer. Optionally, in an electrochemical cell of this aspect, the separator further comprises a second ionically conductive and electronically insulating material provided in at least a portion of the plurality of apertures of the second high mechanical strength layer. Optionally, the first pattern is substantially complementary to the second pattern. Optionally, the first high mechanical strength layer and the second high mechanical strength layer are not in complete physical contact. Optionally, at least portions of the first high mechanical strength layer and the second high mechanical strength layer are separated by a distance selected from the range of 20 nm to 2 mm. Optionally, the second high mechanical strength layer is provided between the first high mechanical strength layer and the negative electrode or the positive electrode.

Optionally, in an electrochemical cell of this aspect, the separator further comprises a third high mechanical strength layer having a plurality of apertures extending entirely through the third high mechanical strength layer and provided in a third pattern, the third pattern having an off-set alignment relative to the first pattern or the second pattern such that an overlap of the apertures of the third high mechanical strength layer and the apertures of the first high mechanical strength layer or the apertures of the second high mechanical strength layer along axes extending perpendicularly from the third high mechanical strength layer through first high mechanical strength layer or the second high mechanical strength layer is less than or equal to 20%; and wherein the first high mechanical strength layer, the second high mechanical strength layer and the third high mechanical strength layer are positioned such that ions of an electrolyte provided in contact with the first high mechanical strength layer, the second high mechanical strength layer and the third high mechanical strength layer are able to be transported through the first high mechanical strength layer, the second high mechanical strength layer and the third high mechanical strength layer. Optionally, in an electrochemical cell of this aspect, the separator further comprises a third ionically conductive and electronically insulating material provided in at least a portion of the plurality of apertures of the third high mechanical strength layer. Optionally, the third pattern is substantially complementary to one or more of the first pattern and the second pattern.

Optionally, in an electrochemical cell of this aspect, the separator further comprises a fourth high mechanical strength layer having a plurality of apertures extending entirely through the fourth high mechanical strength layer and provided in a fourth pattern, the fourth pattern having an off-set alignment relative to the first pattern, the second pattern or the third pattern such that an overlap of the apertures of the fourth high mechanical strength layer and the apertures of the first high mechanical strength layer, the apertures of the second high mechanical strength layer or the apertures of the third high mechanical strength layer along axes extending perpendicularly from fourth third high mechanical strength layer through first high mechanical strength layer, the second high mechanical strength layer or the third high mechanical strength layer is less than or equal to 20%; and wherein the first high mechanical strength layer, the second high mechanical strength layer, the third high mechanical strength layer and the fourth high mechanical strength layer are positioned such that ions of an electrolyte provided in contact with the first high mechanical strength layer, the second high mechanical strength layer, the third high mechanical strength layer and the fourth high mechanical strength layer are able to be transported through the first high mechanical strength layer, the second high mechanical strength layer, the third high mechanical strength layer and the fourth high mechanical strength layer. Optionally, the separator further comprises a fourth ionically conductive and electronically insulating material provided in at least a portion of the plurality of apertures of the third high mechanical strength layer. Optionally, the fourth pattern is substantially complementary to one or more of the first pattern, the second pattern and the third pattern.

Optionally, the plurality of apertures of at least two high mechanical strength layers are filled with one or more solid electrolytes. Optionally, the plurality of apertures of two outer of the high mechanical strength layers are filled with one or more solid electrolytes, such as an outer high mechanical strength layer positioned adjacent to the positive electrode or an outer high mechanical strength layer positioned adjacent to the negative electrode or both of these. Optionally, at least one high mechanical strength layer is electronically conductive. Optionally, at least one high mechanical strength layer comprises a material having a thermal conductivity greater than or equal to 5 $W \cdot m^{-1} \cdot K^{-1}$, greater than or equal to 10 $W \cdot m^{-1} \cdot K^{-1}$, greater than or equal to 20 $W \cdot m^{-1} \cdot K^{-1}$, greater than or equal to 50 $W \cdot m^{-1} \cdot K^{-1}$, greater than or equal to 100 $W \cdot m^{-1} \cdot K^{-1}$ or greater than or equal to 200 $W \cdot m^{-1} \cdot K^{-1}$. Optionally, at least one high mechanical strength layer, such as an outer high mechanical strength layer positioned adjacent to the positive electrode or an outer high mechanical strength layer positioned adjacent to the negative electrode or both, comprises an external current collector pole, useful for reducing one of the positive electrode and the negative electrode or oxidizing one of the positive electrode and the negative electrode.

In various embodiments, the electrochemical cell comprises a secondary battery, a primary battery, a flow battery, an electrochemical capacitor, a semi-solid battery or a fuel cell. Optionally, the electrochemical cell comprises a lithium ion battery, a lithium metal battery, a zinc battery, a lithium-air battery, a zinc-air battery, an aluminum air battery, an iron-air battery, a lithium-water battery, a silicon based battery, an alkaline battery or a lead acid battery. Optionally, the electrochemical cell comprises a secondary lithium battery comprising one or more of a silicon anode, a lithium anode, a metal oxide electrode, a carbon-based oxygen cathode, a carbon based water cathode, a water cathode and an air cathode.

In another aspect, provided are methods of making a membrane for an electrochemical cell. In an embodiment of this aspect, the method comprises the steps of: providing a first high mechanical strength layer having a plurality of apertures extending entirely through the first high mechanical strength layer and provided in a first pattern; and providing a first ionically conductive and electronically insulating material into all or a portion of the plurality of apertures of the first high mechanical strength layer.

Optionally, the first ionically conductive and electronically insulating material is provided into the plurality of apertures using a method selected from the group consisting of wet processing, dry processing, mechanical pressing, thermal deposition and any combination of these. Optionally, the first ionically conductive and electronically insulating material is provided into the plurality of apertures by pressing the first high mechanical strength layer into the first ionically conductive and electronically insulating material, thereby providing the first ionically conductive and electronically insulating material in at least a portion of the plurality of apertures of the first high mechanical strength layer. Optionally, a method of this aspect further comprises a step of cooling the first high mechanical strength layer and the first ionically conductive and electronically insulating material after pressing. In embodiments, such a cooling step heals one or more fractures in the first ionically conductive and electronically insulating material that are formed during a pressing step. Optionally, pressing the first high mechanical strength layer into the first ionically conductive and electronically insulating material occurs during formation of the first ionically conductive and electronically insulating material. Optionally, wherein pressing the first high mechanical strength layer into the first ionically conductive and electronically insulating material occurs at a temperature of 500° C. or greater.

Optionally, the first high mechanical strength layer comprises a mesh or a foam. Optionally, the mesh or the foam comprises a metal, Ni, stainless steel, a glass, a ceramic, aluminum oxide. Optionally, an in-plane pressure on the first ionically conductive and electronically insulating material from the first high mechanical strength layer facilitates solid diffusions of ions through the first ionically conductive and electronically insulating material or helps with the uniform ion deposition on the electrode. Optionally, an in-plane pressure on the first ionically conductive and electronically insulating material from the first high mechanical strength layer results in an increased ionic conductivity of the first ionically conductive and electronically insulating material when compared to an ionic conductivity of the first ionically conductive and electronically insulating material in the absence of the in-plane pressure. Such an increase in ionic conductivity optionally results from the Poisson's ratio effect where in-plane pressure causes out-of-plane tension, thereby facilitating the passage or solid diffusion of ions through the ionically conductive and electronically insulating material.

Optionally, the first ionically conductive and electronically insulating material comprises a solid electrolyte, a gel electrolyte, a polymer electrolyte, LISICON, NASICON, PEO, $Li_{10}GeP_2S_{12}$, LIPON, PVDF, $Li_3N$, $Li_3P$, LiI, LiBr, LiCl, LiF, oxide perovskite, $La_{0.5}Li_{0.5}TiO_3$, thio-LISICON, $Li_{3.25}Ge_{0.25}P_{0.75}S_4$, glass ceramics, $Li_7P_3S_{11}$, glassy materials, $Li_2S$—$SiS_2$—$Li_3PO_4$, lithium nitride, polyethylene oxide, Doped $Li_3N$, $Li_2S$—$SiS_2$—$Li_3PO_4$, LIPON, $Li_{14}Zn(GeO_4)_4$, Li-beta-alumina, $Li_{3.6}Si_{0.6}P_{0.4}O_4$, $Li_2S$—$P_2S_5$, PEO-$LiClO_4$, $LiN(CF_3SO_2)_2/(CH_2CH_2O)_8$, NaPON, $ZrO_2$, Nafion, PEDOT:PSS, $SiO_2$, PVC, glass fiber mat, alumina, silica glass, ceramics, glass-ceramics, water-stable polymers, glassy metal ion conductors, amorphous metal ion conductors, ceramic active metal ion conductors, glass-ceramic active metal ion conductors, an ion conducting ceramic, an ion conducting solid solution, an ion conducting glass, a solid lithium ion conductor or any combination of these Optionally, the first ionically conductive and electronically insulating material comprises 20% or more, 30% or more, 40% or more, 50% or more, 60% or more, 70% or more or 80% or more by volume of the separator. Optionally, the first ionically conductive and electronically insulating material has an average thickness selected from the range 0.01 μm to 2000 μm.

Optionally, the first ionically conductive and electronically insulating material has an average porosity less than 1%. Preferably, the first ionically conductive and electronically insulating material is non-porous. Optionally, the first ionically conductive and electronically insulating material has an average porosity selected from the range of 0% to 5%. Optionally, the first ionically conductive and electronically insulating material is substantially free of pinholes, cracks, holes or any combination of these. Optionally, the first ionically conductive and electronically insulating material is substantially free of defects. Optionally, the first ionically conductive and electronically insulating material is doped.

Optionally, the first ionically conductive and electronically insulating material has an ionic conductivity greater than or equal to $10^{-5}$ S/cm. Optionally, the first ionically conductive and electronically insulating material has an ionic conductivity selected from the range of $10^{-7}$ S/cm to 100 S/cm.

Optionally, the first ionically conductive and electronically insulating material is provided in substantially all of the plurality of apertures of the first high mechanical strength layer. Optionally, the first ionically conductive and electronically insulating material fills all of the plurality of apertures of the first high mechanical strength layer.

Optionally, an average thickness of the high mechanical strength layer is selected from the range of 10 nm to 2000 μm. Optionally, an average thickness of the high mechanical strength layer is selected from the range of 0.005 mm to 0.05 mm. Optionally, the first pattern of apertures provides a first porosity of the first high mechanical strength layer greater than or equal to 30%. Optionally, the first pattern of apertures provides a porosity of the first high mechanical strength layer selected from the range of 30% to 70%.

Optionally, the first high mechanical strength layer comprises an electrically insulating material, Kapton, polyethylene, polypropylene, polyethylene terephthalate, poly(methyl methacrylate), a metal coated with a nonconductive material, an alloy coated with a nonconductive material, a polymer, a glass, a ceramic, an aluminum oxide, a silicon oxide, a titanium oxide and any combination of these. Optionally, the first high mechanical strength layer comprises one or more materials selected from the group consisting of Polyacrylic acid (PAA), Cross-linked polyethylene (PEX, XLPE), Polyethylene (PE), Polyethylene terephthalate (PET, PETE), Polyphenyl ether (PPE), Polyvinyl chloride (PVC), Polyvinylidene chloride (PVDC), Polylactic acid (PLA), Polypropylene (PP), Polybutylene (PB), Polybutylene terephthalate (PBT), Polyamide (PA), Polyimide (PI), Polycarbonate (PC), Polytetrafluoroethylene (PTFE), Polystyrene (PS), Polyurethane (PU), Polyester (PE), Acrylonitrile butadiene styrene (ABS), Poly(methyl methacrylate) (PMMA), Polyoxymethylene (POM), Polysulfone (PES), Styrene-acrylonitrile (SAN), Ethylene vinyl acetate (EVA), Styrene maleic anhydride (SMA), PVDF, PEO, LIPON, LISICON, tetramethylammonium hydroxide pentahydrate, $(CH_3)_4NOH.5H_2O$, poly(ethylene oxide) (PEO), copolymer of epichlorohydrin and ethylene oxide P(ECH-co-EO) and poly(vinylalcohol), PEO-PVA-glassfibre polymer electrolyte, zinc sulfide, silicon dioxide, PVA and PSA, PVA/V6/PSS; PVAN6/(PSS+PAA); V6/PVA/(PSS+PAA); PVMPSS+PAA(35%))/(PSS+PAA(35%)); (PSS+PAA (35%))/PVA/(PSS+PAA(35%)); or (PSS+PAA (35%))/(PVA (10%)+PSS (20% vs. PVA))/(PSS+PAA (35%)) polyethylene glycol, polypropylene glycol, polybutylene glycol, NaPON, $ZrO_2$, Nafion, PEDOT:PSS, $SiO_2$, PVC, glass fiber mat, alkyl-polyethylene glycol, alkyl-polypropylene glycol, alkyl-polybutylene glycol, a copolymer thereof, a PEO material, a PVA material, Ni, Cu, Al, stainless steel, aluminum oxide and any combination thereof.

Optionally, the first high mechanical strength layer comprises an electrically conducting material, a metal, a metal alloy, a metal mesh, a semiconductor, a metal foam, polyethylene, polypropylene, polyethylene terephthalate, poly (methyl methacrylate) and any combination of these.

In embodiments, the first high mechanical strength layer comprises an electrically insulating material and the membrane comprises a separator of an electrochemical cell. In embodiments, the first high mechanical strength layer comprises an electronically conductive material and the membrane comprises an electronically and ionically conductive layer of an electrochemical cell. Optionally, the membrane comprises one or more electronically and ionically conductive layers and one or more electronically insulating and ionically conductive layers. Optionally, when such a membrane is positioned between a positive electrode and a negative electrode of an electrochemical cell, the membrane provides electronic insulation between the positive electrode and the negative electrode.

Optionally, a method of this aspect further comprises a step of providing an electronically insulating layer adjacent to the first high mechanical strength layer with the first ionically conductive and electronically insulating material in all or a portion of the plurality of apertures of the first high mechanical strength layer.

Optionally, a method of this aspect further comprises a step of providing one or more current collectors adjacent to the first high mechanical strength layer with the first ionically conductive and electronically insulating material in all or a portion of the plurality of apertures of the first high mechanical strength layer. Optionally, a first current collector is provided in electronic communication with an active positive electrode material of an electrochemical cell and a second current collector is provided in electronic communication with an active negative electrode material of the electrochemical cell.

In another aspect, provided are electrochemical cells comprising: a positive electrode; a negative electrode; an ionically conductive and electronically insulating separator positioned between the positive electrode and the negative electrode; one or more thermally and ionically conductive layers positioned between the positive electrode and the separator or positioned between the negative electrode and the separator; and one or more electrolytes positioned between the positive electrode and the negative electrode; wherein the one or more electrolytes are capable of conducting charge carriers.

Optionally, the electrochemical cell comprises a first thermally and ionically conductive layer positioned between the positive electrode and the separator and a second thermally and ionically conductive layer positioned between the negative electrode and the separator.

Optionally, each of the one or more thermally and ionically conductive layers is provided in thermal communication with the positive electrode or the negative electrode. Optionally, the one or more thermally and ionically conductive layers provides for a uniform temperature distribution within the electrochemical cell, thereby increasing a performance and a life cycle of the electrochemical cell. Optionally, the one or more thermally and ionically conductive layers assist to provide for a uniform temperature distribution within the electrochemical cell, thereby increasing a performance and a life cycle of the electrochemical cell.

Optionally, each of the one or more thermally and ionically conductive layers independently has a thickness less than or equal to 0.01 mm or selected from the range of 10 nm to 0.01 mm. Optionally, each of the one or more thermally and ionically conductive layers independently comprises a porous material, a perforated layer, a mesh or a foam. Optionally, each of the one or more thermally and ionically conductive layers independently has a porosity greater than or equal to 50%, greater than or equal to 75% or greater than or equal to 90%.

Optionally, each of the one or more thermally and ionically conductive layers independently comprises a metal, an alloy, a ceramic, a polymer, a metal coated with an electronically insulating material or an alloy coated with an electronically insulating material. Optionally, each of the one or more thermally and ionically conductive layers independently comprises a metal, an alloy, a thermal conductive polymer, a thermal conductive ceramic, a polymer having thermally conductive fibers, a polymer having $Al_2O_3$ fibers, Al, Ni, Sn, Steel, stainless steel, copper, Si, $Li_3N$, aluminum oxide, lithium oxide, lithium peroxide, polyethylene, polypropylene, polyethylene terephthalate, PVDF, Kapton, PTFE, PMMA, NaPON, $ZrO_2$, Nafion, PEDOT:PSS, $SiO_2$, PVC, glass fiber mat, LIPON or any combination thereof.

Optionally, each of the one or more thermally and ionically conductive layers independently comprises a mesh. Optionally, each of the one or more thermally and ionically conductive layers independently comprises a coating on one or more surfaces of the positive electrode or the negative electrode.

Optionally, each of the one or more thermally and ionically conductive layers independently comprises a coating on one or more sides of the separator or is positioned adjacent to the separator. Optionally, each of the one or more thermally and ionically conductive layers independently comprises an interior layer of the separator.

Optionally, for any electrochemical cell described herein, any faces of a separator, a negative electrode or a positive electrode are independently and optionally coated with a hydrophilic material or a hydrophobic material or an anion exchange material or a cation exchange material. Optionally, any layers of a separator, a positive electrode or a negative electrode independently comprise a hydrophilic material or a hydrophobic material or an anion exchange material or a cation exchange material.

Optionally, any layers of a separator, a positive electrode or a negative electrode independently comprise a shape memory material. Optionally, a shape memory material comprises a shape memory alloy, nitinol, a shape memory polymers or any combination thereof. Optionally, a shape memory material layer is pre stressed before operation or cycling of the electrochemical cell.

In another aspect, provided are electrochemical cells comprising: a positive electrode; a negative electrode; a solid electrolyte comprising: a first ionically conductive and electronically insulating material; and a group of mechanically tough fibers positioned inside a first ionically conductive and electronically insulating material; wherein the electrolyte is capable of conducting charge carriers. Optionally, the fibers increase a toughness of the solid electrolyte, prevent pinhole cracks during fabrication of the solid electrolyte and prevent cracks in the solid electrolyte due to cycling.

Optionally, the fibers are mechanically tough. Optionally, the fibers comprise 20% or more by volume of the first ionically conductive and electronically insulating material or occupy 20% or more of a surface area of the separator. Optionally, the fibers have an average size selected from the range 0.01 µm to 2000 µm. Optionally, the first ionically conductive and electronically insulating material has an average thickness selected from the range 0.01 µm to 2000 µm. Optionally, fibers are ionically insulating. Optionally, fibers are ionically conductive. Optionally, the fibers are electronically conductive. Optionally, the fibers are electronically insulating.

For any of the electrochemical cells described herein, a high mechanical strength layer optionally comprises a shape memory material selected from the group consisting of shape memory alloys, shape memory polymers, nitonol and any combination of these. For any of the electrochemical cells described herein, a high mechanical strength layer is optionally electronically conductive. For any of the electrochemical cells described herein, a high mechanical strength layer is optionally electronically insulating. For any of the electrochemical cells described herein, a high mechanical strength layer is optionally mechanically tough. For any of the electrochemical cells described herein, a high mechanical strength layer optionally comprises a shape memory material or optionally comprises a shape memory alloy, a shape memory polymer, nitonol or any combination of these. For any of the electrochemical cells described herein, a high mechanical strength layer optionally has a periodic geometry or comprises a mesh. For any of the electrochemical cells described herein, a high mechanical strength layer optionally has a non-periodic geometry or an arbitrary cross section. For any of the electrochemical cells described herein, a high mechanical strength layer is optionally used to prevent creation of pinholes during the fabrication of the first ionically conductive and electronically insulating material. For any of the electrochemical cells described herein, a high mechanical strength layer is optionally used to prevent creation of pinholes during the fabrication of the first ionically conductive and electronically insulating material. For any of the electrochemical cells described herein, a high mechanical strength layer is optionally used to prevent creation of cracks due to diffusion of ions in the first ionically conductive and electronically insulating material. For any of the electrochemical cells described herein, a high mechanical strength layer is optionally partially bounded to an electrode and the first ionically conductive and electronically insulating material. Optionally, a first high mechanical strength layer positions an ionically conductive and electronically insulating material and an electrode in tight contact. Optionally, a high mechanical strength layer has a shape memory behavior or comprises a shape memory alloy, a shape memory polymer or nitonol. Optionally, first high mechanical strength layer is prestressed. For any of the electrochemical cells described herein, a high mechanical strength layer optionally has a 3-dimensional structure or comprises a 3-dimensional mesh. Optionally, high mechanical strength layer is prestressed. Optionally, a high mechanical strength layer is prestressed, thereby providing physical contact between one or more ionically conductive and electronically insulating materials and an electrode. Optionally, the fibers or the mesh of an electrochemical cell has a binding effect and binds a ionically conductive and electronically insulating material together. For any of the electrochemical cells described herein, a fiber or mesh optionally comprises a polymer or PVDF polymer or rubber.

Optionally, any separators and/or membranes described herein, for example single or multilayer separators comprising a high mechanical strength layer including a plurality of apertures, are useful for a variety of applications. In an embodiment, any separators and/or membranes described herein are used as separator of an electrochemical cell. In an embodiment, any separators and/or membranes described herein are used as a liquid filtration membrane. In an embodiment, any separators and/or membranes described herein are used as a gaseous filtration membrane. In an embodiment, any separators and/or membranes described herein are used as engineered electrodes in electrochemical cells. In an embodiment, any separators and/or membranes described herein are used as a filter used for industrial filtration. In an embodiment, any separators and/or membranes described herein are used as a bio-filtration membrane. In an embodiment, any separators and/or membranes described herein are used in as an industrial filtration membrane in the food industry. In an embodiment, any separators and/or membranes described herein are used in as an industrial filtration membrane in the pharmaceutical industry.

The disclosed separators and membranes are suitable for use and/or are optionally used in condensation and separation of substances by reverse osmosis, ultrafiltration, fine filtration, production of a highly purified water or chemicals of high degrees of purity used in semiconductor industries; collection of effluents from defatting process or electrodeposition process; treatment of waste liquids in various industrial processes such as paper-making process, oil-water separation process, oily emulsion separation process, etc.; separation and refining of fermented products; condensation, separation and refining in various food industries such as condensation of fruit and vegetable juices, processing of soybean, production of sugar, etc.; medical uses including artificial kidney, micro-filter for separation of blood components and bacterium, and separator or refiner for medical drugs; bio-technological devices including bio-reactors; and electrodes of a fuel battery.

In an embodiment, the invention provides any electrochemical cell as described herein, wherein the electrochemical cell comprises an electronically conductive layer that is not in electronic and/or physical contact with a cathode of the cell, for example, an electrochemical cell wherein the electronically conductive layer is in electronic and/or physical contact with an anode of the cell.

In an embodiment, the invention provides an electrochemical cell as described herein, wherein the electrochemical cell comprises an electronically conductive layer that is not in electronic and/or physical contact with an anode of the cell, for example, an electrochemical cell wherein the electronically conductive layer is in electronic and/or physical contact with a cathode of the cell.

In an embodiment, the invention provides an electrochemical cell as described herein, wherein the electrochemical cell comprises an electronically conductive layer in electronic and/or physical contact with an electrode that is not a fluid electrode, for example, an electrochemical cell wherein the electronically conductive layer is in electronic and/or physical contact with an electrode that is not an air electrode or an oxygen electrode.

Optionally, in any electrochemical cell described herein, the electrochemical cell does not include any electronically conductive layer, such as an electronically conductive layer of a separator, in electronic and/or physical contact with a cathode. Optionally, in any electrochemical cell described herein, the electrochemical cell does not include any electronically conductive layer, such as an electronically conductive layer of a separator, in electronic and/or physical contact with a positive electrode.

Optionally, in any electrochemical cell described herein, the electrochemical cell does not include any electronically conductive layer, such as an electronically conductive layer of a separator, in electronic and/or physical contact with an anode. Optionally, in any electrochemical cell described herein, the electrochemical cell does not include any electronically conductive layer, such as an electronically conductive layer of a separator, in electronic and/or physical contact with a negative electrode. Optionally, in any electrochemical cell described herein, a metal layer comprises a porous metal layer or a perforated metal layer.

Optionally, in any electrochemical cell described herein, the electrochemical cell does not include any electronically conductive layer, such as an electronically conductive layer of a separator, in electronic and/or physical contact with a fluid electrode. Optionally, in any electrochemical cell described herein, the electrochemical cell does not include any electronically conductive layer, such as an electronically conductive layer of a separator, in electronic and/or physical contact with an air or oxygen electrode.

Without wishing to be bound by any particular theory, there can be discussion herein of beliefs or understandings of underlying principles or mechanisms relating to the invention. It is recognized that regardless of the ultimate correctness of any explanation or hypothesis, an embodiment of the invention can nonetheless be operative and useful.

DETAILED DESCRIPTION

Figure 1:
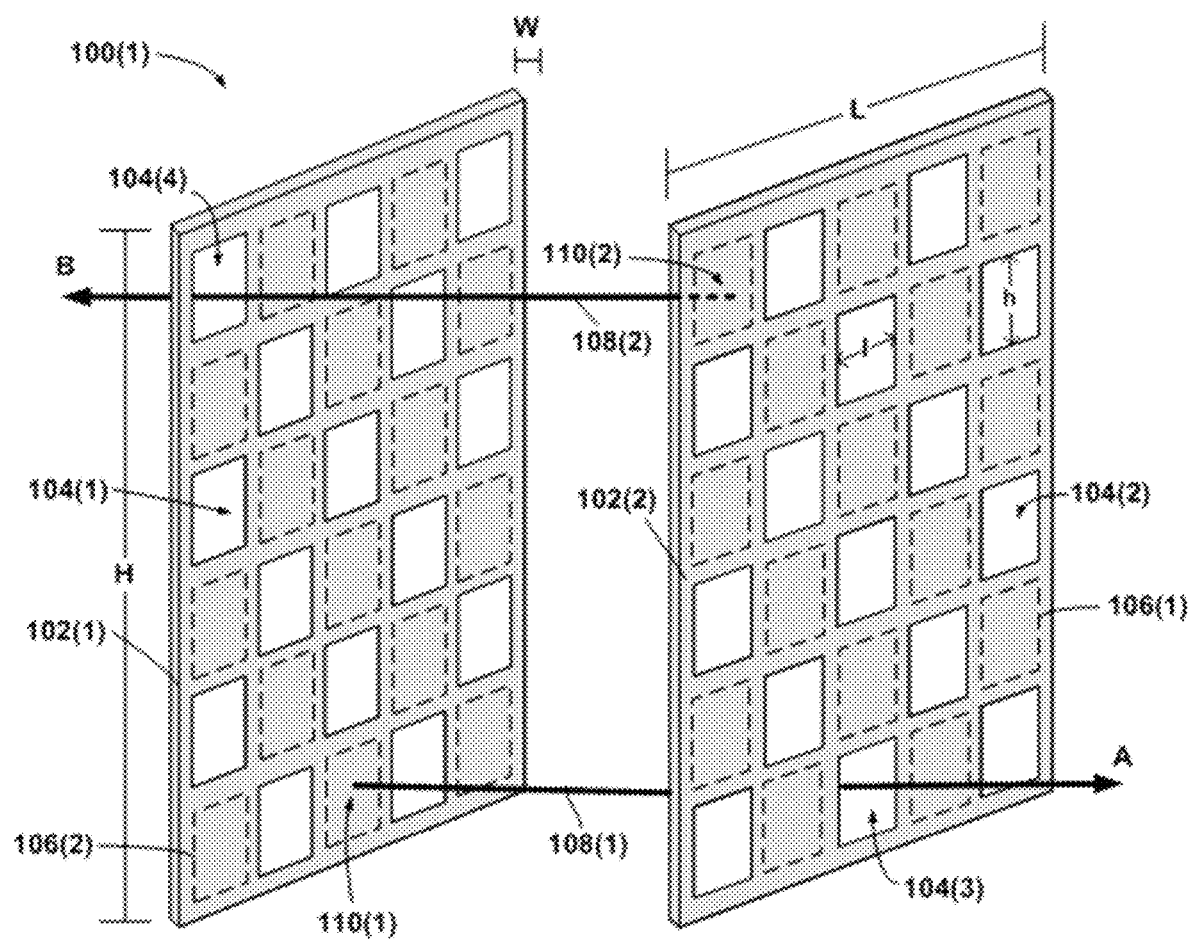
FIG. 1 provides a side perspective view of a multilayer separator system for an electrochemical system comprising parallel first and second high mechanical strength layers having complementary patterns of apertures, wherein the second pattern of apertures has an off-set alignment relative to the first pattern such that there is no overlap of the apertures of the first pattern and the apertures of the second pattern along axes extending perpendicularly from the first high mechanical strength layer to the second high mechanical strength layer.

In general the terms and phrases used herein have their art-recognized meaning, which can be found by reference to standard texts, journal references and contexts known to those skilled in the art. The following definitions are provided to clarify their specific use in the context of the invention.

Referring to the drawings, like numerals indicate like elements and the same number appearing in more than one drawing refers to the same element. In addition, hereinafter, the following definitions apply:

The term "electrochemical cell" refers to devices and/or device components that convert chemical energy into electrical energy or electrical energy into chemical energy. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries and electrolysis systems. In certain embodiments, the term electrochemical cell includes fuel cells, supercapacitors, capacitors, flow batteries, metal-air batteries and semi-solid batteries. General cell and/or battery construction is known in the art, see e.g., U.S. Pat. Nos. 6,489,055, 4,052,539, 6,306,540, Seel and Dahn J. Electrochem. Soc. 147(3) 892-898 (2000).

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours kg$^{-1}$.

The term "discharge rate" refers to the current at which an electrochemical cell is discharged. Discharge rate can be expressed in units of ampere. Alternatively, discharge rate can be normalized to the rated capacity of the electrochemical cell, and expressed as C/(X t), wherein C is the capacity of the electrochemical cell, X is a variable and t is a specified unit of time, as used herein, equal to 1 hour.

"Current density" refers to the current flowing per unit electrode area.

Electrode refers to an electrical conductor where ions and electrons are exchanged with electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive electrodes and negative electrodes of the present electrochemical cell may further comprise a conductive diluent, such as acetylene black, carbon black, powdered graphite, coke, carbon fiber, graphene, and metallic powder, and/or may further comprises a binder, such as a polymer binder. Useful binders for positive electrodes in some embodiments comprise a fluoropolymer such as polyvinylidene fluoride (PVDF). Positive and negative electrodes of the present invention may be provided in a range of useful configurations and form factors as known in the art of electrochemistry and battery science, including thin electrode designs, such as thin film electrode configurations. Electrodes are manufactured as disclosed herein and as known in the art, including as disclosed in, for example, U.S. Pat. Nos. 4,052,539, 6,306,540, and 6,852,446. For some embodiments, the electrode is typically fabricated by depositing a slurry of the electrode material, an electrically conductive inert material, the binder, and a liquid carrier on the electrode current collector, and then evaporating the carrier to leave a coherent mass in electrical contact with the current collector.

"Electrode potential" refers to a voltage, usually measured against a reference electrode, due to the presence within or in contact with the electrode of chemical species at different oxidation (valence) states.

"Electrolyte" refers to an ionic conductor which can be in the solid state, the liquid state (most common) or more rarely a gas (e.g., plasma).

"Standard electrode potential" (E°) refers to the electrode potential when concentrations of solutes are 1M, the gas pressures are 1 atm and the temperature is 25 degrees Celsius. As used herein standard electrode potentials are measured relative to a standard hydrogen electrode.

"Active material" refers to the material in an electrode that takes part in electrochemical reactions which store and/or deliver energy in an electrochemical cell.

"Cation" refers to a positively charged ion, and "anion" refers to a negatively charged ion.

"Electrical contact," "electrical communication", "electronic contact" and "electronic communication" refer to the arrangement of one or more objects such that an electric current efficiently flows from one object to another. For example, in some embodiments, two objects having an electrical resistance between them less than 100 are considered in electrical communication with one another. An electrical contact can also refer to a component of a device or object used for establishing electrical communication with external devices or circuits, for example an electrical interconnection. "Electrical communication" also refers to the ability of two or more materials and/or structures that are capable of transferring charge between them, such as in the form of the transfer of electrons. In some embodiments, components in electrical communication are in direct electrical communication wherein an electronic signal or charge carrier is directly transferred from one component to another. In some embodiments, components in electrical communication are in indirect electrical communication wherein an electronic signal or charge carrier is indirectly transferred from one component to another via one or more intermediate structures, such as circuit elements, separating the components.

"Thermal contact" and "thermal communication" are used synonymously and refer to an orientation or position of elements or materials, such as a current collector or heat transfer rod and a heat sink or a heat source, such that there is more efficient transfer of heat between the two elements than if they were thermally isolated or thermally insulated. Elements or materials may be considered in thermal communication or contact if heat is transported between them more quickly than if they were thermally isolated or thermally insulated. Two elements in thermal communication or contact may reach thermal equilibrium or thermal steady state and in some embodiments may be considered to be constantly at thermal equilibrium or thermal steady state with one another. In some embodiments, elements in thermal communication with one another are separated from each other by a thermally conductive material or intermediate thermally conductive material or device component. In some embodiments, elements in thermal communication with one another are separated by a distance of 1 μm or less. In some embodiments, elements in thermal communication with one another are provided in physical contact.

"High mechanical strength" refers to a property of components of separator systems of the invention, such as first, second, third and fourth high mechanical strength layers, having a mechanical strength sufficient to prevent physical contact of opposite electrodes, sufficient to prevent short circuiting due to external objects within the cell, such as metallic particles from fabrication, and sufficient to prevent short circuiting due to growth of dendrites between positive and negative electrodes of an electrochemical cell, for example, during charge and discharge cycles of a secondary electrochemical cell. In an embodiment, for example, a high mechanical strength layer has a mechanical strength sufficient to prevent piercing due to external objects in the cell, such as metallic particles from the fabrication, and shorts due to the growth of dendrites between electrodes. In an embodiment, for example, a high mechanical strength layer has a mechanical strength sufficient to prevent shorting between the positive electrode and the negative electrode of an electrochemical cell due to external objects in the cell such as metallic particles from the fabrication and shorts due to the growth of dendrites between electrodes. In an embodiment, for example, a high mechanical strength layer is characterized by a Young's modulus greater than or equal to 500 MPa, and optionally for some applications a Young's modulus greater than or equal to 1 GPa, and optionally for some applications a Young's modulus greater than or equal to 10 GPa, and optionally for some applications a Young's modulus greater than or equal to 100 GPa. In an embodiment, for example, a high mechanical strength layer is characterized by a yield strength greater than or equal to 5 MPa, and optionally for some applications a yield strength greater than or equal to 50 MPa, and optionally for some applications a yield strength greater than or equal to 100 MPa, and optionally for some applications a yield strength greater than or equal to 500 MPa. In an embodiment, for example, a high mechanical strength layer is characterized by a propagating tear strength greater than or equal to 0.005 N, and optionally for some applications a propagating tear strength greater than or equal to 0.05 N, a propagating tear strength greater than or equal to 0.5 N, a propagating tear strength greater than or equal to 1 N. In an embodiment, for example, a high mechanical strength layer is characterized by an initiating tear strength greater than or equal to 10 N, and optionally for some applications an initiating tear strength greater than or equal to 100 N. In an embodiment, for example, a high mechanical strength layer is characterized by a tensile strength greater than or equal to 50 MPa, and optionally for some applications a tensile strength greater than or equal to 100 MPa, and optionally for some applications a tensile strength greater than or equal to 500 MPa, and optionally for some applications a tensile strength greater than or equal to 1 GPa. In an embodiment, for example, a high mechanical strength layer is characterized by an impact strength greater than or equal to 10 N cm, and optionally for some applications to an impact strength greater than or equal to 50 N cm, and optionally for some applications to an impact strength greater than or equal to 100 N cm, and optionally for some applications to an impact strength greater than or equal to 500 N cm.

"Chemically resistant" refers to a property of components, such as layers, of separators and electrochemical systems of the invention wherein there is no significant chemical or electrochemical reactions with the cell active materials, such as electrodes and electrolytes. In certain embodiments, chemically resistant also refers to a property wherein the tensile retention and elongation retention is at least 90% in the working environment of an electrochemical system, such as an electrochemical cell.

"Thermally stable" refers a property of components, such as layers, of separators and electrochemical systems of the invention wherein there is no significant chemical or electrochemical reactions due to normal and operational thermal behavior of the cell. In certain embodiments, thermally stable also refers to materials wherein the melting point is more than 100 Celsius, and preferably for some embodiments more than 300 Celsius, and optionally the coefficient of thermal expansion is less than 50 ppm/Celsius. In an embodiment, thermally stable refers to a property of a component of the separator system such that it may perform in a rechargeable electrochemical cell without undergoing a change size or shape with the temperature that significantly degrades the performance of the electrochemical cell.

"Porosity" refers to the amount of a material or component, such as a high mechanical strength layer, that corresponds to pores, such as apertures, channels, voids, etc. Porosity may be expressed as the percentage of the volume of a material, structure or device component, such as a high mechanical strength layer, that corresponds to pores, such as apertures, channels, voids, etc., relative to the total volume occupied by the material, structure or device component.

Provided are separator systems for electrochemical systems providing electronic, mechanical and chemical properties useful for a range of electrochemical storage and conversion applications. Some embodiments, for example, provide structural, physical and electrostatic attributes useful for managing and controlling dendrite formation in lithium and zinc based batteries or flow batteries. Some of the disclosed separator systems include multilayer, porous geometries supporting excellent ion transport properties while at the same time providing a barrier effective to prevent dendrite initiated mechanical failure, shorting and/or thermal runaway. Some embodiments, for example, provide structural, physical and electrostatic attributes useful for improving the cycle life and rate capability of electrochemical cells such as silicon anode based batteries or air cathode based batteries or redox fellow batteries or semisolid batteries. Disclosed separator systems include multilayer, porous geometries supporting excellent ion transport properties while at the same time providing an auxiliary path effective to increase the electronic conductivity of the electrodes or improving the uniformity of the electric field. Some embodiments, for example, provide structural, physical and electrostatic attributes useful for improving the cycle life and rate capability of electrochemical cells in solid electrolyte based systems such as Li-air batteries or fuel cells or flow batteries or semisolid batteries. Disclosed separator systems include composite solid electrolyte/supporting mesh systems and solid electrolyte/supporting fibers systems providing the hardness and safety of solid electrolytes with the toughness and long life of the supporting mesh or fibers which is useful in fabrication and operation of thin solid electrolyte without fabrication pinholes and without operational created cracks that happen in conventional solid electrolytes. Separators and membranes introduced here are suitable for use in condensation and separation of substances by, for example, reverse osmosis, ultrafiltration, fine filtration, production of a highly purified water or chemicals of high degrees of purity used in semiconductor industries; collection of effluents from defatting process or electrodeposition process; treatment of waste liquids in various industrial processes such as paper-making process, oil-water separation process, oily emulsion separation process, and so forth; separation and refining of fermented products; condensation, separation and refining in various food industries such as condensation of fruit and vegetable juices, processing of soybean, production of sugar, and so forth; medical uses such as artificial kidney, micro-filter for separation of blood components and bacterium, and separator or refiner for medical drugs; bio-technological devices such as a bio-reactor; electrodes of a fuel battery FIG. 1 provides a side perspective view of a multilayer separator system 100(1) for an electrochemical system comprising parallel first and second high mechanical strength layers having complementary patterns of apertures, wherein the second pattern of apertures has an off-set alignment relative to the first pattern such that there is no overlap of the apertures of the first pattern and the apertures of the second pattern along axes extending perpendicularly from the first high mechanical strength layer to the second high mechanical strength layer. As shown in FIG. 1, separator system 100(1) comprises a first high mechanical strength layer 102(1) having a first pattern comprising a plurality of apertures, e.g. 104(1) and 104(4), and a second high mechanical strength layer 102(2) having a second pattern comprising a second plurality of apertures, e.g. 104(2) and 104(3). First and second layers are characterized by a planar geometry and lateral dimensions, such as height, H, length, L, and width or thickness, W. As shown in FIG. 1, apertures 104 extend entirely through the thickness of either first high mechanical strength layer 102(1) or second high mechanical strength layer 102(2). Each aperture 104 is also characterized by lateral dimensions, such as height, h, length, l, and width or thickness (not shown).

The superposition of the pattern of first high mechanical strength layer 102(1) onto the second high mechanical strength layer 102(2) is schematically presented as a plurality of off-set dashed areas 106(1) on second high mechanical strength layer 102(2), and the superposition of the pattern of second high mechanical strength layer 102(2) on first high mechanical strength layer 102(1) is schematically presented as a plurality of off-set dashed areas 106(2) on first high mechanical strength layer 102(1). In the embodiment shown in FIG. 1, the first and second patterns resemble checkerboard patterned, for example where the first pattern corresponds to the back squares and the second pattern corresponds to the red squares of a checker board. As will be apparent to one of skill in the art, however, other patterns, such as honeycomb patterns, close-packed circle patterns, brick patterns, triangular patterns and the like, are also possible, so long as the first and second patterns have off-set alignments relative to one another, for example, such that an overlap of apertures 104 along axes extending perpendicularly from first high mechanical strength layer 102(1) to second high mechanical strength layer 102(2) is less than or equal to 50%, 40%, 30%, 20%, 10%, 5%, 2% or 0%. In the embodiment shown in FIG. 1, there is no overlap of the apertures of the first pattern and the apertures of the second pattern along axes extending perpendicularly from the first high mechanical strength layer to the second high mechanical strength layer. The arrows 108(1) and 108(2) shown in FIG. 1 are provided so as to illustrate regions of the apertures that do not overlap along axes extending perpendicularly from first high mechanical strength layer 102(1) to second high mechanical strength layer 102(2). The off-set alignment of the first pattern of apertures of the first high mechanical strength layer and the second pattern of apertures of the second high mechanical strength layer prevents growth of dendrites through the combination of first and second high mechanical strength layers, for example, by mechanically blocking growing dendrites and/or requiring a pathway involving curved trajectories which are thermodynamically and/or kinetically unfavorable. For example, a dendrite may only pass through aperture 104(3) of second high mechanical strength layer 102(2), as shown by arrow A, because it is physically blocked by first high mechanical strength layer 102(1) at point 110(1). Similarly, a dendrite may only pass through aperture 104(4) of first high mechanical strength layer 102(1), as shown by arrow B, because it is physically blocked by second high mechanical strength layer 102(2) at point 110(2).

Figure 2:
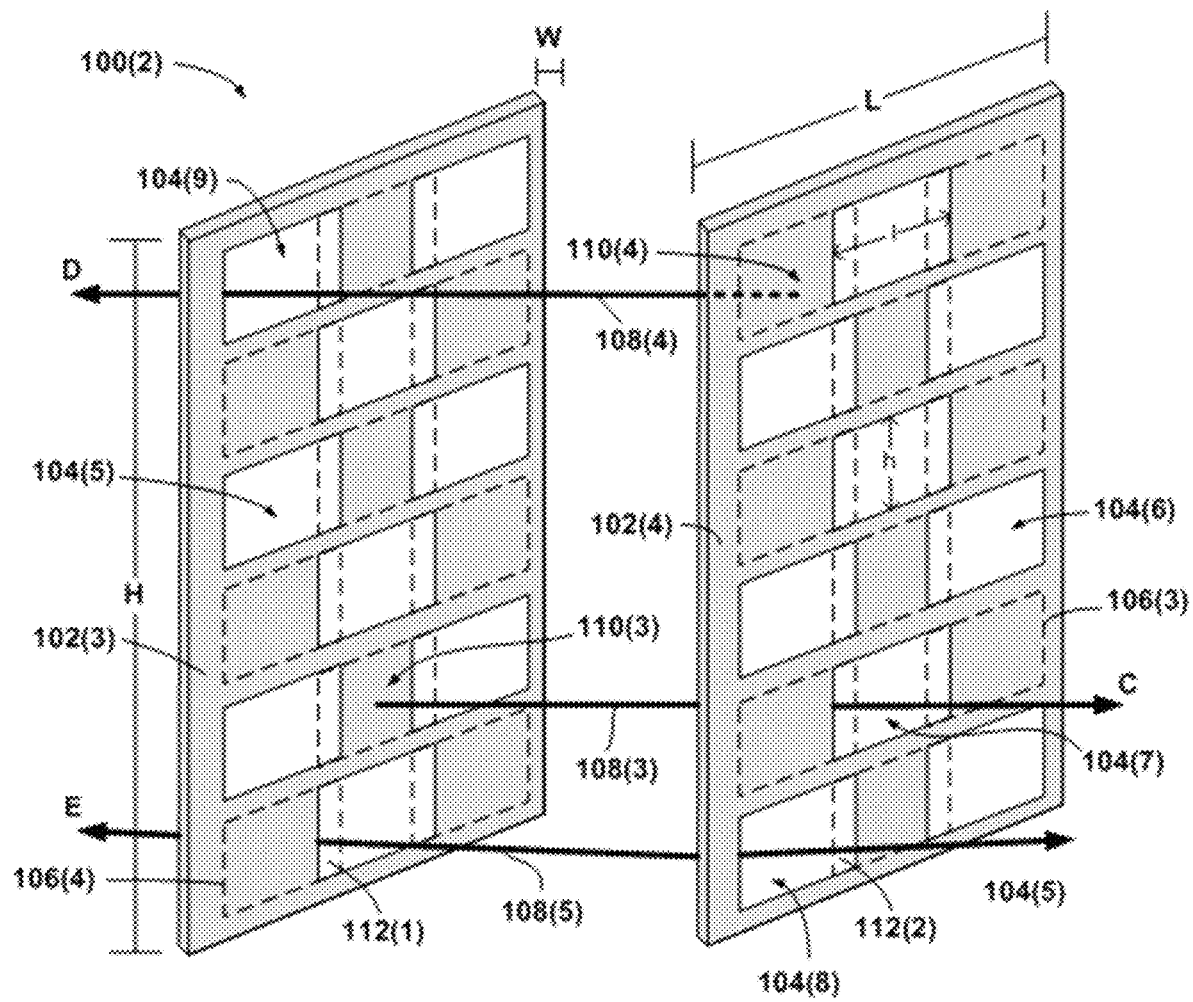
FIG. 2 provides a side perspective view of a multilayer separator system for an electrochemical system comprising parallel first and second high mechanical strength layers having complementary patterns of apertures, wherein the second pattern of apertures has an off-set alignment relative to the first pattern such that there is a selected extent of overlap of the apertures of the first pattern and the apertures of the second pattern along axes extending perpendicularly from the first high mechanical strength layer to the second high mechanical strength layer, for example, a selected extent of overlap minimizing or avoid dendrite growth through the separator system.

FIG. 2 provides a side perspective view of a multilayer separator system 100(2) for an electrochemical system comprising parallel first and second high mechanical strength layers having complementary patterns of apertures, wherein the second pattern of apertures has an off-set alignment relative to the first pattern such that there is a selected extent of overlap of the apertures of the first pattern and the apertures of the second pattern along axes extending perpendicularly from the first high mechanical strength layer to the second high mechanical strength layer. As shown in FIG. 2, separator system 100(2) comprises a first high mechanical strength layer 102(3) having a first pattern comprising a plurality of apertures, e.g. 104(5) and 104(9), and a second high mechanical strength layer 102(4) having a second pattern comprising a second plurality of apertures, e.g. 104(6), 104(7) and 104(8). First and second high mechanical strength layers 102 are characterized by lateral dimensions, such as height, H, length, L, and width or thickness, W. As shown in FIG. 1, apertures 104 extend entirely through the thickness of either first high mechanical strength layer 102(3) or second high mechanical strength layer 102(4). Each aperture 104 is also characterized by lateral dimensions, such as height, h, length, l, and width or thickness (not shown).

The superposition of the first pattern of first high mechanical strength layer 102(3) on the second high mechanical strength layer 102(4) is schematically presented as a plurality of dashed areas 106(3) on second high mechanical strength layer 102(4), and the superposition of the second pattern of second high mechanical strength layer 102(4) on the first high mechanical strength layer 102(3) is schematically presented as a plurality of dashed areas 106(4) on first layer 102(3). In the embodiment shown in FIG. 2, the first and second patterns have off-set alignments relative to one another such that there is a selected overlap of apertures 104 along axes extending perpendicularly from first high mechanical strength layer 102(3) to second high mechanical strength layer 102(4). In an embodiment, for example, the selected overlap is less than or equal to 50%, 40%, 30%, 20%, 10%, 5%, or 2%. In the embodiment shown in FIG. 2, the overlap of the apertures of the first pattern and the apertures of the second pattern along axes extending perpendicularly from the first high mechanical strength layer to the second high mechanical strength layer is greater than zero. The arrows shown in FIG. 2 are provided so as to illustrate the overlapping regions 112 of the apertures and regions of the apertures that do not overlap along axis extending perpendicularly from first high mechanical strength layer 102(3) to second high mechanical strength layer 102(4). The off-set alignment of the pattern of apertures of the first high mechanical strength layer and the pattern of apertures of the second high mechanical strength layer prevents growth of dendrites through the combination of the first and second high mechanical strength layers, for example, by blocking dendrite growth and/or requiring a pathway involving curved trajectories which are thermodynamically and/or kinetically unfavorable.

The invention may be further understood by the following non-limiting examples.

Figure 3:
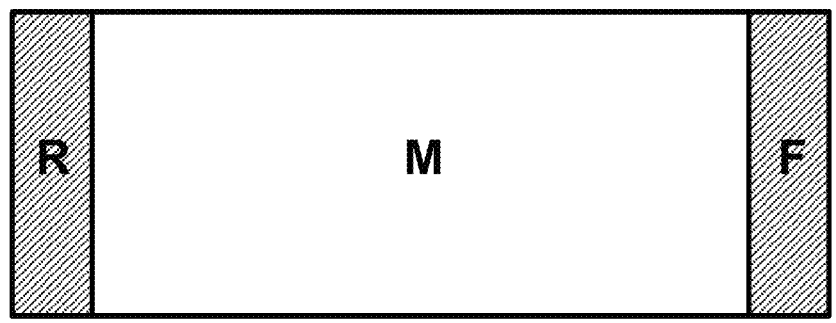
FIG. 3 provides a schematic diagram illustrating a cross sectional view of a multilayer separator system of the invention having first and second patterned high mechanical strength layers separated by an electrolyte-containing layer.
Figure 4:
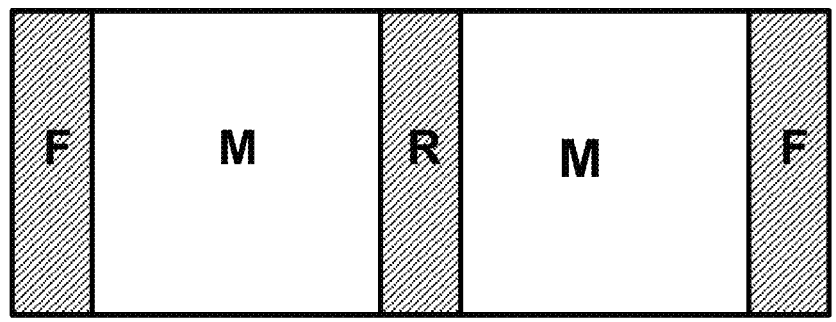
FIG. 4 provides a schematic diagram illustrating a cross sectional view of a multilayer separator system of the invention having first, second and third patterned high mechanical strength layers separated by electrolyte-containing layers.

Example 1: Novel Separators for Electrochemical and Chemical Systems, Such as for Batteries, Such as for Rechargeable Lithium Batteries and Especially to Prevent Dendrite Short Circuits in Li-Metal Batteries FIG. 3 provides a schematic diagram illustrating a cross sectional view of a multilayer separator system of the invention having first and second high mechanical strength layers (layers R and F) having complementary patterns of apertures separated by an electrolyte-containing layer (layer M). FIG. 4 provides a schematic diagram illustrating a cross sectional view of a multilayer separator system of the invention having first, second and third high mechanical strength layers (layers R and F) with complementary patterns of apertures separated by electrolyte-containing layers (layer M). In FIGS. 3 and 4, layers (R) and layers (F) are high mechanical strength layers having patterns of apertures that when provided in combination prevent dendrite growth through the separator system, for example, when incorporated into an electrochemical system, such as an electrochemical cell. In FIGS. 3 and 4, electrolyte-containing layer(s) M is provided between layers F and R and, in some embodiments, electrolyte-containing layer(s) M is preferably thicker than layers F and R. In an electrochemical system, for example, layer(s) M acts as a reservoir for an electrolyte. In an electrochemical system, for example, layer(s) M acts as a separator, thereby, preventing electrical and/or physical contact between the positive electrode and negative electrode while allowing ion transport between positive and negative electrodes so that the electrochemical cell can undergo efficient discharge and charging characteristics. In an embodiment, for example, layer M is a low ionic resistance layer, such as a conductive microporous membrane. In an embodiment, for example, layer M is a polyethylene (PE) membrane or a polypropylene (PP) membrane or a combination of both.

In some embodiments, high mechanical strength layers F and R function to prevent dendrite growth in an electrochemical cell such to prevent electrical shorting, thermal runaway and/or mechanical failure of the cell. As an example, high mechanical strength layers F and R may be configured to prevent the short circuit and capacity losses in lithium metal batteries by preventing dendrite growth between positive and negative electrodes. In some embodiments, high mechanical strength layers F and R provide complementary barriers each having a mechanical strength sufficient to prevent piercing or mechanical failure of the barrier when in contact with a growing dendrite.

Figure 5:
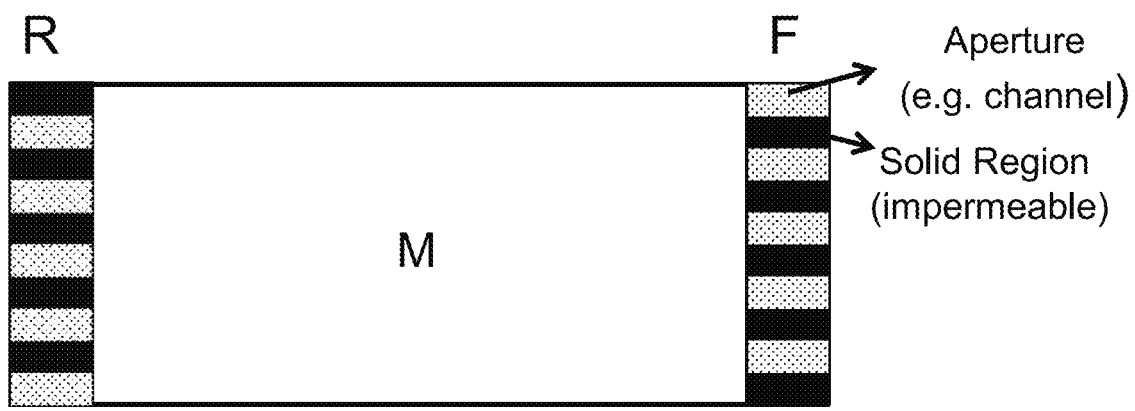
FIG. 5 provides a schematic diagram illustrating a cross sectional view of a multilayer separator system of the invention showing the orientation of apertures and solid regions of the first and second patterned high mechanical strength layers separated by electrolyte-containing layers.
Figure 6:
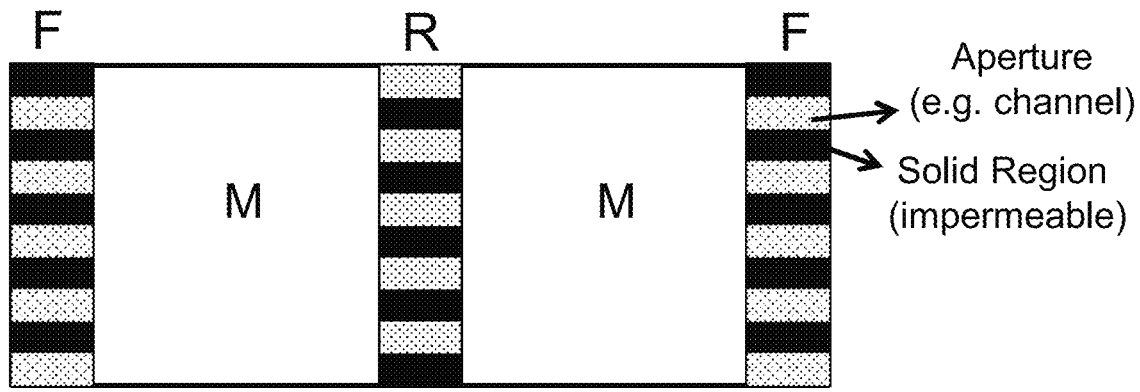
FIG. 6 provides a schematic diagram illustrating a cross sectional view of a multilayer separator system of the invention showing the orientation of apertures and solid regions of the first, second and third patterned high mechanical strength layers separated by electrolyte-containing layers.

In some embodiments, high mechanical strength layers F and R are provided with complementary patterns of apertures extending through the entire thickness of the layers. FIG. 5 provides a schematic diagram illustrating a cross sectional view of a multilayer separator system of the invention illustrating apertures (schematically illustrated as the dotted regions) and solid regions (schematically illustrated as the filled regions) of the first and second high mechanical strength layers separated by one or more low ionic resistance layers, such as an electrolyte-containing layer M. FIG. 6 provides a schematic diagram illustrating a cross sectional view of a multilayer separator system of the invention illustrating apertures and solid regions of the first, second and third high mechanical strength layers separated by one or more low ionic resistance layers, such as an electrolyte-containing layer M. As an example, high mechanical strength layer(s) F may be characterized by a preselected first pattern of apertures and solid regions, and high mechanical strength layer(s) R may be characterized by a second preselected pattern of apertures and solid regions that is different from that of high mechanical strength layer F. In an embodiment, for example, the two patterns are complementary such that each of the high mechanical strength layers F and R have apertures (e.g., through-holes, nanopores, micropores, channels, etc.) that allow the transport of ions and electrolyte from either side of the high mechanical strength layer, but alignment of high mechanical strength layers F and R in the multilayer separator system geometry provides apertures of high mechanical strength layer F to match the solid regions of high mechanical strength layer R and the solid regions of high mechanical strength layer F to match the holes of high mechanical strength layer R, for example along axes extending perpendicularly from the high mechanical strength layer(s) R to high mechanical strength layer(s) F. In an embodiment, for example, the apertures of high mechanical strength layers F and R are off-set with respect to each other such that no straight line can go through the holes of both layers F and R when they are provided in combination, for example in a parallel or concentric orientation. This spatial arrangement can be visualized, for example, by considering a periodic pattern, such as a chess board having white and black squares, wherein the white squares correspond to the apertures and wherein the black squares correspond to the solid regions of the high mechanical strength layer. In an example, high mechanical strength layer F can be in the format of a typical chess board, and high mechanical strength layer R is in the format of a reverse one, misplaced chess board, in which the white blocks (corresponding to the apertures) are in the place of black squares (solid part of layer F) and black blocks (corresponding to the solid regions) are in the place of white squares (holes of layer F). This off-set alignment results in at least two high mechanical strength layers wherein all the holes are blocked by solid regions of a neighboring layer when provided in a multilayer geometry.

Placement of the low ionic resistance layer M (typical separator) between high mechanical strength layers F and R provides a separator system which prevents the unwanted growth of dendrites extending through the separator system. In order to minimize the effect of the separator system on the resistance of the cell, however, it is desirable for some embodiments to minimize the thickness of high mechanical strength layers F and R while at least maintaining a thickness that is necessary to provide sufficient mechanical strength to block growing dendrites.

In an embodiment, for example, high mechanical strength layers F and R are very thin (e.g., thickness less than or equal to 100 μm and optionally for some embodiments thickness less than or equal to 20 μm) and, thus, can optionally be in the form of one or more coatings on the front and/or back sides of the layer M. The volume fraction and surface fraction of holes in high mechanical strength layers F and R are selected for a given application, and for some applications it is preferable that at least a quarter, and optionally half, of the surface-volume comprises apertures and the remainder comprising impermeable solid regions. In an embodiment, high mechanical strength layers F and R comprise materials that do not react with other components of an electrochemical cell and are chemically resistant and thermally stable. In an embodiment, high mechanical strength layers F and R comprise electronic insulators.

In specific embodiments useful for a lithium-metal battery, high mechanical strength layers F and R comprise a polyethylene membrane or polyimide membrane or polyester membrane or polypropylene membrane or Teflon or a mixture of these materials having complementary patterns of apertures allowing the passage of ions and electrolyte through the apertures but preventing the passage of electrical current directly between positive and negative electrodes of an electrochemical cell. In an embodiment, for example, low ionic resistance layer M is a porous polyethylene membrane or a porous polypropylene membrane or a mixture of these. In an embodiment, low ionic resistance layer M has a thickness selected from the range of 10 nm to 200 μm, selected from the range of 80 μm to 120 μm or selected from the range of 5 μm to 25 μm, and high mechanical strength layers F and R each independently have a thickness selected from the range of 5 μm to 200 μm, selected from the range of 10 μm to 30 μm or selected from the range of 5 μm to 30 μm. In an embodiment, high mechanical strength layers F and R have complementary periodic patterns of apertures and solid regions, wherein one or more lateral dimensions of the unit cell characterizing the apertures and/or solid regions is, for example, selected over the range of 1 micrometer and 1 millimeter, preferably 10-30 micrometers for some applications. Smaller sizes of the lateral dimensions of the unit cell of the apertures, as small as 10 times the average aperture size of layer R, are preferred for some embodiments; but it is acknowledged that there may be practical advantages of large apertures with respect to fabrication, so there can be a compromise in the selection of the physical dimensions of the apertures.

As will be apparent to one of skill in the art, the composition, physical dimensions (e.g., thicknesses) and mechanical properties (e.g., porosity) of the components of the separator systems may depend on the type of electrochemical or chemical cells and/or application. In an embodiment, for example, separator systems for lead-acid batteries may employ thicker high mechanical strength layers having larger hole sizes than in separator systems for lithium-metal batteries.

Other separator geometries, besides the described R-M-F and F-M-R-M-F systems shown in FIGS. 3 and 5, are also useful for some applications. As an example, the invention includes multilayer systems with 3, 4, 5, 6, 7, 8, etc. high mechanical strength layers having patterns of apertures selected to prevent dendrite growth. Multilayer systems having more than two high mechanical strength layers, such corresponding to the F-M-R-M-F system shown in FIGS. 4 and 6, are preferred for some applications as they may be configured to efficiently prevent growth of dendrites from positive to negative electrodes and yet the added resistance to the cell can still be maintained low enough to provide useful discharge and charging performance.

As an example, a high energy rechargeable lithium battery of the invention comprises: (1) an anode comprising lithium metal or lithium-alloy or mixtures of lithium metal and/or lithium alloy or zinc metal or ZnO or zinc alloy or silicon and another material; (2) a cathode; (3) a separator system of the invention disposed between the anode and the cathode; and (4) one or more electrolytes in ionic communication, optionally in physical contact, with the anode and the cathode via the separator. In an embodiment, for example, the electrolyte is either solid, gel or liquid (e.g. a fluid). In some embodiments, the electrodes are solid materials or are semi-solid particles (e.g., small solid particles in liquids) such as what is used in semi-solid batteries or in flow batteries or in flow cells. The cross sectional geometry of the separator system can be a range of shapes including rectangular, circular, square, etc.

Figure 7:
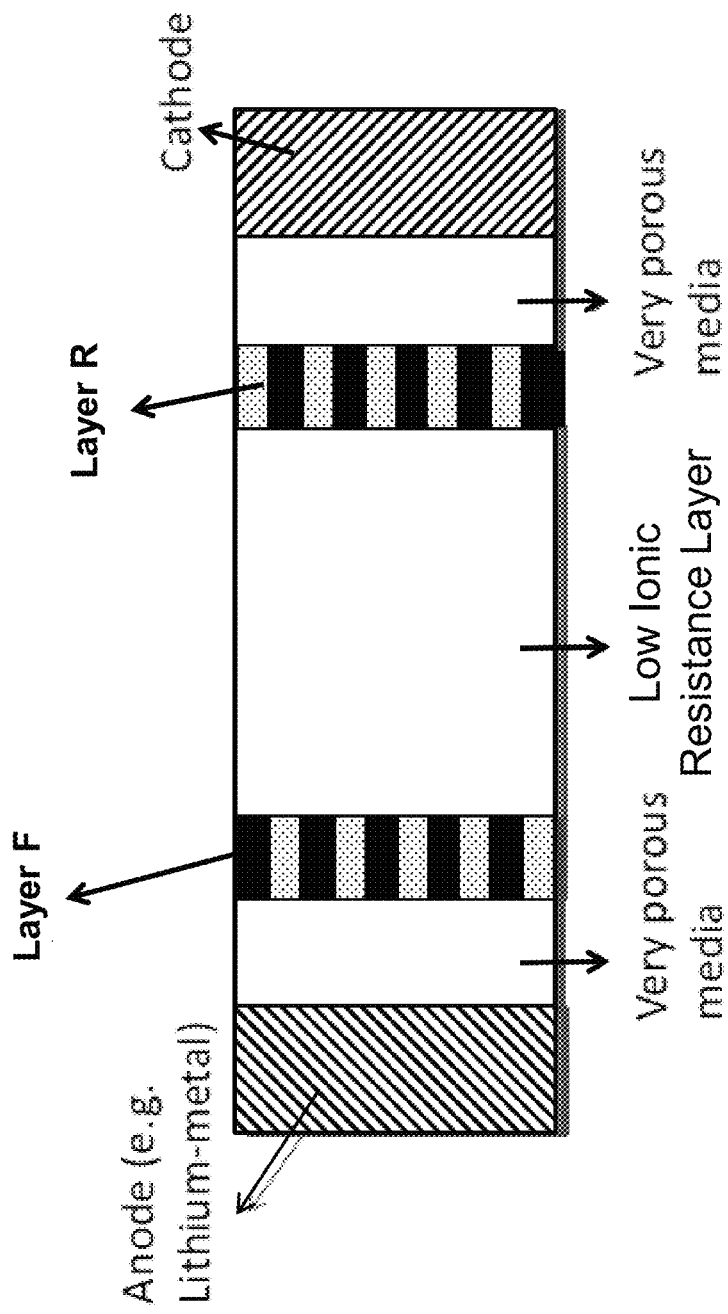
FIG. 7 provides a schematic diagram providing a cross sectional view of a lithium battery of the invention comprising a separator system with two patterned high mechanical strength layers having complementary patterns of apertures.

FIG. 7 provides a schematic diagram providing a cross sectional view of a lithium battery of the invention comprising a separator system with two high mechanical strength layers having complementary patterns of apertures. The electrochemical cell comprises an anode (e.g., lithium metal) and cathode that are separated by a multilayer separator system including an electrolyte reservoir. The multilayer separator comprises two high mechanical strength layers having complementary patterns of apertures separated by a low ionic resistance layer such as an electrolyte-containing separator and/or spacer. In addition, very porous media is provided between the high mechanical strength layers and the anode and cathode components. As shown in FIG. 7, the high mechanical strength layers have patterns comprising alternating apertures and solid regions (e.g., in FIG. 7 the filled-in regions correspond to solid regions of the high mechanical strength layer and dotted regions correspond to apertures extending through the high mechanical strength layer). In the embodiment shown, the high mechanical strength layers have complementary patterns of apertures capable of preventing growth of dendrites between cathode and anode, wherein open regions (e.g., apertures) of a first high mechanical strength layer correspond to solid regions of the second high mechanical strength layer along axes extending perpendicularly from the layers, as shown in FIG. 7.

Figure 8:
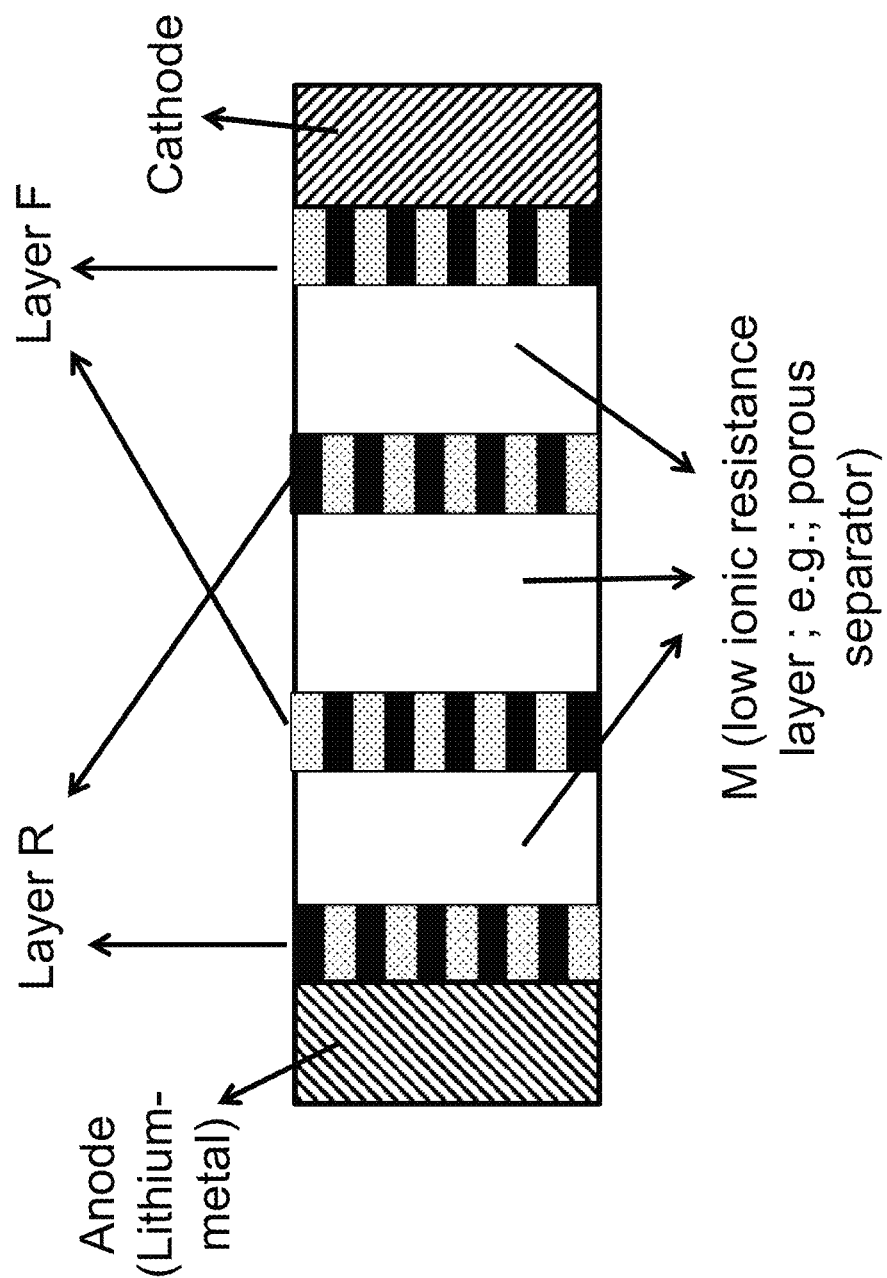
FIG. 8 provides a schematic diagram providing a cross sectional view of a lithium battery of the invention comprising a separator system with four patterned high mechanical strength layers having complementary patterns of apertures.
Figure 9:
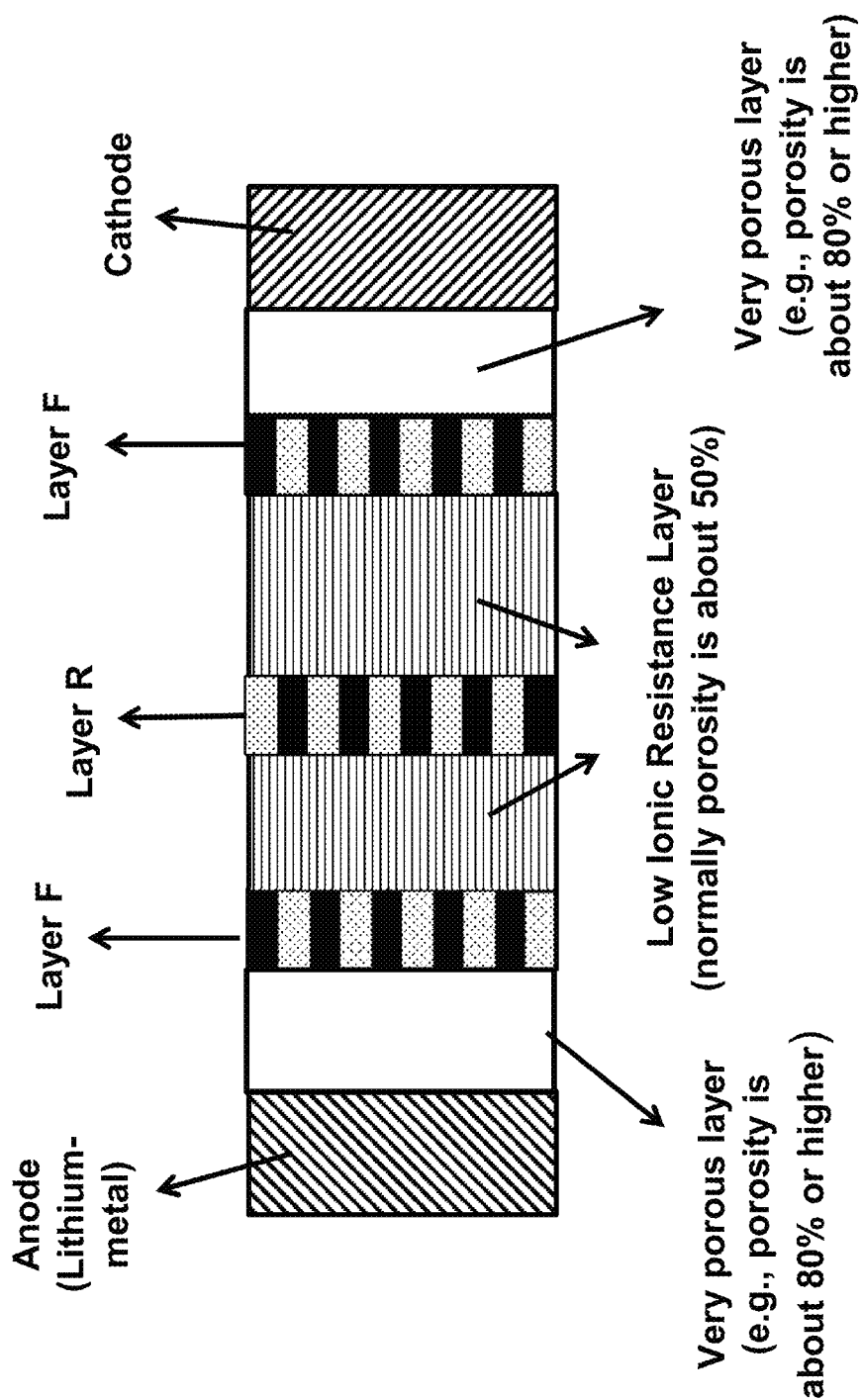
FIG. 9 provides a schematic diagram providing a cross sectional view of an electrochemical cell of the invention comprising a separator system with three patterned high mechanical strength layers having complementary patterns of apertures.

FIGS. 8-10 provide examples of other embodiments of lithium batteries illustrating additional device configurations and device components of the invention. FIG. 8 provides a schematic diagram providing a cross sectional view of a lithium battery of the invention comprising a separator system with four high mechanical strength layers having complementary patterns of apertures. In the device illustrated in FIG. 8, high mechanical strength layer R is provided in direct physical contact with the anode and high mechanical strength L is provided in direct physical contact with the cathode. In the embodiment shown in FIG. 8, the two layers R have the same pattern of apertures and the two layers F have the same pattern of apertures. Together the patterns in layers R and F comprise complementary patterns that eliminate any direct linear pathway between the anode and the cathode along axis extending perpendicularly from cathode to anode, thereby preventing dendrite growth related shorting. In the embodiment shown in FIG. 8, a high mechanical strength layer R is provided in physical contact with the anode so as to allow ions to pass through layer R and interact with the anode surface; and a high mechanical strength layer F is provided in physical contact with the cathode so as to allow ions to pass through layer F and interact with the cathode surface.

FIG. 9 provides a schematic diagram providing a cross sectional view of an electrochemical cell of the invention comprising a separator system with three high mechanical strength layers having complementary patterns of apertures. In the device illustrated in FIG. 9, a very porous layer (e.g., porosity 80%) is provided between the high mechanical strength layer F and the anode and a very porous layer (e.g., porosity 80%) is provided between high mechanical strength layer F and the cathode. In the device illustrated in FIG. 9, high mechanical strength layer R has a pattern of apertures that is complementary to the pattern of apertures of high mechanical strength layers F, and a porous layer (e.g., porosity 50%) is provided between high mechanical strength layer R and the high mechanical strength layers F. In an embodiment, for example, the two high mechanical strength layers F are characterized by the same pattern of apertures. In the embodiment shown in FIG. 9, the two layers F have the same pattern of apertures. Together the patterns in layer R and the two layers F comprise complementary patterns that eliminate any direct linear pathway between the anode and the cathode along axis extending perpendicularly from cathode to anode, thereby preventing dendrite growth related shorting. In the embodiment shown in FIG. 9, a very porous layer (e.g., porosity 80%) is provided in physical contact with the anode so as to allow ions to pass through this porous layer and interact with the anode surface; and a very porous layer (e.g., porosity 80%) is provided in physical contact with the cathode so as to allow ions to pass through this porous layer and interact with the cathode surface.

Figure 10A:
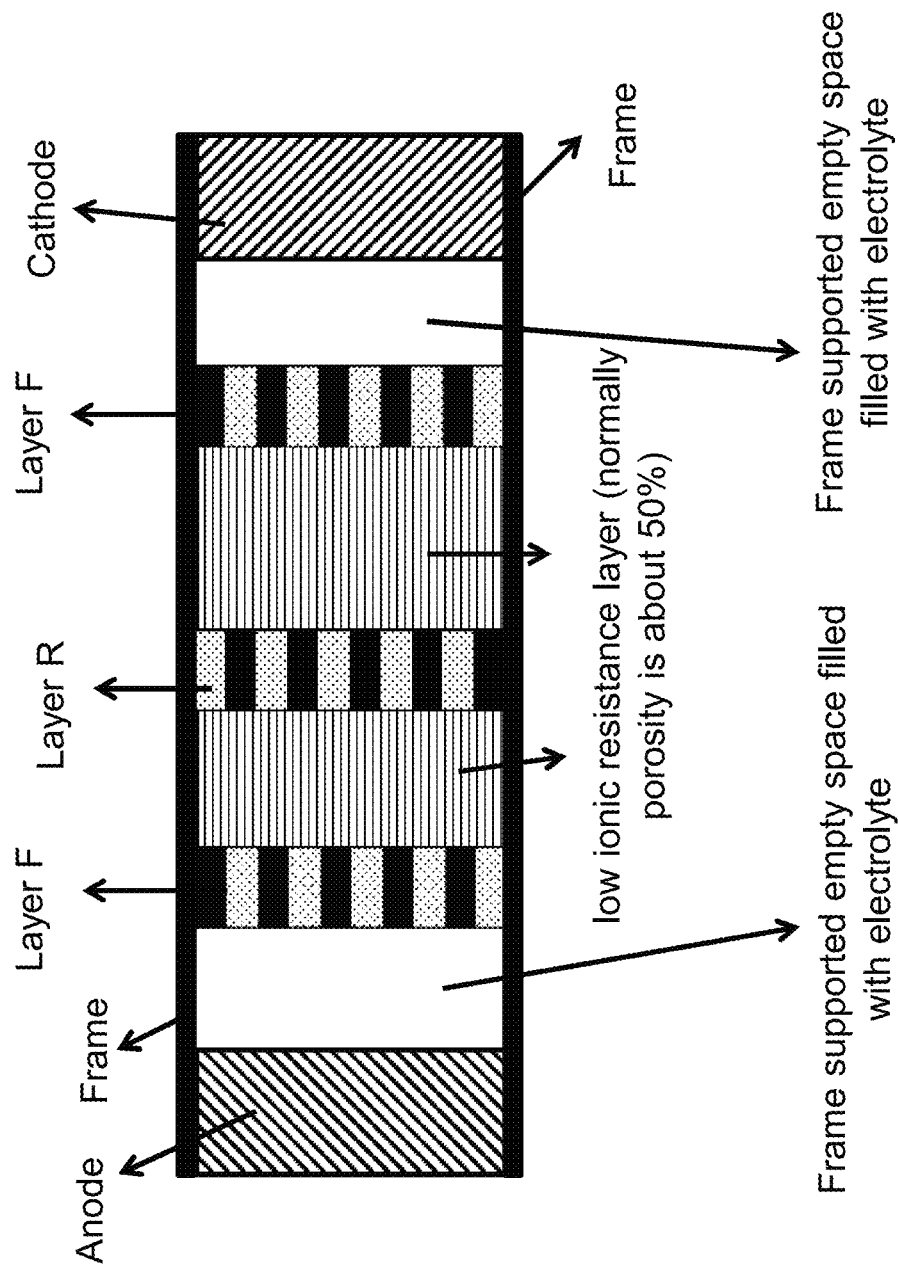
FIG. 10A provides a schematic diagram providing a cross sectional view of an electrochemical cell of the invention comprising a lithium metal anode, cathode and a separator system comprising three high mechanical strength layers having complementary patterns of apertures, two low ionic resistance layers, two electrolyte containing voids and a frame component. The electrochemical cell may include a frame supported empty space filled with electrolyte (e.g., to avoid reducing the electrode surface area that could happen with the layer F). The frame acts as a spacer.

FIG. 10A provides a schematic diagram providing a cross sectional view of an electrochemical cell of the invention comprising a lithium metal anode, cathode and a separator system comprising three high mechanical strength layers having complementary patterns of apertures, two low ionic resistance layers, two electrolyte containing voids and a frame component. In some embodiments, for example, the frame layer(s) provides a means of physically integrating, attaching and/or mechanically supporting the components of the overall multilayer arrangement. In the lithium battery shown in FIG. 10, an electrolyte containing void is provided between the anode and a first high mechanical strength layer having a pattern of apertures and an electrolyte containing void is provided between the cathode and a second high mechanical strength layer having a pattern of apertures. In some embodiments, for example, incorporation of an electrolyte containing void between the electrode and the high mechanical strength layer is useful to avoid reducing the electrode surface area so as to access useful discharge and charge characteristics of the cell. In the device illustrated in FIG. 10, high mechanical strength layer R has a pattern of apertures that is complementary to the pattern of apertures of high mechanical strength layers F, and a low ionic resistance layer (e.g., porosity 50%) is provided between high mechanical strength layer R and the high mechanical strength layers F.

Figure 10B:
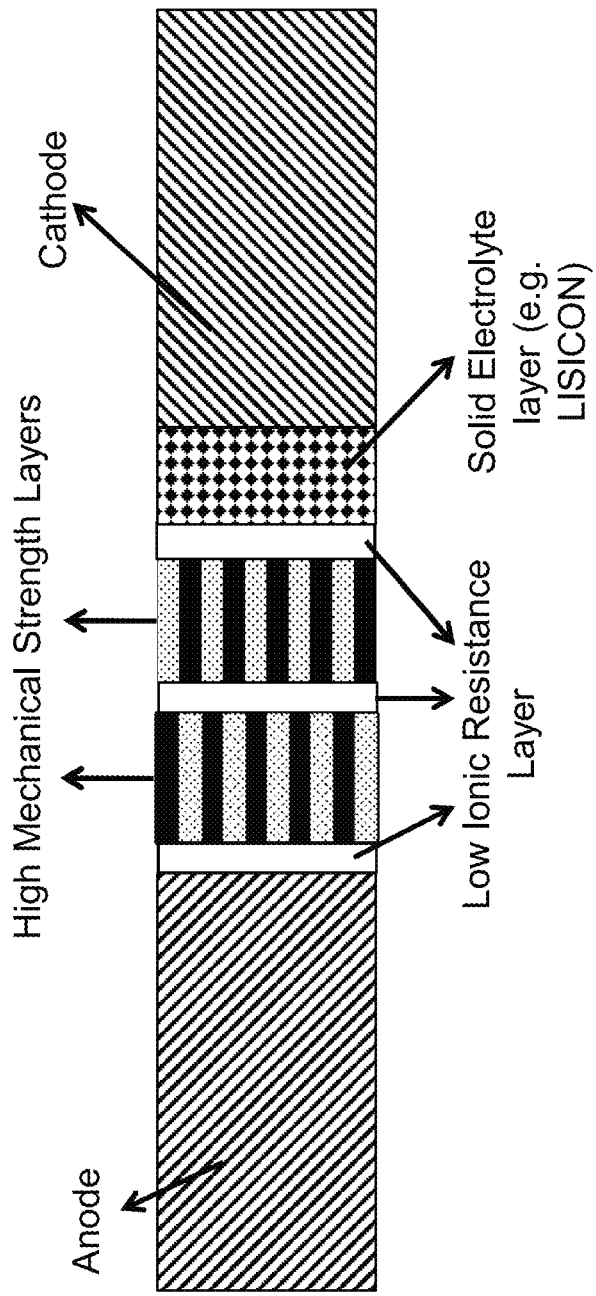
FIG. 10B provides a schematic diagram providing a cross sectional view of an electrochemical cell (e.g. useful for Li-air, Li-water batteries) comprising an anode (e.g., Lithium), a cathode (e.g., carbon-air, carbon-water), and having a separator with a protective solid electrolyte, wherein the solid electrolyte conducts the desired ions (such as $Li^+$) but is impermeable to water, air, $CO_2$, contaminations and materials that deteriorate the performance of the electrochemical cell. The high mechanical strength layer is optionally a chemically resistant and thermally stable, non-conductive perforated layer to stop dendrite growth. The low ionic resistance layer may be very porous (e.g., greater than or equal to 80% porosity (e.g., PE)).

FIG. 10B provides a schematic diagram providing a cross sectional view of an electrochemical cell (e.g. useful for Li-air, Li-water batteries) having a separator with a protective solid electrolyte, wherein the solid electrolyte conducts the desired ions (such as $Li^+$) but is impermeable to water, air, $CO_2$, contaminations and materials that deteriorate the performance of the electrochemical cell. The electrochemical cell comprises an anode, such as a lithium anode; a cathode, such as a carbon-water cathode or carbon-air cathode; a separator system comprising two high mechanical strength layers having complementary patterns of apertures, three low ionic resistance layers, and a solid electrolyte layer, such as a LISICON layer. In the device illustrated in FIG. 10B, the high mechanical strength layers are optionally chemically resistant and thermally stable perforated layers that are also electronically insulating, such as perforated Kapton layers. Use of complementary high mechanical strength layers comprising Kapton is useful in some embodiments for preventing dendrite growth. As shown in FIG. 10B, a first low ionic resistance layer, such as a very porous layer (e.g., ≥80%), is provided between the anode and a first high mechanical strength layer and a second low ionic resistance layer, such as a very porous layer (e.g., ≥80%), is provided between the first high mechanical strength layer and a second high mechanical strength layer, and a third low ionic resistance layer, such as a very porous layer (e.g., ≥80%), is provided between the second high mechanical strength layer and the cathode. As shown in FIG. 10B, a solid electrolyte layer, such as a LISICON layer, is provided between the third low ionic resistance layer and the cathode such that ions are able to be transported to the cathode surface. In an embodiment, for example, the solid electrolyte layer is provided in physical contact with a surface of the cathode. In some embodiments, incorporation of the solid electrolyte layer (e.g., LISICON layer) is useful to protect the cathode, for example, to protect against unwanted chemical reactions with the cathode surface and components of the electrochemical cell, such as electrolyte components other than the solid electrolyte. In some embodiments, the solid electrolyte layer (e.g., LISICON layer) provides a chemical barrier layer separating a first side of the electrochemical cell having a first electrolyte from a second side of the electrochemical cell having a second electrolyte that is different from the first electrolyte. Embodiments of this aspect, therefore, may provide a means for integrating two separate electrolytes each tailored specifically for selected anode and cathode compositions.

Figure 10C:
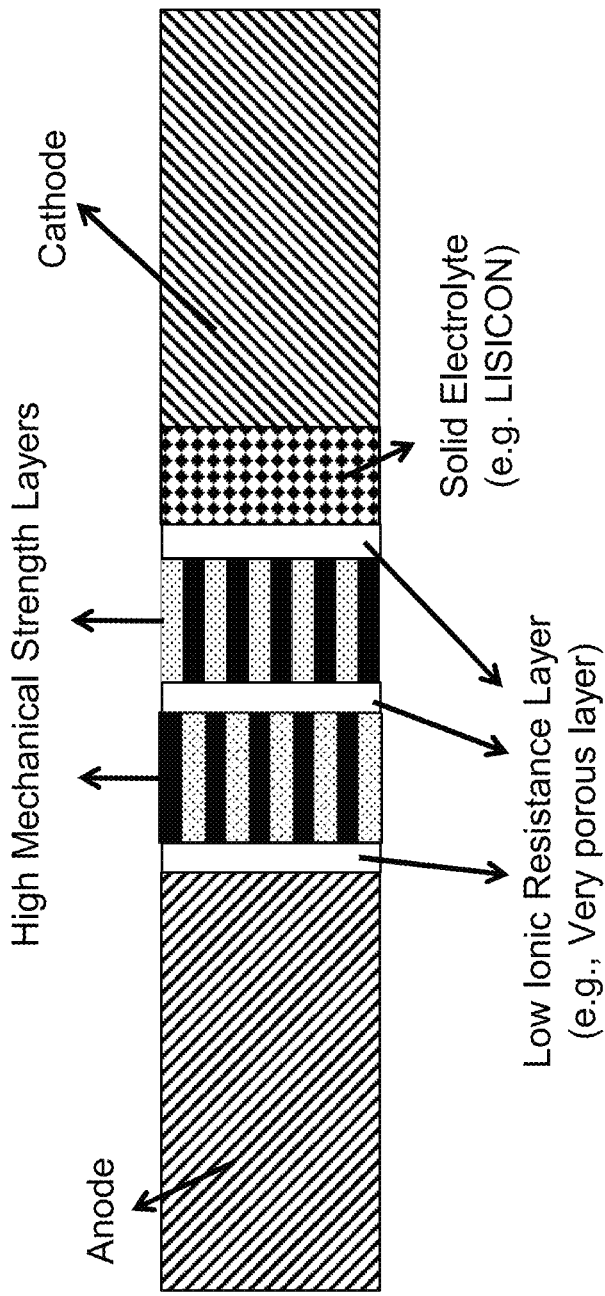
FIG. 10C provides a schematic diagram providing a cross sectional view of an electrochemical cell (e.g., useful for Li-air, Li-water batteries) comprising an anode (e.g., Lithium), a cathode (e.g., carbon-air, carbon-water), and having a separator with a protective solid electrolyte, wherein the solid electrolyte conducts the desired ions (such as $Li^+$) but is impermeable to water, air, $CO_2$, contaminations and materials that deteriorate the performance of the electrochemical cell. The high mechanical strength layer is optionally a chemically resistant and thermally stable and electronic conductive metal layer. The low ionic resistance layer may be very porous (e.g., greater than or equal to 80% porosity (e.g., PE)).

FIG. 10C provides a schematic diagram providing a cross sectional view of an electrochemical cell (e.g., useful for Li-air, Li-water batteries) having a separator with a protective solid electrolyte, wherein the solid electrolyte conducts the desired ions (such as $Li^+$) but is impermeable to water, air, $CO_2$, contaminations and materials that deteriorate the performance of the electrochemical cell. The electrochemical cell comprises a lithium anode; a cathode such as a carbon-water cathode or carbon-air cathode; a separator system comprising two high mechanical strength layers having complementary patterns of apertures, three low ionic resistance layers; and a solid electrolyte layer, such as a LISICON layer. The overall electrochemical cell geometry in FIG. 10C is similar to that shown in FIG. 10B, wherein a first low ionic resistance layer, such as a very porous layer (e.g., ≥80%), is provided between the anode and a first high mechanical strength layer and a second low ionic resistance layer, such as a very porous layer (e.g., ≥80%), is provided between the first high mechanical strength layer and a second high mechanical strength layer, and a third low ionic resistance layer, such as a very porous layer (e.g., ≥80%), is provided between the second high mechanical strength layer and the cathode, and wherein a solid electrolyte layer, such as a LISICON layer, is provided between the third low ionic resistance layer and the cathode such that ions are able to be transported to the cathode surface. In the electrochemical cell of FIG. 10C, however, the high mechanical strength layers are perforated metal layers having complementary patterns of apertures that are useful in some embodiments for preventing dendrite growth and reducing anode loss such as in mossy deposition. Similar to the discussion in connection with FIG. 10B, incorporation of the solid electrolyte layer (e.g., LISICON layer) is useful to protect the cathode, for example, to protect against unwanted chemical reactions with the cathode surface and components of the electrochemical cell, such as electrolyte components other than the solid electrolyte. In some embodiments, the solid electrolyte layer (e.g., LISICON layer) provides a chemical barrier layer separating a first side of the electrochemical cell having a first electrolyte from a second side of the electrochemical cell having a second electrolyte that is different from the first electrolyte, and therefore, may provide a means for integrating two separate electrolytes each tailored specifically for selected anode and cathode compositions.

Figure 10D:
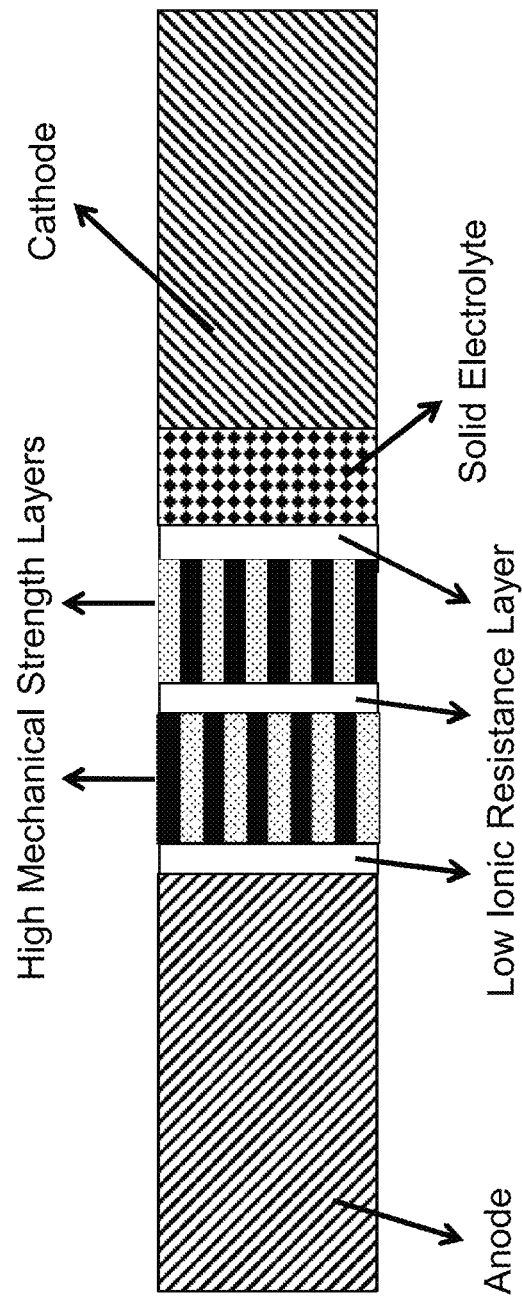
FIG. 10D provides a schematic diagram providing a cross sectional view of an electrochemical cell (e.g., useful for Li-Sulfur batteries) comprising an anode (e.g., Lithium), a cathode (e.g., sulfur), and having separator with a protective solid electrolyte (e.g., LISICON) optionally coated with hydrophilic coating or hydrophobic coating or anion exchange coating or cation exchange coating, wherein the solid electrolyte conducts the desired ions (such as $Li^+$) but is impermeable to particle passage between cathode and anode that deteriorate the performance of the electrochemical cell. The high mechanical strength layer is optionally a chemically resistant and thermally stable metal layer optionally coated with hydrophilic coating or hydrophobic coating or anion exchange coating or cation exchange coating to stop dendrite growth, reduce anode loss such as in mossy deposition and stop the passage of cathode materials to the anode. The low ionic resistance layer may be very porous (e.g., greater than or equal to 80% porosity (e.g., PE)), optionally coated with hydrophilic m coating or hydrophobic coating or anion exchange coating or cation exchange coating.
Figure 10E:
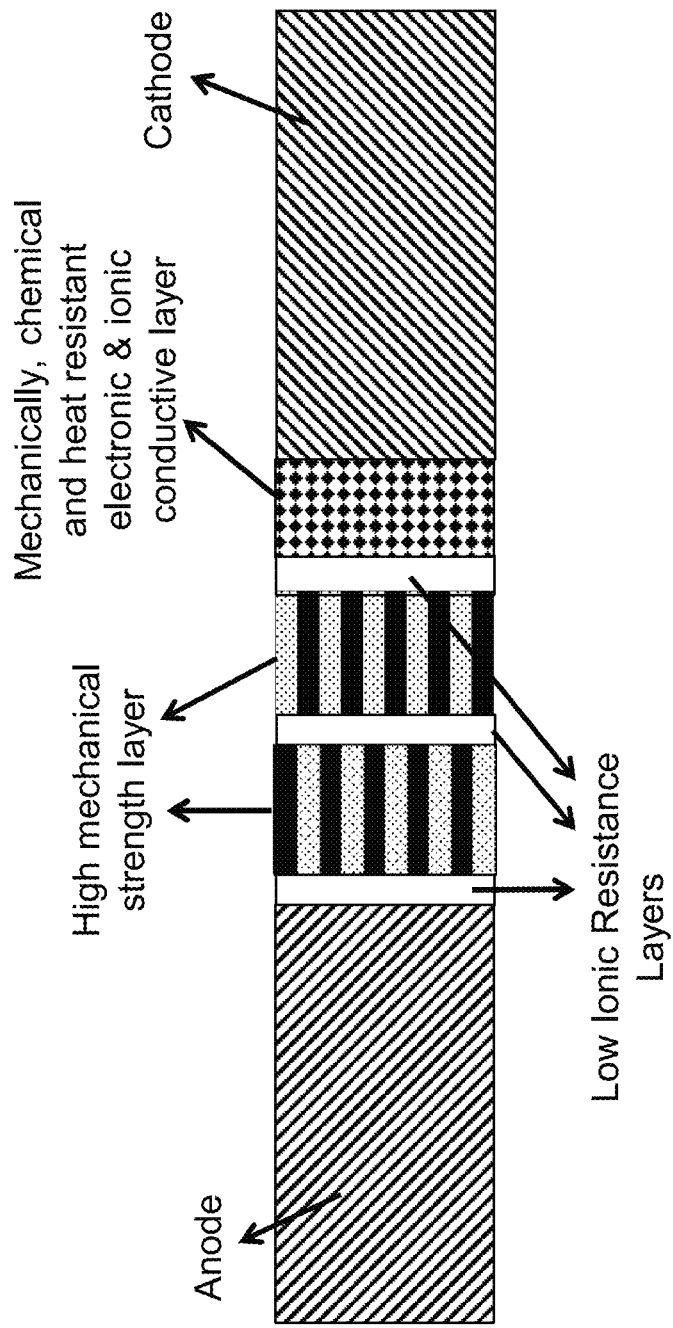
FIG. 10E provides a schematic diagram providing a cross sectional view of an electrochemical cell comprising an anode (e.g., Lithium), a cathode (e.g., LiFePO4, LiCoO2), and having a separator wherein the conductive side of the separator next to the anode reduces anode loss; e.g., by stopping the dendrite growth, reducing anode loss such as in mossy deposition and stop the passage of cathode materials to the anode upon cycling which breaks the electronic contact between anode particles and the current collector and deteriorate the performance of the electrochemical cell. The high mechanical strength layer is optionally a chemically resistant and thermally stable, perforated electronic and ionic conductive layer (e.g., perforated metal), or an electronically insulating perforated layer (e.g., Kapton). The low ionic resistance layer may be very porous (e.g., greater than or equal to 80% porosity (e.g., PE)).

FIG. 10D provides a schematic diagram providing a cross sectional view of an electrochemical cell (e.g., useful for Li-Sulfur batteries) having separator with a protective solid electrolyte, wherein the solid electrolyte conducts the desired ions (such as $Li^+$) but is impermeable to particle passage between cathode and anode that deteriorate the performance of the electrochemical cell. The electrochemical cell comprises an anode such as a lithium anode; a cathode such as a sulfur-based cathode; a separator system comprising two high mechanical strength layers having complementary patterns of apertures, three low ionic resistance layers; and a solid electrolyte layer, such as a LISICON layer. The overall electrochemical cell geometry in FIG. 10C is similar to that shown in FIGS. 10B and 10C, wherein a first low ionic resistance layer, such as a very porous layer (e.g., ≥80%), is provided between the anode and a first high mechanical strength layer and a second low ionic resistance layer, such as a very porous layer (e.g., ≥80%), is provided between the first high mechanical strength layer and a second high mechanical strength layer, and a third low ionic resistance layer, such as a very porous layer (e.g., ≥80%), is provided between the second high mechanical strength layer and the cathode, and wherein a solid electrolyte layer, such as a LISICON layer, is provided between the third low ionic resistance layer and the cathode such that ions are able to be transported to the cathode surface. In the electrochemical cell of FIG. 10D, however, the high mechanical strength layers are perforated metal layers having complementary patterns of apertures and the cathode is optionally a sulfur-based cathode. Incorporation of high mechanical strength metal layers in the present separators are useful in some embodiments for preventing dendrite growth, reducing anode loss such as in mossy deposition and stopping the passage of cathode materials to the anode. Similar to the discussion in connection with FIG. 10B, incorporation of the solid electrolyte layer (e.g., LISICON layer) is useful to protect the cathode, for example, to protect against unwanted chemical reactions with the cathode surface and components of the electrochemical cell, such as electrolyte components other than the solid electrolyte. In some embodiments, the solid electrolyte layer (e.g., LISICON layer) provides a chemical barrier layer separating a first side of the electrochemical cell having a first electrolyte from a second side of the electrochemical cell having a second electrolyte that is different from the first electrolyte, and, therefore, may provide a means for integrating two separate electrolytes each tailored specifically for selected anode and cathode compositions FIG. 10E provides a schematic diagram providing a cross sectional view of an electrochemical cell having a separator wherein the conductive side of the separator next to the anode reduces anode loss; e.g., by stopping the dendrite growth, reducing anode loss such as in mossy deposition and stop the passage of cathode materials to the anode upon cycling which breaks the electronic contact between anode particles and the current collector and deteriorate the performance of the electrochemical cell. For example, the conductive side next to the cathode increases the electronic conductivity of the cathode which can result in longer life cycle, higher power and thicker cathode, and higher energy cathode and thus a better electrochemical cell. The electrochemical cell comprises an anode, such as a lithium anode; a cathode, such as a $LiFePO_4$, $LiCoO_2$ cathode; a separator system comprising two high mechanical strength layers having complementary patterns of apertures, three low ionic resistance layers; and a mechanically, chemically and heat resistant ionic conductive layer such as a carbon black layer. The overall electrochemical cell geometry in FIG. 10C is similar to that shown in FIGS. 10B, 10C and 10D, wherein a first low ionic resistance layer, such as a very porous layer (e.g., ≥80%), is provided between the anode and a first high mechanical strength layer and a second low ionic resistance layer, such as a very porous layer (e.g., ≥80%), is provided between the first high mechanical strength layer and a second high mechanical strength layer, and a third low ionic resistance layer, such as a very porous layer (e.g., ≥80%), is provided between the second high mechanical strength layer and the cathode. In the electrochemical cell of FIG. 10D, however, a first high mechanical strength layer comprises a perforated metal layer and a second high mechanical strength layer comprises a perforated electronically insulating layer, such as a perforated Kapton layer. In this embodiment, the perforated metal layer and the perforated Kapton layer have complementary patterns of apertures to prevent dendrite growth. In addition, a mechanically, chemically and heat resistant ionic conductive carbon black layer is provided adjacent to, and optionally in electrical contact and/or physical contact with, the cathode.

Figure 10F:
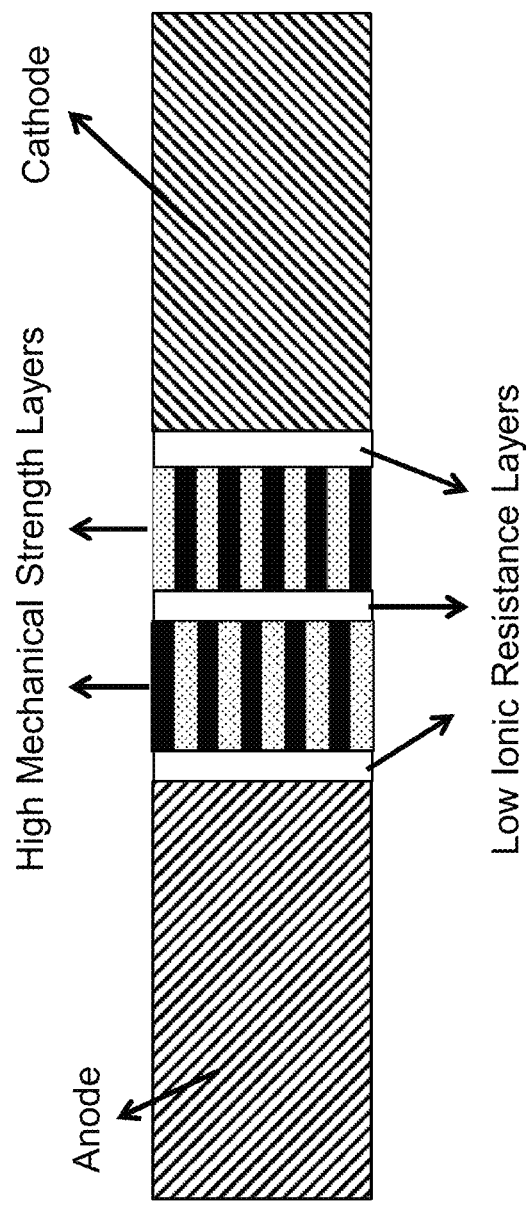
FIG. 10F provides a schematic diagram providing a cross sectional view of an electrochemical cell comprising an anode (e.g., silicon, Li, Zn, ZnO, Graphite, LTO), a cathode (e.g., LiFePO4, LiCoO2, Sulfur, Ag), and having a separator wherein the perforated separator plates and the porous layers act as a separator by providing electronic insulation between the electrodes, yet providing ionic connection between the electrodes via a fluid electrolyte (aqueous or aprotic). The high mechanical strength layer is optionally a chemically resistant and thermally stable, electronic insulating (e.g., perforated metal) layer that can also be coated with PE or PP, and the holes may be filled with a solid electrolyte such as PVDF, Nafion, LISICON or PEO. The low ionic resistance layer may be very porous (e.g., greater than or equal to 80% porosity (e.g., PE)).

FIG. 10F provides a schematic diagram providing a cross sectional view of an electrochemical cell having a separator wherein the perforated separator plates and the porous layers act as a separator by providing electronic insulation between the electrodes, yet providing ionic connection between the electrodes via a fluid electrolyte (aqueous or aprotic). The electrochemical cell comprises an anode, such as a silicon, Li, Zn, ZnO, Graphite or LTO anode; a cathode, such as a $LiFePO_4$, $LiCoO_2$, Sulfur, or Ag cathode; and a separator system comprising two high mechanical strength layers having complementary patterns of apertures and three low ionic resistance layers. As shown in FIG. 10F, a first low ionic resistance layer, such as a very porous layer (e.g., ≥80%), is provided between the anode and a first high mechanical strength layer and a second low ionic resistance layer, such as a very porous layer (e.g., ≥80%), is provided between the first high mechanical strength layer and a second high mechanical strength layer, and a third low ionic resistance layer, such as a very porous layer (e.g., ≥80%), is provided between the second high mechanical strength layer and the cathode. In the electrochemical cell of FIG. 10F, first and second high mechanical strength layers independently comprise a mechanically, chemically and heat resistant electronically insulating layers, such as perforated metal layers having one or more insulating coatings such as a PE or PP coating.

Figure 10G:
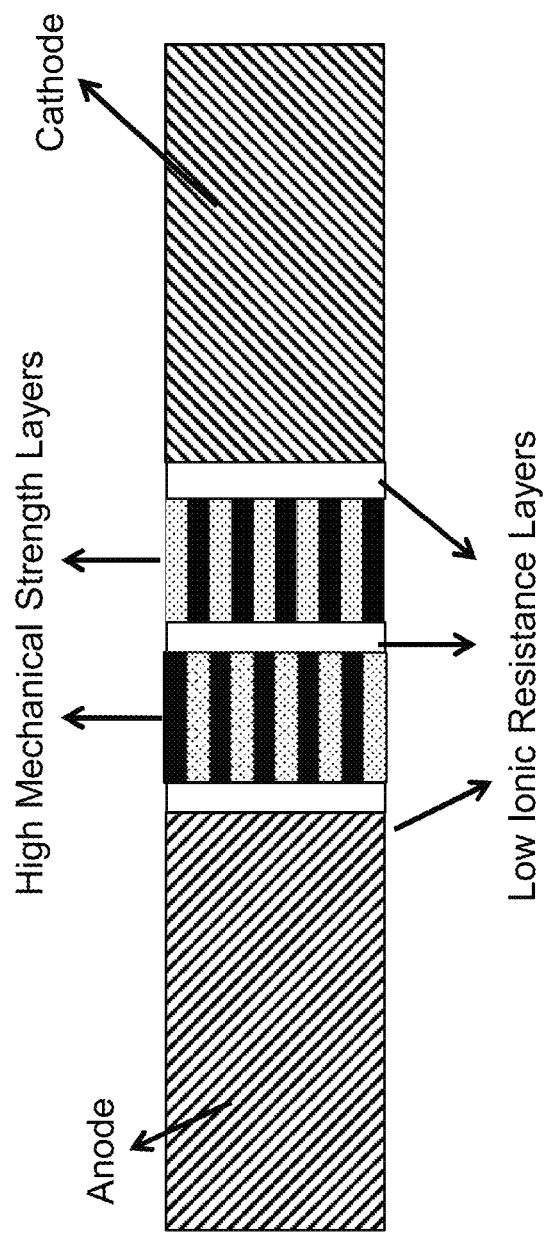
FIG. 10G provides a schematic diagram providing a cross sectional view of an electrochemical cell comprising an anode (e.g., silicon, Li, Zn, ZnO, Graphite, LTO), a cathode (e.g., LiFePO4, LiCoO2, Sulfur, Ag), and having a separator wherein shape memory effect of the two high mechanical strength layers results in a very good mechanical contact between the separator and the electrodes. The high mechanical strength layer is optionally a chemically resistant and thermally stable, electronic insulating layer with shape memory effect (e.g., perforated Nitonol that can be coated with PE or PP); the low ionic resistance layer may be very porous (e.g., greater than or equal to 80% porosity (e.g., PE)).

FIG. 10G provides a schematic diagram providing a cross sectional view of an electrochemical cell having a separator wherein shape memory effect of the two high mechanical strength layers results in a very good mechanical contact between the separator and the electrodes. The electrochemical cell comprises an anode, such as a silicon, Li, Zn, ZnO, Graphite or LTO anode; a cathode, such as a $LiFePO_4$, $LiCoO_2$, Sulfur, or Ag cathode; and a separator system comprising two high mechanical strength layers having complementary patterns of apertures and three low ionic resistance layers. The overall electrochemical cell geometry in FIG. 10G is similar to that shown in FIG. 10F, wherein a first low ionic resistance layer, such as a very porous layer (e.g., ≥80%), is provided between the anode and a first high mechanical strength layer and a second low ionic resistance layer, such as a very porous layer (e.g., ≥80%), is provided between the first high mechanical strength layer and a second high mechanical strength layer, and a third low ionic resistance layer, such as a very porous layer (e.g., ≥80%), is provided between the second high mechanical strength layer and the cathode. In the electrochemical cell of FIG. 10G, however, first and second high mechanical strength layers independently comprise a mechanically, chemically and heat resistant electronically insulating layers exhibiting a shape memory effect, such as perforated Nitnonol layers that are optionally coated with PE or PP.

Figure 10H:
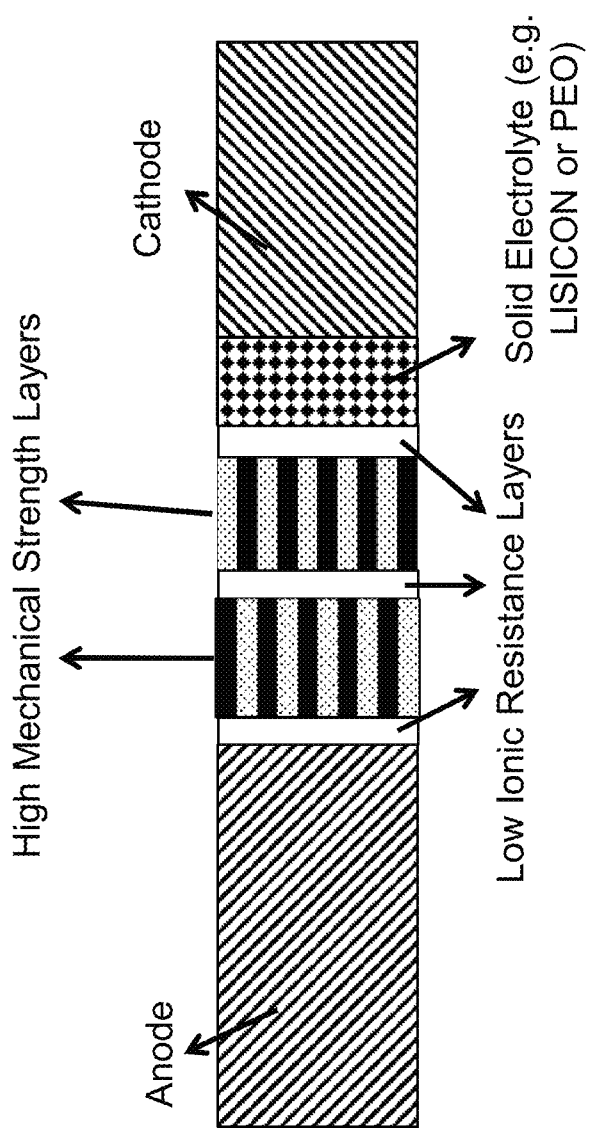
FIG. 10H provides a schematic diagram providing a cross sectional view of an electrochemical cell comprising an anode (e.g., silicon, Li, Zn, ZnO, Graphite, LTO), a cathode (e.g., LiFePO4, LiCoO2, Sulfur, Ag, Carbon-Air, Carbon-Water), and having a separator wherein the super elasticity and/or shape memory effect of the two high mechanical strength layers results in a very good mechanical contact between the separator and the electrodes. The high mechanical strength layer is optionally a chemically resistant and thermally stable, electronic insulating layer with super-elasticity or shape memory effect (e.g., perforated Nitonol that can be coated with PE or PP). The low ionic resistance layer may be very porous (e.g., greater than or equal to 80% porosity (e.g., PE)).
Figure 10I:
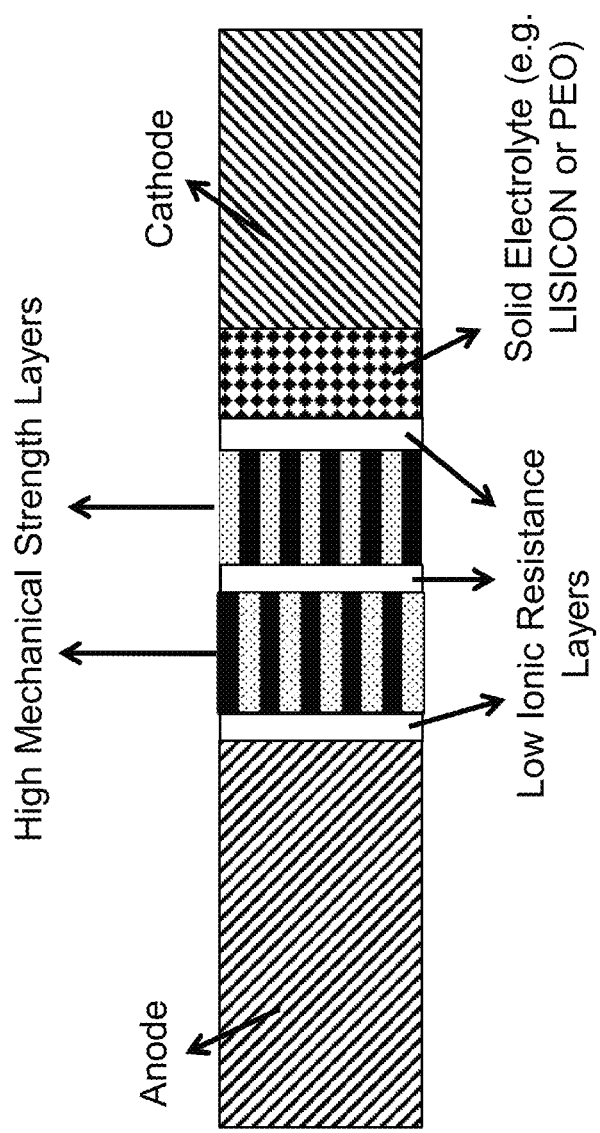
FIG. 10I provides a schematic diagram providing a cross sectional view of an electrochemical cell comprising an anode (e.g., silicon, Li, Zn, ZnO, Graphite, LTO), a cathode (e.g., LiFePO4, LiCoO2, Sulfur, Ag, Carbon-Air, Carbon-Water), and having a separator wherein the super elasticity and/or shape memory effect of two high mechanical strength layers results in a very good mechanical contact between the separator and the electrodes. The high mechanical strength layer is optionally a chemically resistant and thermally stable, electronically insulating layer with super-elasticity or shape memory effect (e.g., perforated shape memory polymer). The low ionic resistance layer may be very porous (e.g., greater than or equal to 80% porosity (e.g., PE)).

FIG. 10H provides a schematic diagram providing a cross sectional view of an electrochemical cell having a separator wherein the super elasticity and/or shape memory effect of the two high mechanical strength layers results in a very good mechanical contact between the separator and the electrodes. In an embodiment, of this aspect for example, enhanced electrical contact is provided between the solid electrolyte and the cathode. The electrochemical cell comprises a anode such as a silicon, Li, Zn, ZnO, Graphite or LTO anode; a cathode such as a $LiFePO_4$, $LiCoO_2$, Sulfur, Ag, Carbon-Air, Carbon-Water cathode; a separator system comprising two high mechanical strength layers having complementary patterns of apertures, three low ionic resistance layers; and a solid electrolyte layer, such as a LISICON or PEO (polyethylene oxide) layer. The overall electrochemical cell geometry in FIG. 10H is similar to that shown in FIGS. 10B, 10C and 10D, wherein a first low ionic resistance layer, such as a very porous layer (e.g., ≥80%), is provided between the anode and a first high mechanical strength layer and a second low ionic resistance layer, such as a very porous layer (e.g., ≥80%), is provided between the first high mechanical strength layer and a second high mechanical strength layer, and a third low ionic resistance layer, such as a very porous layer (e.g., ≥80%), is provided between the second high mechanical strength layer and the cathode, and wherein a solid electrolyte layer, such as a LISICON or PEO layer, is provided between the third low ionic resistance layer and the cathode such that ions are able to be transported to the cathode surface. In the electrochemical cell of FIG. 10H, however, the high mechanical strength layers are mechanically, chemically and heat resistant electronically insulating layers with super-elasticity or shape memory effect such as perforated Nitonol layers that may optionally be coated with PE or PP. Similar to the discussion in connection with FIG. 10B, incorporation of the solid electrolyte layer (e.g., LISICON or PEO layer) is useful to protect the cathode, for example, to protect against unwanted chemical reactions with the cathode surface and components of the electrochemical cell, such as electrolyte components other than the solid electrolyte. In some embodiments, the solid electrolyte layer (e.g., LISICON layer) provides a chemical barrier layer separating a first side of the electrochemical cell having a first electrolyte from a second side of the electrochemical cell having a second electrolyte that is different from the first electrolyte, and, therefore, may provide a means for integrating two separate electrolytes each tailored specifically for selected anode and cathode compositions FIG. 10I provides a schematic diagram providing a cross sectional view of an electrochemical cell having a separator wherein the super elasticity and/or shape memory effect of two high mechanical strength layers results in a very good mechanical contact between the separator and the electrodes. In an embodiment of this aspect, for example, enhanced electrical contact is provided between the solid electrolyte and the cathode. The electrochemical cell comprises an anode such as a silicon, Li, Zn, ZnO, Graphite, or LTO anode; a cathode such as a $LiFePO_4$, $LiCoO_2$, Sulfur, Ag, Carbon-Air, Carbon-Water cathode; a separator system comprising two high mechanical strength layers having complementary patterns of apertures, three low ionic resistance layers; and a solid electrolyte layer, such as a LISICON or PEO layer. The overall electrochemical cell geometry in FIG. 10I is similar to that shown in FIGS. 10B, 10C and 10D, wherein a first low ionic resistance layer, such as a very porous layer (e.g., ≥80%), is provided between the anode and a first high mechanical strength layer and a second low ionic resistance layer, such as a very porous layer (e.g., ≥80%), is provided between the first high mechanical strength layer and a second high mechanical strength layer, and a third low ionic resistance layer, such as a very porous layer (e.g., ≥80%), is provided between the second high mechanical strength layer and the cathode, and wherein a solid electrolyte layer, such as a LISICON layer, is provided between the third low ionic resistance layer and the cathode such that ions are able to be transported to the cathode surface. In the electrochemical cell of FIG. 10I, however, the high mechanical strength layers are mechanically, chemically and heat resistant electronically insulating layers exhibiting a super-elasticity and/or shape memory effect such as a perforated shape memory polymer layer. Similar to the discussion in connection with FIG. 10B, incorporation of the solid electrolyte layer (e.g., LISICON or PEO layer) is useful to protect the cathode, for example, to protect against unwanted chemical reactions with the cathode surface and components of the electrochemical cell, such as electrolyte components other than the solid electrolyte. In some embodiments, the solid electrolyte layer (e.g., LIS ICON or PEO layer) provides a chemical barrier layer separating a first side of the electrochemical cell having a first electrolyte from a second side of the electrochemical cell having a second electrolyte that is different from the first electrolyte, and, therefore, may provide a means for integrating two separate electrolytes each tailored specifically for selected anode and cathode compositions.

Figure 10J:
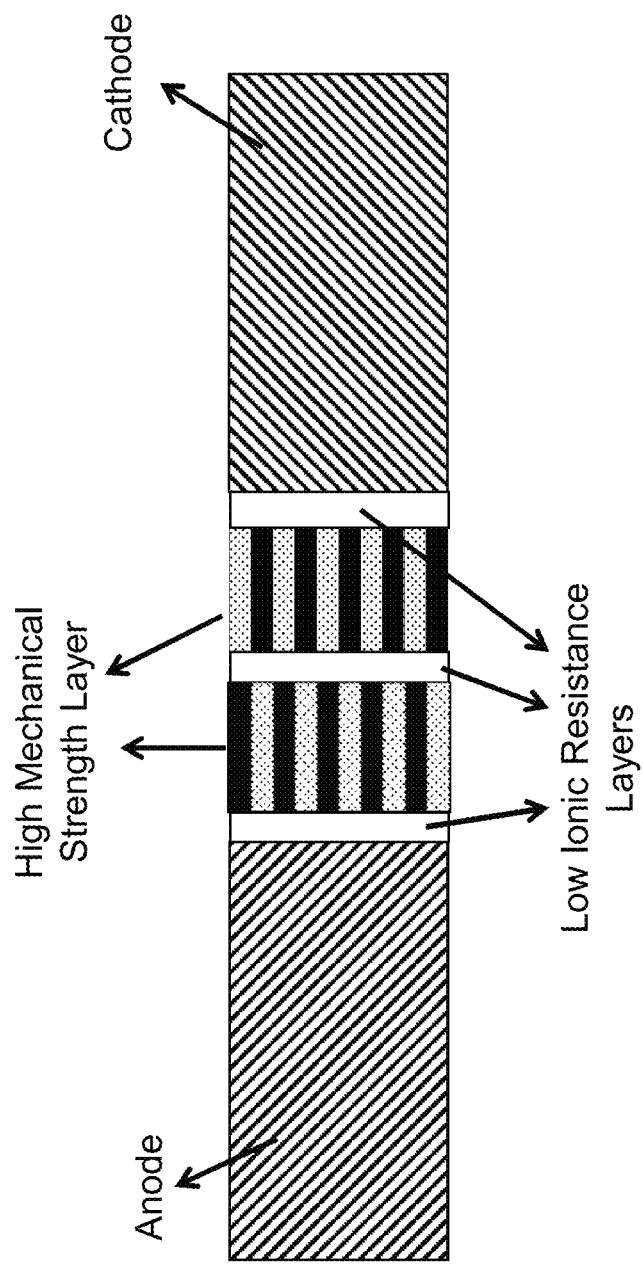
FIG. 10J provides a schematic diagram providing a cross sectional view of an electrochemical cell comprising an anode (e.g., silicon), a cathode (e.g., LiFePO4, LiCoO2), and having a separator wherein the conductive side of the separator reduces anode loss such as in silicon large deformations upon cycling which breaks the electronic contact between anode particles and the current collector and deteriorate the performance of the electrochemical cell. The high mechanical strength layer is optionally a chemically resistant and thermally stable, electronically and ionically conductive layer (e.g., perforated metal), or an electronically insulating perforated layer (e.g., Kapton). The low ionic resistance layer may be very porous (e.g., greater than or equal to 80% porosity (e.g., PE)).

FIG. 10J provides a schematic diagram providing a cross sectional view of an electrochemical cell having a separator wherein the conductive side of the separator reduces anode loss such as in silicon large deformations upon cycling which breaks the electronic contact between anode particles and the current collector and deteriorate the performance of the electrochemical cell. The electrochemical cell comprises an anode, such as a silicon anode; a cathode, such as a LiFePO$_4$ or LiCoO$_2$ cathode; and a separator system comprising two high mechanical strength layers having complementary patterns of apertures and three low ionic resistance layers. The overall electrochemical cell geometry in FIG. 10J is similar to that shown in FIG. 10F, wherein a first low ionic resistance layer, such as a very porous layer (e.g., ≥80%), is provided between the anode and a first high mechanical strength layer and a second low ionic resistance layer, such as a very porous layer (e.g., ≥80%), is provided between the first high mechanical strength layer and a second high mechanical strength layer, and a third low ionic resistance layer, such as a very porous layer (e.g., ≥80%), is provided between the second high mechanical strength layer and the cathode. In the electrochemical cell of FIG. 10J, however, the first high mechanical strength layer comprises a mechanically, chemically and heat resistant ionically conductive and electrically conductive layer positioned proximate to the anode, such as a perforated metal layer; and the second high mechanical strength layer comprises a mechanically, chemically and heat resistant nonconductive perforated layer positioned proximate to the cathode, such as a perforated Kapton layer.

Figure 10K:
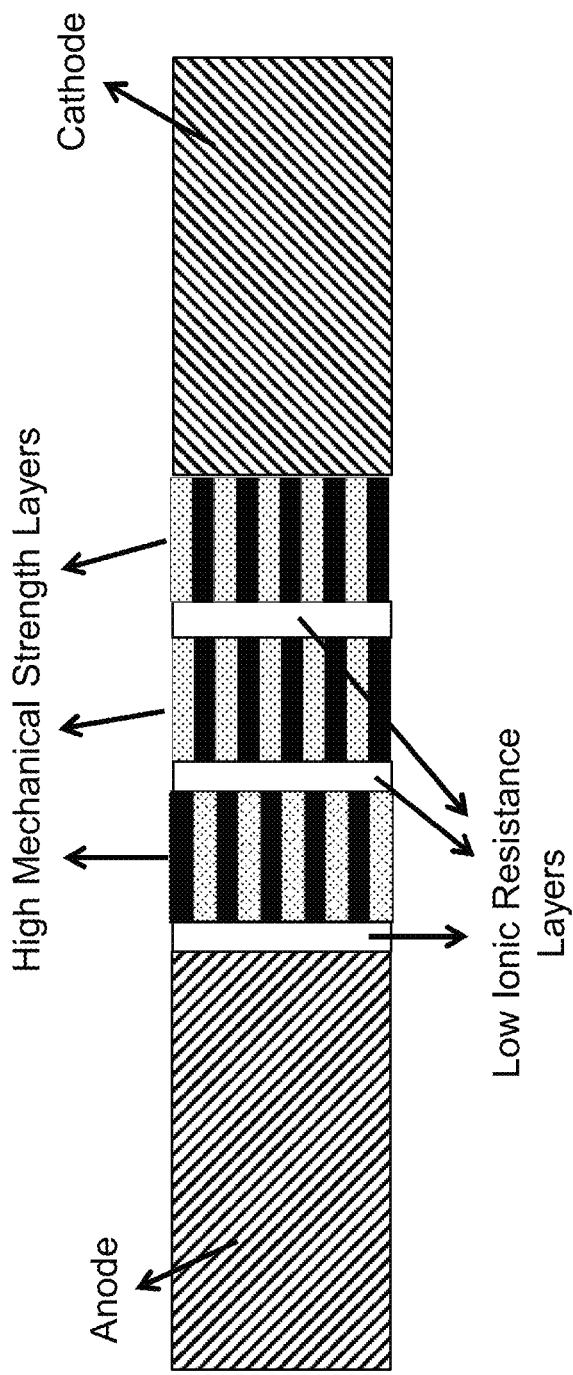
FIG. 10K provides a schematic diagram providing a cross sectional view of an electrochemical cell comprising an anode (e.g., silicon), a cathode (e.g., LiFePO4, LiCoO2), and having a separator wherein the conductive side of the separator next to the anode reduces anode loss such as in silicon large deformations upon cycling which breaks the electronic contact between anode particles and the current collector and deteriorate the performance of the electrochemical cell. The high mechanical strength layer is optionally a chemically resistant and thermally stable, electronic conductive layer (e.g., perforated metal), or an ionic conductive, electronically insulating perforated layer (e.g., Kapton). The low ionic resistance layer may be very porous (e.g., greater than or equal to 80% porosity (e.g., PE)).

FIG. 10K provides a schematic diagram providing a cross sectional view of an electrochemical cell having a separator wherein the conductive side of the separator next to the anode reduces anode loss such as in silicon large deformations upon cycling which breaks the electronic contact between anode particles and the current collector and deteriorate the performance of the electrochemical cell. In an embodiment of this aspect, the conductive side next to the cathode increases the electronic conductivity of the cathode which can result in longer life cycle, higher power and thicker cathode, and higher energy cathode and thus a better electrochemical cell. The electrochemical cell comprises an anode, such as a silicon anode; a cathode, such as a LiFePO$_4$ or LiCoO$_2$ cathode; and a separator system comprising three high mechanical strength layers having complementary patterns of apertures and three low ionic resistance layers. As shown in FIG. 10K a first low ionic resistance layer, such as a very porous layer (e.g., ≥80%), is provided between the anode and a first high mechanical strength layer, a second low ionic resistance layer, such as a very porous layer (e.g., ≥80%), is provided between the first high mechanical strength layer and a second high mechanical strength layer, a third low ionic resistance layer, such as a very porous layer (e.g., ≥80%), is provided between the second and third high mechanical strength layers. In the electrochemical cell of FIG. 10K, the first and third high mechanical strength layers positioned proximate to anode and cathode, respectively, comprises a mechanically, chemically and heat resistant layers, such as a perforated metal layers; and the second high mechanical strength layer provide between the first and second high mechanical strength layers comprises a mechanically, chemically and heat resistant electronically insulating and ionically conductive layer, such as a perforated Kapton layer.

Figure 10L:
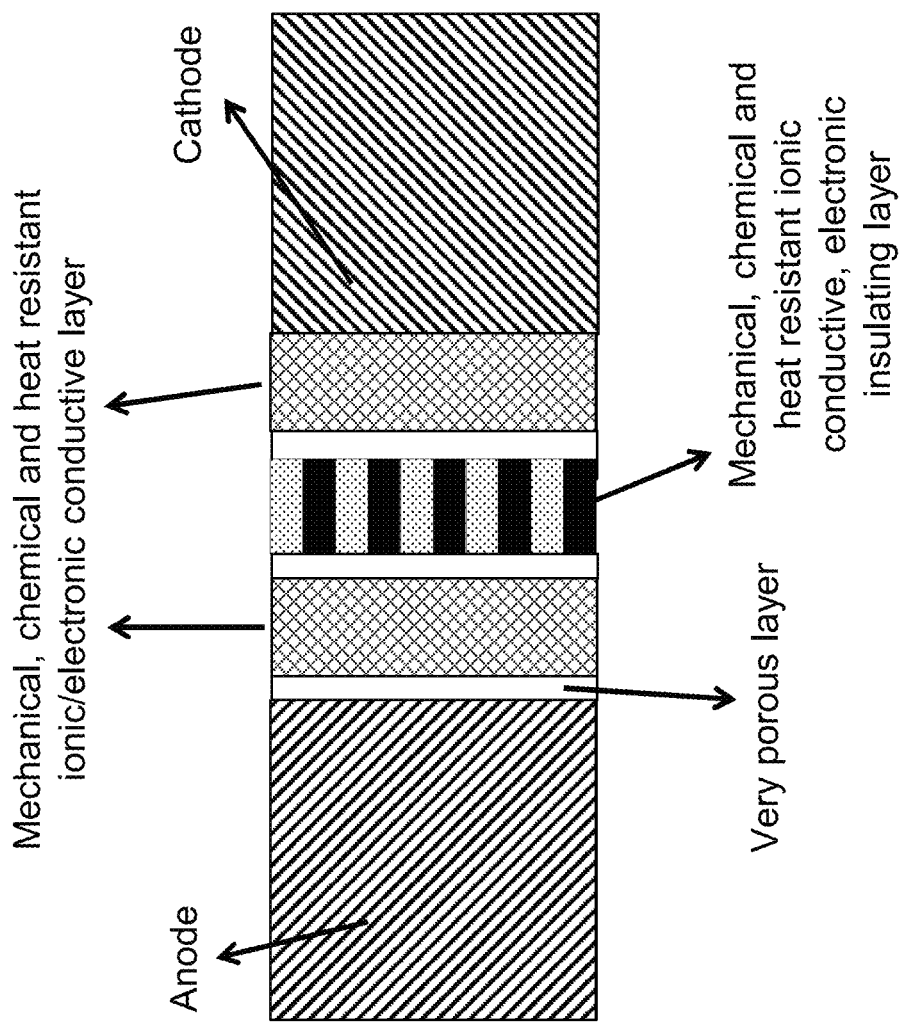
FIG. 10L provides a schematic diagram providing a cross sectional view of an electrochemical cell comprising an anode (e.g., silicon), a cathode (e.g., LiFePO4, LiCoO2), two mechanical, chemical and heat resistant ionic/electronic conductive layers (e.g., carbon black), a mechanical, chemical and heat resistant ionic conductive, electronic insulating layer (e.g., PE or PP or perforated Kapton), and a very porous layer (e.g., 80% porosity (e.g., PE).

FIG. 10L provides a schematic diagram providing a cross sectional view of an electrochemical cell embodiment having a mechanically, chemically and/or heat resistant layer that is ionically and electronically conductive positioned adjacent to the cathode. The electrochemical cell of this embodiment comprises an anode, such as a silicon anode; a cathode, such as a LiFePO$_4$ or LiCoO$_2$; and a series of layers including a pair of very porous layers, such as 80% porous PE layers, a mechanically, chemically, and/or heat resistant layer that is electronically and ionically conductive, such as carbon black, and a mechanically, chemically and/or heat resistant layer that is ionically conductive but electronically insulating, e.g., PE, PP or perforated Kapton. The use of a mechanically, chemically and/or heat resistant layer that is ionically and electronically conductive positioned adjacent to the positive electrode permits use of cathode materials that expand and contract during charging/discharging, as a secondary conductivity path for current collection is provided by this layer which may route electrons to the cathode current collector.

Figure 10M:
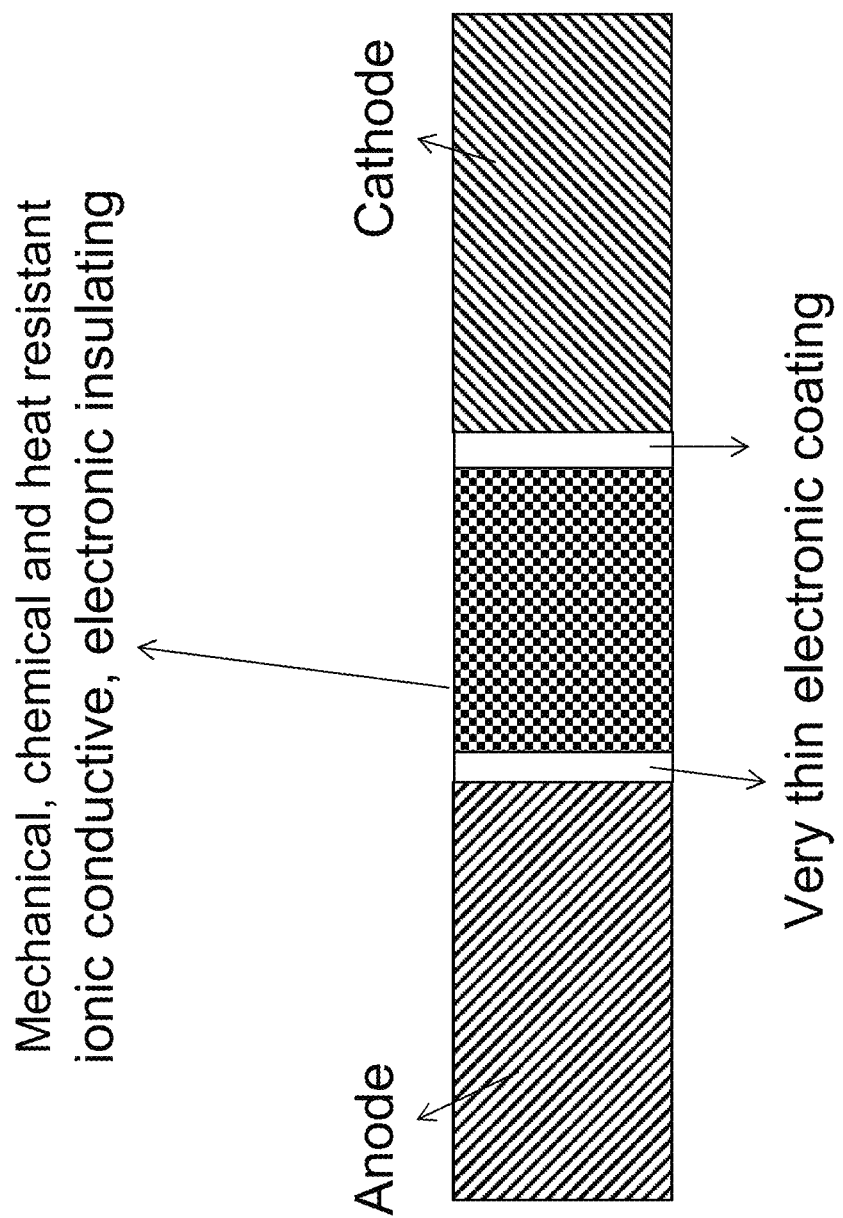
FIG. 10M provides a schematic diagram providing a cross sectional view of an electrochemical cell comprising an anode (e.g., silicon, Li, zinc, zinc-oxide, LTO, Graphite, Na, Mg, Sn, Cd, Pb, PbO2), a cathode (e.g., LiFePO4, LiCoO2, Sulfur, FeS, V2O5, LVO, Carbon-air, Carbon-water, silver, silveroxide, Ni, Pb, PbO2, carbon), a mechanical, chemical and heat resistant ionic conductive, electronic insulating layer (e.g., PE, PP, Kapton, fibrous cellulose), and two very thin electronic coating layers that can be done on the electrode or on the separator or both (e.g., 5 nm thick carbon black).

FIG. 10M provides a schematic diagram providing a cross sectional view of an electrochemical cell embodiment. The electrochemical cell of this embodiment comprises an anode, such as a silicon, Li, zinc, zinc-oxide, LTO, graphite, Na, Mg, Sn, Cd, Pb or PbO$_2$ anode; a cathode, such as a LiFePO$_4$, LiCoO$_2$, sulfur, FeS, V$_2$O$_5$, LVO, Carbon-air, carbon-water, silver, silver oxide, Ni, Pb, PbO$_2$ or carbon; a mechanically, chemically, and/or heat resistant separator layer that is ionically conductive but electronically insulating, such as PE, PP, Kapton or fibrous cellulose; and a pair of thin electronically conductive coatings, that are optionally provided on the cathode surface, the anode surface and/or an outside surface of the separator, such as a 5 nm layer of carbon black. The use of thin electronically conductive coating adjacent to one or both electrodes enables a secondary conductivity path for current collection by this layer which may route electrons to the cathode or anode current collector. The conductive layer on the outside of the electrode reduces capacity loss such as in silicon where large deformations upon cycling can break the electronic contact between electrode active particles and the current collector and deteriorate the performance of the electrochemical cell. At the same time, the conductive coating (such as nanometers thick carbon black) is ionic conductive and allows easy passage of ions, such as Li ions.

Figure 10N:
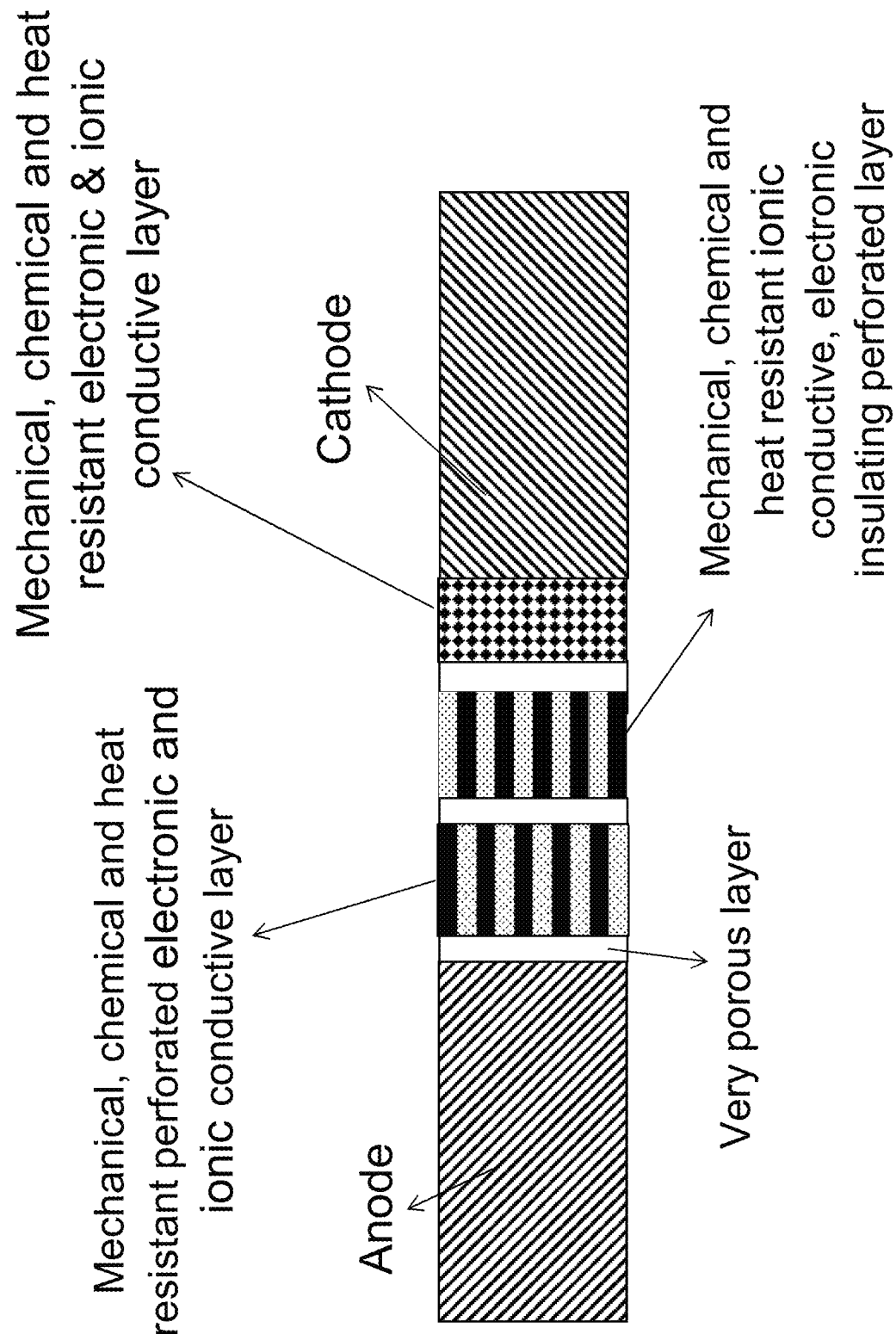
FIG. 10N provides a schematic diagram providing a cross sectional view of an electrochemical cell comprising an anode (e.g., Lithium), a cathode (e.g., LiFePO4, LiCoO2), a mechanical, chemical and heat resistant electronic and ionic conductive layer (e.g., perforated metal), a mechanical, chemical and heat resistant ionic conductive, electronic insulating perforated layer (e.g., Kapton), a mechanical, chemical and heat resistant electronic and ionic conductive layer (e.g., carbon black), and three very porous layers (e.g., 80% porosity, e.g., PE).

FIG. 10N provides a schematic diagram providing a cross sectional view of an electrochemical cell embodiment. The electrochemical cell of this embodiment comprises an anode, such as lithium; one or more porous layers, such as 80% porous PE; a mechanically, chemically, and/or heat resistant layer that is electronically and ionically conductive, such as a perforated metal; a mechanically, chemically and/or heat resistant layer that is ionically conductive but electronically insulating, such as a perforated Kapton layer; a mechanically, chemically and/or heat resistant layer that is electronically and ionically conductive, such as carbon black; and a cathode, such as $LiFePO_4$ or $LiCoO_2$. The conductive material proximate to the anode reduces anode loss, for example, by stopping the dendrite growth, reducing anode loss such as in mossy deposition and stopping the passage of cathode materials to the anode upon cycling which breaks the electronic contact between anode particles and the current collector, thus deteriorating the performance of the electrochemical cell. The conductive material proximate to the cathode increases the electronic conductivity of the cathode which can result in longer life cycle, higher power and thicker cathode, and higher energy cathode and, thus, a better electrochemical cell.

Figure 10O:
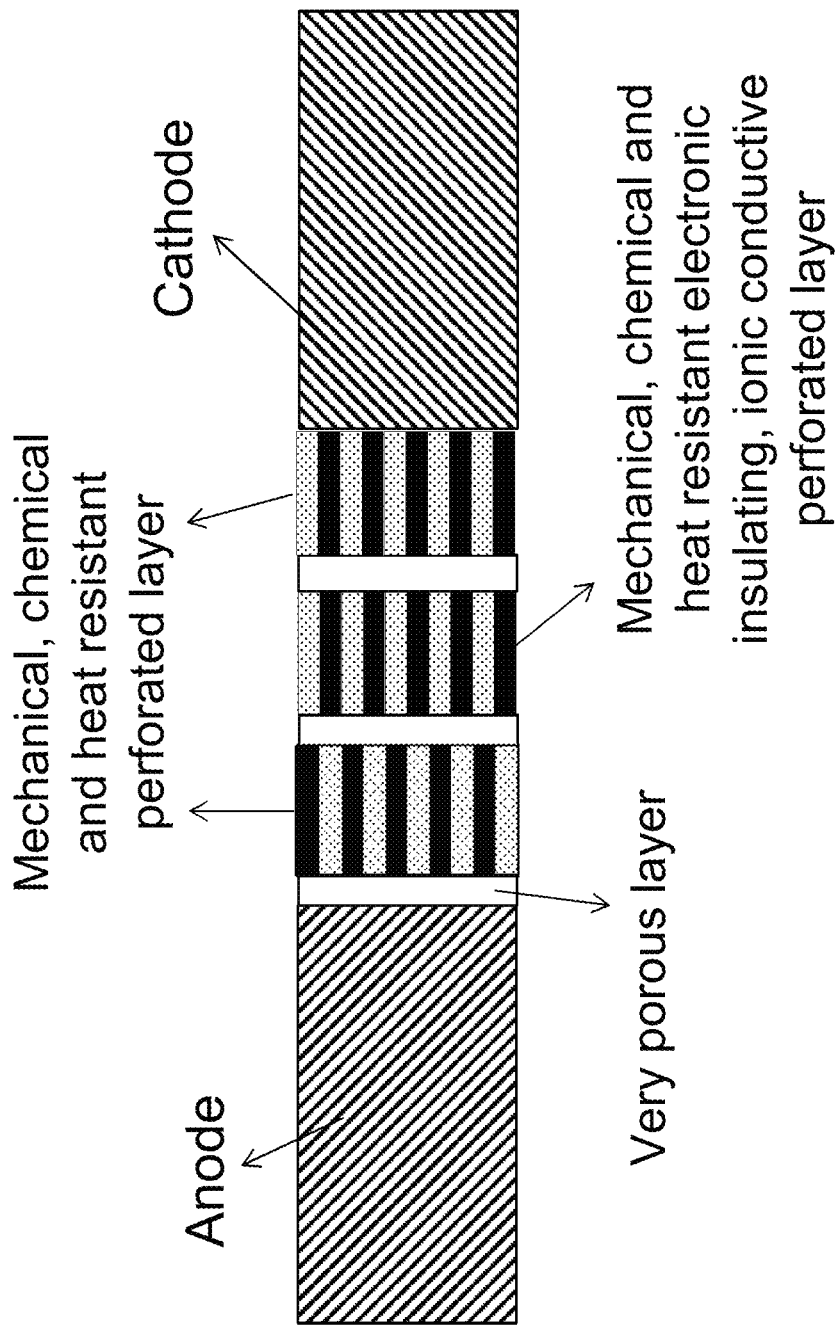
FIG. 10O provides a schematic diagram providing a cross sectional view of an electrochemical cell comprising an anode (e.g., silicon), a cathode (e.g., LiFePO4, LiCoO2), a mechanical, two chemical and heat resistant perforated layers (e.g., perforated metal), a mechanical, chemical and heat resistant electronic insulating, ionic conductive perforated layer (e.g., Kapton), and three very porous layers (e.g., 80% porosity, e.g., PE).

FIG. 10O provides a schematic diagram providing a cross sectional view of an electrochemical cell embodiment. The electrochemical cell of this embodiment comprises an anode, such as silicon; one or more porous layers, such as 80% porous PE; at least mechanically, chemically, and/or heat resistant layer that is electronically and ionically conductive, such as a perforated metal, positioned proximate to the anode and a cathode, optionally spaced by a porous layer; a mechanically, chemically and/or heat resistant layer that is ionically conductive but electronically insulating, such as a perforated Kapton layer; and a cathode, such as $LiFePO_4$ or $LiCoO_2$. The conductive material proximate the anode reduces anode loss, such as in silicon, where large deformations upon cycling breaks the electronic contact between anode particles and the current collector and deteriorates the performance of the electrochemical cell. The conductive side proximate to the cathode increases the electronic conductivity of the cathode which can result in longer life cycle, higher power and thicker cathode, and higher energy cathode and thus a better electrochemical cell.

Figure 10P:
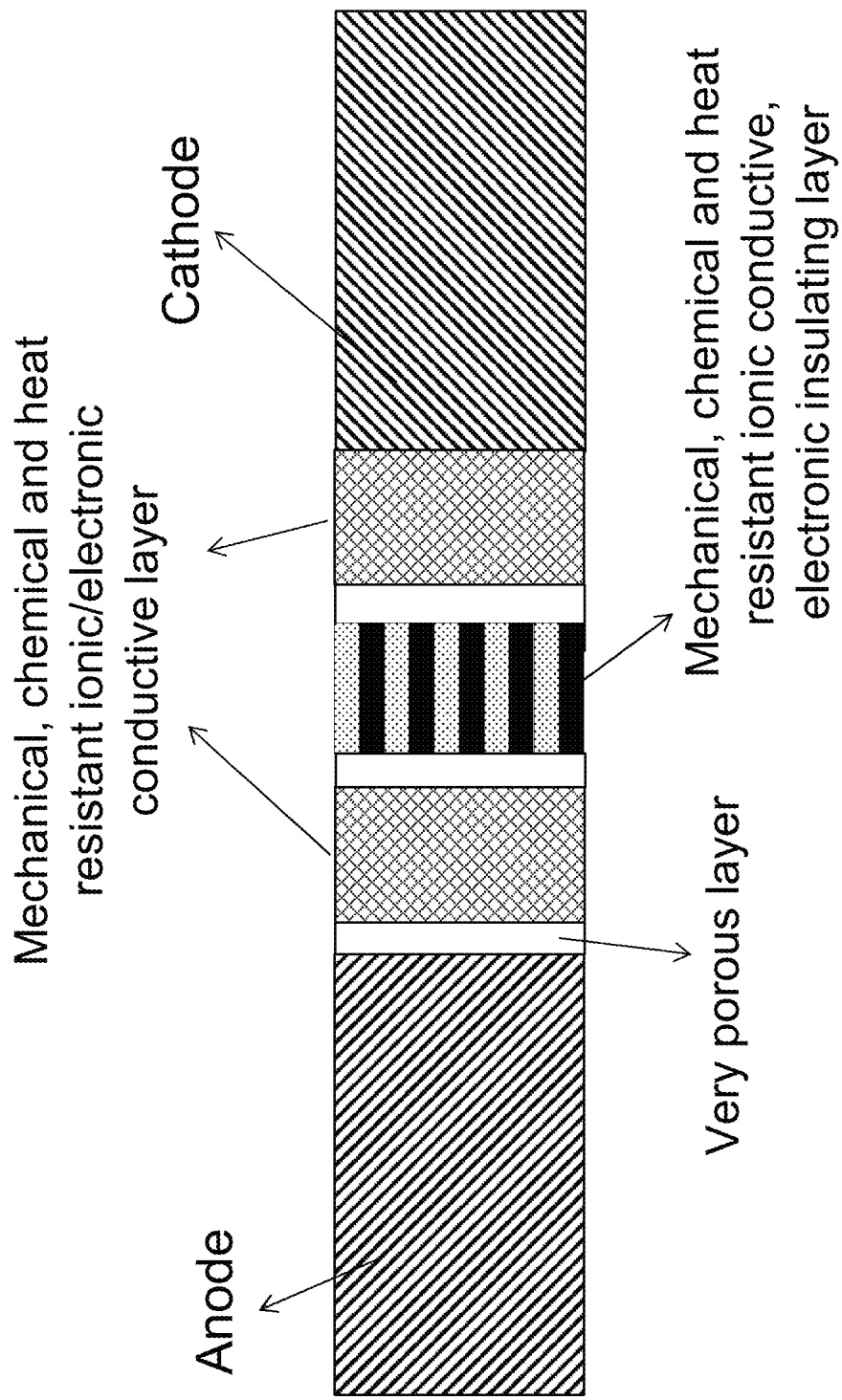
FIG. 10P provides a schematic diagram providing a cross sectional view of an electrochemical cell comprising an anode (e.g., silicon), a cathode, a mechanical, chemical and heat resistant ionic/electronic conductive layer (e.g., carbon black), a mechanical, chemical and heat resistant ionic conductive, electronic insulating layer (e.g., PE or PP or perforated Kapton), and three very porous layers (e.g., 80% porosity, e.g., PE).

FIG. 10P provides a schematic diagram providing a cross sectional view of an electrochemical cell embodiment. The electrochemical cell of this embodiment comprises an anode, such as silicon; one or more porous layers, such as 80% porous PE; at least two a mechanically, chemically, and/or heat resistant layers that are electronically and ionically conductive, such as a carbon black; a mechanically, chemically and/or heat resistant layer that is ionically conductive but electronically insulating, such as a perforated Kapton layer; and a cathode, such as $LiFePO_4$ or $LiCoO_2$. The conductive material proximate the anode reduces anode loss, such as in silicon, where large deformations upon cycling breaks the electronic contact between anode particles and the current collector and deteriorates the performance of the electrochemical cell. The conductive side proximate to the cathode increases the electronic conductivity of the cathode which can result in longer life cycle, higher power and thicker cathode, and higher energy cathode and thus a better electrochemical cell.

Figure 11A:
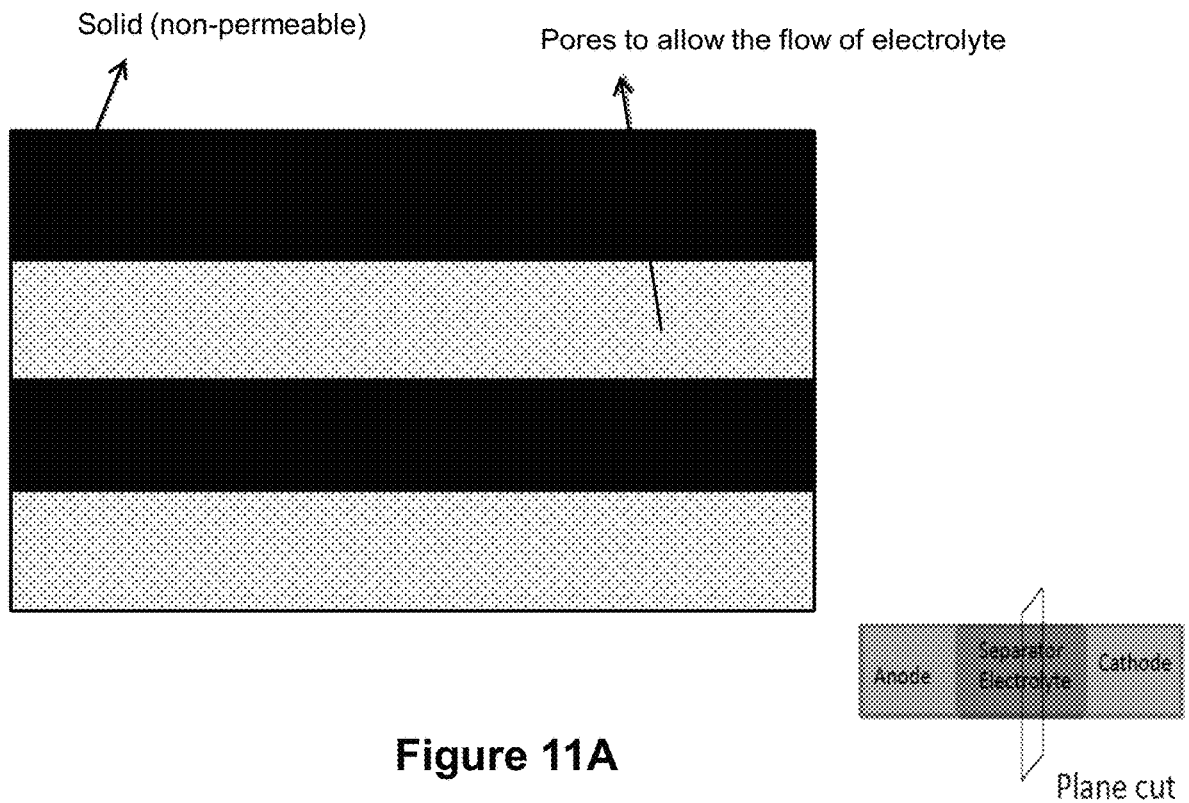
FIGS. 11A and 11B provide examples of the designs of porous, patterned layers of some separator systems of the invention. Each of FIGS. 11A and 11B shows an example of the design of the layer F. Layer R is the reverse of the design (holes and solids are interchanged with each other). The view corresponds to scutting the cell through layer F of the separator.
Figure 11B:
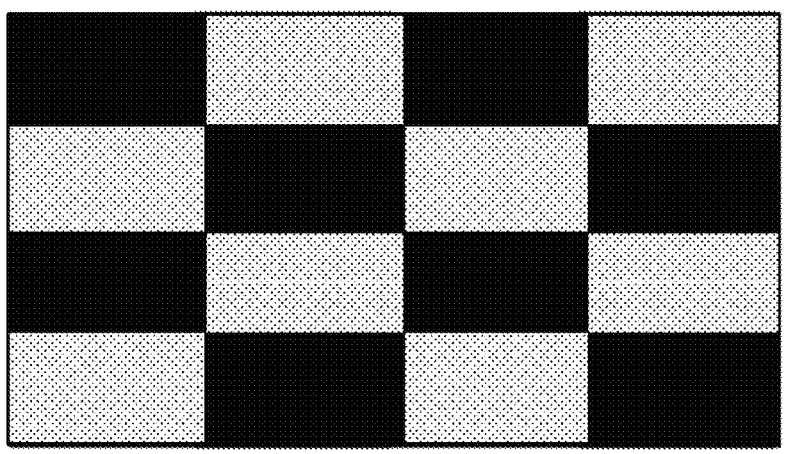

FIGS. 11A and 11B provide examples of the designs of porous, patterned layers of the some separator systems of the invention, such as layers F in FIGS. 2-10. In the embodiments shown in FIGS. 11A and 11B, for example, there are alternating porous regions (schematically shown as dotted regions) and solid regions (schematically shown as filled-in regions). In these embodiments, the layer(s) R may provide the reverse patterned of apertures of the designs of the layers F. In FIGS. 11A and 11B, the pattern is characterized by alternating rectangular porous regions and solid regions. Optionally, the apertures of some of the layers F or R are filled with a solid or gel electrolyte.

Example 2: High Performance Inexpensive Rechargeable Lithium Batteries: Engineering the Separator and Electrodes The highest energy batteries known so far use metals such as zinc and lithium, which are inexpensive, and have very high energy/power densities. Meanwhile, recharging these batteries poses major safety hazards. A requirement for mitigating the safety problems is very strong yet highly conductive separators that can resist dendrite formation, accidents and thermal runaway.

Using engineering methods in building separators and electrodes, the separator systems of this example provide a significant improvement of safety, durability, power and energy performance in a variety of battery chemistries. One approach of the invention is to apply engineering knowledge and methods to the most efficient chemistries used in the battery industry. As shown in this example, the invention provides manufacturing friendly methods to make ultra-safe, high-capacity separators. Coin cells tests made of commercial lithium metal, $LiFePO_4$ and the present separator systems demonstrate the separator conductivities are comparable to conventional Celgard separators, the mechanical strength of solids and a working temperature range of −40 to 200 Celsius. The separator systems of this example can be an essential part of Li-ion based super capacitors, Li-ion based flow batteries, Li-Sulfur, Li-air, Li-water, Zn batteries, Manganese batteries, Silicon anode batteries or Zn-air batteries.

A goal of certain aspects of the invention is to enhance rechargeability, safety and high cycle life of the existing non-rechargeable high-energy chemistries such as lithium metal and zinc batteries and silicon anode batteries and air cathode batteries and flow batteries and provide advanced electrochemical systems for high-energy rechargeable metal-air batteries which provide economic solutions to energy storage challenges, especially in utility-scale batteries.

Current state of the art lithium metal batteries are not rechargeable, mostly due to dendrite formation which may result in internal shorts and in fires and explosions. At the same time, silicon as a potential high-energy anode undergoes very large shape changes and loses its electronic contact with the current collector, unless one uses very expensive nano-silicone grown carefully in preferred directions (not scalable). Many different electrolytes and additives have been tested and failed to be useful in an industrial level system. Recently, various solid electrolytes have been introduced to enhance the safety, but they have orders of magnitude lower conductivity compared to liquid electrolyte-separator systems, and lose their performance after very few cycles due to fatigue, cracks and lost electrode-electrolyte contacts.

Using a novel and scalable process, aspects of the invention provide highly porous separator systems (e.g., greater than or equal to than $10^{-2}$ S/cm conductivity with liquid electrolyte, at room temperature) with mechanically rigid materials (e.g., more than 1 GPa elastic modulus, and temperature range of −200 to 400 Celsius) that resist the growth of dendrites. Embodiments of the present separator systems provide a new device architecture that enables high-energy, low-cost utility-scale batteries for a variety of chemistries. Embodiments of the present separator systems also provide accident safe transportation batteries. Experimental results indicate, for example, batteries integrating the present separator systems may achieve more than 5,000 cycles with no or minimal capacity loss. In addition, some of the separator systems are able to be readily implemented into casting and roll-to-roll processing methodologies, already used in current lithium battery manufacturing.

Figure 12:
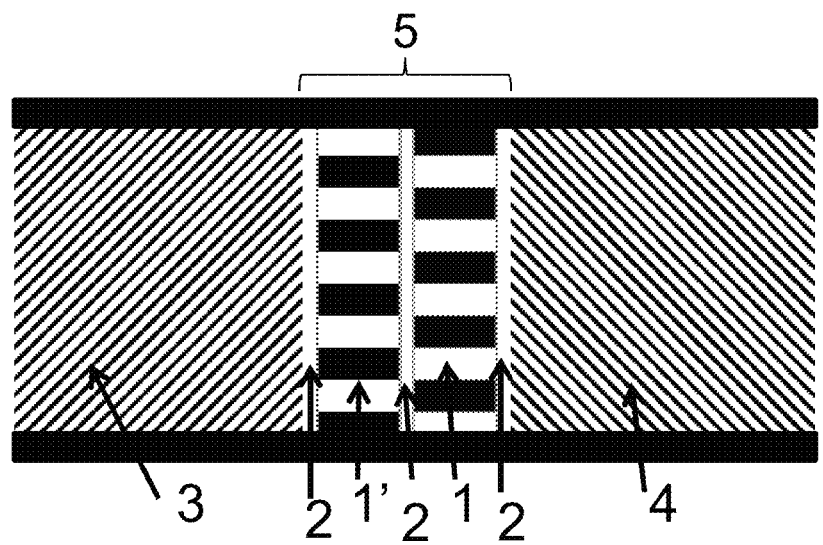
FIG. 12 provides a schematic diagram of a cross sectional view of an electrochemical cell including a separator system of the invention.
Figure 14:
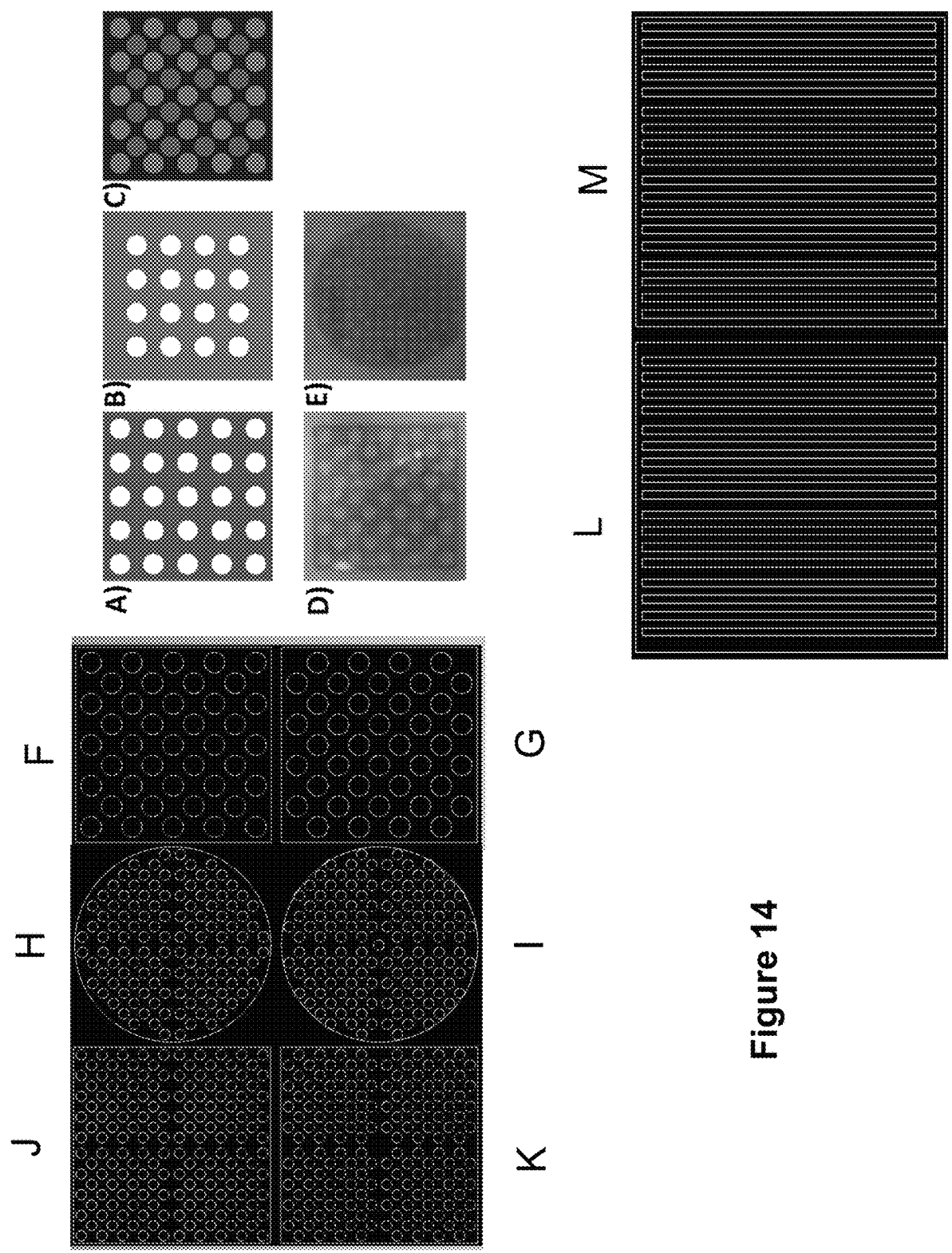
FIG. 14 (Panels A-M) provides examples of complementary patterns of apertures useful in the patterned high mechanical strength layers of separator systems of the invention.

An important feature of certain embodiments of the invention is a multilayer separator system that provides high conductivity and high safety at the same time. FIG. 12 provides a schematic diagram of a cross sectional view of an electrochemical cell including a separator system of the invention. As shown in FIG. 12, the electrochemical cell comprises anode (3) and cathode (4) separated from each other by a separator system (5). In this embodiment, the separator system (5) comprises a plurality of layers including perforated layers (1 and 1') comprising a strong material and having a pattern of apertures and frame and/or very porous layers (2). The high elastic modulus of the perforated layers of the separator material prevents dendrites from directly piercing the barrier. FIG. 14 provides examples of patterns of apertures useful in the perforated layers of separator systems of the invention. As shown in FIG. 14, perforated layers of the separator systems may have apertures with circular or rectangular shapes. FIG. 14 also illustrates complementary patterns for perforated layers useful for preventing dendrite growth, shorting and mechanical failure. For example, panels A and B provide complementary patterns of apertures which do not overlap when provided in the off-set alignment of certain separator systems. Panel C provides a schematic illustrating the superposition of the patterns in panels A and B showing that the off-set alignment results in no overlap of the apertures. Similarly, panels F and G provide complementary patterns of apertures which do not overlap when provided in the off-set alignment of certain separator systems. Similarly, panels H and I provide complementary patterns of apertures which do not overlap when provided in the off-set alignment of certain separator systems. Similarly, panels J and K provide complementary patterns of apertures which do not overlap when provided in the off-set alignment of certain separator systems. Similarly, panels L and M provide complementary patterns of rectangular apertures which do not overlap when provided in the off-set alignment of certain separator systems.

Figure 13:
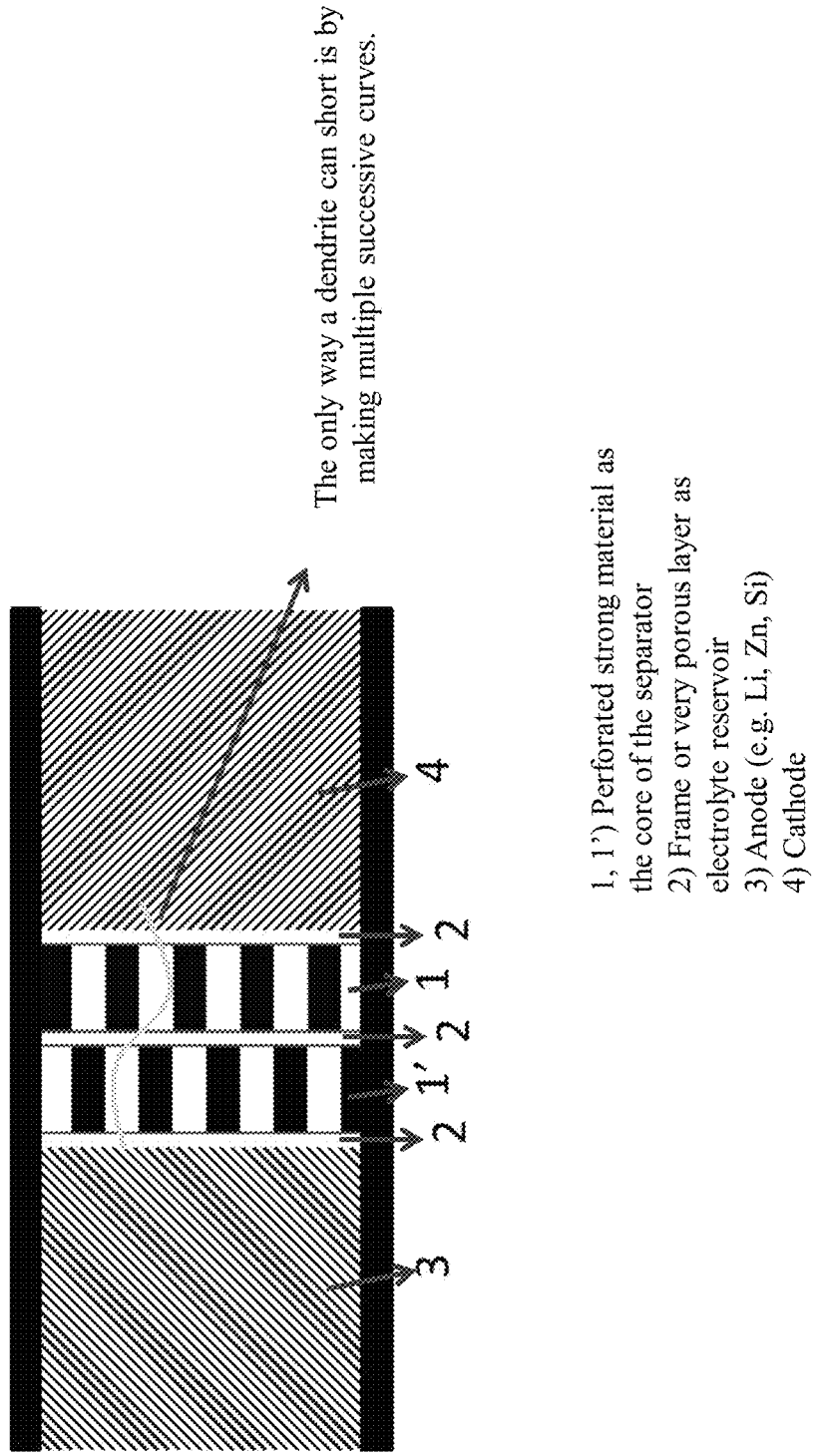
FIG. 13 provides a schematic diagram illustrating a required trajectory of dendrite growth in order to make a short in an electrochemical system of the invention.

The large number of apertures in the perforated layer ensures high conductivity of the separator and the offset alignment of the pores in the successive layers ensures that there is no direct path between the electrodes. The force from the high mechanical strength layers on the dendrites slows down or stops the dendrite growth. In an electrochemical cell this significantly improves the performance of the cell. FIG. 13 provides a schematic diagram illustrating a required trajectory of dendrite growth to make a short in an electrochemical system of the invention. In this figure, the dendrite is shown as a curved line extending from anode to cathode. As shown in FIG. 13, dendrites would have to make several curvatures to pass through the perforated layers and create a short. From a strictly mechanical view, the elastic modulus of lithium (5 GPa) is too high to allow successive curvatures of dendrites in a small length (less than 0.1 mm); the required energy to bend a straight beam is $U=\int_0^L EI/R^2 dx$, where E is the elastic modulus, I is the moment of inertia, and R(x) is the radius of the curvature at each point, finally, L is the length of the element. From a chemical engineering standpoint, the dendrites have too much kinetic frustration to overcome such a convoluted growth path. Additionally, the resistive pressure of the solid components of the high mechanical strength layers slows down and can even stop dendrite growth. The layered separator system including perforated layers having complementary patterns of apertures effectively prevents dendrite growth and therefore prevents shorts. The materials and fabrication methods necessary for such a composite separator system are compatible with the present battery fabrication infrastructure, allowing low-cost implementation into current battery manufacturing. The invention provides cost-effective, safe and high-energy lithium batteries well suited for load leveling in a power grid with very slow charging (e.g., C/10) and very fast discharging (e.g., 4C). The invention also provides a process of making layered separators resulting in industrially friendly batteries characterized by the conductivity of liquid electrolytes, the safety of solid electrolytes, high cycle life and low cost. Optionally, in some embodiments this is achieved by layers made of shape memory materials such as Nitonol or shape memory polymers. Applying pre-stress such as in-plane tension on the shape memory layer of separator, will cause out of plane pressure on the electrodes when the layer is put in the cell. This can be especially useful in larger battery cells such as 18650 cylindrical cells or wound cells.

The electrochemical systems of the invention are also compatible with the use of engineered electrodes such as pre-stressed electrodes. Lithium metal when compressed in an out-of-plane direction performs significantly better by leveling its surface (less mossy and less dendrites). Also, out-of-plane compression in silicon anodes results in much better contacts with the current collectors and much higher life cycle. This aspect of the invention can also be helpful in solid state batteries by maintaining a good contact between the electrodes and the solid electrolyte and increasing the cycle life and performance. Optionally, in some embodiments this is achieved by layers made of shape memory materials such as Nitonol or shape memory polymers. Applying pre-stress such as in-plane tension on the shape memory layer of separator, will cause out of plane pressure on the electrodes when the layer is put in the cell. This can be especially useful in larger battery cells such as 18650 cylindrical cells or wound cells.

To further demonstrate the beneficial attributes of the present invention, over 100 coin-cells incorporating a composite layer separator system have been made and evaluated. Some of the tested separators are currently 0.125 mm thick and keep 75% capacity at C/2 compared to 0.025 mm Celgard. Safety tests including high current cycling, 55 mA/cm2 for 300 cycles, show that the separator system is robust and the battery does not internally short. Furthermore, there is no measurable degradation or capacity loss after several hundred cycles, in contrast to 5-layer Celgard separators (0.125 mm thick) which were completely destroyed. The invention includes separator systems optionally having an overall thickness of 0.075 mm. The invention optionally includes 0.025 mm thick rolls of the separator system useful for 10 kWh packs of cylindrical 18650 lithium metal batteries with 400 Wh/kg energy and 5000 cycles.

Grid level energy storage is currently dominated by pumped hydro, over 99% of current storage, which is only possible at a very few limited sites and applications, is not suitable for society's growing storage needs. Other solutions have significant shortcomings. Compressed air technology suffers from very low round trip efficiency of less than 20%. Electrochemical capacitors and flywheels have very low energy/cost ratios. Flow batteries, used as a combination of high-power and high-energy, are very complicated and expensive. Current batteries also suffer from high cost/ energy and cost/power ratios (at about $1/Wh). The state-of-the-art high energy lithium-metal, metal-air, and nano-silicon chemistries have major safety/cost problems as mentioned earlier.

In some embodiments, the separator-electrodes design of the invention enables a range of rechargeable high-energy chemistries that are currently not considered safe and/or have short cycle life. Using industrial methods of manufacturing (e.g., CNC, molding, casting) the invention combines electrochemistry with engineering to address safety issues with state of the art battery technologies. The present separator systems combined with high-energy electrodes, provide safe, long cycle life, high energy batteries at industrial scale for grid storage and also electric vehicles.

The present systems and methods are scalable and industrially friendly. Enhancing separator performance may be achieved via several approaches amenable with the present systems and methods. Improving the conductivity by making smaller holes (0.010 to 0.100 mm) and using thinner layers (0.005 mm) are useful approaches for accessing high performance systems. In addition, maintaining the required offset alignment and attaching the layers by thermal heating at the boundaries and other selected areas may be used to access separator systems providing enhanced safety.

Figure 15:
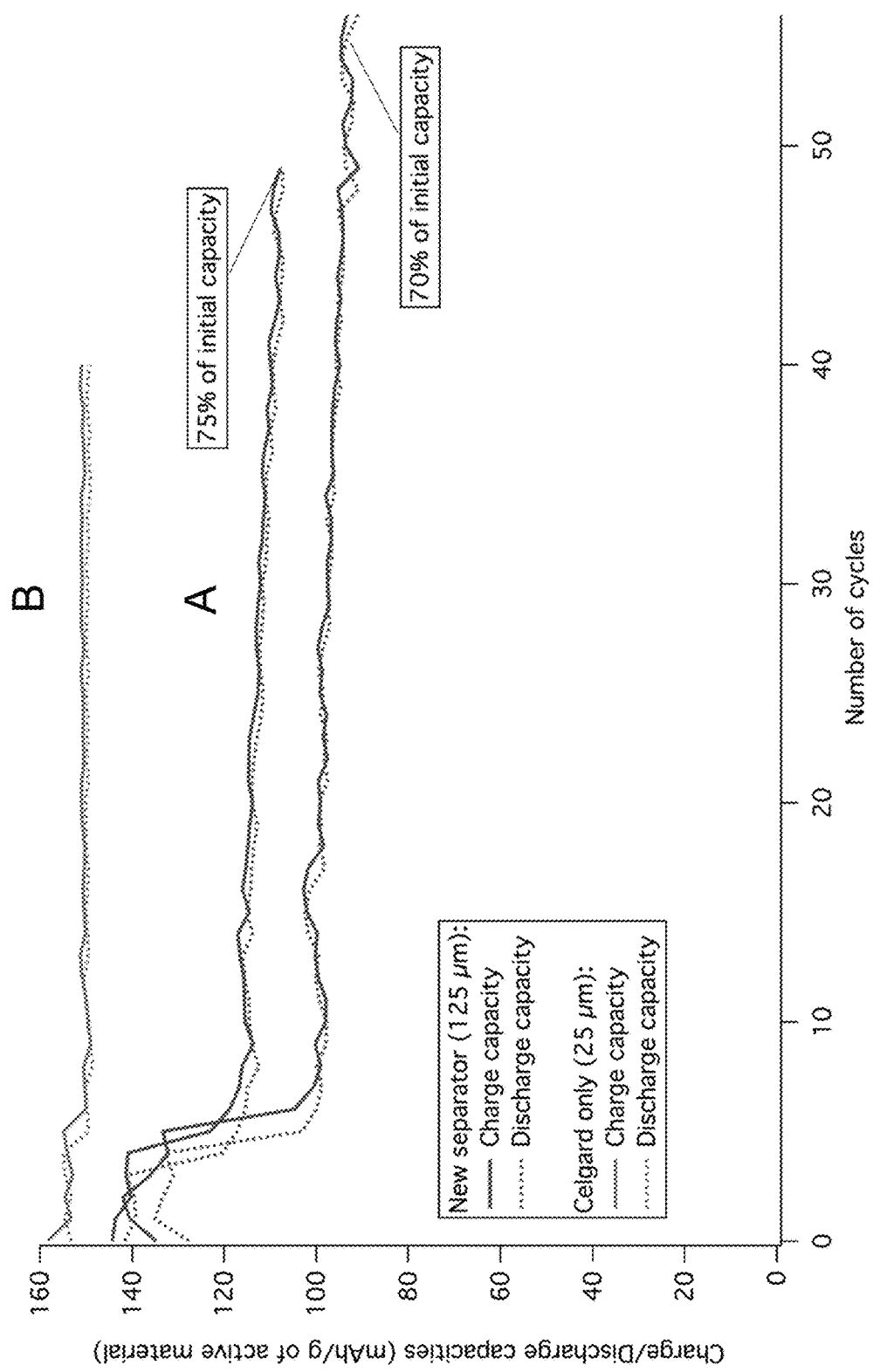
FIG. 15 provides a plot of charge and discharge capacities (mAh/g) as a function of number of cycles for an electrochemical cell having: (A) a multilayer separator system of the invention having an overall thickness of 125 microns and (B) a Celgard separator having a thickness of 25 microns.

FIG. 15 provides a plot of charge and discharge capacities (mAh/g) as a function of number of cycles for an electrochemical cell having: (A) a multilayer separator system of the invention having an overall thickness of 125 microns and (B) a Celgard separator having a thickness of 25 microns. The CR2032 coincell evaluated is made of Li foil 0.5 mm thick anode, LiFePO4 (0.0142 g) cathode, 1M LiPF6 in EC:DEC:DMC (1:1:1). The voltage limits are 3 v (discharge) and 4 v (charge). Formation, 3 cycles at C/5, and the C/2 cycling are distinguishable from the sharp drop in the capacity. The top line shows a separator made with two perforated Kapton layers as mechanical strong layers and 3 perforated Celgard 2325 layers as low resistance layers. The bottom line shows a separator made with two perforated Kapton layers as mechanical strong layers and 3 Celgard 2325 layers as low resistance layers. The cells are tested in room temperature. No measurable capacity drop was observed after 40-50 cycles. The experimental results shown in FIG. 15 indicate that the present separators provide low resistance, and thus, are compatible with a range of electrochemical systems.

Figure 16:
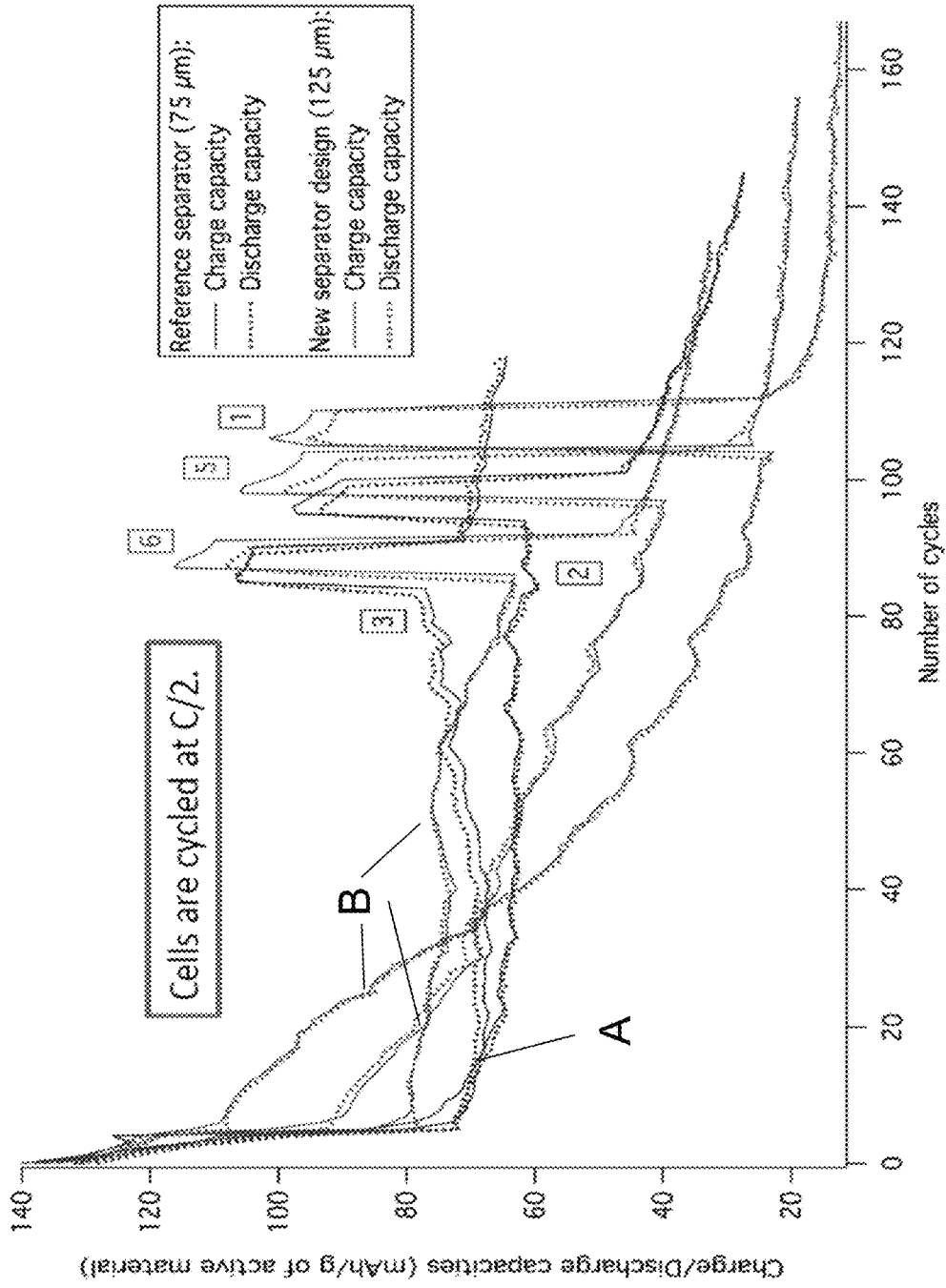
FIG. 16 provides a plot of charge and discharge capacities (mAh/g) as a function of number of cycles for: (A, lines 1, 5 and 6)) an electrochemical cell having a multilayer separator system of the invention, a Li metal anode and a LiCoO$_2$ cathode as compared to (B, lines 2 and 3) an electrochemical cell having a conventional separator.

FIG. 16 provides a plot of charge and discharge capacities (mAh/g) as a function of number of cycles for: (A) an electrochemical cell having a multilayer separator system of the invention, a Li metal anode and a LiCoO$_2$ cathode as compared to (B) an electrochemical cell having a conventional separator. The electrochemical cells were coin cells and evaluated at a discharge rate of C/2. The CR2032 coincell evaluated is made of Li foil, 0.5 mm thick anode, LiCoO$_2$, 0.1 mm thick cathode, 1M LiPF6 in EC:DEC:DMC (1:1:1). The voltage limits are 3 v (discharge) and 4.2 v (charge). Formation, 5 cycles at C/24, and the C/2 cycling are distinguishable from the sharp drop in the capacity. The red lines (indicated by the letter B), 1, 5, 6 show cells made with a separator made with two perforated Kapton layers (2 mm diameter holes) as mechanical strong layers and 3 Celgard 2325 layers as low resistance layers. The blue lines (indicated by the letter A), 2, 3 show a reference electrode made with a perforated Kapton between two Celgard layers. The cells are tested in room temperature. The cells were cycled at C/2 and then were cycled at C/24 for a few cycles and then again at C/2. The experimental results show that the capacity loss was not due to any chemical reactions in the cell, and were likely due to the resistance of the perforated Kapton layers in the electrochemical cells evaluated. FIG. 16 shows that using other materials, surface treatments or a homogenous distribution of holes, and thus smaller holes, are necessary to reach a good capacity in the cell under some experimental conditions.

Figure 17:
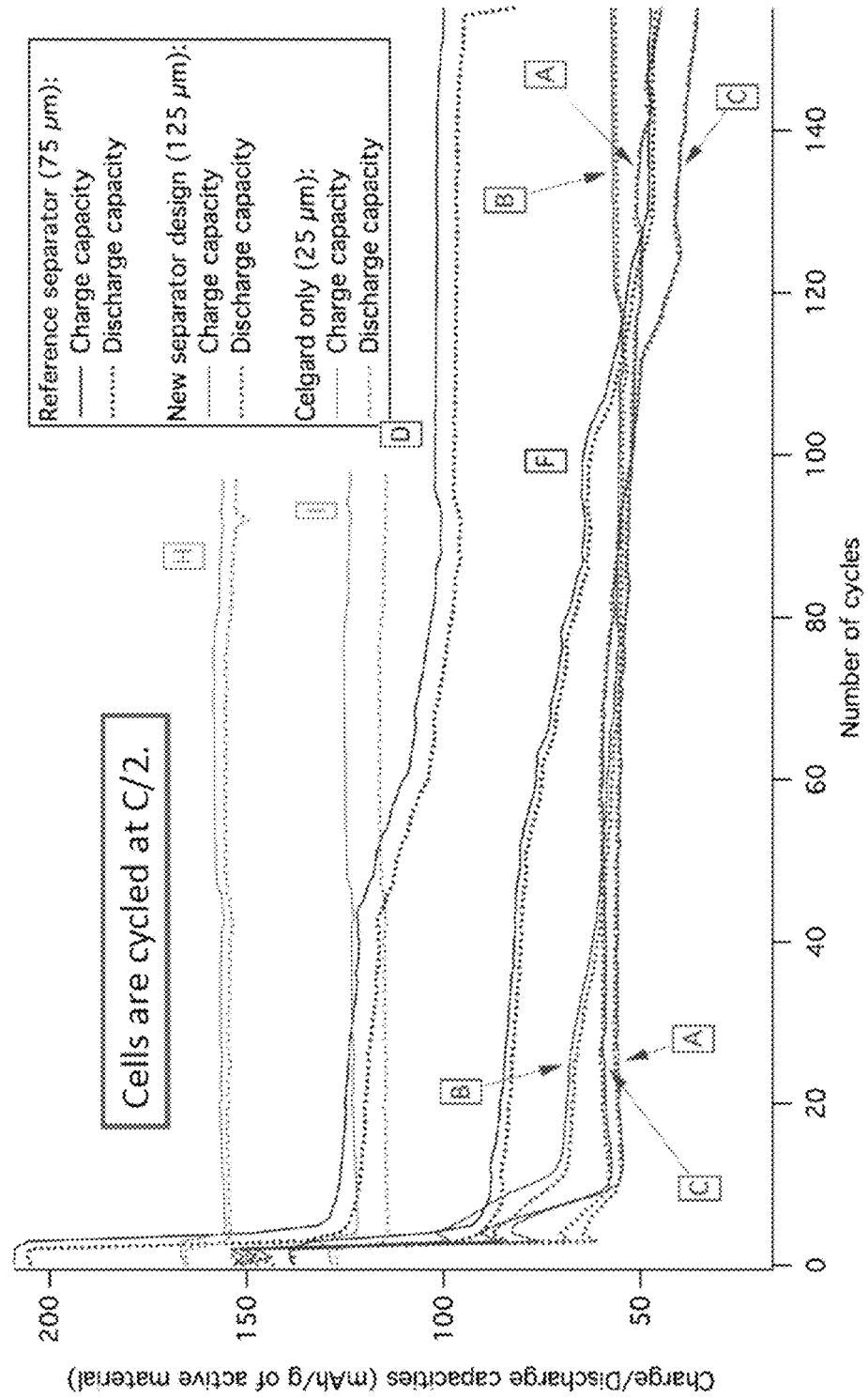
FIG. 17 provides a plot of charge and discharge capacities (mAh/g) as a function of number of cycles for: (lines A, B and C) an electrochemical cell having a multilayer separator system of the invention, a Li metal anode and a LiCoO$_2$ cathode as compared to (lines F and D) show a reference electrode made with a perforated Kapton between two Celgard layers and (lines H and I) a Celgard separator having a thickness of 25 microns.

FIG. 17 provides a plot of charge and discharge capacities (mAh/g) as a function of number of cycles for: (i) an electrochemical cell having a multilayer separator system of the invention, a Li metal anode and a LiFePO$_4$ cathode as compared to (ii) an electrochemical cell having 3 conventional separators having a thickness of 75 microns and (iii) a Celgard separator having a thickness of 25 microns. The electrochemical cells were coin cells and evaluated at a discharge rate of C/2. The CR2032 coincell evaluated is made of Li foil, 0.5 mm thick anode, LiFePO4, 0.1 mm thick cathode, 1M LiPF6 in EC:DEC:DMC (1:1:1). The voltage limits are 3 v (discharge) and 4 v (charge). Formation, 5 cycles at C/24, and the C/2 cycling are distinguishable from the sharp drop in the capacity. The lines I, H show cells made with single Celgard layers. The lines, A, B, C, show cells with a separator made with two perforated Kapton layers as mechanical strong layers and 3 Celgard 2325 layers as low resistance layers. The lines F and D show a reference electrode made with a perforated Kapton between two Celgard layers. The cells are tested in room temperature. The test demonstrates the importance of having thin separators to reach high capacity in the cells.

Figure 18:
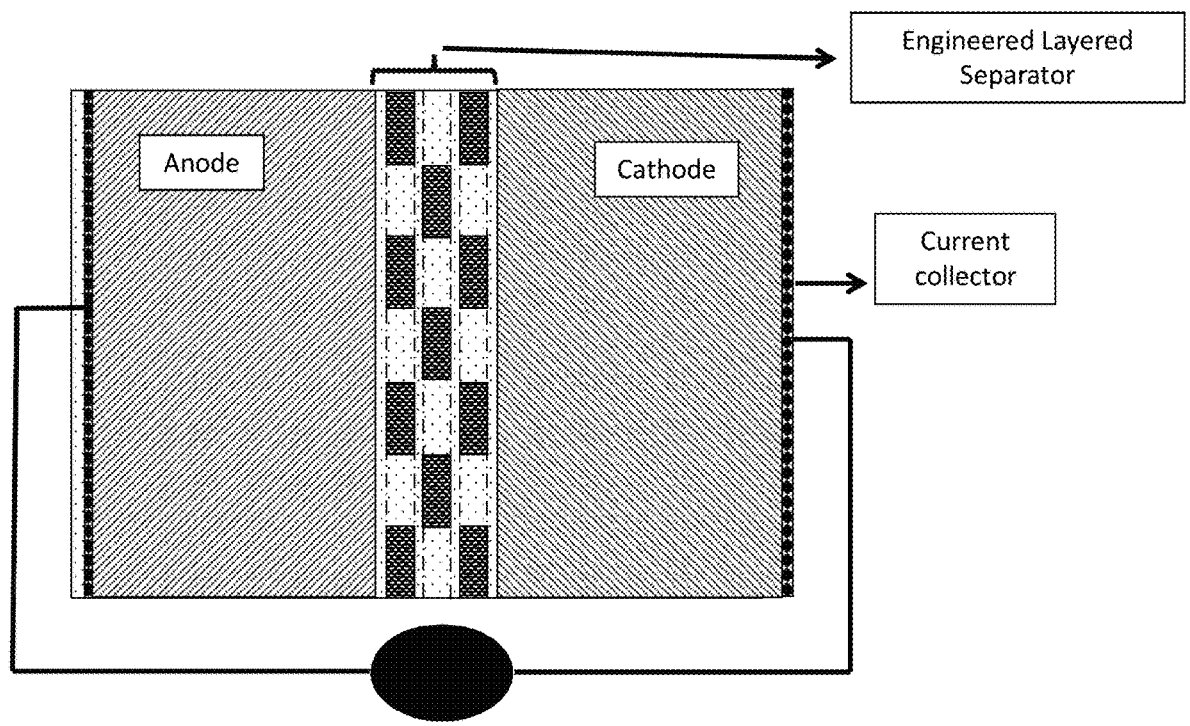
FIG. 18 provides a schematic diagram illustrating an electrochemical cell of the invention having a multilayer separator comprising three high mechanical strength layers with complementary patterns of apertures.
Figure 19:
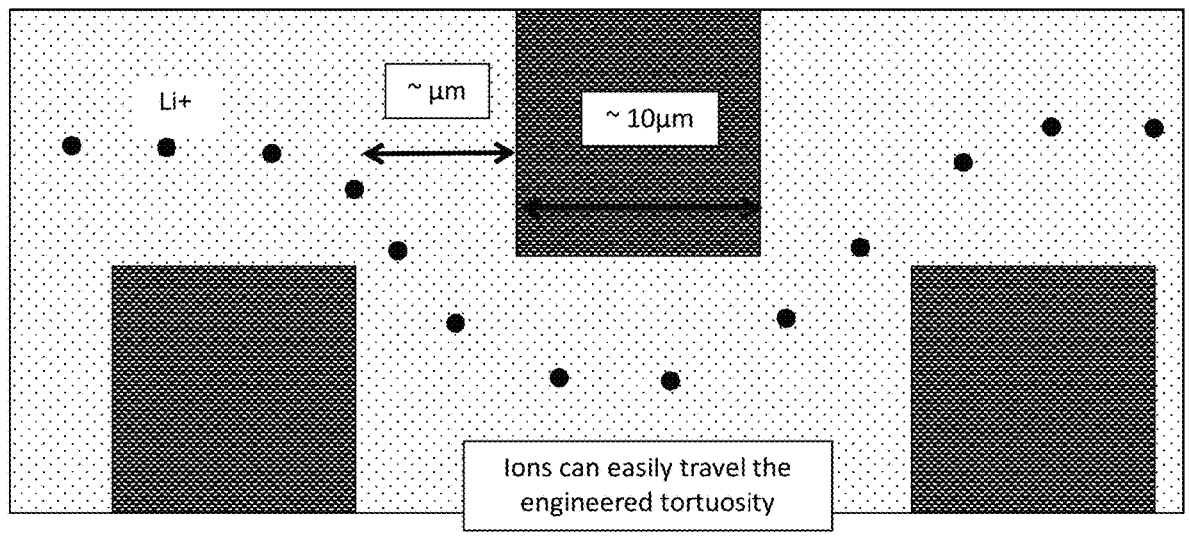
FIG. 19 provides a schematic diagram illustrating the trajectory of Li$^+$ ions passing through the multilayer separator shown in FIG. 18.

FIG. 18 provides a schematic diagram illustrating an electrochemical cell of the invention having a multilayer separator comprising three high mechanical strength layers with complementary patterns of apertures, an anode and a cathode. FIG. 19 provides a schematic diagram illustrating the trajectory of Li$^+$ ions passing through the multilayer separator shown in FIG. 18. While Li$^+$ ions are able to efficiently pass through the multilayer separator as shown in FIG. 19, dendrites are not able to make the same trajectory and, thus are prevented in certain embodiments of the invention. Further, the force from the high mechanical strength layers slows down or even stops the dendrite growth.

Figure 20:
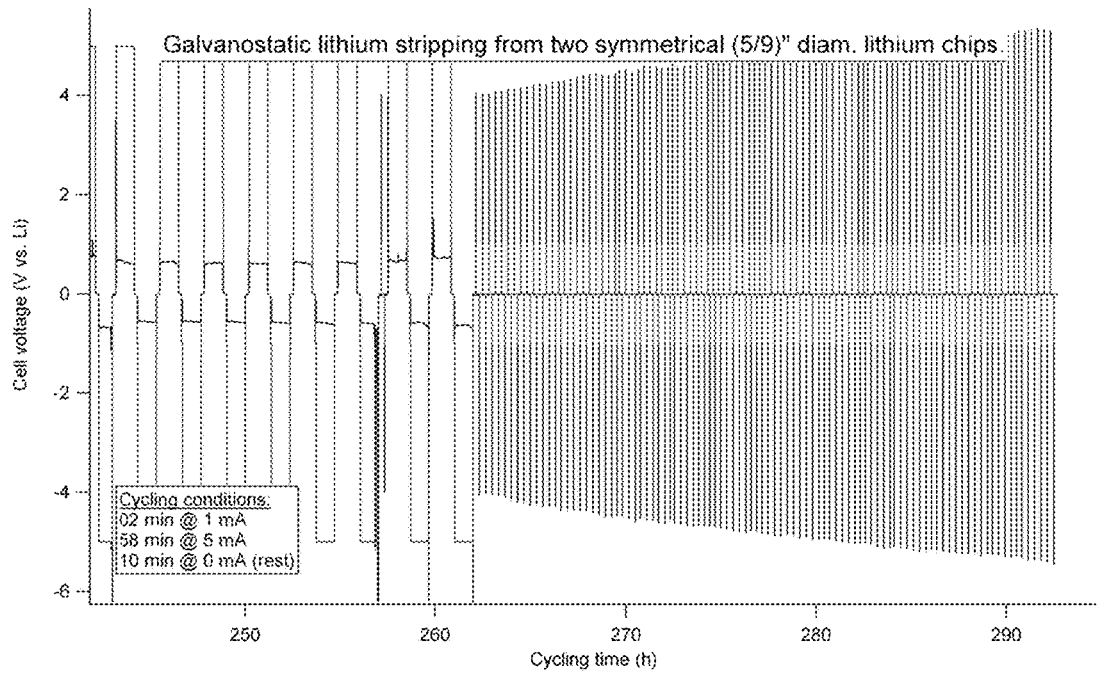
FIG. 20 provides a plot of cell voltage (V vs Li) versus cycling time (h) for the galvanostatic lithium stripping from two symmetrical (⅝)" lithium chips separated by a multilayer separator of the invention.
Figure 21:
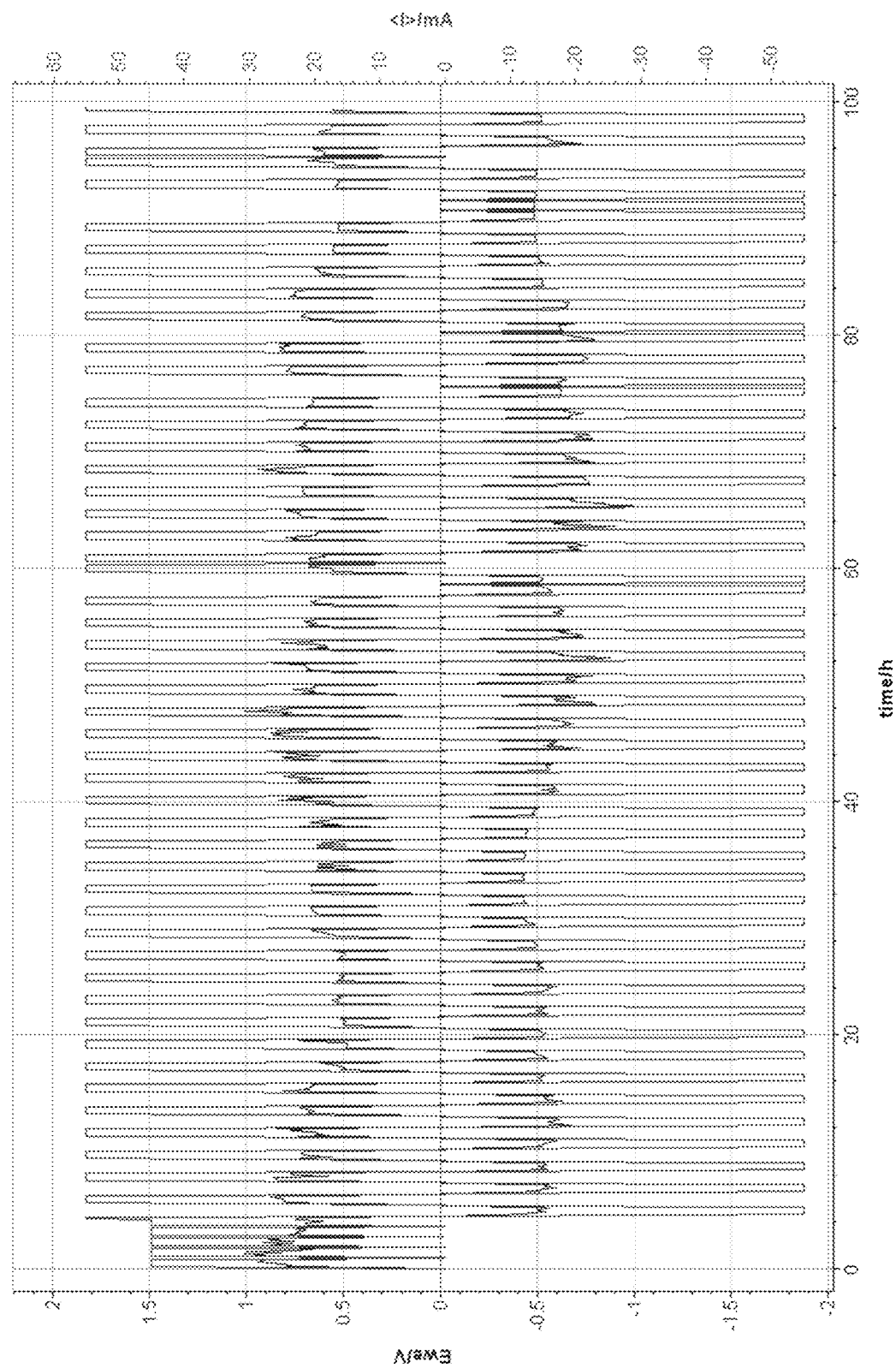
FIG. 21 provides plots of the current [milliAmpere] vs. time [hr] and voltage [v] vs. time [hr].

FIG. 20 provides a plot of cell voltage (V vs Li) versus cycling time (h) for the galvanostatic lithium stripping from two symmetrical (⅝)" lithium chips with a multilayer separator of the present invention. Layers of a novel separator (0.125 mm thick) made with 2 Kapton layers as the high strength layers and 3 Celgard layers next to them as low resistance layers in a CR2032 cell. Celgard 2325 is used. The cells are made with 0.75 mm Li foils as electrodes and 1M LiPF6 in EC:DEC:DMC (1:1:1) from Novolte, as electrolyte. The Kapton holes are each 1 mm diameter. Cells are tested at room in an Argon-filled dry box (H$_2$O<0.1 ppm). This figure shows that the multilayered separator can safely stop dendrite shorting and prevent catastrophic failure even at very high currents.

Figure 22:
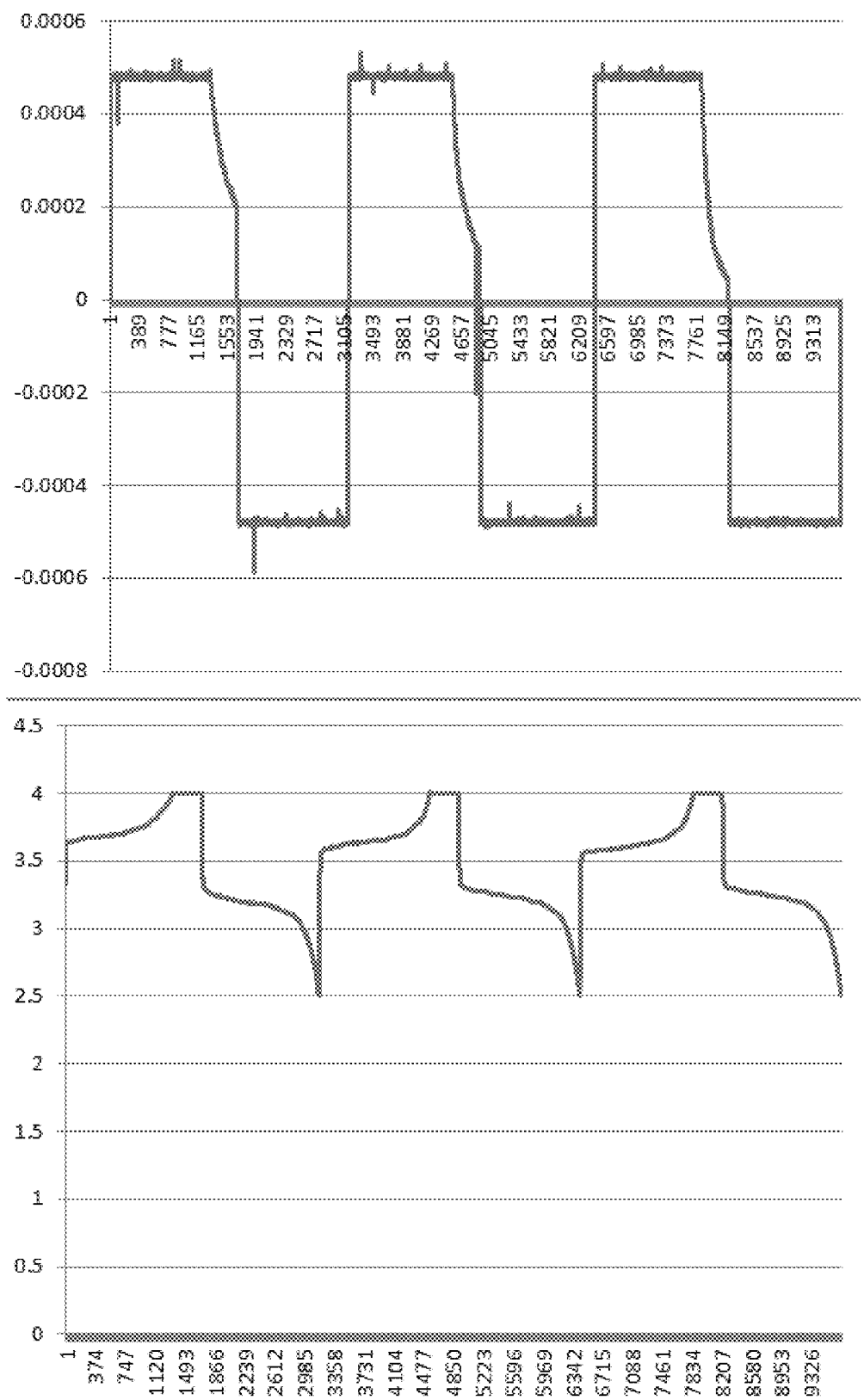
FIG. 22 provides a plot of current [A] (on top) and voltage [v] (on bottom) as a function of time [s] in a CR2032 cell made with Li-metal, LiFePO$_4$ cathode separated by a multilayer separator of the invention.

FIG. 22 shows the current [ampere] vs. time [s] (top plot) and voltage [v] vs. time [s] (bottom plot) for the experiment of FIG. 15. This shows the top red line.

Figure 23:
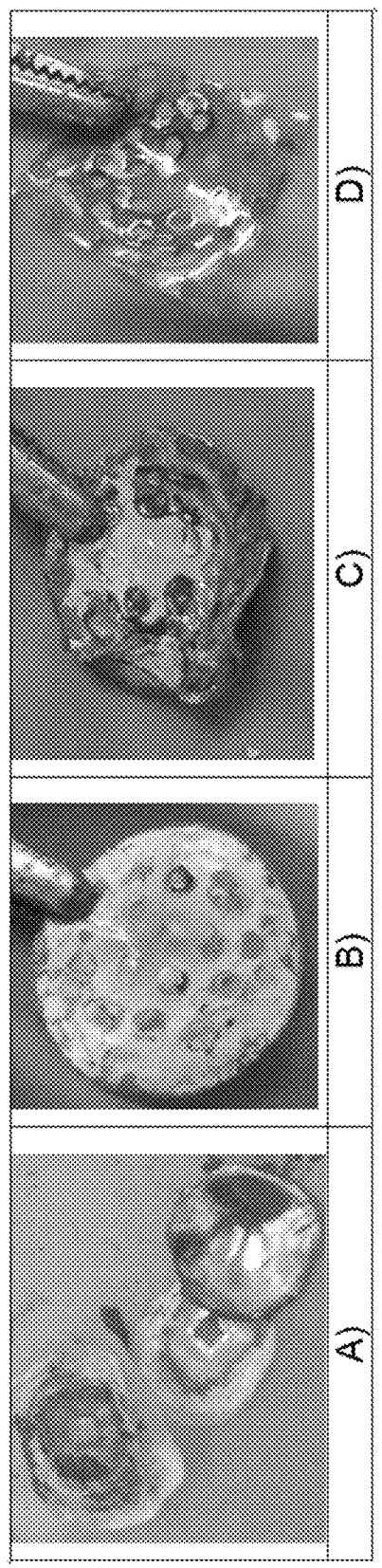
FIGS. 23 and 24 provide photographs of perforated layers useful in separator systems of some embodiments and experiments.

FIGS. 23-30 provide photographs of perforated layers useful in separator systems of some embodiments. FIG. 23, for example, provides pictures of the different separator materials (5-Celgard separator: A) and new separator B)-D) after cycling a few days at high current: A) 5-Celgard separator (from top-left to bottom-right: Li+Celgard, Li+Celgard, Stainless steel current collector; A typical separator (Celgard) punctured by lithium dendrites and destroyed. As can be seen the separator is not recognizable anymore B) Celgard layer between the two perforated Kapton layers; C) Celgard in contact with the lithium electrode; D) perforated Kapton. Lithium dendrites could not penetrate the new separator. Shown here, a Kapton layer of the new separator is intact, though the Celgard on the right side of the Kapton layer is destroyed. FIGS. 25-30, for example, are pictures of a 1 mil kapton film prepared with laser cutting for use in a separator system of the invention.

Figure 24:
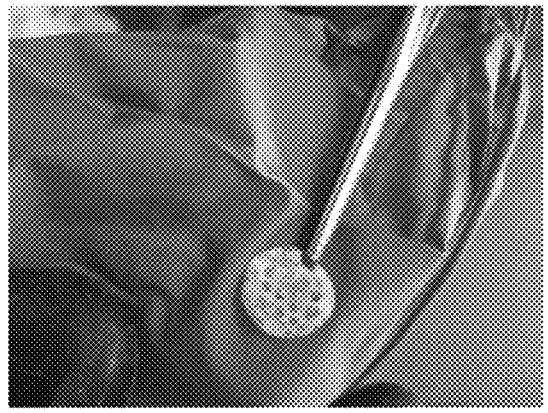
Figure 24:
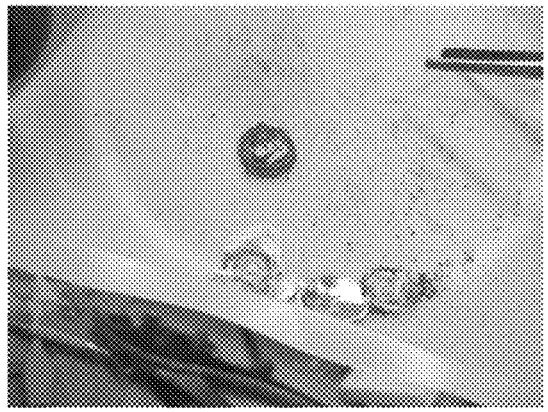
Figure 24:
Figure 24:
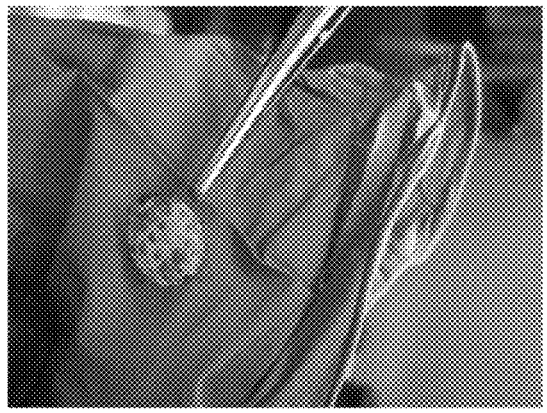
Figure 25:
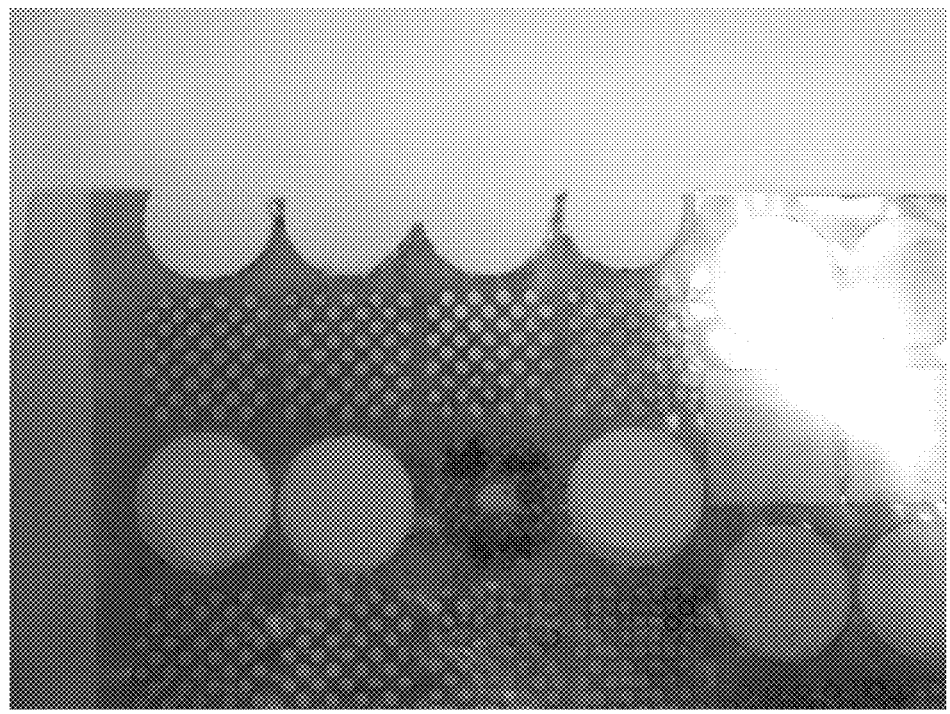
FIGS. 25, 26, 27, 28, 29 and 30 provide photographs of perforated layers useful in separator systems of some embodiments.
Figure 26:
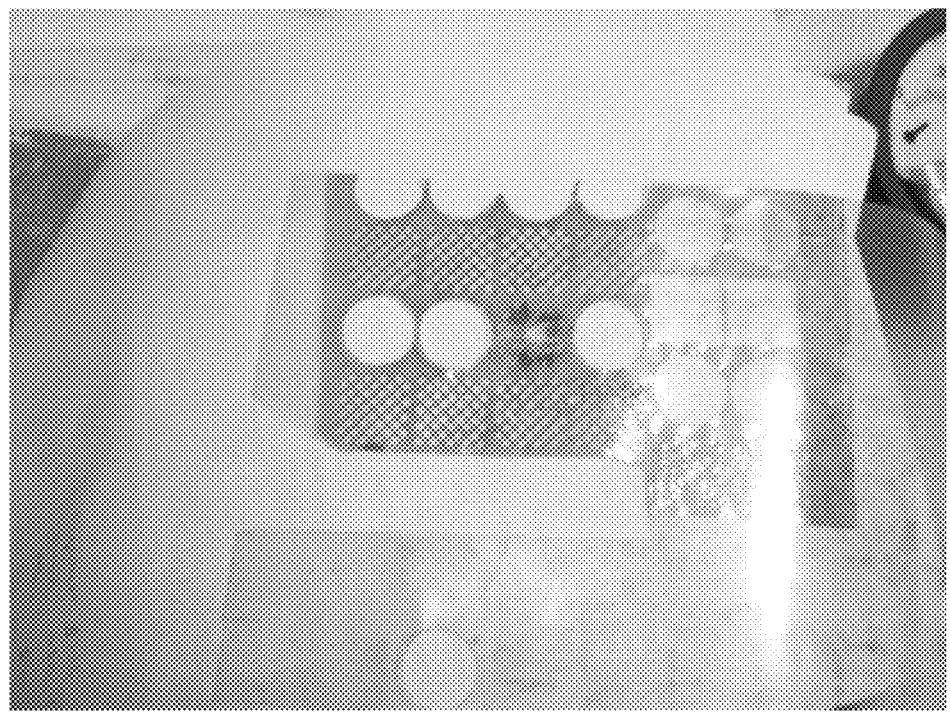
Figure 27:
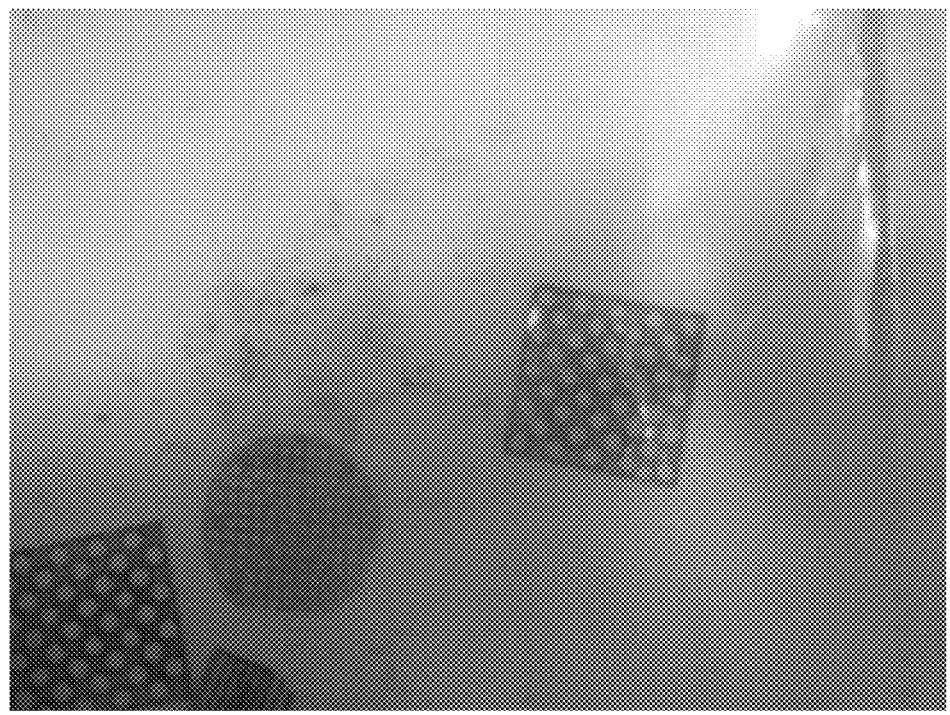
Figure 28:
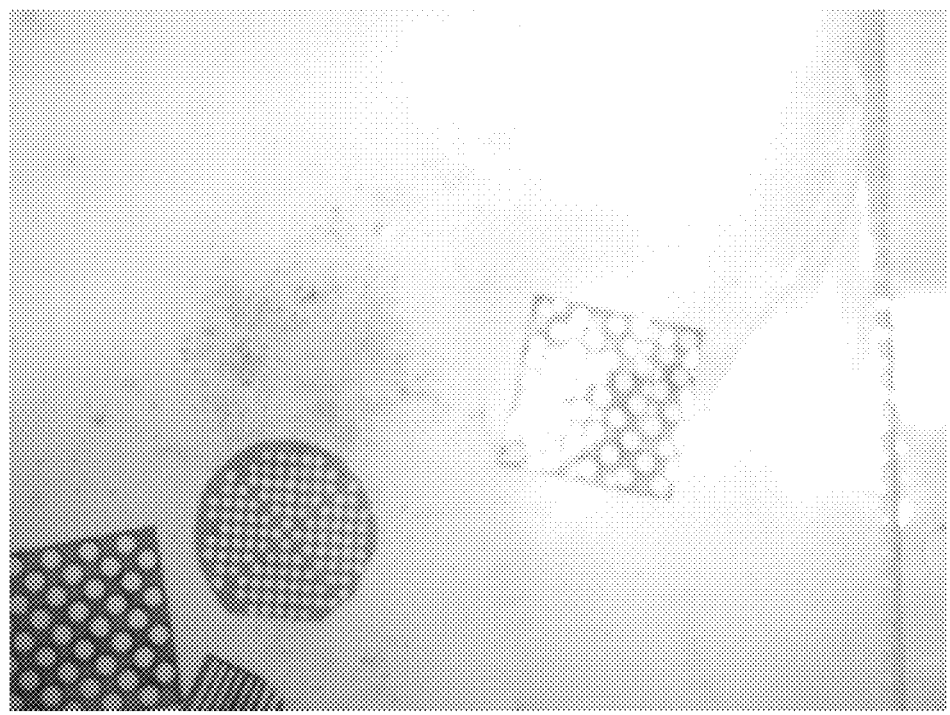
Figure 29:
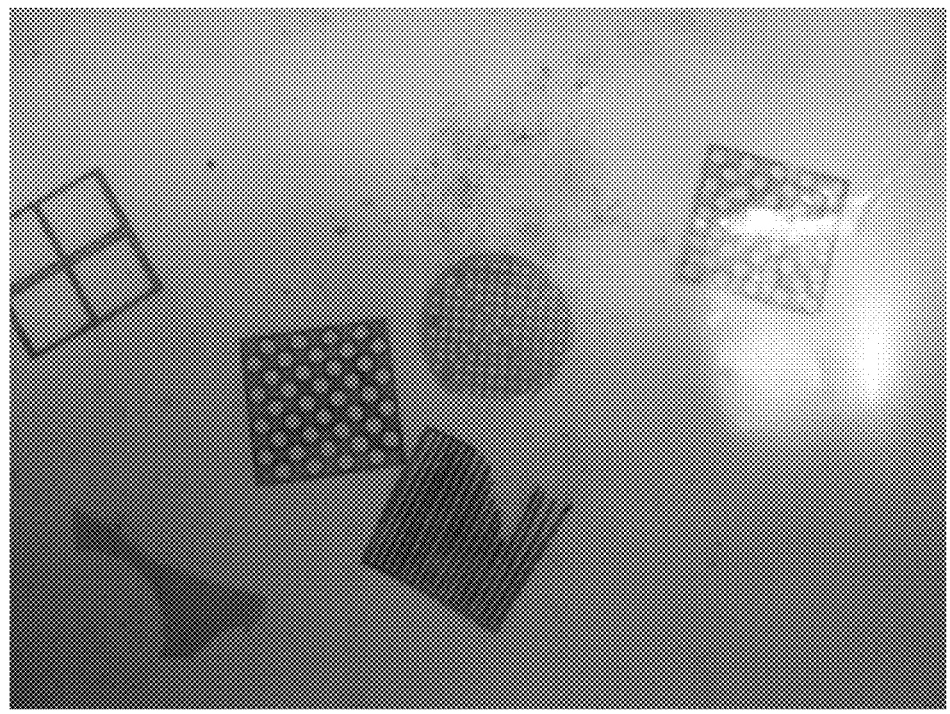
Figure 30:
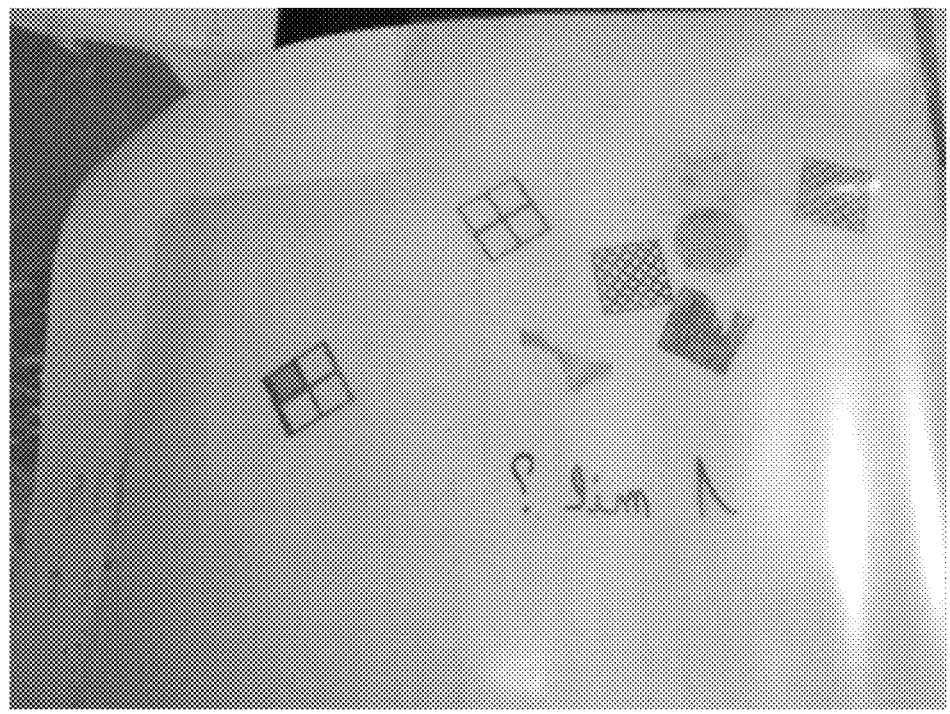

FIG. 23 shows the layers of a novel separator (0.125 mm thick) made with 2 Kapton layers as the high strength layers and 3 Celgard layers next to them as low resistance layers in comparison with 5 Celgard layers (0.125 mm thick) as a reference separator in a house made cell of ½" diameter. Celgard 2325 is used. The cells are made with 0.75 mm Li foils as electrodes and 1M LiPF6 in EC:DEC:DMC (1:1:1) from Novolte, as electrolyte. The Kapton holes are each 2 mm diameter. Cells are tested at room temperature and are cycled at 55 mA for 45 minute charge-discharge cycles in an Argon-filled dry box (H2O<0.5 ppm) (A) Reference separator: shows 5-Celgard reference separator: the cell is shorted; (B-D) show components of the new separator. The cell is not shorted. (B) new separator: Celgard layer between the two perforated Kapton layers is intact; (C) New separator: Celgard in contact with the lithium electrode shows severe damage; (D) new separator: perforated Kapton is intact and maintains its structural integrity, preventing any short. This figure shows that the multilayered separator can safely stop dendrite shorting and prevent catastrophic failure even at very high currents. FIG. 24 (zoom out) is the same as FIG. 23 (zoom in). The top and bottom graphs show two adjacent layers in each design. FIG. 25-30 show several examples of the strong layer design made of Kapton. The holes are made with Laser cutting. The size of each of the layers is ½ inch. The holes are either 1 mm diameter or 2 mm diameter.

Example 3: Lithium Batteries Having a Multilayer Separator System

This Example provides description of examples of lithium batteries comprising a multilayer separator system of the present invention.

Example A

In this example, two layers of Kapton films, each 25 micrometers thick, are used for the separator system. Each layer is perforated with Cartesian (vertical-horizontal) periodic holes, each 1 mm diameter, and with 1 mm distance between the walls. A layer of Celgard 25 micrometers is placed in between the two Kapton layers. A layer of Celgard 25 micrometers is placed in between each Kapton layer and the adjacent electrode. The electrodes are $LiCoO_2$ and Lithium metal films. The electrolyte is LiPF6 in a combination of EC-DMC-PC-DME.

Example B

In this example, two layers of Kapton films, each 25 micrometers thick, are used for the separator system. Each layer is perforated with Cartesian (vertical-horizontal) periodic holes, each 1 mm diameter, and with 1 mm distance between the walls are used for the separator system. A layer of Celgard, 25 micrometers, is placed in between the two Kapton layers. A layer of Celgard 25 micrometers is placed in between each Kapton layer and the adjacent electrode. The electrodes are $LiFePO_4$ and Lithium metal films. The electrolyte is $LiPF_6$ in a combination of EC-DMC-PC-DME.

Example C

In this example, two layers of Kapton films, each 25 micrometers thick, are used for the separator system. Each layer is perforated with Cartesian (vertical-horizontal) periodic holes, each 1 mm diameter, and with 1 mm distance between the walls are used for the separator system. A layer of perforated Celgard, 25 micrometers thick with 3 holes each ⅛ inch, is placed in between the two Kapton layers. A layer of perforated Celgard, 25 micrometers thick with 3 holes each ⅛ inch, is placed in between each Kapton layer and the adjacent electrode. The electrodes are $LiFePO_4$ and Lithium metal films. The electrolyte $LiPF_6$ in is a combination of EC-DMC-PC-DME.

Example D

In this example, two layers of PP films, each 25 micrometers thick and ¾ inch diameter, are used for the separator system. Each layer is perforated with Cartesian (vertical-horizontal) periodic holes, each 1 mm diameter, and with 1 mm distance between the walls. A ring of Celgard, 25 micrometers thick, is placed in between the two PP layers. A ring of Celgard, 25 micrometers thick and ¾ inch outside diameter and ½ inch inside diameter, is placed in between each PP layer and the adjacent electrode. The electrodes are $LiFePO_4$ and Lithium metal films. The electrolyte is $LiPF_6$ in a combination of EC-DMC-PC-DME.

Example E

In this example, two layers of hard polyester films, each 5 micrometers thick and ¾ inch diameter, are used for the separator system. Each layer is perforated with Cartesian (vertical-horizontal) periodic holes, each 1 mm diameter, and with 1 mm distance between the walls. A ring of microporous PE/PP/PE, 5 micrometers thick, is placed in between the two hard polyester layers. A ring of microporous PE/PP/PE, 5 micrometers thick and ¾ inch outside diameter and ½ inch inside diameter, is placed in between each hard polyester layer and the adjacent electrode. The electrodes are $LiFePO_4$ and Lithium metal films. The electrolyte is $LiPF_6$ in a combination of EC-DMC-PC-DME.

Example F

In this example, two layers of stainless steel, each 5 micrometers thick, are used. The steel layers are coated with a very thin electronically isolating layer (here 1 micrometer thick Teflon. Kapton or PVDF or PEO or PP or PE coatings can also be used). Each layer is perforated with Cartesian (vertical-horizontal) periodic holes, each 0.5 mm diameter, and with 0.5 mm distance between the walls. A layer of microporous PE/PP/PE, 5 micrometers, is placed in between the two stainless steel layers. A layer of microporous PE/PP/PE 5 micrometers is placed in between each stainless steel layer and the adjacent electrode. The electrodes are $LiFePO_4$ and Lithium metal films. The electrolyte is $LiPF_6$ in a combination of EC-DMC-PC-DME.

Example G

In this example, two layers of Kapton films, each 5 micrometers thick and ¾ inch diameter, are used for the separator system. Each layer is perforated with Cartesian (vertical-horizontal) periodic holes, each 1 mm diameter, and with 1 mm distance between the walls. A ring of Celgard, 5 micrometers thick, is placed in between the two Kapton layers. A ring of Celgard, 5 micrometers thick and ¾ inch outside diameter and ½ inch inside diameter, is placed in between the Kapton layer next to lithium metal film anode and the Li electrode. A LISICON layer, 25 micrometer thick and ¾ inch diameter is placed between the second Kapton and the air carbon-cathode. The electrolyte on the Li side of the LISICON is LiClO$_4$ in a combination of EC-DMC-PC-DME. The electrolyte on the air cathode side of LISICON is an aqueous electrolyte.

Example H

In this example, two layers of PE films, each 5 micrometers thick and ¾ inch diameter are used for the separator system. Each layer is perforated with Cartesian (vertical-horizontal) periodic holes, each 0.1 mm diameter, and with 0.1 mm distance between the walls. A LIS ICON layer, 25 micrometer thick and ¾ inch diameter is placed between the second PE and the air carbon-cathode. The electrolyte on the Li side of the LISICON is LiPF$_6$ in a combination of EC-DMC-PC-DME. The electrolyte on the air cathode side of LISICON is an aqueous electrolyte.

Example I

In this example, two layers of stainless steel, each 5 micrometers thick, are used. The steel layers are coated with a very thin electronically isolating layer (here 1 micrometer thick Teflon) on the inside faces (sides against the closer electrode). Each layer is perforated with Cartesian (vertical-horizontal) periodic holes, each 0.1 mm diameter, and with 0.1 mm distance between the walls. A layer of Celgard, 5 micrometers, is placed in between the two stainless steel layers. A layer of Celgard 5 micrometers is placed in between each stainless steel layer and the adjacent electrode. The electrodes are partially lithiated Si and partially lithiated sulfur. The battery with this separator is expected to show higher cycle life and charge-discharge (power) rates.

Example J

In this example, two layers of stainless steel, each 5 micrometers thick, are used. The steel layers are coated with a very thin electronically isolating layer of 1 micrometer thick Teflon on the inside surfaces (the sides against the closer electrodes) and with a 1 micrometer thick polyethylene glycol on the outside surface (the sides facing the closer electrodes). Each layer is perforated with Cartesian (vertical-horizontal) periodic holes, each 0.1 mm diameter, and with 0.1 mm distance between the walls. A layer of cellulose separator, 5 micrometers, is placed in between the two stainless steel layers. A layer of cellulose separator, 5 micrometers, is placed in between each stainless steel layer and the adjacent electrode. The electrodes are Li metal and sulfur. It is expected that the polyethylene glycol coating increases the cycle life of the battery.

Example K

In this example, two layers of polyimide films, each 5 micrometers thick and ¾ inch diameter, are used for the separator system. Each layer is perforated with Cartesian (vertical-horizontal) periodic holes, each 0.1 mm diameter, and with 0.1 mm distance between the walls. A ring of microporous PE/PP/PE, 5 micrometers thick, is placed in between the two polyimide layers. A ring of microporous PE/PP/PE, 5 micrometers thick and ¾ inch outside diameter and ½ inch inside diameter, is placed in between each polyimide layer and the adjacent electrode. The electrodes are Zinc anode and carbon based air cathode. The electrolyte is aqueous 6M NaOH.

Example L

In this example, two layers of hard PP films, each 5 micrometers thick and ¾ inch diameter, are used for the separator system. Each layer is perforated with Cartesian (vertical-horizontal) periodic holes, each 0.1 mm diameter. The electrodes are Zinc anode and carbon based air cathode. The electrolyte is aqueous 6M KOH.

Example M

In this example, two layers of aluminum oxide films, each 5 micrometers thick and ¾ inch diameter, are used for the separator system. Each layer is perforated with an arbitrary pattern of holes that are each 40% porous and when put on top of each other give less than 5% overlap of the hole patterns, each 0.1 mm diameter, and with 0.1 mm distance between the walls. A ring of microporous polyester, 5 micrometers thick, is placed in between the two aluminum oxide layers. A ring of microporous polyester, 5 micrometers thick and ¾ inch outside diameter and ½ inch inside diameter, is placed in between each aluminum oxide layer and the adjacent electrode. The electrodes are Zinc anode and carbon based air cathode. The electrolyte is aqueous 6M KOH.

Example N

In this example, two layers of hard polyester films, each 25 micrometers thick and ¾ inch diameter, are used for the separator system. Each layer is perforated with an arbitrary pattern of holes that are each 40% porous and when put on top of each other give less than 5% overlap of the hole patterns, each 1 mm diameter, and with 1 mm distance between the walls. A ring of microporous polyester, 25 micrometers thick, is placed in between the two hard polyester layers. A ring of microporous polyester, 25 micrometers thick and ¾ inch outside diameter and ½ inch inside diameter, is placed in between each hard polyester layer and the adjacent electrode. The electrodes are LiFePO$_4$ and silicon films. The electrolyte is ionic liquid.

Example O

In this example, two layers of Kapton films coated with polyethylene glycol, each 5 micrometers thick and ¾ inch diameter, are used for the separator system. Each layer is perforated with Cartesian (vertical-horizontal) periodic holes, each 0.01 mm diameter, and with 0.01 mm distance between the walls. A ring of Celgard, 5 micrometers thick, is placed in between the two Kapton layers. A ring of Celgard, 5 micrometers thick and ¾ inch outside diameter and ½ inch inside diameter, is placed in between each Kapton layer and the adjacent electrode. The electrodes are Sulfur and Lithium metal films. The electrolyte is a polymer electrolyte.

Example P

In this example, two layers of PP films, each 5 micrometers thick and ¾ inch diameter, are used for the separator system. Each layer is perforated with Cartesian (vertical-horizontal) periodic holes, each 0.001 mm diameter, and with 0.001 mm distance between the walls. A ring of microporous polyester, 5 micrometers thick, is placed in between the two PP layers. A ring of microporous polyester, 5 micrometers thick and ¾ inch outside diameter and ½ inch inside diameter, is placed in between each PP layer and the adjacent electrode. The electrodes are NMC and carbon films. The electrolyte is PEO.

Example Q same as any of the above examples when the layers are attaché to each other by PEO and PvDFat some areas such as the outer part of each side.

Example R corresponds to Example G when the LISICON is 5 micrometers and is deposited on the hard layer on the air cathode side of the lithium-air cell.

In another Example, the porous patterned layers have the following physical dimensions, compositions and mechanical properties:
Thickness: 125 micron, 75 micron, 50 micron or 25 microns.
Tensile strength: 150 MPa isotropic (Celgard: 15 MPa TD; 150 MPA MD)
Porosity: 45%
Elastic modulus: 2 GPa
Yield strength: 50 MPa
Density: ~1.3 g/cm$^3$
MIT Folding Endurance: 10000 cycles
Elmendorf tear strength: 0.1 N
Graves tear strength: 15 N
Impact strength: 50 N·cm
30 mins @ 150 Celsius Shrinkage: 0.2 (Celgard: 5-10%)
Dielectric Strength ASTM D-149-91: 250 V/m
Dielectric constant: 3.5
Thermal coefficient of expansion: 20 ppm/Celsius.

Electrochemical cells comprising multilayer separators having porous patterned layers with these properties exhibit useful performance characteristics. When tested a half cell [coin cells]: LiFePO$_4$|LP71|Li, for example, after 200 cycles: @ C/5 the capacity was ~140 mAh/g; @C/2~120 mAh/g. Force-displacement testing using external pressure showed that the cell did not short but stopped functioning. Analysis of the separator system after 300 cycles at C/2 showed little to no degradation and the separator system was able to be used in another cell.

Tables 1 and 2 provide summary of the physical dimensions and properties of high mechanical strength layers and separator systems of certain embodiments of the invention.

TABLE 1

Physical dimensions and properties of the high mechanical strength layers

|  | Embodiment 1 | Embodiment 2 |
| --- | --- | --- |
| Process | Dry | Dry |
| Composition | PE & PP & PET | PE & PP & Kapton |
| Thickness (um) | 125 | 125 |
| Porosity (%) | 40 | 40 |
| Ionic Resistivity(Ω · cm) | 1800 | 400 |
| ionic Resistivity(Ω · cm2) | 22.5 | 5 |
| Melt temperature(° C.) | 135/165/300 | 135/165/300 |
| Tensile strength, MD (Kg/cm2) | 2000 | 2000 |

TABLE 1-continued

Physical dimensions and properties of the high mechanical strength layers

|  | Embodiment 1 | Embodiment 2 |
| --- | --- | --- |
| Tensile Strength, TD (Kg/cm2) | 2000 | 2000 |
| MIT Folding Endurance (cycles) | 10000 | 10000 |
| Impact strength (N · cm) | 50 | 50 |
| Thermal shrinkage % | 0.2 | 0.2 |

TABLE 2

Physical dimensions and properties of the separator systems

| Misalignment information | Measured resistance (Ω) | Estimated Length between electrodes (μm) | Resistivity (Ω · cm) | Resistivity (Ω · cm2) |
| --- | --- | --- | --- | --- |
| >90% misalignment | 57 | 125 | 3238 | 40 |
| <60% misalignment | 32 | 125 | 1818 | 23 |

The resistivities of the separators in Table 2 were tested in 1 M LiPF$_6$ EC:EMC (30:70 by volume. For electrochemical evaluation, ½" coincell electrochemical cells with Al—Al electrodes were used to characterize the separators. The separators are made as celgard/perforated Kapton/celgard/perforated kapton/celgard, each 25 μm thick.

Example 4: Separators Comprising Thermally Conductive Layers, Such as Coated Metal Mesh In some aspects, separator systems of the invention comprise one or more porous patterned layers that are a coated metal layer, such as a metal mesh having an external insulating coating, such as Al coated with PP or Al coated with aluminum oxide or a thermally conductive ceramic such as Al$_2$O$_3$. Embodiments of this aspect are beneficial for increasing the life of a battery significantly. In an embodiment, for example, the metal mesh (Al, nickel, copper, stainless steel) has very high mechanical strength over a very wide temperature range; the metal separator is a thermally conductive material that homogenizes the temperature of the cell and significantly enhances the safety and the life of the cell. In an embodiment, the microporous layers of the separator are PTFE coated (or PP coated or PEO coated or Al$_2$O$_3$ coated or PET coated or PVDF coated) aluminum mesh layers (e.g. Al mesh, 40% opening: 3 layers, 5 micrometers each or 2 layers ⅓ mil each; in one embodiment, Al layers are coated with PTFE, e.g. 2 micrometers thick on each side. In another embodiment only the Al layer next to the anode is coated. In another embodiment, the Al layers are coated and the sides are provided in contact with the electrodes.

Example 5: A Novel Method in Making Thin Membranes: A Mesh or Fiber Supported Ceramic Production and their Applications as Membranes, for Example as Solid Electrolytes in Electrochemical Cells Such as Li-Air Batteries or as Filters in Bio-Industry or Food Industry or Filtration Background: Li-air and Li-Sulfur batteries have energy density order of magnitude higher than current batteries.

One approach for making these cells is using a semi-permeable membrane such as LISICON, which allows ionic transport but prevents any other material to pass, to protect the anode from contamination with the cathode materials or their impurities. Thick solid electrolyte membranes not only show higher ionic resistance and cause energy and power loss, but also form cracks and lose connections with electrodes in a few cycles. Especially, it is well-known in solid mechanics that there is a critical thickness that thinner than that the plastic deformation and cracks can be avoided. Thus, in order to have high energy efficiency, high power density, fast charging and high cycle life, the protective membrane should be as thin as possible. Today, making ceramics such as LISICON membranes of 50 micrometer thick or smaller is a major challenge; more often pinholes form in the process of making thin ceramics and thus small particles can pass through the holes, and the ceramic loses its functionality as a semi-permeable membrane. This example suggests a new approach in making thin (less than 50 micrometer) and very thin (less than 5 micrometer) solid electrolytes, especially ceramics based solid electrolytes. The applications are vast and in many industries; for example, such as ceramic membranes as solid electrolytes in electrochemical cells and ceramic membranes as filters in drug industry or bioengineering industry or in food processing.

In some embodiments the membrane is a composite solid electrolyte/mesh system or a composite solid electrolyte/fibers system in which the toughness of the mesh or fibers prevents the cracks and pinholes in the ceramic during fabrication of the membrane and during the operation of it.

The mesh is optionally in a periodic format, occupying only a small part of the total mesh supported ceramic system. The mesh volume, for example, can be only 5-15% of the volume of the ceramic part. Further, the mesh is optionally totally inside the ceramic part, or is optionally exposed on one face of the ceramic or both faces.

The mesh or fiber materials preferably have good ductility and strength such as made of metals or alloys such as stainless steel, aluminum, copper or their alloys. The mesh is optionally made of a polymer such as PE, PP, Kapton, PVdF, PVC or PMMA. The mesh is optionally made of a glassy material, such as aluminum oxide or Silicon oxide or titanium oxide.

The solid electrolyte is optionally any solid electrolyte such as LISICON or NASICON or PEO. The solid electrolyte is optionally used in an electrochemical cell such as a battery or an electrochemical capacitor or a fuel cell or a flow battery.

The system of mesh or fiber supported solid electrolyte is useful because making thin solid electrolytes is difficult due to the difficulties in production of thin layers of ceramics. For example, the difficulty can be because of cracks formation in the production process, such as pinholes creation in thin LISICON for Lithium battery applications such as Li-air batteries. The mesh or fiber supported system relaxes the stresses inside the ceramic, for example the solid electrolyte such as LISICON, and thus prevents the cracks and holes such as pinholes during the making of the ceramic. In some embodiments it also helps with relaxing the stresses due to the cycling and this improves the cycle life.

The system of mesh or fiber supported membrane is useful because making thin membranes is difficult due to the difficulties in production of thin layers of ceramics. For example, the difficulty can be because of cracks formation in the production process, such as pinholes creation in thin membranes for filter applications such as in bio-industry or in food industry or in liquid filtration. The mesh or fiber supported system relaxes the stresses inside the ceramics and thus prevents the cracks and holes such as pinholes during the making of the ceramic.

Other applications include fuel cell membranes or electrochemical capacitors or flow batteries or semis-solid batteries or cathode redox flow batteries or solvated electrode batteries.

The method described in this example result in a mechanically strong matrix where the mesh/fibers are mechanically tough, resulting in a strong and tough overall behavior of the system. This has been understood in the overall behavior of systems such as martensite/austenite systems; TRIP and maraging steel, recently in metallic glasses, and in reinforced concreted, but has never been applied to the formation process and especially not in the formation process of thin membranes or thin ceramics that otherwise typically and frequently suffer from pinholes and cracks during the manufacturing.

Figure 31:
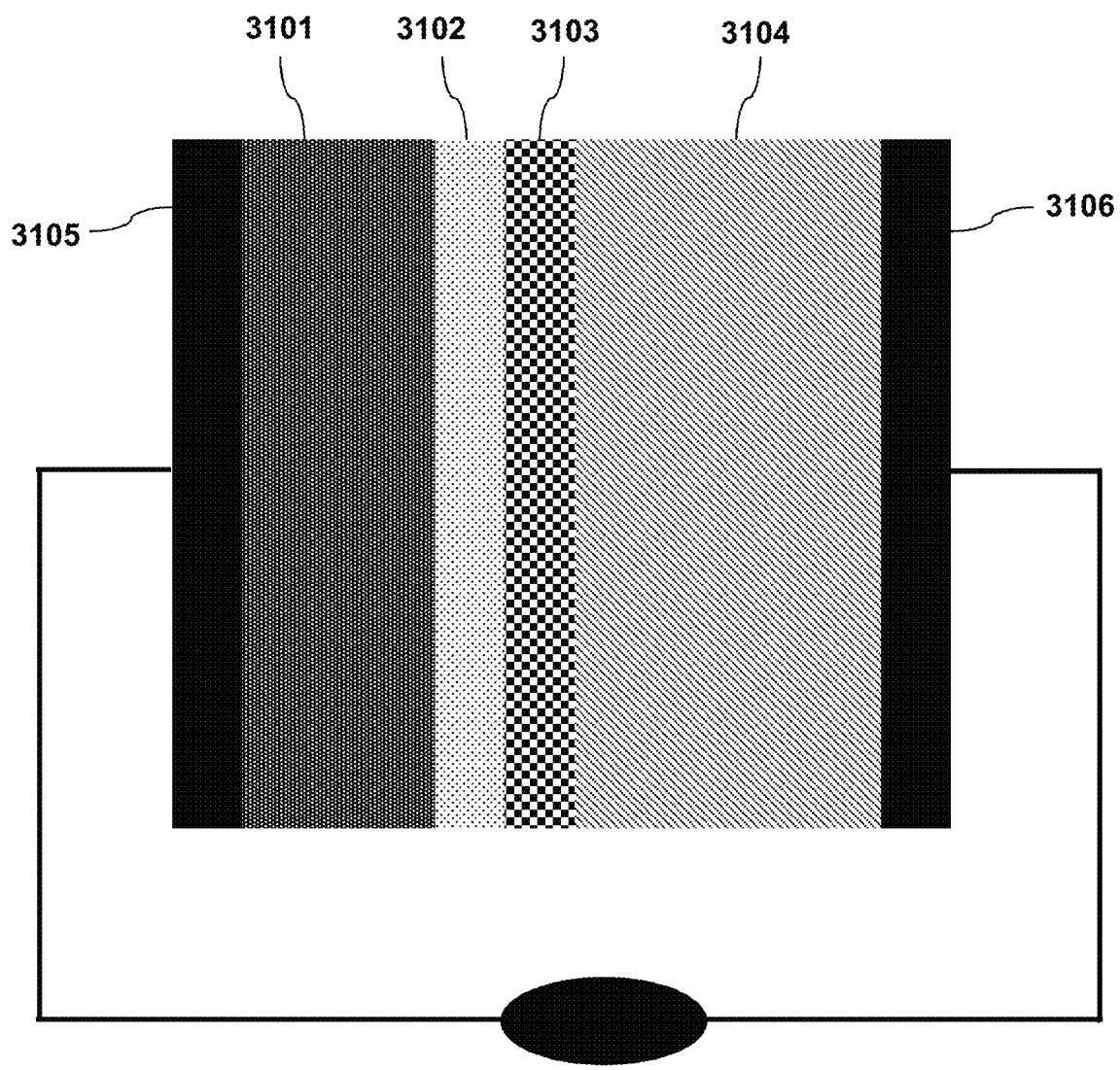
FIG. 31 provides a cross sectional view of an electrochemical cell embodiment including a composite membrane.

FIG. 31 shows an example of the application of the supported membrane in an electrochemical cell. In FIG. 31, The anode 3101 (such as lithium), is positioned adjacent to the anode organic electrolyte 3102 (such as $LiClO_4$ in PC-EC) and a separator (such as Celgard) and membrane 3103 (such as comprising LISICON solid electrolyte) separates the anode electrolyte 3102 from a porous cathode (such as Sulfur or air cathode) and cathode electrolyte (such as aqueous electrolyte) 3104. Current collectors 3105 and 3106 are positioned in contact with anode 3101 and porous cathode/cathode electrolyte 3102.

Figure 32:
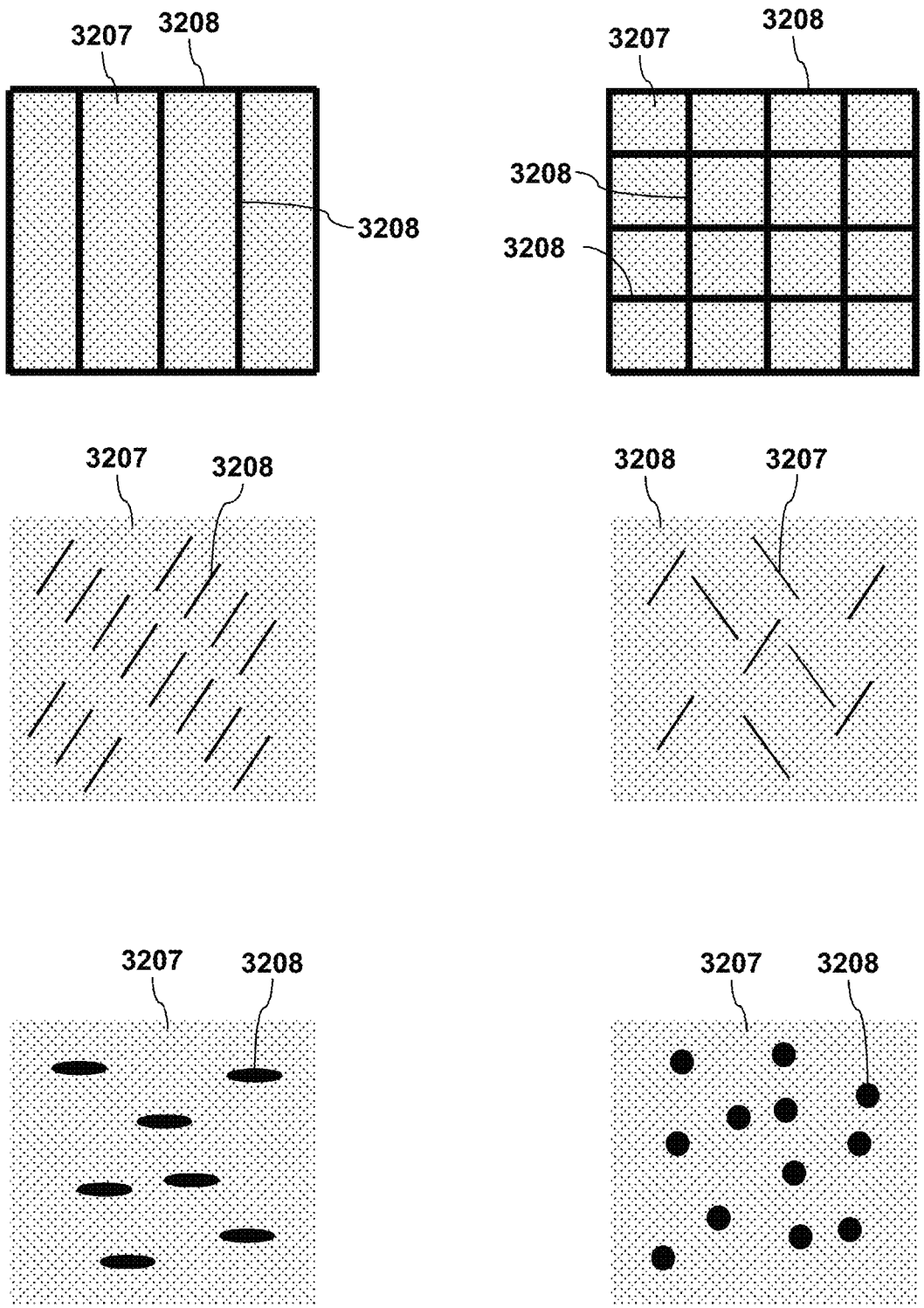
FIG. 32 depicts various composite membrane embodiments.

FIG. 32 illustrates several possible configurations for construction of a thin membrane, such as a separator/membrane 3103 as depicted in FIG. 32. Here, ceramic 3207 is supported by mesh and/or fibers 3208.

Example 6: Active Membranes: Conductivity Assisting Membranes and their Use as Active Separators in Electrochemical Cells Such as Batteries Previous membranes and especially separators in electrochemical cells have only been a passive component. Generally, separators in electrochemical cells are electronically nonconductive components to electronically separate the two opposite electrodes. This example describes active membranes, especially as separators, in electrochemical cells, such as in batteries.

For example a multi-layer membrane comprises two or more layers such that at least one of the layers at either of the ends of the membrane is electronically conductive; and at least one of the middle layers is electronically nonconductive such that there is no electronic connection between the two outer faces of the membrane.

Optionally, some of the layers are deposited or coated on each other. Such a membrane is optionally useful as a separator in an electrochemical cell. Optionally, some of the layers are deposited or coated on another layer or on either of the electrodes. Optionally, the outer conductive layer results in a new electronic path for the outer particles of the adjacent electrode and thus increases the electronic conductivity of the adjacent electrode materials.

Optionally separators of this example are used in an electrochemical cell, such as where the electrode materials undergo shape change due to charging-discharging, which can result in the loss of at least part of the electronic conductivity between the electrode materials and the corresponding current collector.

Electrochemical cells useful for the described separators include, but are not limited to, lithium batteries. A lithium battery optionally includes a separator and optionally a silicon anode. Optionally, the cathode is lithium oxide or is sulfur or is carbon or air. Electrochemical cells useful for the described separators further include alkaline batteries and metal air batteries.

Optionally, in a multi-layer membrane, such as described above each of the conductive layers is a porous or perforated layer or a mesh made of a metal such as stainless steel or aluminum or copper or Ni or tin. Optionally, the metallic layer is between an electrode and an electronically non-conductive layer of the membrane. Optionally, the non-conductive layer is a coating on one side of the metallic layer, for example a polymer such as PTFE or PVDF or PEO or PMMA or PE or PP or PET or $Al_2O_3$.

Useful membranes include those where the total thickness of the membrane is less than 500 micrometers. Useful membranes include those where the total thickness of the membrane is less than 100 micrometers or less than 50 micrometers. Optionally, the total thickness of the membrane is less than 25 micrometers or less than 5 micrometers.

Optionally, the ionic resistance of a separator or membrane described in this example is less than 10 $\Omega cm^2$ or less than 1 $\Omega cm^2$. Optionally, the porosity of a separator or membrane described in this example is at least 30% or at least 70%. Optionally, the outer conductive layer of a separator or membrane described in this example results in a change in electric field at least in the vicinity of the corresponding electrode, for example when compared to a separator or membrane lacking the outer conductive layer. In some cases, the electric field modifications due to the conductive layer of the separator results in a more uniform lithium deposition during charging and thus increase the performance, life cycle and efficiency of the electrochemical cell.

Optionally, membranes of this example are useful in electro-depositions such as in electro-depositing of a metal such as gold, silver or lithium or zinc or copper or an alloy. Optionally, membranes of this example are useful as a separator in an electrochemical cell, such as a rechargeable lithium metal battery.

FIG. 33A-33D depicts an example of the usage of the membrane as a separator in an electrochemical cell such as in a battery. In FIGS. 33A-33D the current collectors are identified as elements 3301A and 3301B; the active electrode particles (e.g. Silicon) are identified as elements 3302; the conductive materials between active electrode particles, such as carbon black, are identified as elements 3303; a conventional separator is identified as elements 3304; a separator of this example is identified as element 3305; inactive (lost) electrode material due to the lost electronic connectivity is identified as elements 3306; the opposite electrode is identified as elements 3307; and electrolyte is identified as element 3308.

Figure 33A:
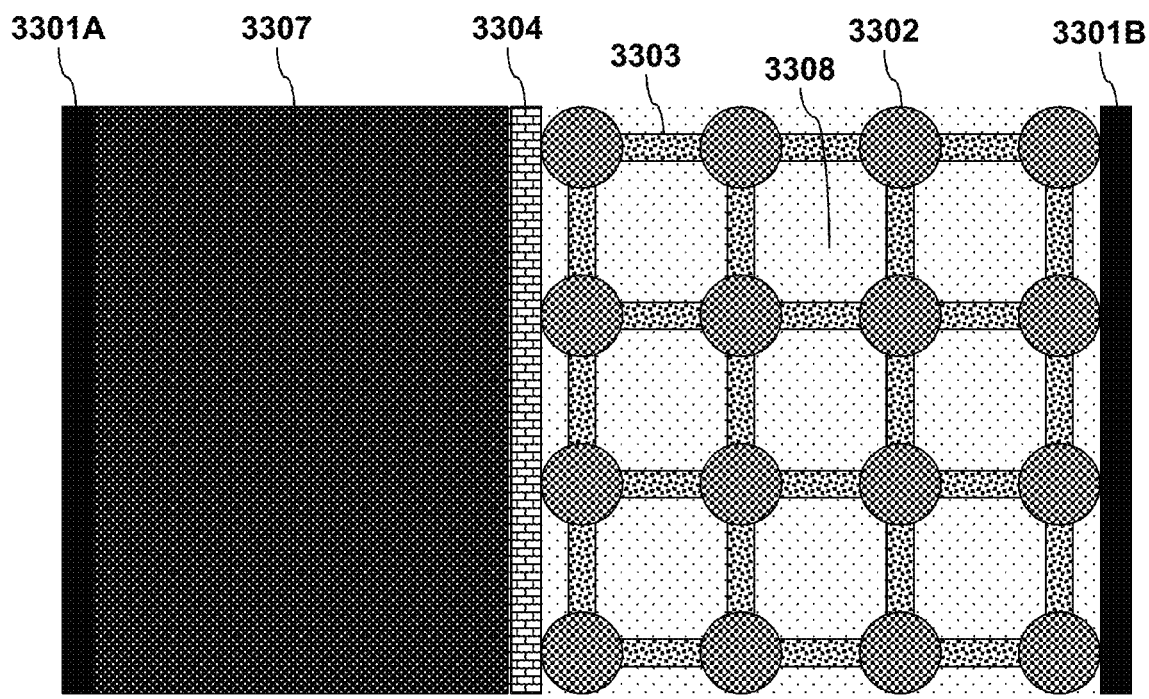
FIGS. 33A-33D provide schematic cross-sectional views of an electrochemical cell before (FIG. 33A) and after (FIG. 33B) charging, and after multiple charge/discharge cycles (FIG. 33C and FIG. 33D).
Figure 33B:
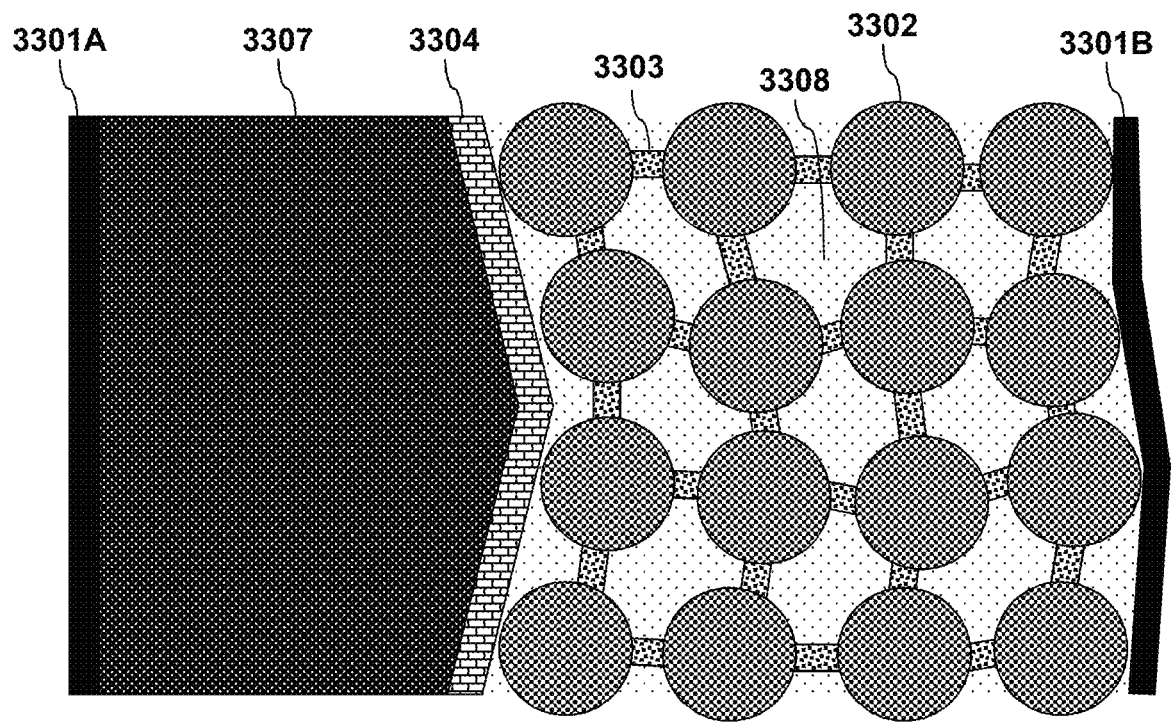
Figure 33C:
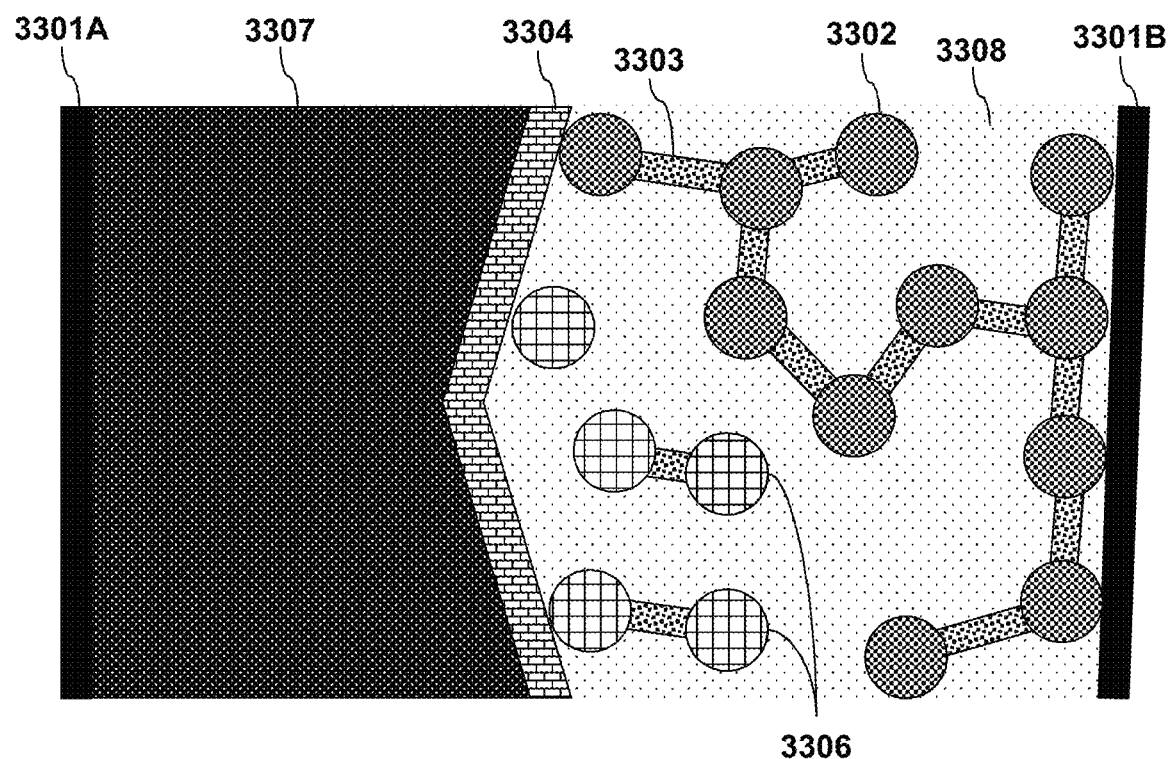
Figure 33D:
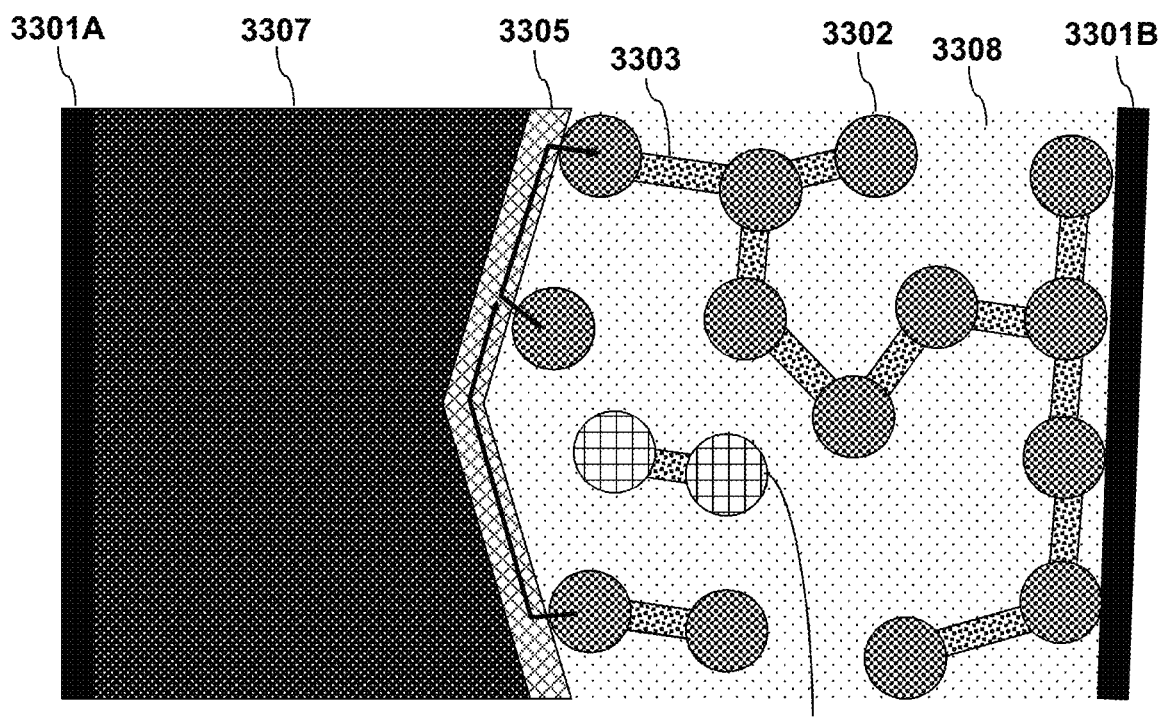

FIG. 33A depicts a schematic representation of the battery before use, where all of the electrode particles 3302 are electronically connected. FIG. 33B depicts a schematic representation of the battery after charging, where the electrode particles 3302 have a large shape change. FIG. 33C depicts a schematic representation of a battery with a conventional separator 3304 after several charge-discharge cycles, showing that some of the electrode particles have lost their electronic connection with the current collector and thus are inactive electrode particles 3306. FIG. 33D depicts a schematic representation of a battery including an electronically conductive separator 3305 in place of conventional separator 3304 after several charge-discharge cycles, showing that some of the electrode particles have lost their conventional electronic connection with the current collector but electronically conductive separator 3305 provides a new path for some of the electrode particles 3303. Arrows indicate a path for electron transfer from these particles to the current collector along electronically conductive separator 3305.

The new batteries described in this example are not limited to conventional parallel plate batteries. An example of such a battery was made by using the 3-d battery structure of the inventor, described in U.S. Patent Publication US 2012/0077095. 3 layers of $LiCoO_2$ cathode from MTI, 2 cm×2 cm×0.2 mm, were put on top of each other and were perforated to make periodic holes of 1 mm. Then rings of PE polymer, 0.025 mm thick, were put between them as electrolyte holders and the layers were put in an aluminum tube 2 cm×2 cm×1 cm. Copper wires of about 0.75 mm diameter were put through the holes and fixed from the top and bottom by guides. Electrolyte (mix of PC, EC, DMC and $LiClO_4/LiPF_6$) was added as electrolyte. After fixing the cell and attaching in to a galvanostat, the cell was charged at rates starting at as low as 10 μA for up to few days. Lithium metal was deposited on the copper wire which formed the anode. After a few charge discharge cycles, called the formation of the cell, to stabilize the performance, the cell was ready to use. After cycling such a conventional cell at higher currents (for example 1 mA) the cell will short due to lithium dendrite formation on the copper wires and growing of such dendrites to the point that they touch the $LiCoO_2$ plates. Using the separator design of shifter-layers as discussed earlier prevents the short and improves the cycle life of the battery.

The separator efficiency in preventing dendrite shorting is also clearly shown by making symmetric coin cells of lithium and cycling them at high currents. Results (experiment at room temperature, electrolyte: LP71 from Merk) show that 0.75 mm thick disks of lithium foils can be cycled for more than 500 cycles at rates of as high as 10 mA and at cycling time of 5 hours with no signs of shorting.

Example 7: Experimental Results for Electrochemical Cells Having an Electronically and Ionically Conductive Layer Positioned Adjacent to an Electrode Experiment A: An electrochemical cell was constructed from a lithium cobalt oxide cathode 0.100 mm thick and a Li metal anode 0.35 mm thick. The electrolyte used for the cell was Merck LP 71 (1 M $LiPF_6$ in EC-DC-DMC 1:1:1). A PE/PP/PE multilayer (Celgard 2325) 0.025 mm thick was used as the separator. A conductive layer comprising Ni mesh (117.6) was placed between the Li anode and the separator. The cell was ½ inch square and made in house. The electrodes, the separator and the conductive layer were cut into ½ inch diameter disks.

The cell was constructed inside a glove box. The ⅝ inch square cell was made of Teflon. The lithium anode was made from lithium foil after rinsing with DMC and hexane. $LiCoO_2$ foil was used as the cathode. The cell was constructed with the layers in the following order: wire heads/stainless steel disk/Li/Ni mesh layer/celgard separator/Li-$CoO_2$/aluminum foil. The electrolyte was used to oversaturate the cell.

Figure 34:
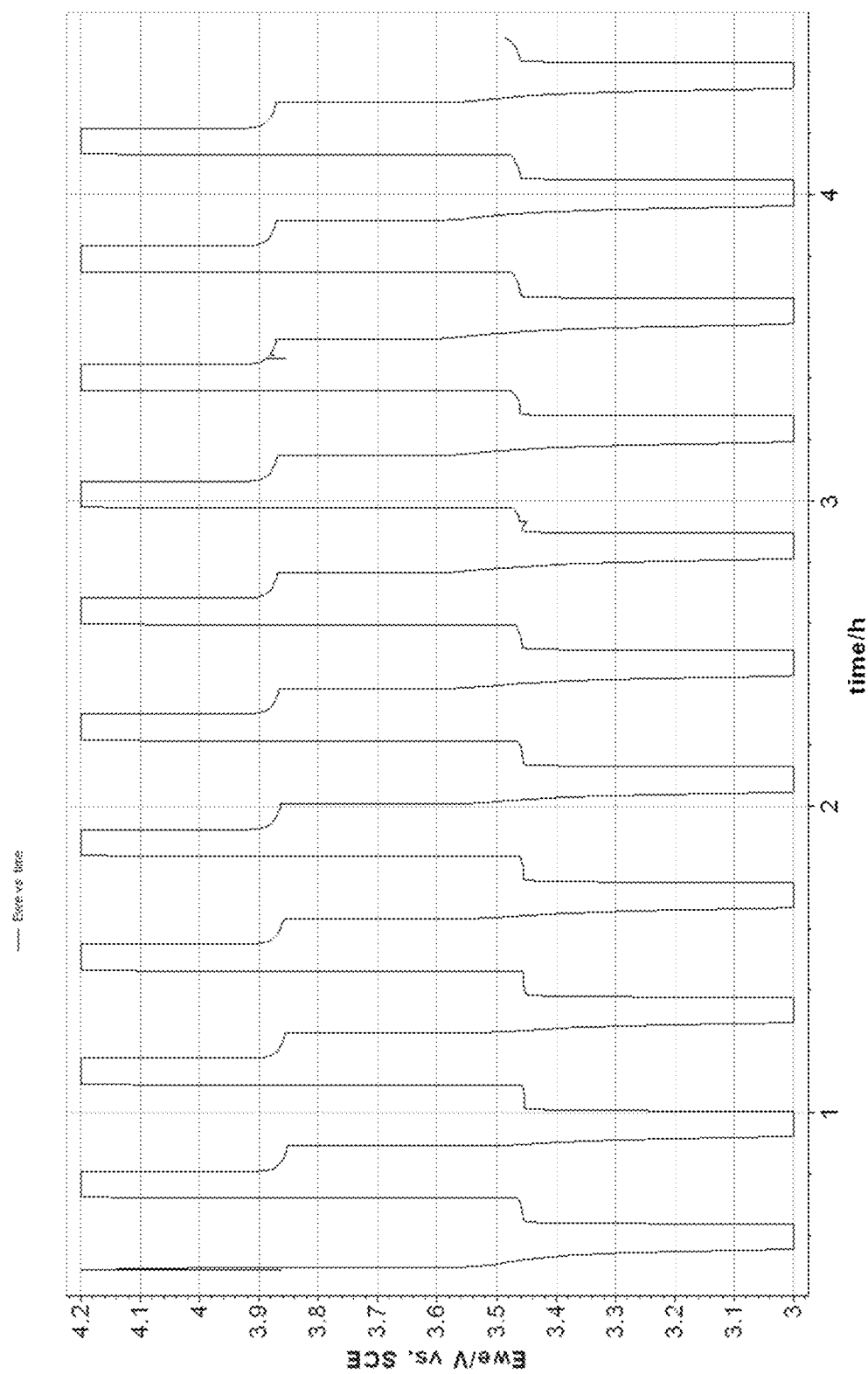
FIGS. 34-43 provide plots showing experimental data obtained from electrochemical cells in which an ionically and electronically conductive layer was positioned adjacent to an electrode.
Figure 35:
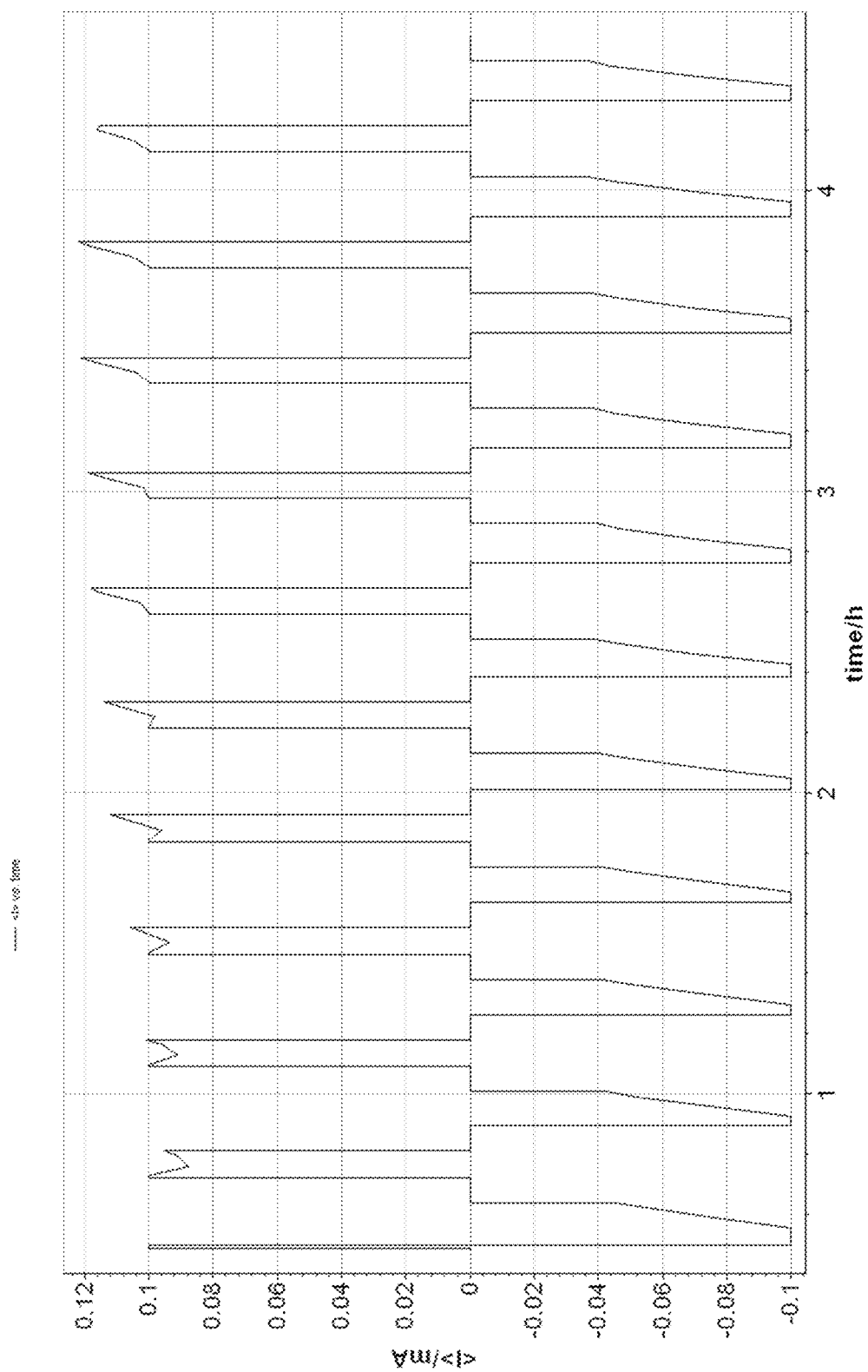
Figure 36:
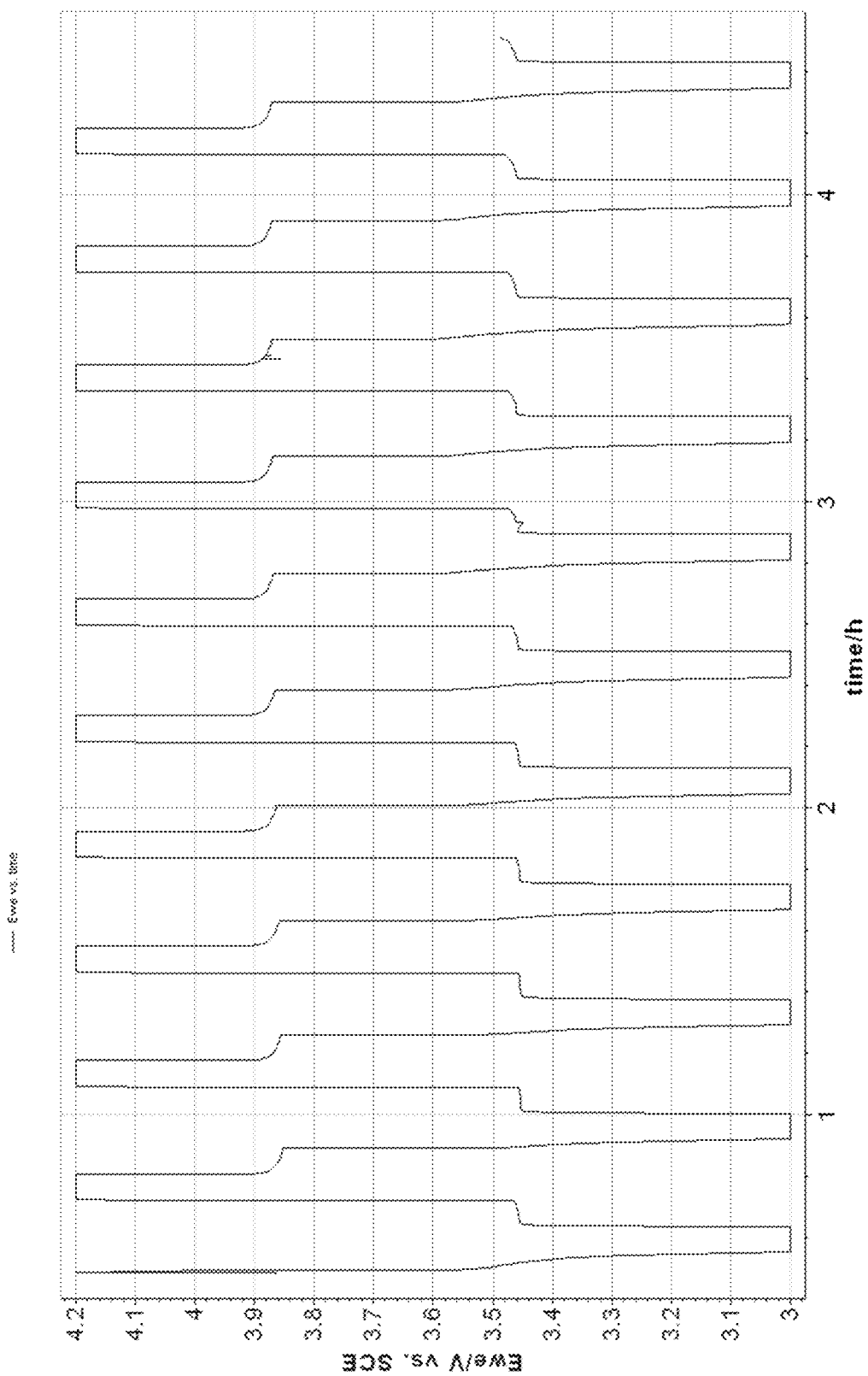

FIGS. 34, 35 and 36 show the cycling data, voltage vs time and current vs time, of the cell. The cell was tested at room temperature, and voltage range was set to 3-4.2 v.

Experiment B: An electrochemical cell was constructed from a lithium cobalt oxide cathode 0.100 mm thick and a Li metal anode 0.35 mm thick. The electrolyte used for the cell was Merck LP 71 (1 M $LiPF_6$ in EC-DC-DMC 1:1:1). A PE/PP/PE multilayer (Celgard 2325) 0.025 mm thick was used as the separator. A conductive layer comprising Cu mesh (117.6) was placed between the Li anode and the separator. The cell was ½ inch square and made in house. The electrodes, the separator and the conductive layer were cut into ⅞ inch diameter disks.

Figure 37:
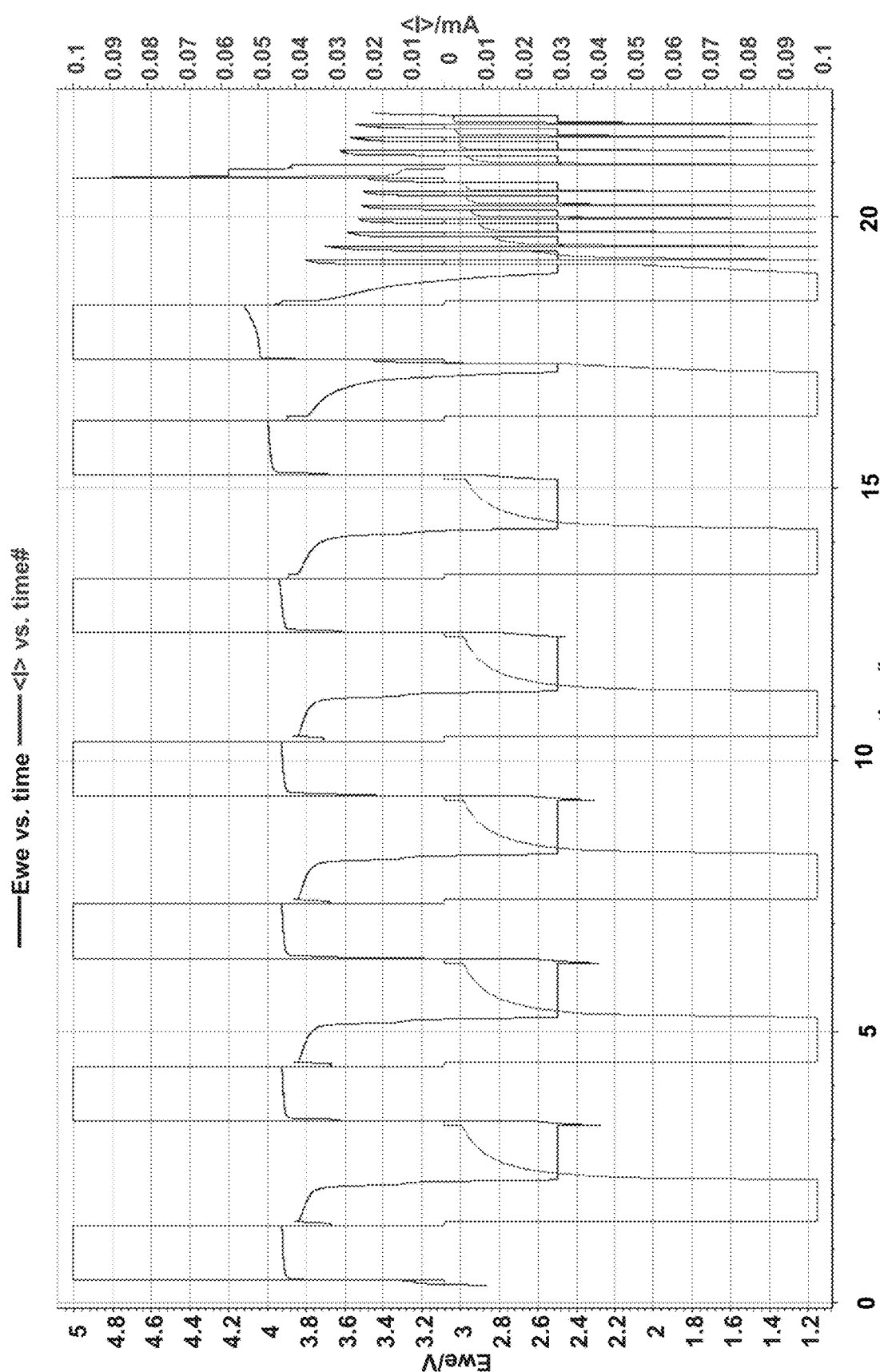
Figure 38:
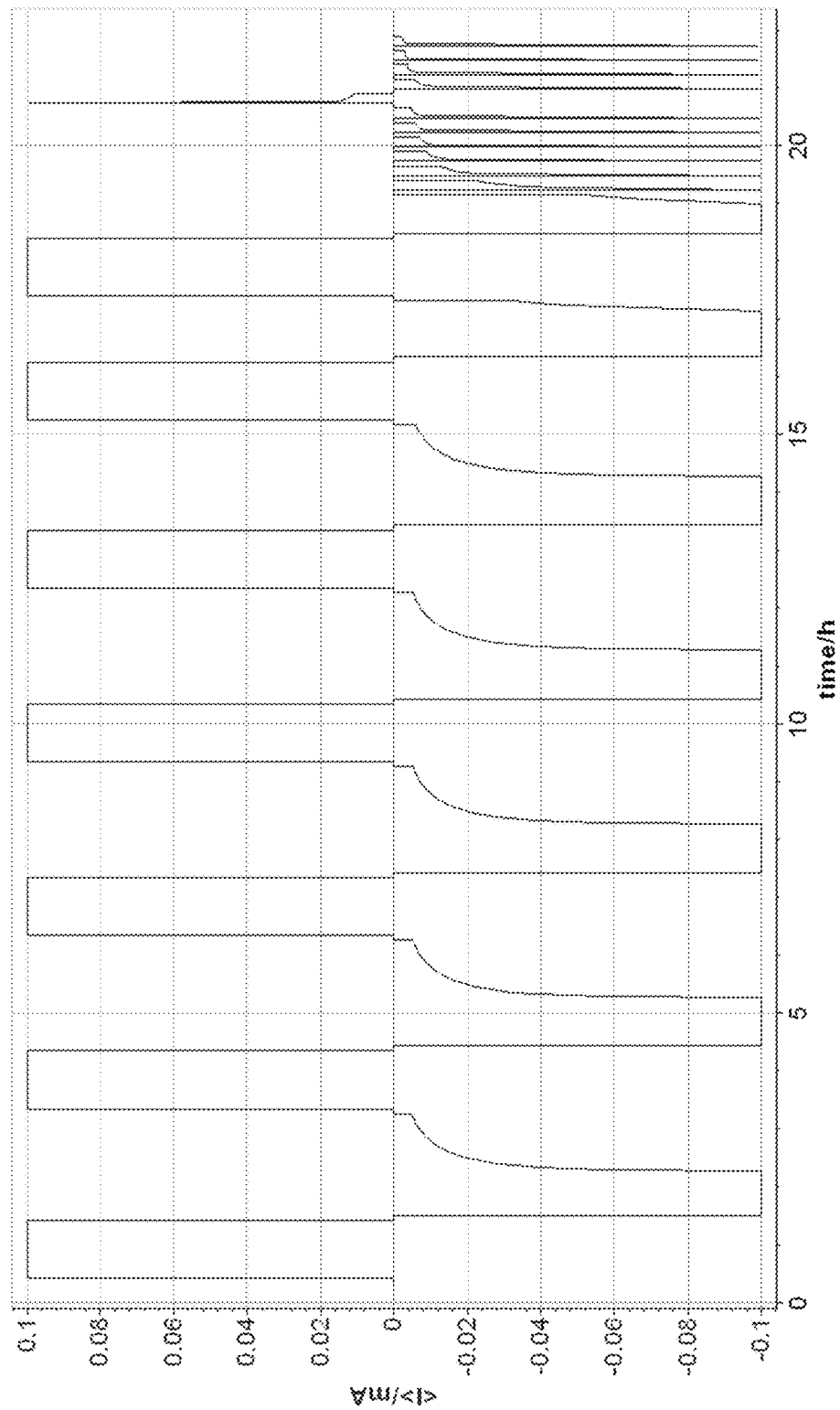
Figure 39:
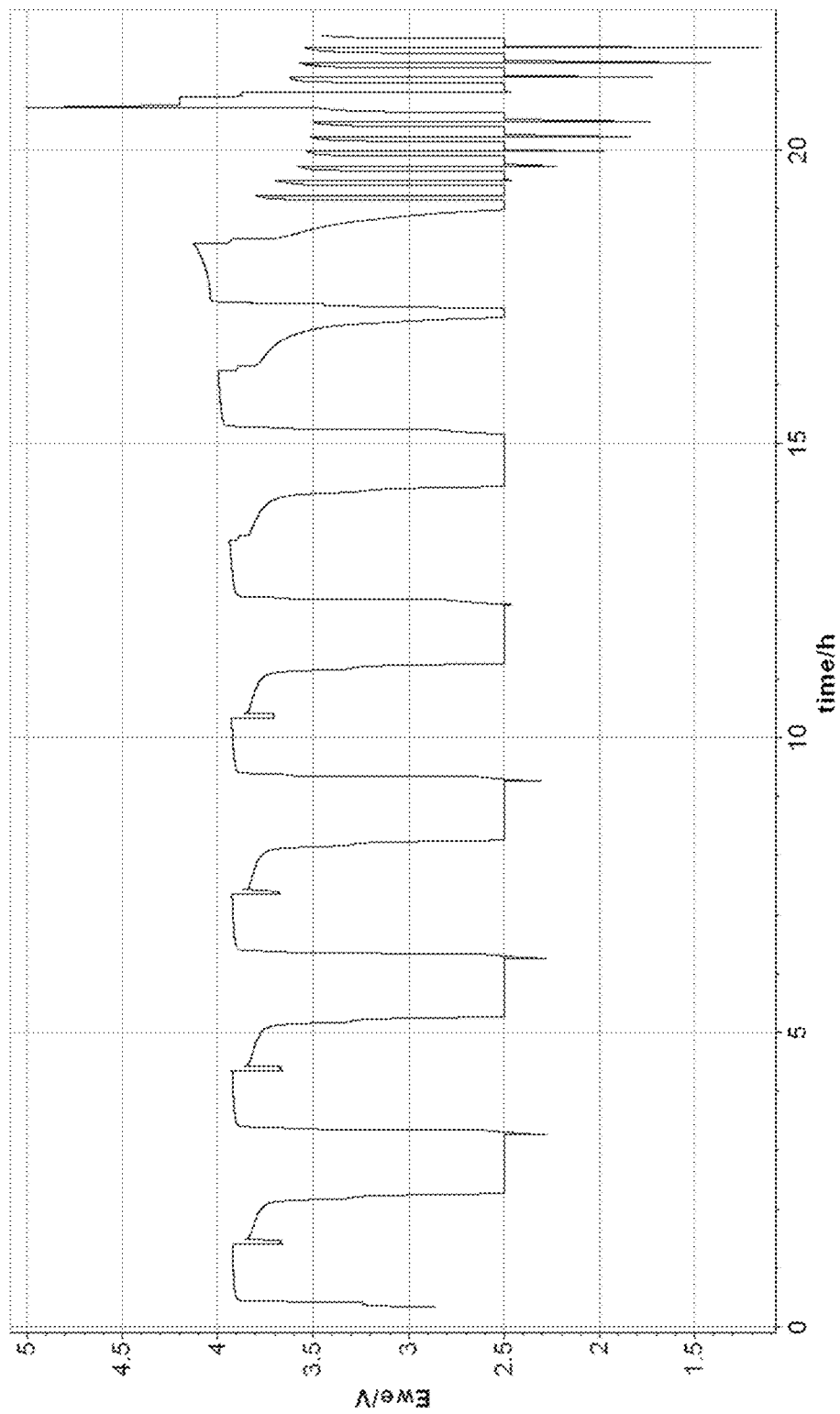

FIGS. 37, 38 and 39 show the cycling data, voltage vs time and current vs time, of the cell. The cell was tested at room temperature, and voltage range was set to 3-4.2 v.

Experiment C: Coin cells of size 2035 were made having a PE/PP/PE multilayer separator (Celgard 2325) 0.025 mm thick. The electrolyte used was Merck LP 50 (1 M $LiPF_6$ in EC-EMC 1:1). A $LiFePO_4$ cathode was used and a graphite anode was used. A Ni mesh (117.6) was positioned between the graphite anode and the separator.

Figure 40:
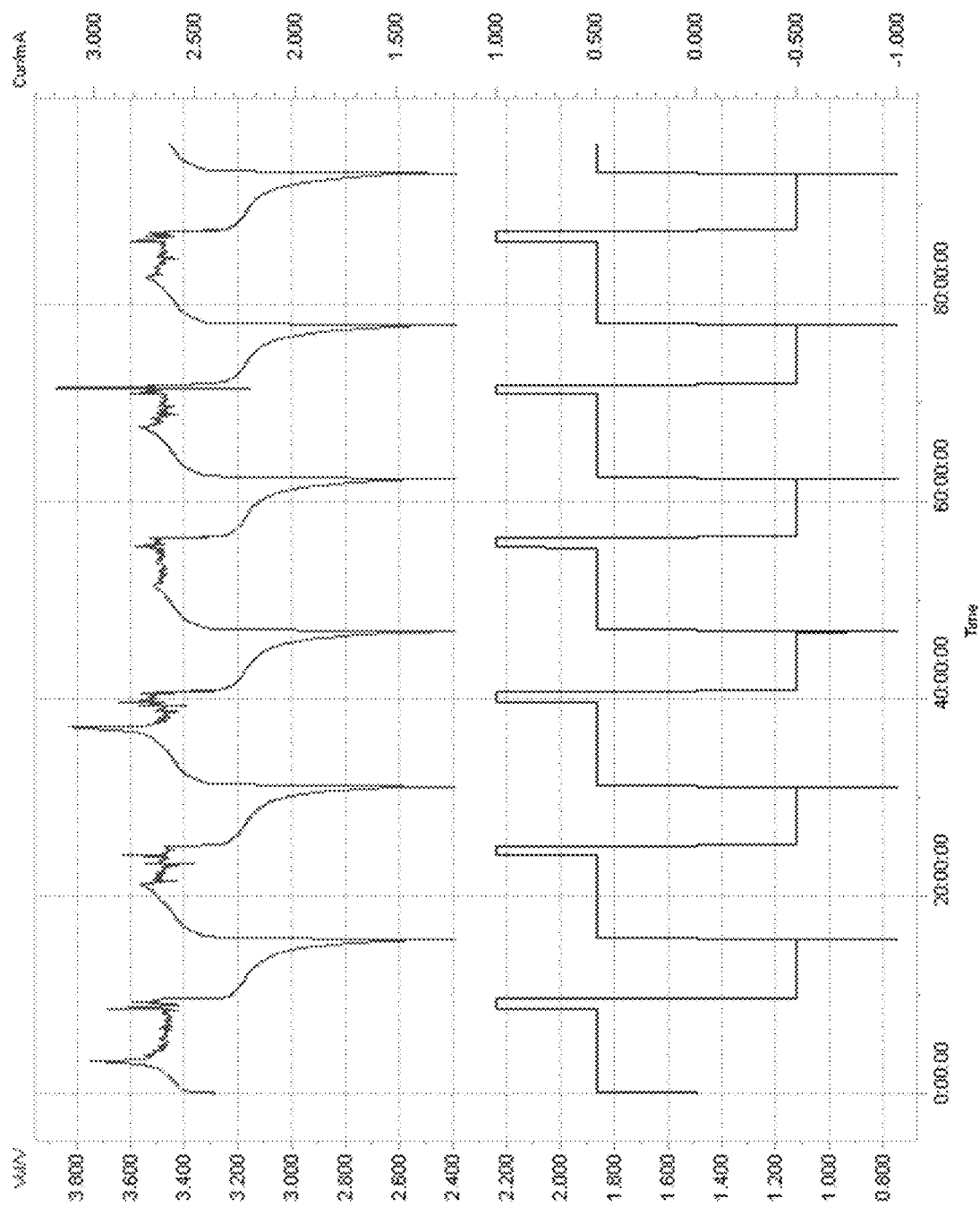
Figure 41:
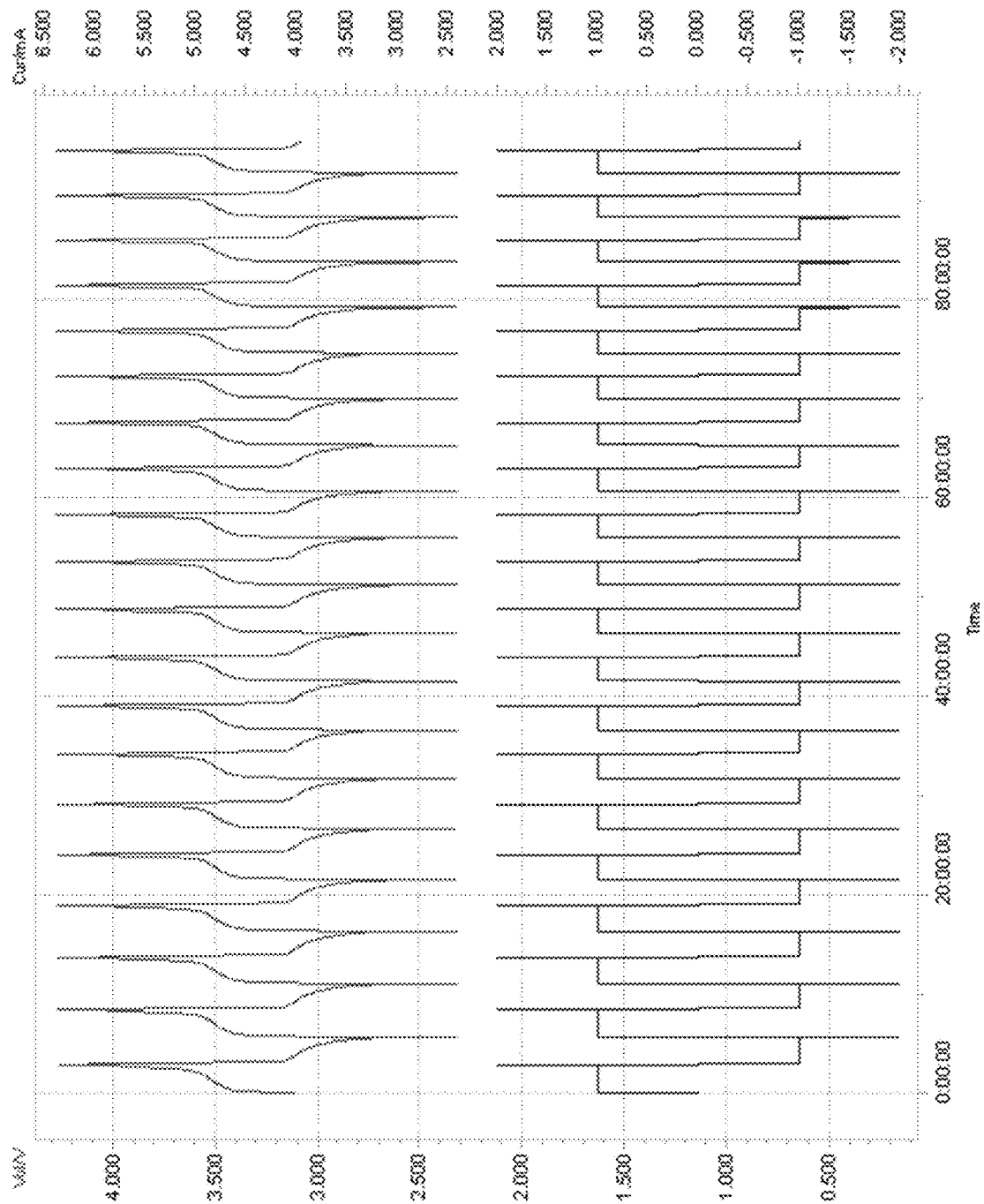

FIGS. 40 and 41 show the cycling data, voltage vs time (top) and current vs time (bottom), of the cells. The cell was tested at room temperature, and voltage range was set to 2.5-4.2 v.

Experiment D: Two coin cells of size 2035 were made having a PE/PP/PE multilayer separator (Celgard 2325) 0.025 mm thick. The electrolyte used was Merck LP 50 (1 M $LiPF_6$ in EC-EMC 1:1). A $LiFePO_4$ cathode was used and a Li anode was used. A Ni mesh (333) was positioned between the $LiFePO_4$ cathode and the separator.

Figure 42:
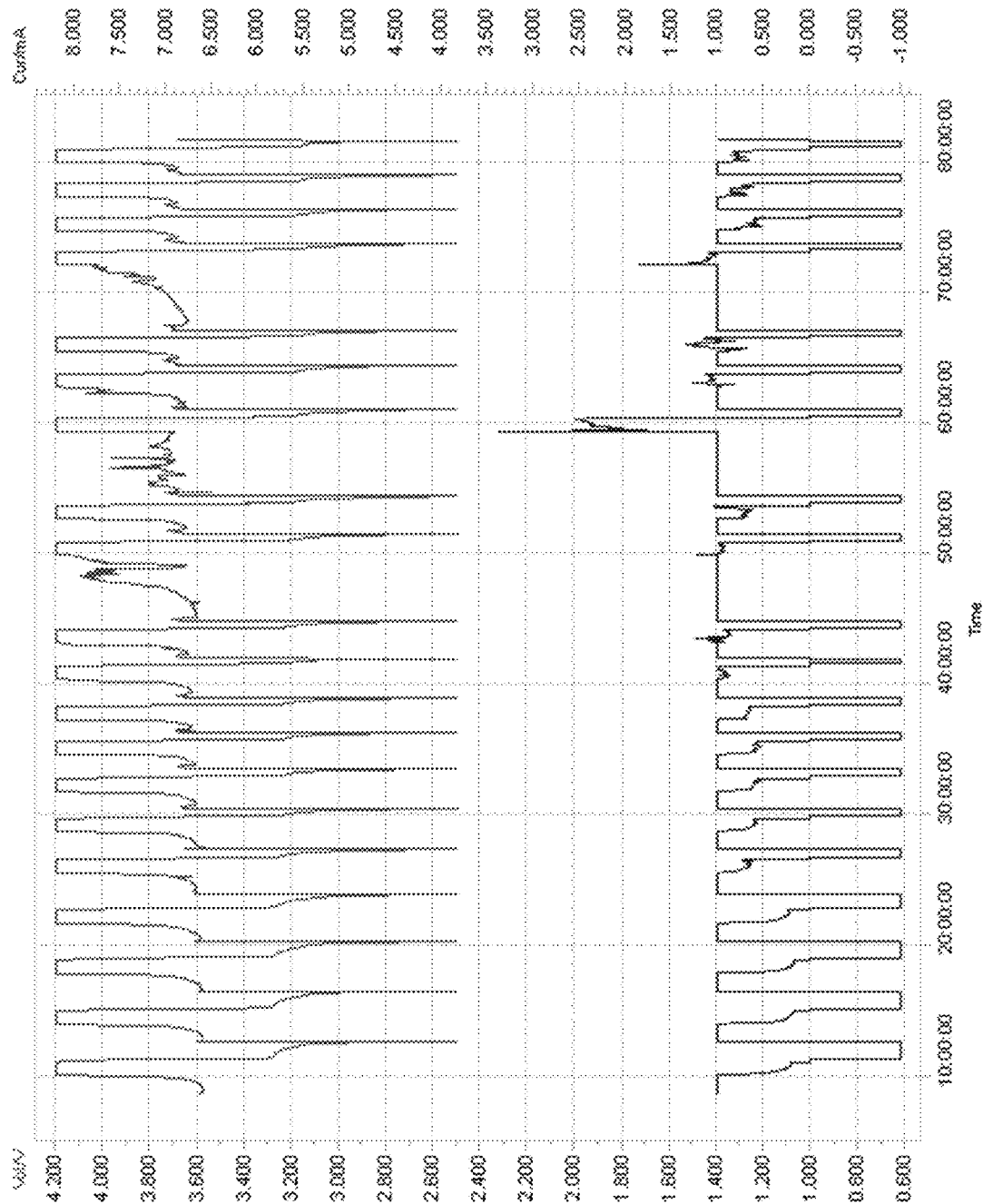
Figure 43:
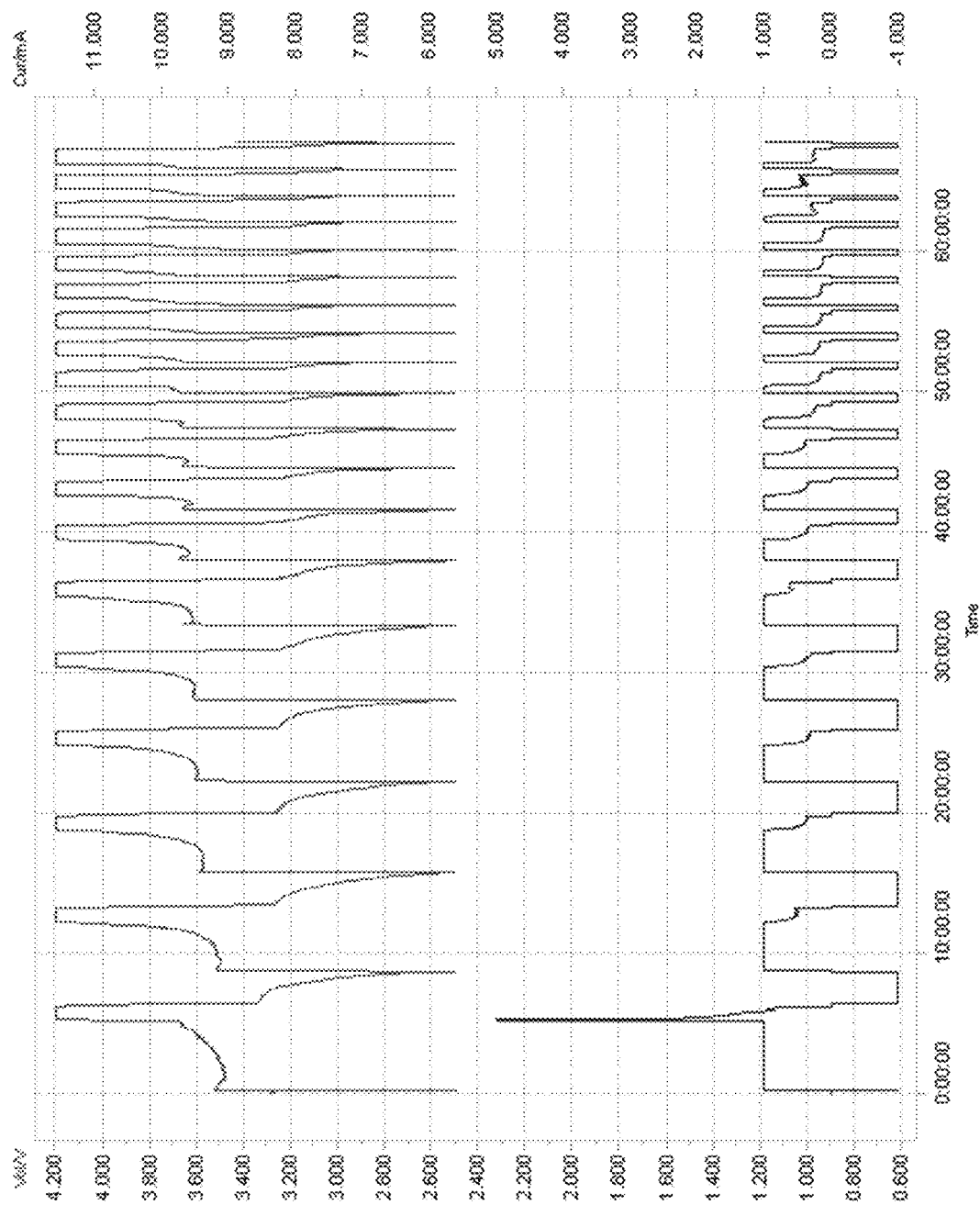
Figure 44:
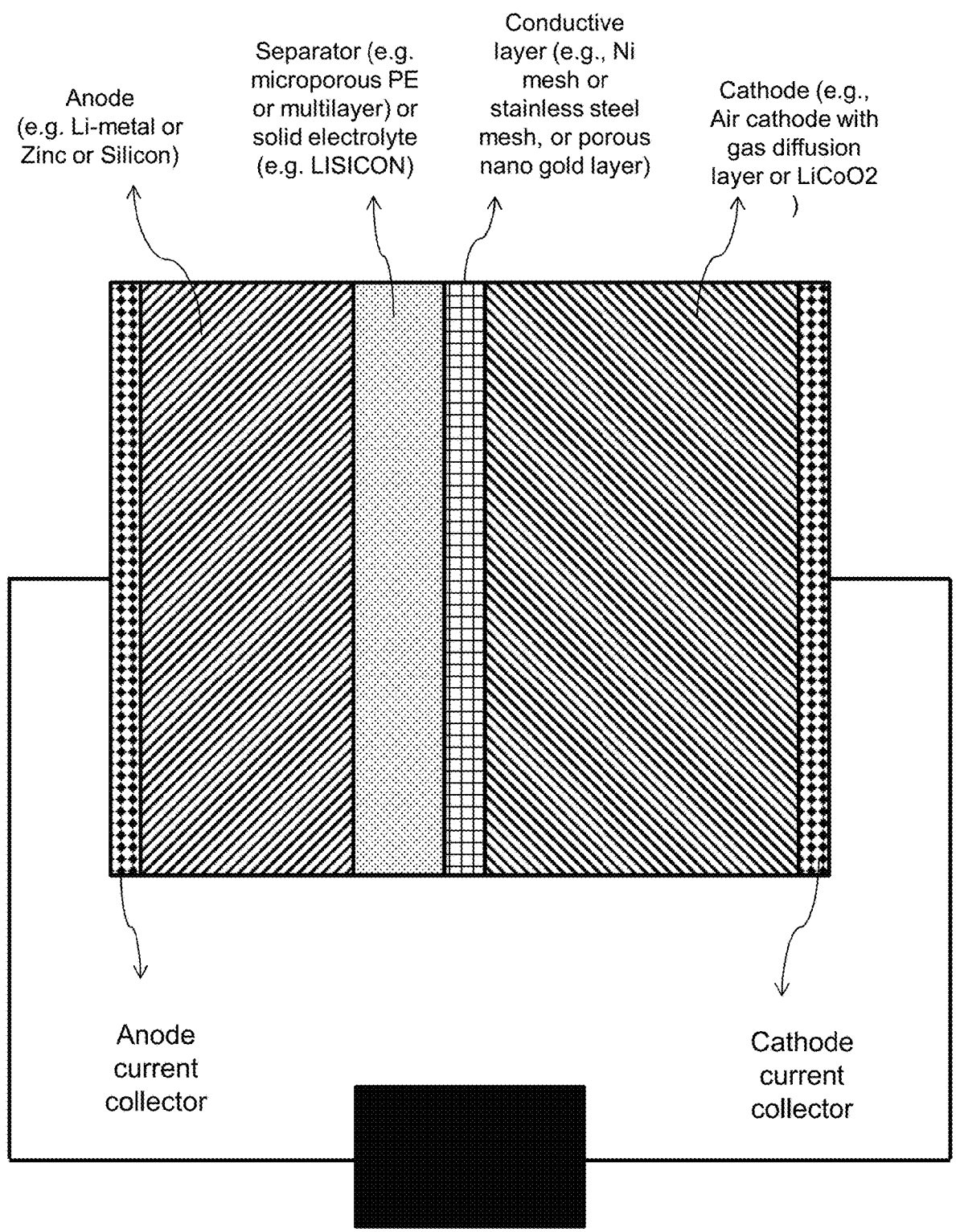
FIGS. 44-49 provide schematic cross-sectional views of electrochemical cell embodiments including one or more conductive layers.
Figure 45:
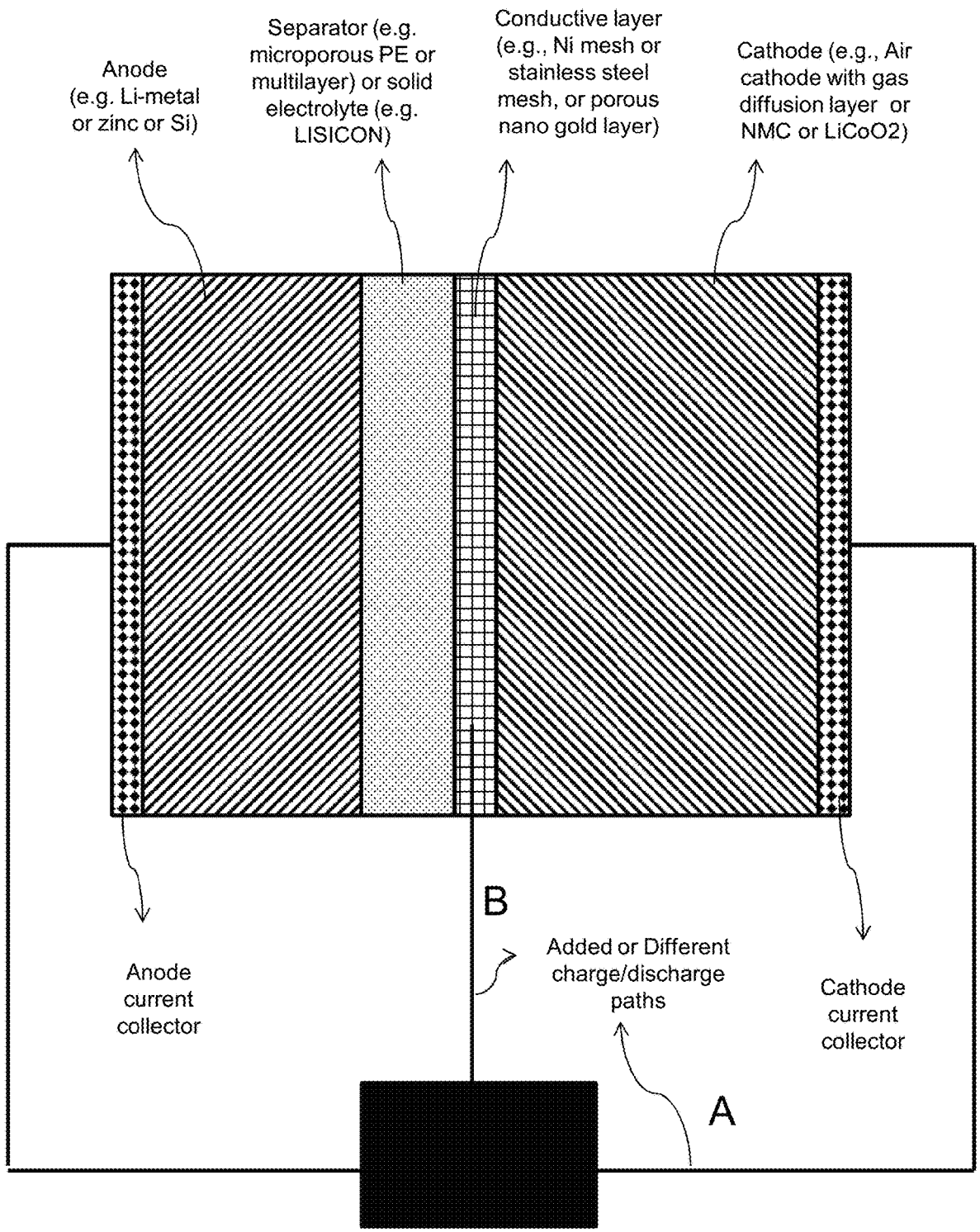
Figure 46:
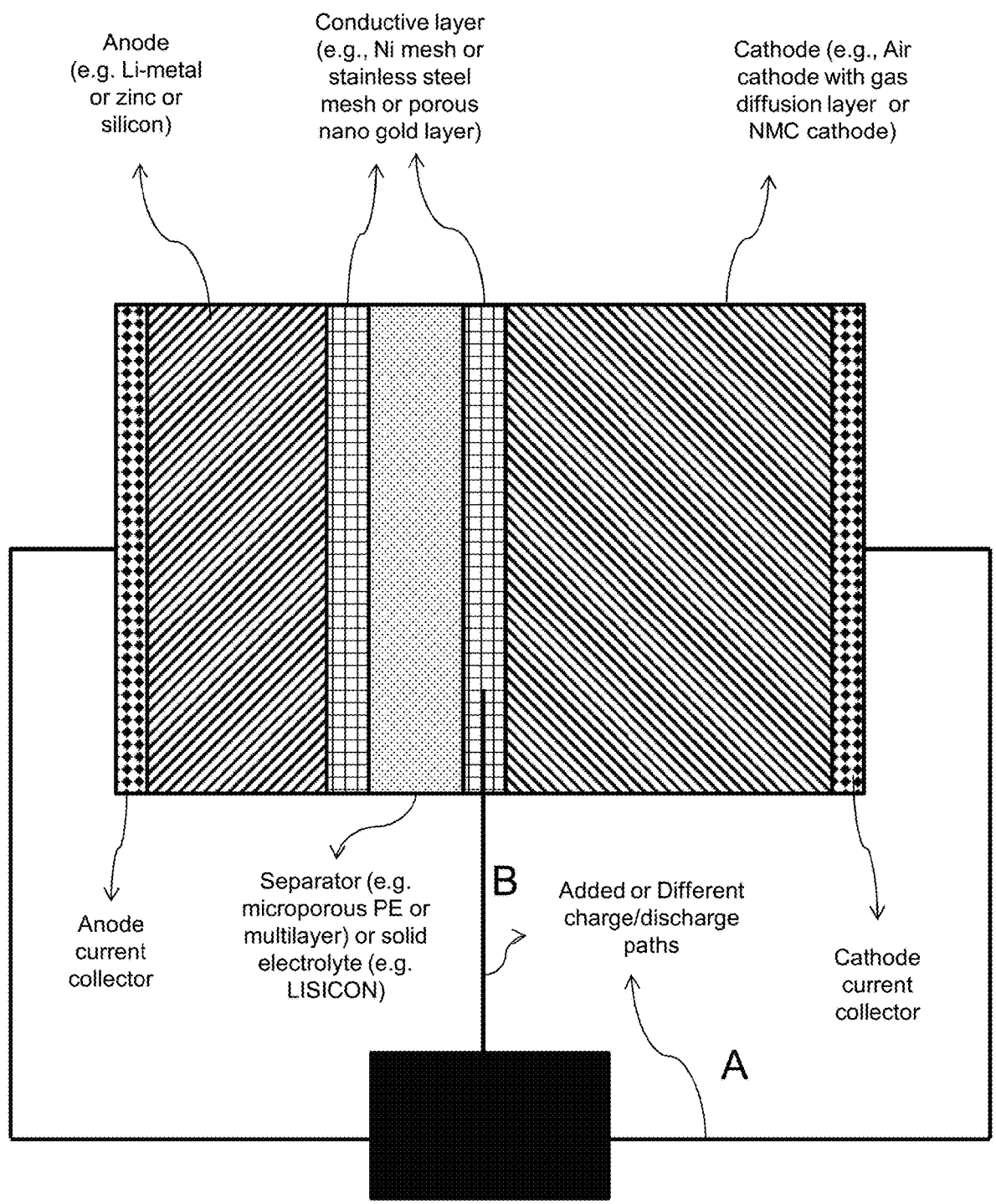
Figure 47:
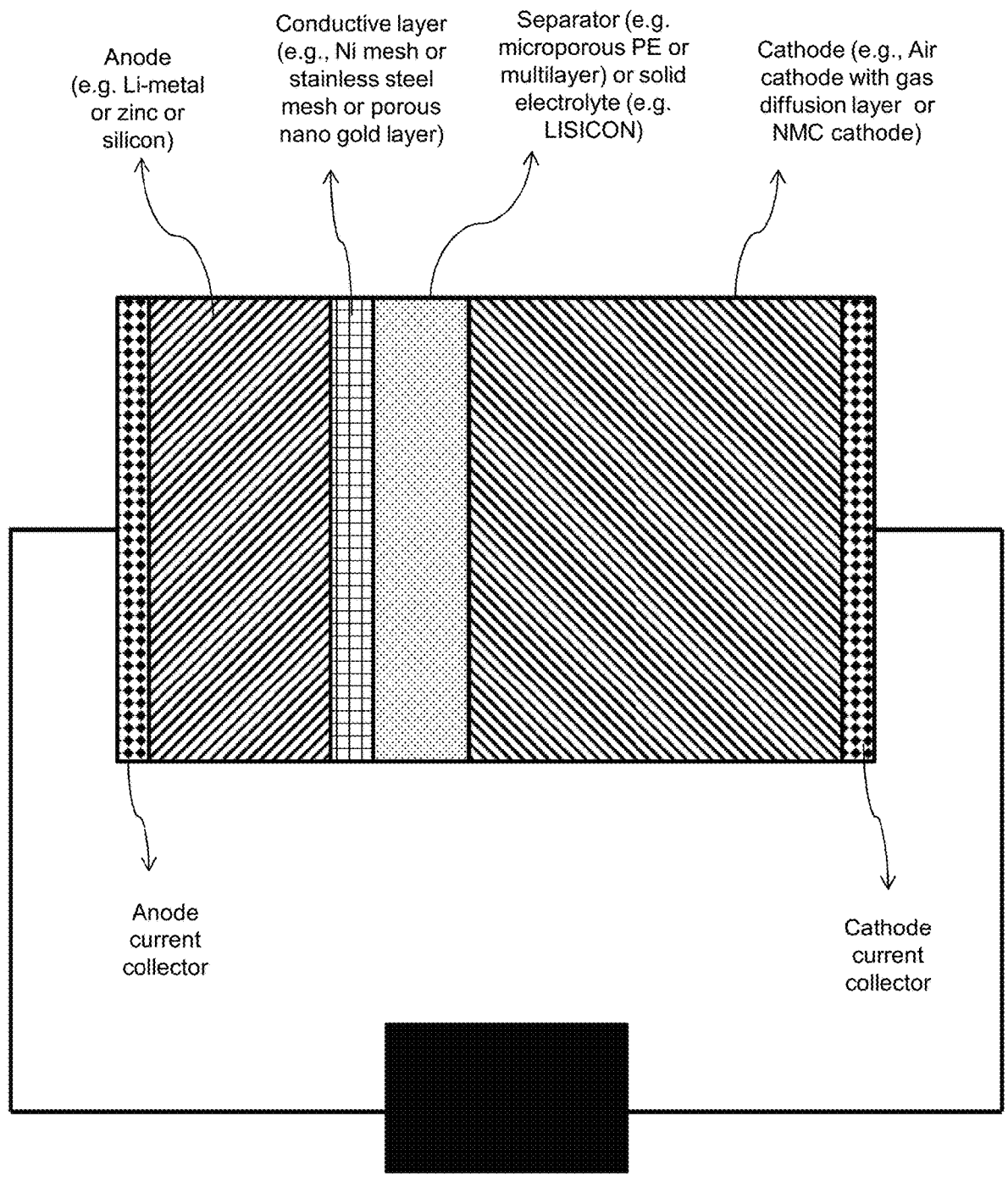
Figure 48:
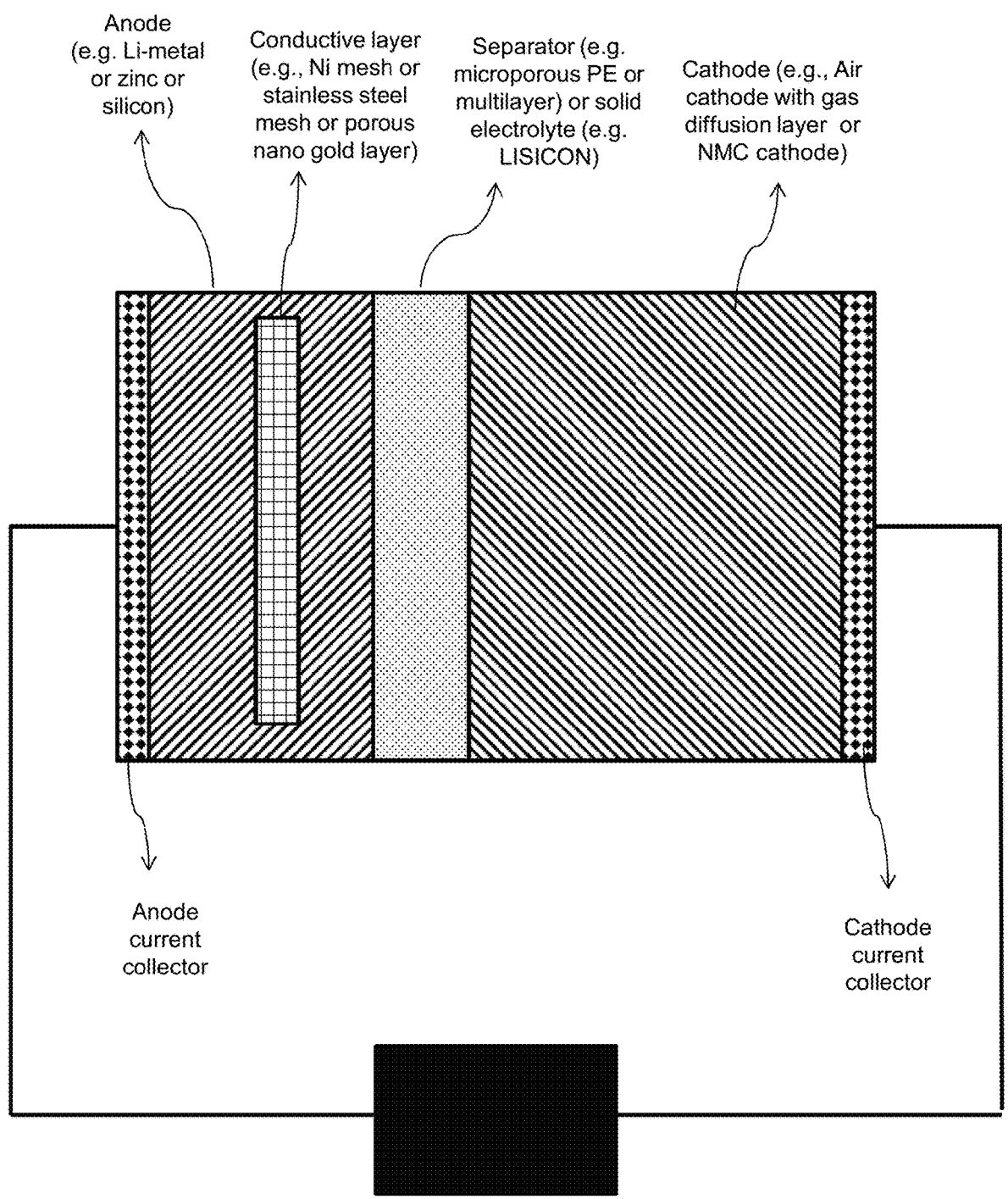
Figure 49:
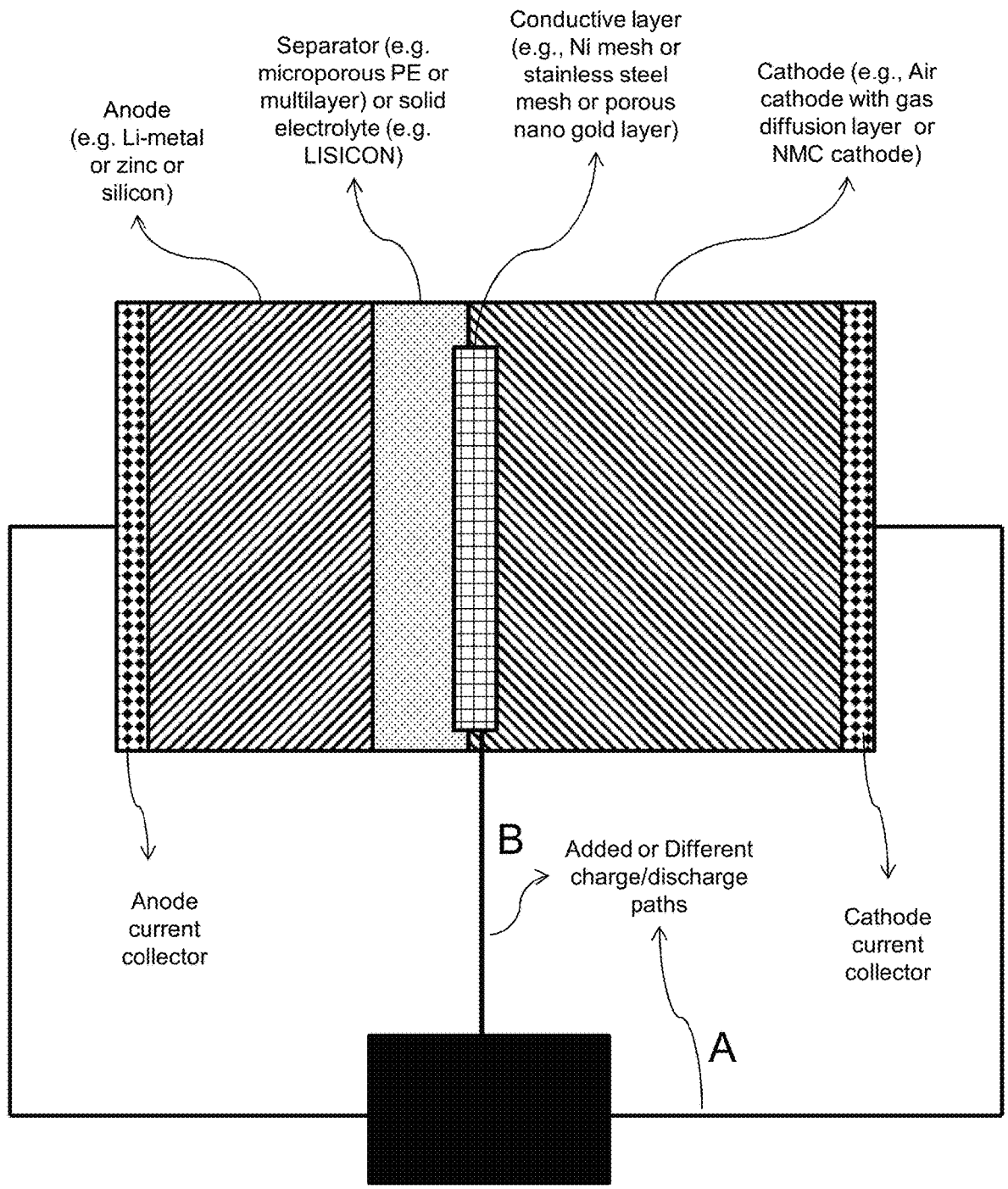

FIGS. 42 and 43 show the cycling data, voltage vs time and current vs time, of the cell. The cell was tested at room temperature, and voltage range was set to 2.5-4.2 v.

REFERENCES

U.S. Pat. Nos. 8,202,649, 8,288,034. U.S. Patent Application Publication Nos. US 2012/0119155, US 2012/0219842, 2012/0183868.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. An electrochemical cell comprising:
   a positive electrode;
   a negative electrode;
   an ionically conductive and electronically insulating separator positioned between said positive electrode and said negative electrode;
   one or more thermally and ionically conductive layers positioned between said positive electrode and said separator or positioned between said negative electrode and said separator; and
   one or more electrolytes positioned between said positive electrode and said negative electrode; wherein said one or more electrolytes are capable of conducting charge carriers; and
   wherein each of said one or more thermally and ionically conductive layers independently comprises a thermal conductive polymer, a thermal conductive ceramic, a polymer having thermally conductive fibers, a polymer having $Al_2O_3$ fibers, or any combination thereof.

2. The electrochemical cell of claim 1, wherein each of said one or more thermally and ionically conductive layers independently comprises a polymer having thermally conductive $Al_2O_3$ fibers.

3. The electrochemical cell of claim 1, wherein said electrochemical cell comprises a first thermally and ionically conductive layer positioned between said positive electrode and said separator and a second thermally and ionically conductive layer positioned between said negative electrode and said separator.

4. The electrochemical cell of claim 1, wherein each of said one or more thermally and ionically conductive layers is provided in thermal communication with said positive electrode or said negative electrode.

5. The electrochemical cell of claim 1, wherein said one or more thermally and ionically conductive layers assist to provide for a uniform temperature distribution within said electrochemical cell, thereby increasing a performance and a life cycle of said electrochemical cell.

6. The electrochemical cell of claim 1, wherein each of said one or more thermally and ionically conductive layers independently has a thickness less than or equal to 0.01 mm or selected from the range of 10 nm to 0.01 mm.

7. The electrochemical cell of claim 1, wherein each of said one or more thermally and ionically conductive layers independently comprises a porous material, a perforated layer, a mesh or a foam.

8. The electrochemical cell of claim 1, wherein each of said one or more thermally and ionically conductive layers independently has a porosity greater than or equal to 50%, greater than or equal to 75% or greater than or equal to 90%.

9. The electrochemical cell of claim 1, wherein each of said one or more thermally and ionically conductive layers independently comprises a metal, an alloy, a ceramic, a polymer, a metal coated with an electronically insulating material or an alloy coated with an electronically insulating material.

10. The electrochemical cell of claim 1, wherein each of said one or more thermally and ionically conductive layers independently comprises a metal, an alloy, Al, Ni, Sn, Steel, stainless steel, copper, Si, $Li_3N$, aluminum oxide, lithium oxide, lithium peroxide, polyethylene, polypropylene, polyethylene terephthalate, polyvinylidene fluoride, poly(4,4'-oxydiphenylene-pyromellitimide), polytetrafluoroethylene, poly(methyl methacrylate), sodium phosphorous oxynitride, $ZrO_2$, sulfonated tetrafluoroethylene based fluoropolymer-copolymer, poly(3,4-ethylenedioxythiophene) poly(styrenesulfonate), $SiO_2$, polyvinyl chloride, glass fiber mat, lithium phosphorus oxynitride or any combination thereof.

11. The electrochemical cell of claim 1, wherein each of said one or more thermally and ionically conductive layers independently comprises a mesh.

12. The electrochemical cell of claim 1, wherein each of said one or more thermally and ionically conductive layers independently comprises a coating on one or more surfaces of said positive electrode or said negative electrode.

13. The electrochemical cell of claim 1, wherein each of said one or more thermally and ionically conductive layers independently comprises a coating on one or more sides of said separator or is positioned adjacent to said separator.

14. The electrochemical cell of claim 1, wherein each of said one or more thermally and ionically conductive layers independently comprises an interior layer of said separator.

15. The electrochemical cell of claim 1, wherein any faces of said separator, said negative electrode or said positive electrode are independently coated with a hydrophilic material or a hydrophobic material or an anion exchange material or a cation exchange material.

16. The electrochemical cell of claim 1, wherein the one or more electrolytes comprises a solid electrolyte, the solid electrolyte comprising a first ionically conductive and electronically insulating material and a group of mechanically tough fibers positioned inside the first ionically conductive and electronically insulating material.

17. The electrochemical cell of claim 16, wherein said fibers increase a toughness of said solid electrolyte, prevent pin hole cracks during fabrication and prevent cracks due to cycling.

18. The electrochemical cell of claim 16, wherein said fibers comprise 20% or more by volume of said first ionically conductive and electronically insulating material or occupy 20% or more of a surface area of said separator.

19. The electrochemical cell of claim 16, wherein said fibers have an average size selected from the range 0.01 μm to 2000 μm.

20. The electrochemical cell of claim 16, wherein said first ionically conductive and electronically insulating material has an average thickness selected from the range 0.01 μm to 2000 μm.

21. The electrochemical cell of claim 16, wherein said fibers are ionically insulating.

22. The electrochemical cell of claim 16, wherein said fibers are ionically conductive.

23. The electrochemical cell of claim 16, wherein said fibers are electronically conductive.

24. The electrochemical cell of claim 16, wherein said fibers are electronically insulating.

25. The electrochemical cell of claim 16, wherein said fibers have a binding effect and bind said first ionically conductive and electronically insulating material together.

26. The electrochemical cell of claim 16, wherein the first ionically conductive and electronically insulating material is the ionically conductive and electronically insulating separator.

27. The electrochemical cell of claim 16, wherein the one or more thermally and ionically conductive layers comprise the group of mechanically tough fibers.

28. The electrochemical cell of claim 16, wherein the one or more thermally and ionically conductive layers are the group of mechanically tough fibers.

29. The electrochemical cell of claim 16, wherein the group of mechanically tough fibers are the polymer having thermally conductive fibers, the polymer having $Al_2O_3$ fibers, or said any combination thereof.

* * * * *